(12) United States Patent
Takimoto et al.

(10) Patent No.: US 7,370,881 B2
(45) Date of Patent: *May 13, 2008

(54) KNEE PROTECTING AIRBAG DEVICE

(75) Inventors: Masahiro Takimoto, Aichi (JP); Toru Koyama, Aichi (JP); Yuji Kuriyama, Aichi (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/653,413

(22) Filed: Jan. 16, 2007

(65) Prior Publication Data

US 2007/0132215 A1    Jun. 14, 2007

Related U.S. Application Data

(63) Continuation of application No. 10/311,329, filed as application No. PCT/JP01/05848 on Jul. 5, 2001, now Pat. No. 7,182,365.

(30) Foreign Application Priority Data

| Jul. 7, 2000 | (JP) | ............................. 2000-207289 |
| Dec. 13, 2000 | (JP) | ............................. 2000-379371 |
| Dec. 18, 2000 | (JP) | ............................. 2000-384096 |
| Dec. 19, 2000 | (JP) | ............................. 2000-386075 |
| Jan. 26, 2001 | (JP) | ............................. 2001-018823 |

(51) Int. Cl.
*B60R 21/231* (2006.01)
*B60R 21/205* (2006.01)

(52) U.S. Cl. ..................... 280/730.1; 280/731; 280/732

(58) Field of Classification Search ............. 280/728.2, 280/730.1, 731, 732, 743.1, 743.2

See application file for complete search history.

(56) References Cited

U.S. PATENT DOCUMENTS

| 3,618,978 A | 11/1971 | Klove et al. |
| 3,784,223 A | 1/1974 | Hass et al. |
| 4,948,168 A | 8/1990 | Adomeit et al. |
| 5,324,070 A * | 6/1994 | Kitagawa et al. ........ 280/730.1 |
| 5,344,184 A | 9/1994 | Keeler et al. |
| 5,513,877 A * | 5/1996 | MacBrien et al. .......... 280/732 |
| 5,570,901 A | 11/1996 | Fyrainer |
| 5,785,350 A | 7/1998 | Inoue et al. |
| 5,853,191 A | 12/1998 | Lachat |

(Continued)

FOREIGN PATENT DOCUMENTS

DE    29807424 U1    10/1998

(Continued)

*Primary Examiner*—Paul N. Dickson
*Assistant Examiner*—Barry Gooden, Jr.
(74) *Attorney, Agent, or Firm*—Posz Law Group, PLC

(57) ABSTRACT

In a knee protecting airbag device (M1), an airbag (26) folded and housed below a steering column (3) is expanded and inflated while rising from the lower side of the steering column (3) along a column cover lower surface (9a) during an inflation process. The shape of the airbag having completed the inflation is in a generally plate shape capable of covering at least the lower surface of the column cover. Even if the knee of the driver comes close to the column cover when the driver depressing a brake pedal, therefore, the airbag being expanded and inflated goes smoothly into the clearance between the knee of the driver and the column cover lower surface. The airbag having completed the expansion and inflation protects the knee of the driver properly so that the knee may not interfere with the column cover.

8 Claims, 84 Drawing Sheets

U.S. PATENT DOCUMENTS

| | | | |
|---|---|---|---|
| 6,073,959 A | | 6/2000 | Heinz et al. |
| 6,092,836 A | | 7/2000 | Saslecov |
| 6,155,595 A | * | 12/2000 | Schultz ................. 280/729 |
| 6,176,509 B1 | * | 1/2001 | Kawaguchi et al. ..... 280/728.1 |
| 6,196,585 B1 | * | 3/2001 | Igawa ................. 280/743.1 |
| 6,286,866 B1 | * | 9/2001 | Satge et al. ............ 280/743.1 |
| 6,299,202 B1 | | 10/2001 | Okada et al. |
| 6,752,417 B2 | * | 6/2004 | Takimoto et al. ........ 280/730.1 |
| 6,902,186 B2 | * | 6/2005 | Suzuki et al. ........... 280/730.1 |
| 6,945,557 B2 | * | 9/2005 | Takimoto et al. ........ 280/730.1 |
| 6,945,562 B2 | * | 9/2005 | Abe ................. 280/743.1 |
| 2002/0171230 A1 | * | 11/2002 | Takimoto et al. ........ 280/730.1 |
| 2003/0094795 A1 | * | 5/2003 | Takimoto et al. ........ 280/730.1 |
| 2003/0107206 A1 | * | 6/2003 | Takimoto et al. ........ 280/730.1 |
| 2003/0120409 A1 | * | 6/2003 | Takimoto et al. ............. 701/45 |
| 2003/0132617 A1 | * | 7/2003 | Takimoto et al. ........ 280/730.1 |
| 2003/0184069 A1 | * | 10/2003 | Takimoto et al. ........ 280/743.1 |
| 2004/0075253 A1 | * | 4/2004 | Morita ................. 280/730.1 |

FOREIGN PATENT DOCUMENTS

| | | |
|---|---|---|
| DE | 19900592 A1 | 7/2000 |
| EP | 0684167 A1 | 11/1995 |
| EP | 0818360 A1 | 1/1998 |
| GB | 2263671 A | 8/1993 |
| JP | 46-006307 | 12/1971 |
| JP | U-2-056053 | 4/1990 |
| JP | A-5-208646 | 8/1993 |
| JP | 5-094030 | 12/1993 |
| JP | 08-080797 | 3/1996 |
| JP | 8-310330 A1 | 11/1996 |
| JP | A-8-301054 | 11/1996 |
| JP | 9-123862 A1 | 5/1997 |
| JP | 9-132100 A1 | 5/1997 |
| JP | A-9-123863 | 5/1997 |
| JP | A-10-59103 | 3/1998 |
| JP | A-10-71911 | 3/1998 |
| JP | A-10-315894 | 12/1998 |
| JP | A-11-240411 | 9/1999 |
| JP | 11-278192 | 10/1999 |
| JP | 11-301385 | 11/1999 |
| JP | 11-310100 A1 | 11/1999 |
| JP | A-2000-225911 | 8/2000 |
| WO | WO 98/58823 | 12/1998 |

* cited by examiner

Sectional View at line XII-XII

Sectional View at line XIII-XIII

Completely Inflated Time

A.

B.

A.

B.

A. Second Retaining State

B.

KNEE PROTECTING AIRBAG DEVICE

CROSS REFERENCE TO RELATED APPLICATIONS

This application is a continuation of U.S. application Ser. No. 10/311,329 filed on Dec. 30, 2002 now U.S. Pat. No. 7,182,365 which in turn is a 371 of PCT/JP01/05848 filed on Jul. 5, 2001. This application is also related to and claims priority from Japanese patent application no. 2000-207289, filed on Jul. 7, 2000, Japanese patent application no. 2000-379371, filed on Dec. 13, 2000, Japanese patent application no. 2000-384096, filed on Dec. 18, 2000, Japanese patent application no. 2000-385262, filed on Dec. 19, 2000, Japanese patent application no. 2000-386075, filed on Dec. 19, 2000 and Japanese patent application no. 2001-018823, filed on Jan. 26, 2001, the contents of which are incorporated by reference.

BACKGROUND OF THE INVENTION

1. Field of the Invention

The present invention relates to a knee protecting airbag device in which an airbag to be expanded and inflated with an inflating gas let in protects the knee of a driver.

2. Description of Related Art

In the prior art, the device for protecting the knee of a driver is known in Japanese Patent Laid-Open No. 6-32195, EP Publication No. 0684167A1, EP Publication No. 0818360A1 and so on. In the prior art, more specifically, there were a device in which a pad is arranged near a column cover below a steering wheel to protrude when activated to hold the knee of a driver, or a device having an airbag which is expanded and inflated when activated to protect the knee of the driver.

In the knee protecting devices of the prior art, however, the pad or airbag is protruded into a narrow space between the column cover and the knee of the driver. Especially at the action time, the driver is mostly depressing a brake pedal. In this case, the space between the column cover and the knee of the driver is further narrowed.

Therefore, devices of the prior art had a room for improvement in proper protection of the knee of a driver.

SUMMARY OF THE INVENTION

The present invention contemplates to solve the above-specified problem and has an object to provide a knee protecting airbag device capable of protecting the knee of a driver properly even if the space between a column cover and the knee is narrow.

According to the present invention, there is provided a knee protecting airbag device for protecting the knee of a driver with an airbag to be expanded and inflated by an inflating gas let in. And, the airbag takes such a generally plate shape when having completed the expansion and inflation as covers at least the lower surface of a column cover covering a steering column. Moreover, the airbag is so folded and housed below said steering column that it may be expanded and inflated while rising along the lower surface of said column cover.

In the knee protecting airbag device according to the present invention, the airbag is expanded and inflated while rising from the lower side of the steering column along the column cover lower surface during the inflation process. The shape of the airbag having completed the inflation is a generally plate shape capable of covering at least the lower surface of the column cover. Even if the driver depresses the brake pedal, and thus the knee of the driver comes closer to the column cover, therefore, the airbag being expanded and inflated goes smoothly into the clearance between the knee of the driver and the column cover lower surface. Accordingly, the airbag having completed the expansion and inflation can protect the knee of the driver properly so that the knee may not interfere with the column cover.

Therefore, in the knee protecting airbag device according to the present invention, the knee of the driver is properly protected by the airbag even if the space between the column cover and the knee is narrow.

Here, the rising of the airbag along the column cover lower surface need not take place in the initial stage of the expansion and inflation. Specifically, it is sufficient that the airbag rise along the column cover lower surface at the instant it comes close to the side of the knee of the driver in the expansion and inflation process.

The airbag may be housed either within the lower portion of said column cover or in a lower panel of an instrument panel (as will be called "dashboard") below said column cover. In case the airbag is housed in the lower panel of the dashboard, moreover, the airbag rises smoothly along the lower surface of the column cover when it is expanded and inflated since it is housed at a different position from the column cover.

It is desired that the airbag has a connection means for connecting peripheral walls, as opposed to each other in the thickness direction, partially so that said airbag may keep the generally plate shape after the completion of the inflation. With this construction, the airbag having completed the inflation is enabled to keep the generally plate shape by the connection means. With this construction, therefore, the airbag being expanded and inflated is easily arranged between the narrow space between the column cover lower surface and the knee of the driver.

Moreover, it is desired that the upper side peripheral wall and the lower side peripheral wall of said airbag, as opposed to each other in the thickness direction, are so set that the longitudinal length of said upper side peripheral wall is shorter than that of said lower side peripheral wall so that said airbag may be able to have the inflation completed shape along the lower surface of said column cover. With this construction, the airbag being expanded and inflated has its upper end side curved upward, so that it easily comes into close contact with the lower surface of the column cover. As a result, with this construction, the airbag goes more smoothly into the narrow space between the column cover lower surface and the knee of the driver.

Moreover, the airbag may be formed by jointing a plurality of airbag elements which are cut solid to match the inflation completed shape. With this construction, the airbag can be made solid, so that the airbag having completed the expansion and inflation comes into close contact with the lower surface of the column cover.

On the other hand, it is desired that said airbag folded is housed in a case opened on the vehicular rear side. In this case, the airbag being inflated with the inflating gas let in is protruded from the case opening in the vehicular rear side. Therefore, the airbag is expanded and inflated in the stable protruding direction while smoothly rising along the column cover lower surface.

On the peripheral edge of the case opening for housing the airbag, there may be arranged a guide plate portion. This guide plate portion guides said airbag being expanded and inflated, along the column cover lower surface. With this construction, the airbag is expanded and inflated more properly by the guidance of the guide plate portion while rising along the column cover lower surface.

It is desired that said case for housing the airbag is axially arranged generally in parallel with the axial direction of said steering column. In this case, the protrusion of the airbag can be stabilized along the axial direction of the steering column. As a result, the airbag being expanded and inflated is further protruded along the lower surface of the column cover.

In case the airbag is housed in a case, moreover, it may be formed into an airbag assembly. This airbag assembly is formed by housing the folded airbag and an inflator for feeding said inflating gas to said airbag. This airbag assembly may be fixed, when mounted on a vehicle, on said steering column or on the vehicular body side positioned on the left and right sides of said steering column. With this construction, the airbag device can be prepared in advance as an assembly. Therefore, assembling work of the airbag device on the vehicle is facilitated. Moreover, the individual members are integrated so that they can be easily handled before the assembly is mounted on the vehicle.

Here in case the airbag assembly is connected to the body on the left and right sides of the steering column, the airbag assembly can be easily assembled with the vehicle without interfering with the steering column.

Moreover, in case said airbag is housed in a case having its vehicular rear side covered with an airbag cover, it is desired that said airbag cover includes a door portion to be opened by the push of the airbag being inflated. It is also desired that a hinge portion for the door to open on is arranged on the lower end side of said door portion so that said door portion may be opened downward.

With this construction, the door portion of the airbag cover is opened downward from the upper end side when it is pushed by the airbag being expanded and inflated. Therefore, the airbag being expanded and inflated is protruded at the initial opening stage of the door portion from the upper side of the opening area for the door portion. Specifically, the airbag being expanded and inflated is easily protruded upward. As a result, the airbag is smoothly expanded and inflated while rising along the column cover lower surface. Moreover, the folded airbag is covered with the airbag cover when mounted on the vehicle, so that the appearance design of the airbag device can be improved.

This airbag cover may be formed integrally with the lower panel of the instrument panel below said column cover or may be made integral with said column cover in the lower portion thereof. In this case, the airbag cover is integrated with the lower panel or the column cover so that the knee protecting airbag device does not deteriorate the appearance near the column cover even when mounted on the vehicle.

On the other hand, it is desired that said door portion is constructed to open by breaking a breakable portion, as arranged on the peripheral edge thereof. With this construction, the door portion of the airbag cover has an appearance identical to that of the airbag cover body portion (or the general portion) therearound. Therefore, the appearance design of the airbag cover is improved.

Moreover, the hinge portion at the lower end of the door portion may be arranged on the vehicular front side of the upper end of said door portion. With this construction of the door portion, the following working-effects can be attained over the comparison example of a simple construction. The comparison example is constructed such that the door portion is arranged along the generally vertical direction while retaining such an opening area of the airbag cover as is necessary for the expansion and inflation of the airbag. Moreover, the door portion of the comparison also has the hinge portion arranged at its lower end.

In the door portion thus constructed, the hinge portion on the lower end side is arranged on the vehicular front side of the upper end of the door portion. In the aforementioned door portion, therefore, the width of the door portion itself in the vertical direction along the door portion is larger than the vertical width of the door portion in the comparison example. As a result, the aforementioned door portion can reduce its opening angle while enough opening area of the airbag cover is retained for expanding and inflating the airbag. Specifically, the door portion of the comparison example, as arranged in the vertical direction, has a hinge portion as the turning center of the door portion arranged at a substantially identical position in the vehicular longitudinal direction to that of the upper end of the door portion. Therefore, in order to retain the opening area of the airbag cover necessary for the expansion and inflation of the airbag, the comparison example is required to open the door portion along the generally horizontal direction at a large opening angle. However, the aforementioned door portion is constructed to arrange the hinge portion of the lower end side at the vehicular front side of the door portion upper end. Therefore, the aforementioned door portion takes the large width of the door itself in the vertical direction along the door portion (or the turning radius for the door portion to open). As a result, even with the small opening angle, the aforementioned door portion can easily retain the opening area of the airbag cover necessary for the expansion and inflation of the airbag. Because of the small opening angle, moreover, the aforementioned door portion can make the protrusion width at the opening time in the horizontal direction to the vehicular rear side smaller than that of the door portion of the comparison example. More specifically, as compared with the comparison example in which the door portion is arranged in the vertical direction, the aforementioned construction can reduce the horizontal protrusion width of the upper end of the door portion, i.e., the end portion (or the rear end portion) being the driver's side at the opening time to the vehicular rear side. In other words, the aforementioned door portion can suppress the horizontal protrusion to the vehicular rear side when it is opened.

As a result, in the door portion of the aforementioned construction, the airbag is smoothly expanded and inflated while suppressing the protrusion to the vehicular rear side at the time of the expansion and inflation.

Moreover, an angle regulating means for regulating the opening angle may be connected to the door portion. This angle regulating means is so connected to said door portion as to retain enough opening angle for said airbag to protrude from said case and to restrain the opening more than said opening angle. With this construction, the door portion keeps, when pushed and opened by the airbag being expanded and inflated, the opening angle to retain the opening area necessary for the expansion and inflation of the airbag, and is restrained from opening more than the predetermined opening angle by the angle regulating means. Therefore, the upper end of the door portion at the expansion and inflation of the airbag, i.e., the end portion (or the rear end portion) on the driver side at the opening time is regulated so that the door portion can suppress the horizontal protrusion to the vehicle rear side. As a result, the aforementioned construction can expand and inflate the airbag smoothly while suppressing the protrusion of the door portion, as opened at the time of the expansion and inflation of the airbag, to the vehicle rear side.

Still moreover, the construction may be modified such that said door portion has a lower end side hinge portion arranged on the lower end side and has at least one auxiliary hinge portion arranged between said lower end hinge portion and said door portion upper end, and such that the portion on the upper side of the arrangement position of said auxiliary hinge portion is opened downward. With this construction, the door portion is opened downward from the upper end side when it is pushed by the airbag being expanded and inflated. Moreover, the door portion is bent and opened from the auxiliary hinge portion on the upper side. As compared with the door portion having only the hinge portion on the lower end side, therefore, the door portion having the aforementioned construction can shorten the substantial turning radius from the lower end side hinge portion to the door portion upper end. In the door portion of the aforementioned construction, moreover, the protrusion to the vehicle rear side can be suppressed when the door is opened while retaining the opening area necessary for the expansion and inflation of the airbag. As a result, the door portion of the aforementioned construction expands and inflates the airbag smoothly while suppressing the protrusion of the door portion, as opened at the expansion and inflation time of the airbag, to the vehicle rear side.

On the other hand, when said case is covered on the vehicular rear side with an airbag cover and said airbag cover includes a door portion to be opened by the push of said airbag being inflated, the construction may be modified as follows. Specifically, said door portion has a hinge portion on which to open at either one of the upper end side or the lower end side. The door portion has its lower end arranged at the upper side of the lower end of the opening of said case, and has a vertical width smaller than that of the opening of said case. Moreover, the body portion (or the general portion) in the airbag cover other than the door portion covers the lower side of the opening of said case. This construction can achieve the following working-effects.

With the aforementioned construction, the door portion has a vertical width smaller than the vertical width of the opening of the case. As compared with the door portion having a vertical width substantially equal to the vertical width of the opening of the case, therefore, the door portion of the aforementioned construction can suppress the protrusion to the vehicle rear side when it is opened while retaining the opening area necessary for the expansion and inflation of the airbag. Moreover, the airbag is housed so as to expand and inflate from the inner side of the case arranged at the lower position of the steering column, upward and toward the vehicle rear side along the lower surface of the column cover. Even if the lower side of the opening of the case is covered with the body portion of the airbag cover, therefore, the airbag being expanded and inflated passes over the opening of the case without interfering with the airbag cover body portion. As a result, the aforementioned construction can expand and inflate the airbag smoothly while suppressing the protrusion of the door portion to be opened at the expansion and inflation time of the airbag, to the vehicle rear side.

Moreover, it is desired that said airbag includes a column cover side wall portion arranged on said column cover side when it completes the expansion and inflation, and a driver side wall portion arranged on the driver side when it completes the expansion and inflation, and that the airbag is folded by rolling at its upper end side to said column cover side wall portion. With this construction, the airbag is unfolded while being unrolled when it is expanded and inflated. At this time, the airbag is unfolded while coming the closest to the side of the column cover. Therefore, the airbag is expanded and inflated, while being suppressed from protruding to the driver side, to rise more smoothly along the column cover lower surface.

In case the airbag is roll-folded, moreover, it is desirably folded through the longitudinal folding step. In this longitudinal folding step, said airbag is longitudinally folded from a flatly expanded state to bring the left and right edges close to the center side, to a transverse width capable of being housed in the case. With this construction, the airbag can cover, when expanded and inflated, the column cover lower surface over a wider area than the transverse width of the case.

In the aforementioned longitudinal folding step, the left and right end portions of the airbag are desirably folded individually on the side of the column cover side wall portion. The airbag of this case is constructed to include a central portion near the center in the transverse direction, and end portions positioned on the left and right sides of said central portion. With this construction, when the longitudinal folds are eliminated with the inflating gas let in, the central portion of the driver side wall portion is protruded at first to the driver side, and then the left and right end portions leading from the central portion are protruded to the driver side. At this time, the left and right end portions of the airbag are arranged, when longitudinally folded, individually on the side of the column cover side wall portion. Therefore, the airbag is unfolded while minimizing the protrusion of its left and right end portions to the driver side. Specifically, the left and right end portions of the airbag are unfolded while being expanded widely in the transverse direction toward the column cover. As a result, the airbag is expanded and inflated to enlarge the transverse width while being suppressed from protruding to the driver side, so that it protects the knee of the driver properly.

Moreover, the airbag may be constructed such that it has a lower side as the upstream portion of said inflating gas and an upper side as the downstream portion of said inflating gas. In this airbag, moreover, it is desired that said inflating gas flows to the both left and right sides in said upstream portion and then flows to the upper side of said airbag as said downstream portion. With this construction, the inflating gas is directed toward the left and right sides when it flows in the upstream portion of the airbag. Therefore, the airbag is expanded and inflated to enlarge the transverse width while being suppressed from protruding to the driver side, and then completes the inflation of the downstream portion on the upper side. As a result, the airbag is expanded and inflated to enlarge the transverse width without protruding to the driver side, so that even the single airbag can protect the both knees of the driver properly.

The airbag of this case including a column cover side wall portion on the side of said column cover and a driver side wall portion on the driver side may further be provided with a gas flow regulating member connecting said column cover side wall portion and said driver side wall portion. This gas flow regulating member is arranged within the airbag along the transverse direction to form gas communication holes between the left and right ends of said regulating member and the left and right sides of said airbag. Moreover, the gas flow regulating member partitions the airbag into the upstream portion and the downstream portion. Specifically, the gas flow regulating member helps said inflating gas to flow to the left and right sides in said upstream portion and then to flow through said gas communication holes to the upper side of said airbag as said downstream portion. With this construction, therefore, the flow of the inflating gas is reliably regulated by the gas flow regulating means arranged within the airbag. As a result, with this construction, the airbag is expanded and inflated to enlarge the transverse width stably while being suppressed from protruding to the driver side. The gas flow regulating member can be compactly folded together with the airbag when the airbag is housed, if this is made of a flexible cloth material. On the other hand, the gas flow regulating member connects the column cover side wall portion and the driver side wall portion. Therefore, the gas flow regulating member can regulate the thickness of the airbag to a constant value at the time of the inflation completion of the airbag, thereby to further suppress the protrusion to the driver side.

Moreover, it is desired that the airbag having the aforementioned gas flow regulating member includes a thickness regulating means in said downstream portion for regulating the thickness of said airbag. With this construction, the downstream portion of the airbag having completed the inflation is easily kept in the generally plate shape by the thickness regulating means. Therefore, the airbag of this construction is easily arranged in the narrow space between the column cover lower surface and the knee of the driver.

In the airbag having the aforementioned gas flow regulating member, still moreover, it is desired that said gas flow regulating member is arranged in said airbag at such a position as is out of the airbag housing portion at the time of the expansion and inflation but near said housing portion. With this construction, at the initial time when the airbag being expanded and inflated is protruded from its housing portion and rises along the column cover lower surface, the airbag rapidly expands in the transverse direction by the gas flow regulating member. Therefore, the gas flow regulating member can further suppress the protrusion of the airbag to the driver side.

In case a thickness regulating means is arranged in said airbag having the gas flow regulating member for connecting said column cover side wall portion and said driver side wall portion, moreover, it is desired that the connection portion to said driver side wall portion in said thickness regulating means is arranged on the upper stream side of said inflating gas than an interference portion of said airbag with said knee of the driver. With this construction, at the completion time of the expansion and inflation, the interference portion of the airbag with the knee of the driver becomes thicker than the portion where the thickness regulating means is arranged. Therefore, the airbag having completed the expansion and inflation is enabled by the thickened portion to protect the knee of the driver effectively.

DESCRIPTION OF THE PREFERRED EMBODIMENTS

The embodiments of the present invention will be described with reference to the accompanying drawings. Here, the present invention should not be limited to the embodiments. All the modifications in the components of Claims or the equivalents to those components should be included in Claims.

Figure 1:
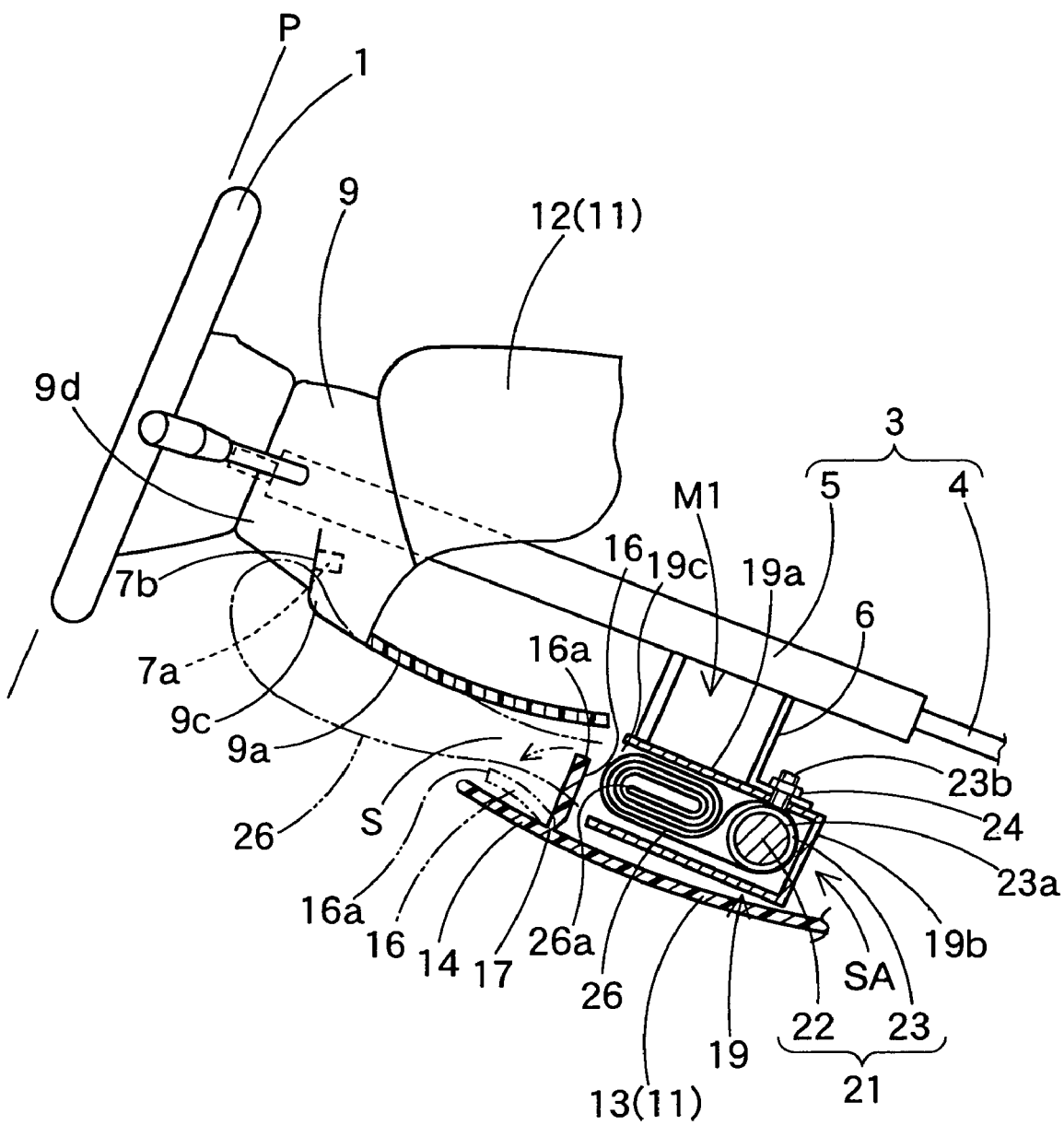
FIG. 1 is a sectional view showing a knee protecting airbag device of a first embodiment of the present invention in use.
Figure 2:
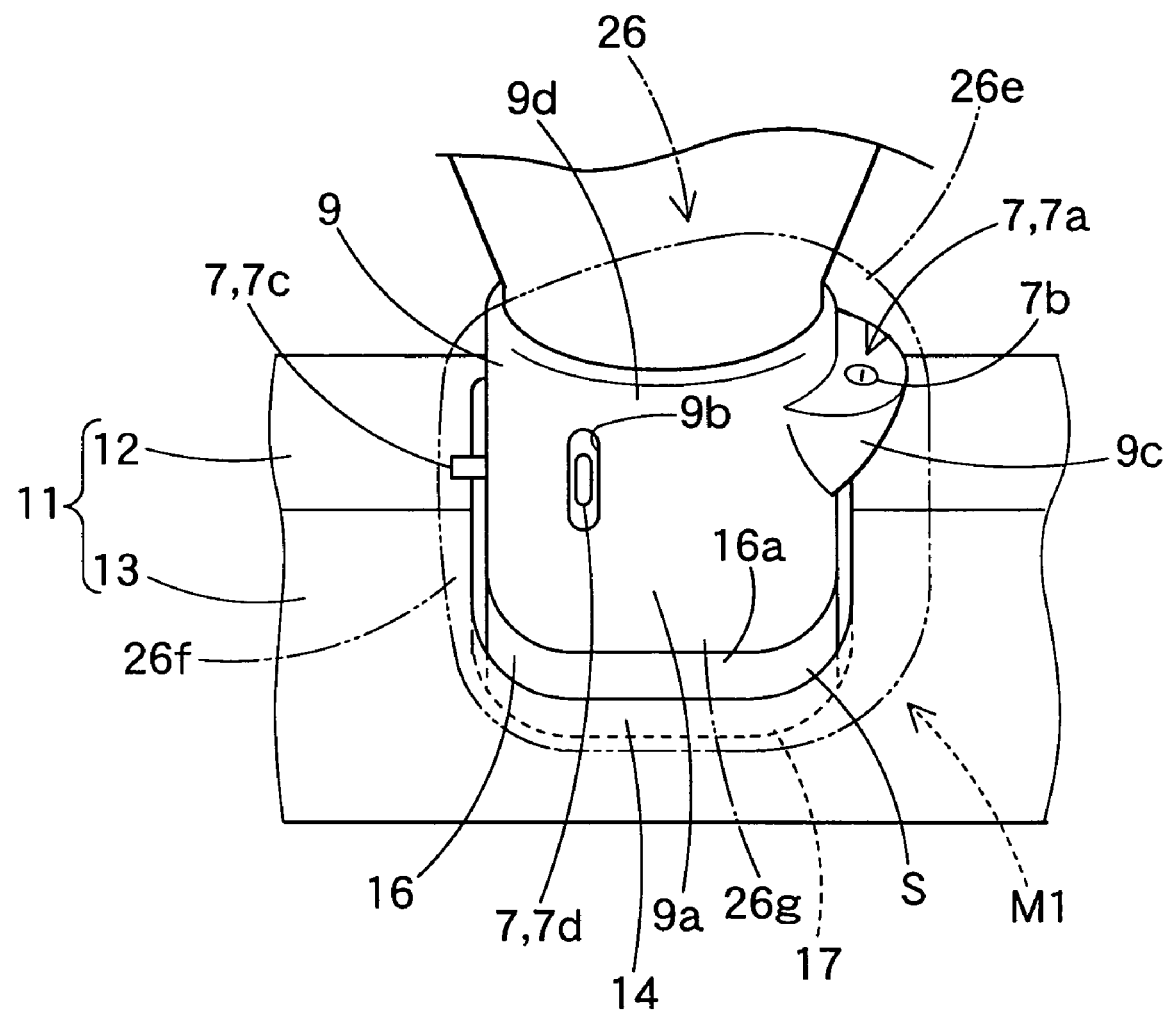
FIG. 2 is a front elevation of the vicinity of a column cover of the first embodiment.

A knee protecting airbag device M1 of the first embodiment is arranged below and on the side of the lower surface 9a of a column cover 9 and is constructed, as shown in FIGS. 1 and 2, to include an airbag 26, an inflator 21 and a case 19. The airbag 26 is folded up and housed below a steering column 3. The inflator 21 feeds an inflating gas to the airbag 26. The case 19 houses the airbag 26 and the inflator 21.

The column cover 9 is made of a synthetic resin, has a generally square cylinder shape, and covers the steering column 3 below a steering wheel 1. And the column cover 9 is arranged along the axial direction of the steering column 3. Specifically, the column cover 9 is arranged at such a backward rising slope as to take a lower position on the vehicle front side and a higher position on the vehicle rear side. Moreover, the lower surface 9a of the column cover 9 is formed generally in a rectangular shape and is curved to rise backward in the longitudinal direction of the vehicle.

The steering column 3 is provided as its accessories 7 with: a key cylinder 7a for locking the steering of the steering wheel 1; a tilt mechanism control unit (or a control lever) 7c; and a telescopic mechanism control unit (or a control lever) 7d. These parts 7a, 7c and 7d are exposed or protruded from the column cover 9. The key cylinder 7a is arranged on the righthand side face of the column cover 9. A cover portion 9c is protruded in a generally halved frusto-conical shape from the column cover 9 to cover the key cylinder 7a. The tilt mechanism control lever 7c is arranged on the lefthand side of the column cover 9, and the telescopic mechanism control lever 7d is so arranged as is protruded from a through hole 9b on the left edge side of the column cover lower surface 9a.

The steering column 3 is constructed to include: a main shaft 4 connected to the steering wheel 1; and a column tube 5 covering the main shaft 4. Between the main shaft 4 and the column tube 5, there are arranged the tilt mechanism, the telescopic mechanism and so on, although not shown. The tilt mechanism adjusts the angle of a ring plane P of the steering wheel 1. The telescopic mechanism moves and fixes the steering wheel 1 in the axial direction of the shaft 4.

The case 19 is made of a sheet metal and constructed to include a peripheral wall portion 19a of a generally rectangular cylinder shape, and a bottom wall portion 19b having a generally rectangular shape and closing the bottom of the peripheral wall portion 19a. The case 19 is connected and fixed to such a immovable portion of the column tube 5 of the steering column 3 by means of a bracket 6. In the case 19 on the vehicular rear side, there is arranged an opening 19c which is defined by the peripheral wall portion 19a. Moreover, the case 19 is arranged with its peripheral wall portion 19a being axially directed along the column cover lower surface 9a (or along the axial direction of the steering column 3). This arrangement is made so that the airbag 26 housed therein may be easily protruded from the column cover 9 along the lower surface 9a of the column cover 9.

Figure 6:
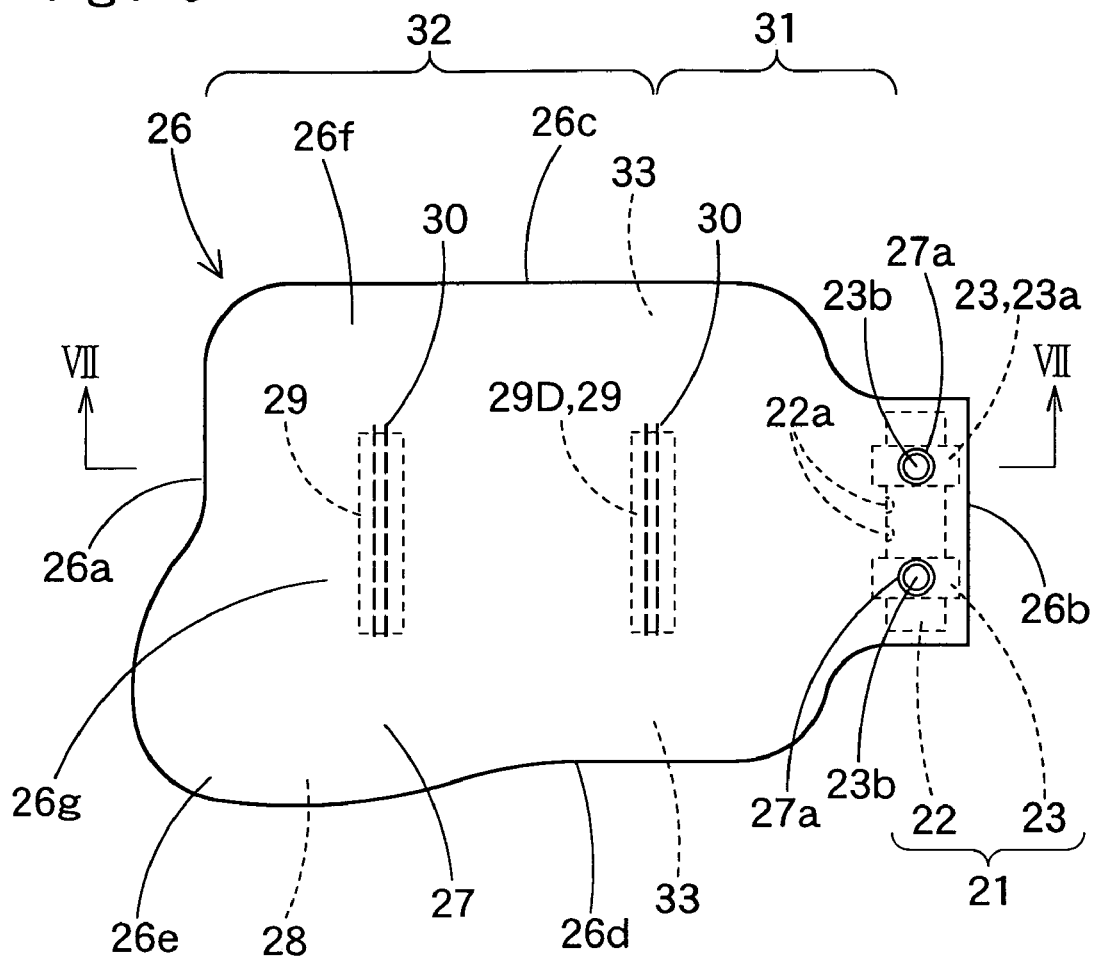
FIG. 6 is a top plan view of the airbag used in the first embodiment.

The inflator 21 is constructed, as shown in FIGS. 1 and 6, to include a body 22 and two bracket portions 23. The body 22 is of the cylinder type, and discharges the inflating gas in response to an electric signal. The body 22 is provided with gas discharge ports 22a (as referred to FIG. 6) for discharging the inflating gas therefrom. In the case of the embodiment, the inflator 21 is activated in response to an electric signal coming from a predetermined control unit. When this inflator 21 acts, the not-shown airbag device mounted on the steering wheel 1 also acts simultaneously with the inflator 21 in response to an electric signal coming from a predetermined control unit. The bracket portions 23 are provided with retaining rings 23a and bolts 23b. The retaining rings 23a are made of a sheet metal and plastically deformable to shrink radially thereby to clamp the body 22. The bolts 23b are protruded from the retaining rings 23a. The inflator 21 is enveloped in the airbag 26 as the bracket portions 23 are assembled with the body 22. Moreover, the inflator 21 is fastened to the bracket 6 by inserting the bolts 23b protruded from the airbag 26 into the case 19 and by using nuts 24. As a result, the inflator 21 is mounted and fixed together with the airbag 26 and the case 19 on the bracket 6.

Moreover, the airbag 26 thus folded and housed in the case 19 is housed in a lower panel 13 on the lower side of an instrument panel (or dashboard) 11. This dashboard 11 covers the column cover 9. On the lower panel 13 on the side of the column cover lower surface 9a, there is arranged a peripheral edge portion 14 having a generally halved square cylinder shape. The peripheral edge portion 14 is spaced at a clearance S from the peripheral edge of the column cover lower surface 9a. Inside the peripheral edge portion 14 on the vehicular front side, there is arranged a door portion 16 of a plane shape. The door portion 16 covers the rear side of the airbag 26 folded and housed, i.e., covers the opening 19c in the case peripheral wall portion 19a on the vehicular rear side. In the boundary portion between the lower edge side of the door portion 16 and the lower panel 13, there is arranged a hinge portion 17 which is made of an integral hinge.

This door portion 16 is so opened when the airbag 26 is expanded and inflated that its upper edge 16a is turned on the hinge portion 17 toward the vehicular rear side by the push of the airbag 26. In short, the door portion 16 is opened downward. Moreover, this door portion 16 is formed such that the hinge portion 17 is curved along the peripheral edge portion 14. Therefore, the door portion 16 is not opened fully toward the vehicular rear side but at a small angle. Thus, the door portion 16 plays a role as a guide plate for guiding the airbag 26 to be inflated and expanded easily along the column cover lower surface 9a. Here, the column cover 9 is covered on its upper face side with an upper panel 12 of the dashboard 11.

Figure 7:
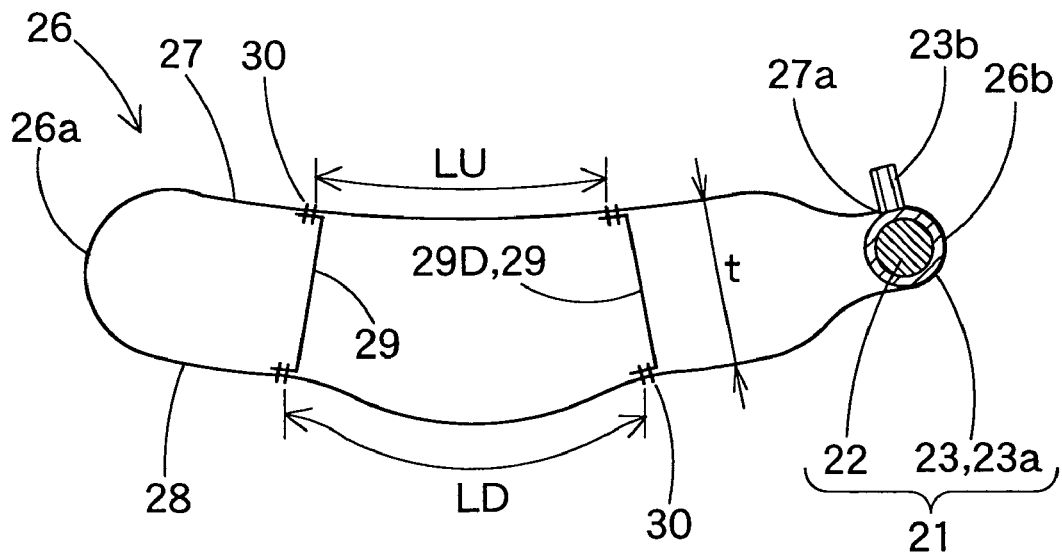
FIG. 7 is a sectional view of a portion VII-VII of FIG. 6.

The airbag 26 is formed of a flexible woven fabric of polyester, polyamide or the like. The airbag 26 takes such a generally rectangular plate shape when it completes the expansion and inflation as to cover the side of the lower surface 9a of the column cover 9. In the case of the embodiment, the airbag 26 has a peripheral wall constructed, as shown in FIGS. 6 and 7, of an upper side cloth 27 on the upper face side and a lower side cloth 28 on the lower face side, and these cloths 27 and 28 are opposed to each other in the thickness direction. Here, the upper side cloth 27 forms the wall portion 27 on the side of the column cover 9, and the lower side cloth 28 forms the wall portion 28 on the side of the driver.

Figure 4:
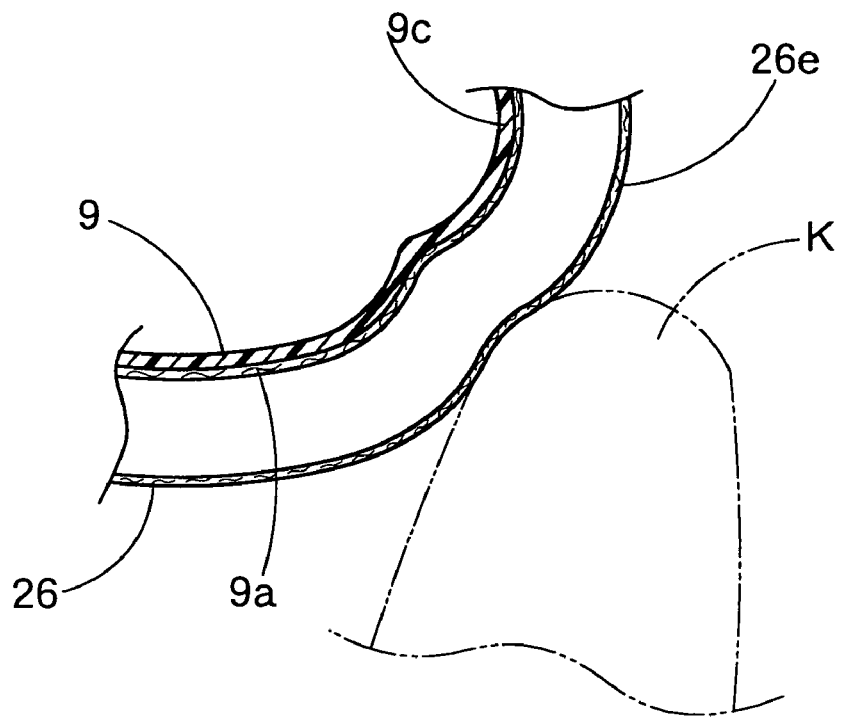
FIG. 4 is a sectional view of a portion IV-IV of FIG. 3.
Figure 5:
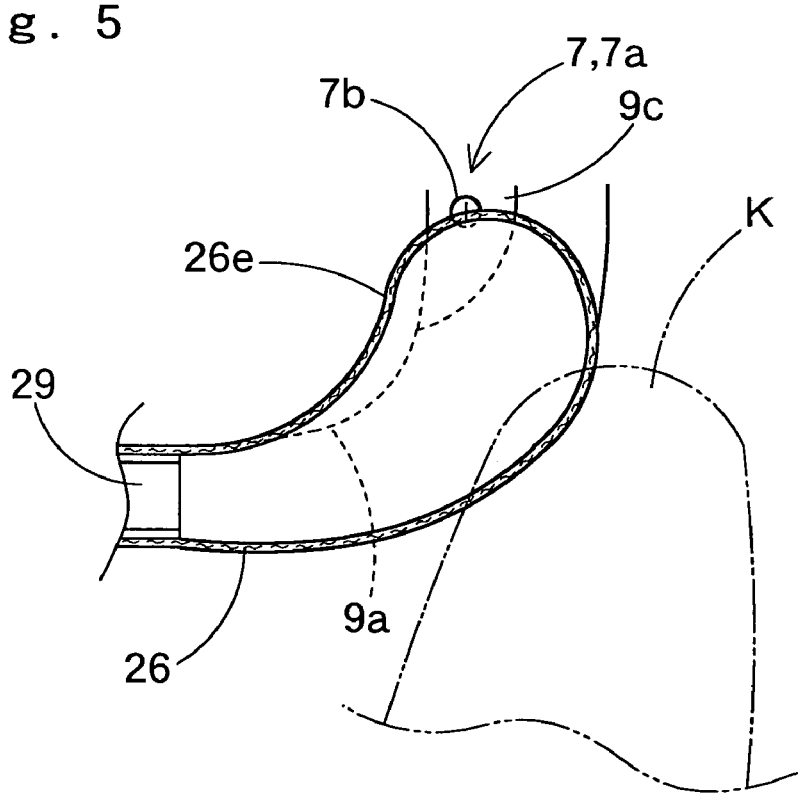
FIG. 5 is a sectional view of a portion V-V of FIG. 3.

At the rear end portion of a right edge 26d of the airbag 26 having completed the inflation, there is arranged a cover portion 26e. This cover portion 26e covers the portion 9c of the key cylinder 7a as an accessory on the side of the column cover lower surface 9a. The cover portion 26e of the embodiment is constructed, as shown in FIGS. 4 and 5, to cover, when expanded and inflated, not only the lower surface 9a and the right side face of the cover portion 9c of the column cover 9 but also the side of a rear face 7b of the key cylinder 7a (as referred to FIG. 2). The airbag 26 is further provided with a body portion 26g for covering the vicinity of the center of the column cover lower surface 9a including the lower portion of the telescopic control lever 7d when the airbag 26 is expanded and inflated. The airbag 26 is further provided on the left edge side with a cover portion 26f which is not so large as the cover portion 26e. The cover portion 26f covers the lower portion of the side of the tilt mechanism control lever 7c. This tilt mechanism control lever 7c is arranged at such a position as is symmetric to the key cylinder portion 9c with respect to the steering column 3.

In the airbag 26, as shown in FIGS. 6 and 7, there are arranged a plurality of (two in the embodiment) tethers 29 which act as connection means for connecting the column cover side wall portion 27 and the driver's side wall portion 28 to each other. The tethers 29 retain the generally plate shape of the airbag 26 by keeping the thickness t of the airbag 26 substantially constant. In short, the tethers 29 have a function as a thickness-regulating means for the airbag 26. Moreover, the longitudinal length LU between the tethers 29 in the vicinity of the longitudinal center of the column cover side wall portion 27 is set shorter than the corresponding longitudinal length LD of the lower side cloth 28. With this construction, the column cover sidewall portion 27 of the airbag 26 expanded and inflated can easily extend closely along the backward rising curved face of the column cover lower surface 9a. In the column cover side wall portion 27 on the side of the front end (or lower end) 26b of the airbag 26, on the other hand, there are formed through holes 27a. Into these through holes 27a, there are inserted the individual bolts 23b of the inflator 21.

Here will be described how to mount the airbag device M1 on the vehicle. First of all, the airbag 26 is folded up while having the inflator 21 packaged therein. Here, the individual bolts 23b of the inflator 21 are protruded from the through holes 27a. Not-shown action-signal-inputting lead wires extending from the inflator body 22 are led out from predetermined not-shown through holes of the airbag 26.

Moreover, the airbag 26 is wrapped, after folded up, with not-shown breakable wrapping film, and the individual bolts 23b are protruded out from the case 19 through the wrapping film. Then, the individual bolts 23b thus protruded are assembled with not-shown spring nuts of a thin sheet metal, and the folded airbag 26 and the inflator 21 are housed in the case 19. Thus, there is formed an airbag assembly SA.

Here, the folding of the airbag 26 is started from the state in which the column cover side wall portion 27 and the driver's sidewall portion 28 are overlapped and expanded flatly. The two left and right edges 26c and 26d are folded back toward the center on the side of the column cover side wall portion 27. Then, the airbag 26 is folded, as shown in FIG. 1, to roll up the side of its rear end (or upper end) 26a toward the column cover side wall portion 27 being the upper face side. This way, even if the airbag 26 comes, when expanded and inflated, into contact with the upper face side of the knee of the driver, it is easily unrolled to expand and inflate the side of its rear end 26a along the column cover lower surface 9a. Moreover, when the folded portion in the rolled state is unfolded by introducing the inflating gas, the folded portion is not only unrolled but also unfolded. Specifically, the unfolded portion is pulled toward the column cover side wall portion 27 being the rolled side, not toward the side of the driver's side wall portion 28 by the turning inertial force of the portion being unfolded. In this state, the folded portion is unfolded. Therefore, the rolled folded portion is unfolded in such a manner as to be curved, when unfolded, toward the side of the column cover side wall portion 27. As a result, the folded portion is expanded and inflated smoothly along the column cover lower surface 9a.

Without considering this point, the airbag 26 may also be so folded up that the side of its rear end 26a is rolled to the side of the driver's side wall portion 28 being the lower face side. Alternatively, the airbag 26 may also be folded up in such a cactus shape that the side of its rear end 26a is sequentially inserted into the airbag 26 and approaches the side of the front end 26b. Moreover, the airbag 26 may further be folded up in such a bellows shape that the side of the rear end 26a comes closer to the side of the front end 26b.

On the other hand, the not-shown lead wires extending from the inflator body 22 are led out from the wrapping film and not-shown through holes of the case 19.

Then, the airbag assembly SA (or the airbag device M1) having the airbag 26 and the inflator 21 housed in the case 19 is fixed on the bracket 6 by means of the nuts 24. Moreover, the not-shown lead wires are connected with the control circuit, and the dashboard 11 is mounted on the vehicle. Thus, the airbag device M1 can be mounted on the vehicle.

If a predetermined electric signal is inputted to the inflator body 22 after the airbag device M1 was mounted on the vehicle, the inflating gas is discharged from the gas discharge ports 22a. Therefore, the airbag 26 is inflated to break the not-shown wrapping film and to push and open the door portion 16 of the lower panel 13. Then, the airbag 26 is expanded and inflated while rising along the column cover lower surface 9a. The airbag 26 having completely expanded and inflated has its rear end 26a arranged near the rear end 9d of the column cover lower surface 9a.

Specifically, the airbag 26 is expanded and inflated from the front side below the cover portion 9c of the column cover 9 to the rear end 9d while rising along the column cover lower surface 9a. Here, the airbag 26 takes, when it completes the inflation, a substantially rectangular plate shape capable of covering the lower surface 9a of the column cover 9. Therefore, the airbag 26 being expanded and inflated goes smoothly into the clearance between the driver's knee and the column cover lower surface 9a, even if the driver depresses a brake pedal so that the knee comes close to the column cover 9. Then, the airbag 26 having completed the expansion and inflation can protect the driver's knee properly by preventing the knee from interfering with the column cover 9.

In the first embodiment, the folded airbag 26 is housed in the case 19 which is opened to the rear side of the vehicle. In this construction, the airbag 26 to be inflated admitting the inflating gas can be protruded from the case opening 19c opened to the rear side of the vehicle. Therefore, the airbag 26 can be smoothly expanded and inflated in the steady protruding direction while rising along the column cover 9 lower surface 9a.

Especially in the first embodiment, the case 19 housing the airbag 26 is axially arranged generally in parallel with the axial direction of the steering column 3. By the case 19, therefore, the protruding direction of the airbag 26 is stabilized along the axial direction of the steering column 3. As a result, the airbag 26 being expanded and inflated is further protruded along the lower surface 9a of the column cover 9.

Figure 3:
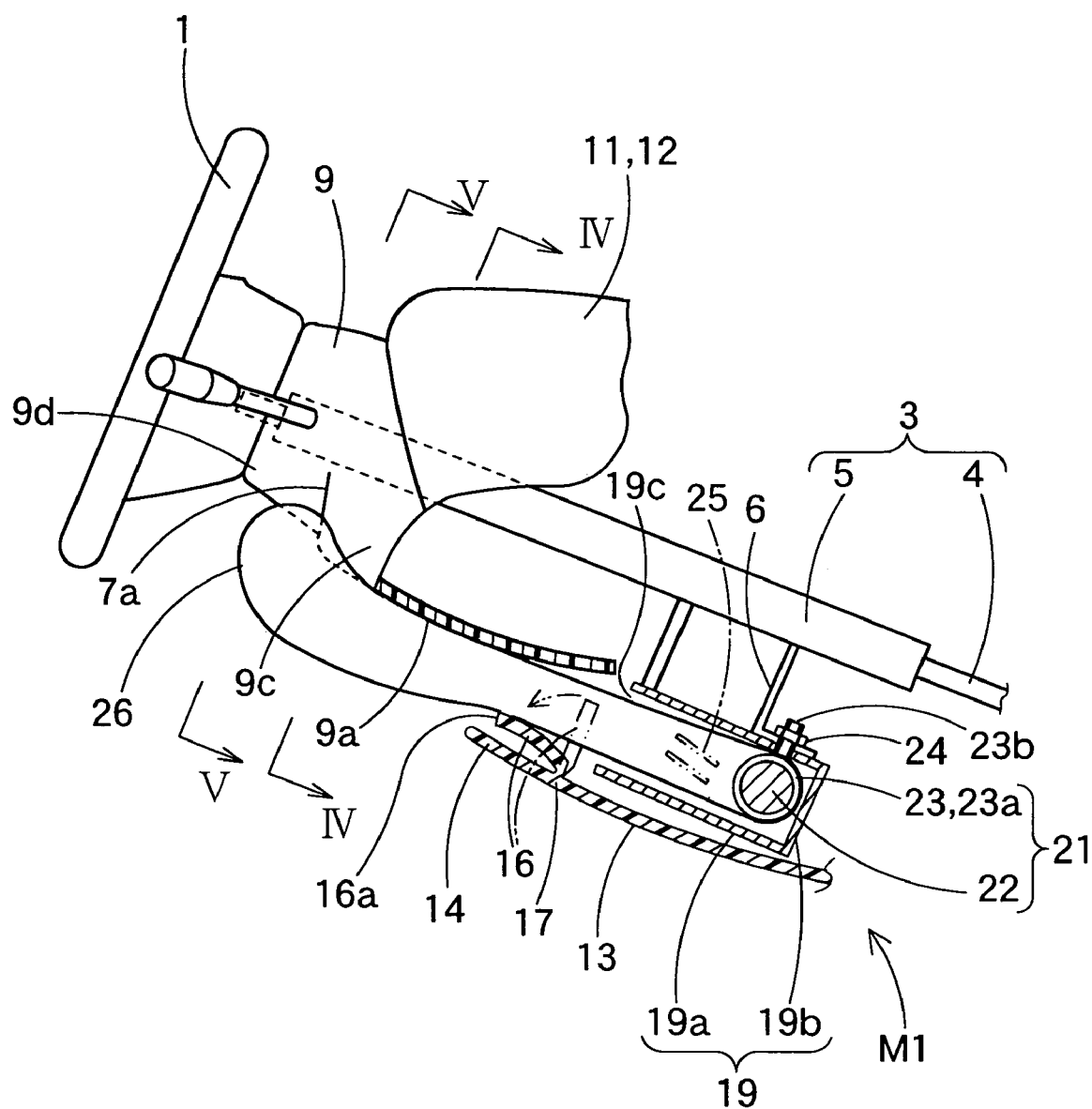
FIG. 3 is a diagram showing the airbag of the first embodiment being expanded and inflated.

In the case of the first embodiment, on the other hand, the airbag 26 having completed the expansion and inflation is provided with the cover portion 26e to cover the key cylinder 7a of the cover portion 9c on the side of the column cover lower surface 9a. Therefore, even if the knee K of the driver would otherwise interfere through the cover portion 9c with the key cylinder 7a protruded from the column cover 9, as shown in FIG. 4, the airbag cover portion 26e can protect the knee K of the driver properly. Especially in the case of the embodiment, as shown in FIGS. 3 and 5, the expanded and inflated cover portion 26e covers the side of the rear face 7b of the key cylinder 7a, too. Therefore, the cover portion 26e can prevent the interference between the key cylinder 7a as made of a metal block and the knee K.

In the case of the first embodiment, moreover, the airbag 26 having completed the expansion and inflation covers not only the key cylinder 7a, but its body portion 26g or cover portion 26f covers the lower face side of the accessories 7 such as the tilt mechanism control lever 7C or the telescopic mechanism control lever 7d arranged at the steering column 3. Therefore, the body portion 26a or the cover portion 26f of the airbag 26 can protect the knee K of the driver properly even if the knee K would otherwise interfere with those control levers 7c or 7d.

Here, the airbag 26 may be constructed to cover not only the accessories 7a, 7c and 7d exposed or protruded from the column cover 9, as in the embodiment, but also the arrangement portions of the accessories 7 covered completely with the column cover 9 and having rigidities.

The first embodiment is constructed such that the airbag 26 expanded and inflated covers only the lower surface 9a of the column cover 9. However, the construction may be modified into a knee protecting airbag device M2 of a second embodiment.

Figure 8:
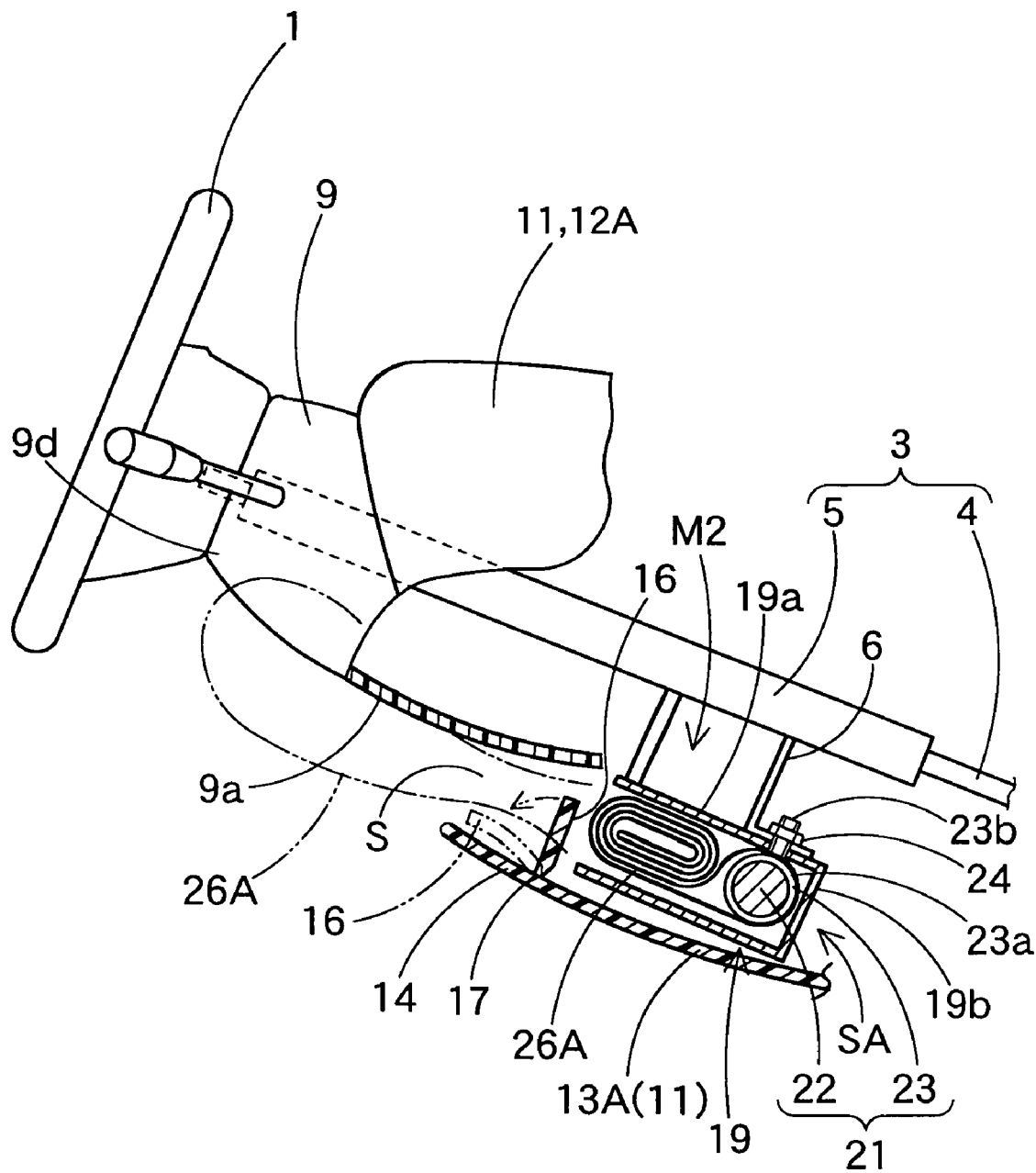
FIG. 8 is a sectional view showing an airbag device of a second embodiment of the present invention in use.
Figure 9:
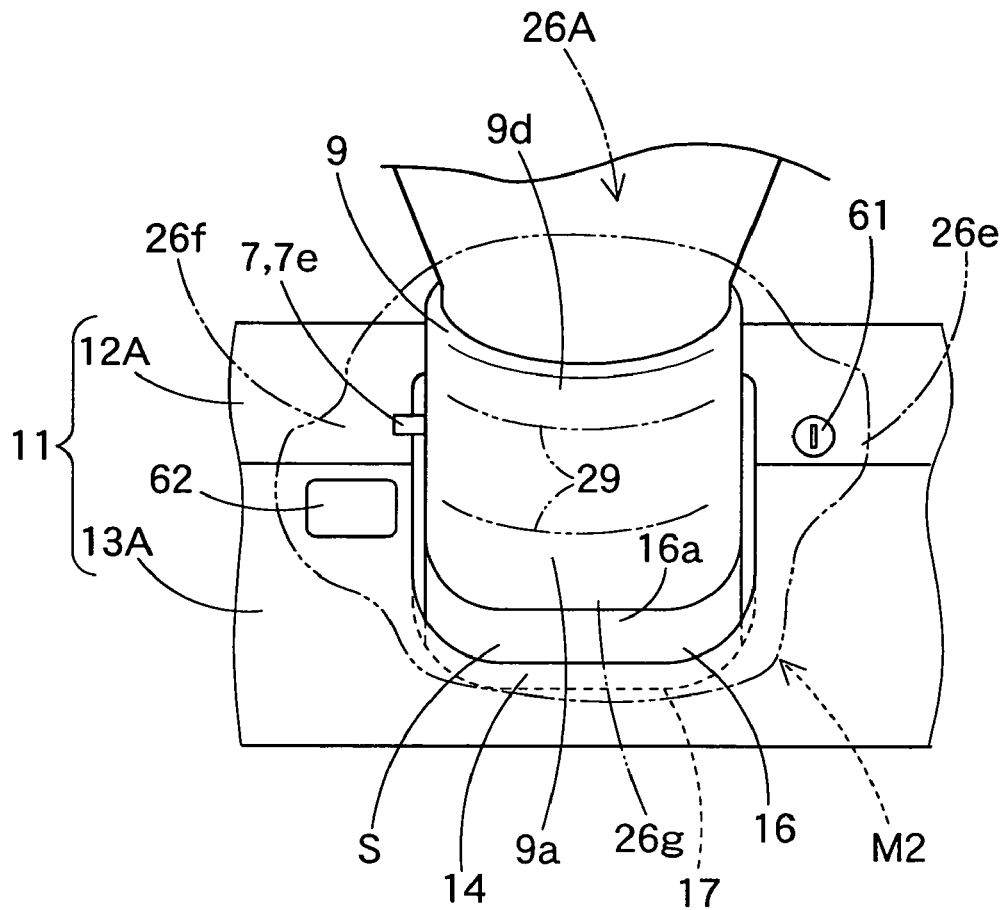
FIG. 9 is a front elevation of the vicinity of a column cover of the second embodiment.

In this knee protecting airbag device M2, as shown in FIGS. 8 and 9, an expanded and inflated airbag 26A is constructed to cover the dashboard 11 near the column cover 9. At the portion of an upper panel 12A of the dashboard 11 to be covered with the airbag 26A, there is arranged a key cylinder 61 which is arranged on the right side of the column cover 9. At the portion of a lower panel 13A of the dashboard 11 to be covered with the airbag 26A, there is arranged a parking brake release lever 62 which is arranged on the left side of the column cover 9. The airbag 26A to be expanded and inflated is provided like the airbag 26 with the body portion 26g and the cover portions 26e and 26f. The body portion 26g covers the lower surface 9a of the column cover 9. The cover portion 26e covers the area from the lower surface to the vicinity of the rear face of the key cylinder 61. The cover portion 26f covers the area from the lower surface to the vicinity of the rear face of the release lever 62.

Here, the airbag 26A is formed into a generally rectangular plate shape, as in the first embodiment, and has the tethers 29 arranged therein. The remaining portions of the upper panel 12A and the lower panel 13A or the constructions of the case 19 and the inflator 21 are similar to those of the first embodiment. Therefore, the description of those portions will be omitted by designating them the same reference numerals as those of the first embodiment. On the left side face of the column cover 9, on the other hand, there is arranged a control portion (or a control lever) 7e for both the tilt mechanism and the telescopic mechanism as the accessories 7 of the steering column 3. Moreover, this airbag device M2 is mounted on the vehicle by the same process as the first embodiment.

In this airbag device M2 of the second embodiment, the airbag 26A is expanded and inflated from the lower side below the column cover 9 to the vicinity of the rear end 9d while rising along the column cover lower surface 9a. Moreover, the airbag 26A also takes, when it completes the inflation, a generally rectangular plate shape capable of covering the lower surface 9a of the column cover 9. Therefore, the airbag 26A being expanded and inflated goes smoothly into the clearance between the driver's knee and the column cover lower surface 9a, even if the driver depresses the brake pedal so that the knee comes close to the column cover 9. Then, the airbag 26A having completed the expansion and inflation can protect the driver's knee properly by preventing the knee from interfering with the column cover 9.

On the other hand, the airbag 26A is constructed to cover a part of the dashboard 11 near the column cover 9 as well, so that it covers the column cover lower surface 9a over a wide range. Therefore, the airbag 26A protects a wider range than the airbag 26. In other words, the airbag 26A protects the driver's knee effectively over the wide range. Especially in the second embodiment, the key cylinder 61 and the release lever 62 are covered with the cover portions 26e and 26f even if they are arranged in the upper panel 12A and the lower panel 13A. Therefore, the airbag 26A can protect the driver's knee properly from those members 61 and 62.

Here, this airbag 26A may be constructed to cover the arrangement portions of not only the key cylinder 61 and the release lever 62 and the parts exposed or protruded from the dashboard 11 but also the rigid parts arranged in the dashboard 11 near the column cover 9.

In the airbags 26 and 26A of the first and second embodiments, moreover, the tethers 29 are arranged as the connection means for partially connecting their peripheral walls, as opposed in the thickness direction to each other, that is, the column cover side wall portion 27 and the driver's side wall portion 28 to each other. Therefore, the airbags 26 and 26A easily retain the generally plate shape when they complete the inflation. As a result, the airbags 26 and 26A is easily arranged in the narrow space between the column cover lower surface 9a and the knee K of the driver.

Figure 10:
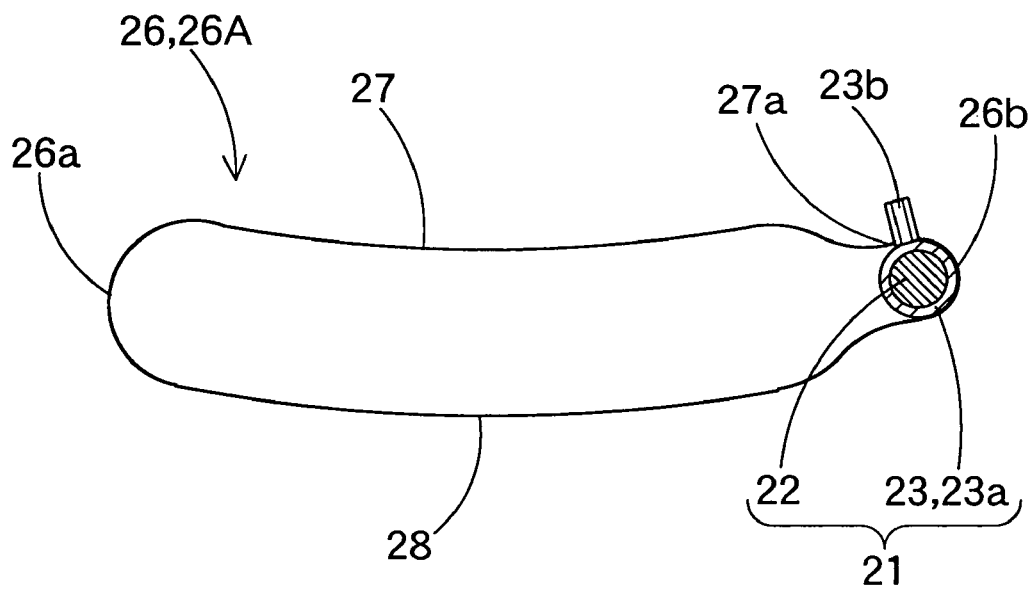
FIG. 10 is a sectional view showing a modification of the airbag.

Without considering this point, the airbags 26 and 26A may be constructed by connecting the outer peripheral edges of the column cover side wall portion 27 and the driver's side wall portion 28, as shown in FIG. 10, not by forming the connection means such as the tethers 29.

Figure 11:
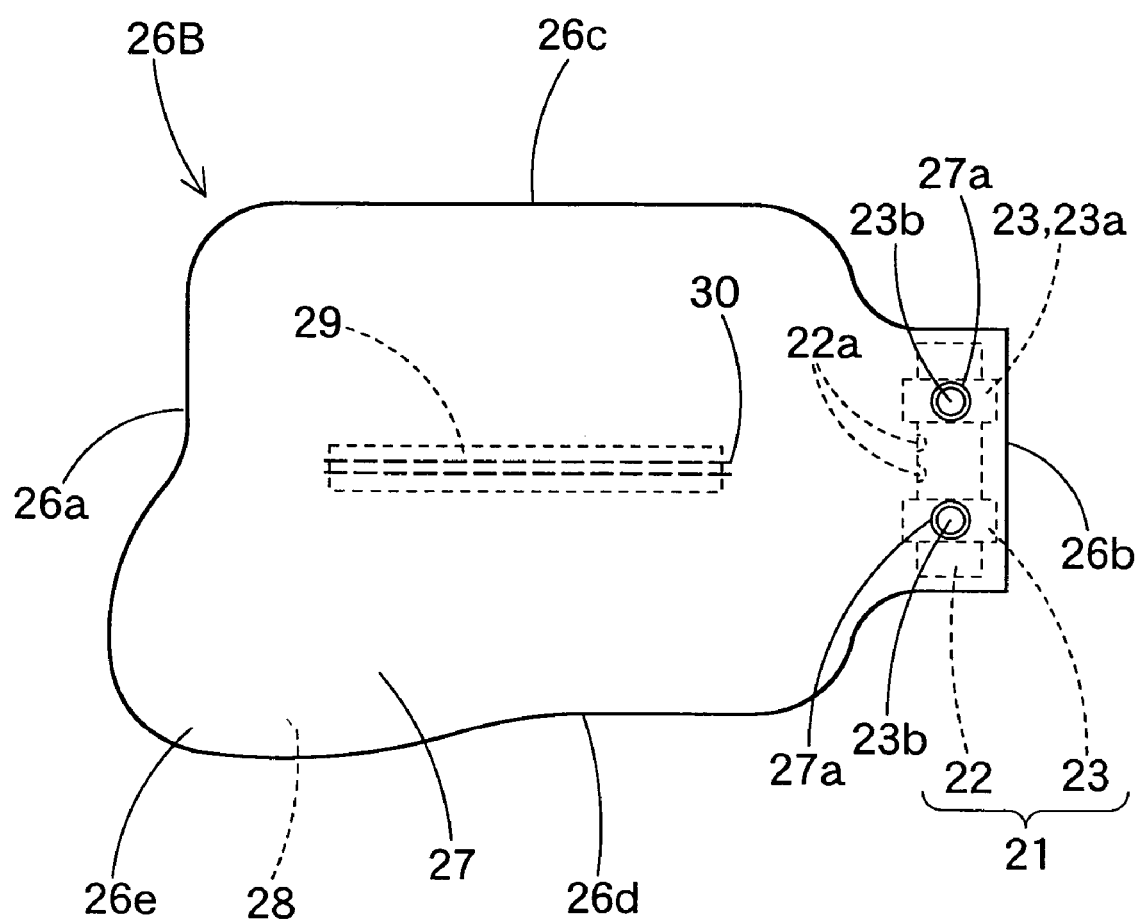
FIG. 11 is a top plan view showing another modification of the airbag.

In the first and second embodiments, the tethers 29 in a band shape are arranged to extend transversely of the vehicle. In an airbag 26B of FIG. 11, however, a tether 29 may be so arranged as to extend in a band shape longitudinally of the vehicle. Moreover, the number of tethers 29 to be arranged may be suitably set to one or more.

However, the following working-effects are obtained when tethers 29D (as referred to FIG. 6) are arranged transversely of the vehicle in the vicinity of the inflator 21 as in the airbag 26 of the first embodiment. Specifically, the tethers 29D play the role of a gas flow regulating member. The tethers 29D divide the inner space of the airbag 26 into the portion (or the lower portion) closer to the inflator 21 from the tethers 29D as an upstream side portion 31 of the inflating gas, and the portion (or the upper portion) closer to the rear end (or the upper end) 26a from the tethers 29D in the airbag 26 as a downstream side portion 32 of the inflating gas. Then, the inflating gas flows transversely in the upstream side portion 31 and flows through gas communication holes 33 and 33 to the downstream side portion 32. Therefore, the tethers 29D help the airbag 26 being expanded and inflated to rise, with the airbag 26 being transversely extended, along the column cover lower surface 9a. Here, the gas communication holes 33 are the clearances which are arranged between the two left and right ends of the tethers 29D and the left and right edges 26c and 26d of the airbag 26.

Figure 12:
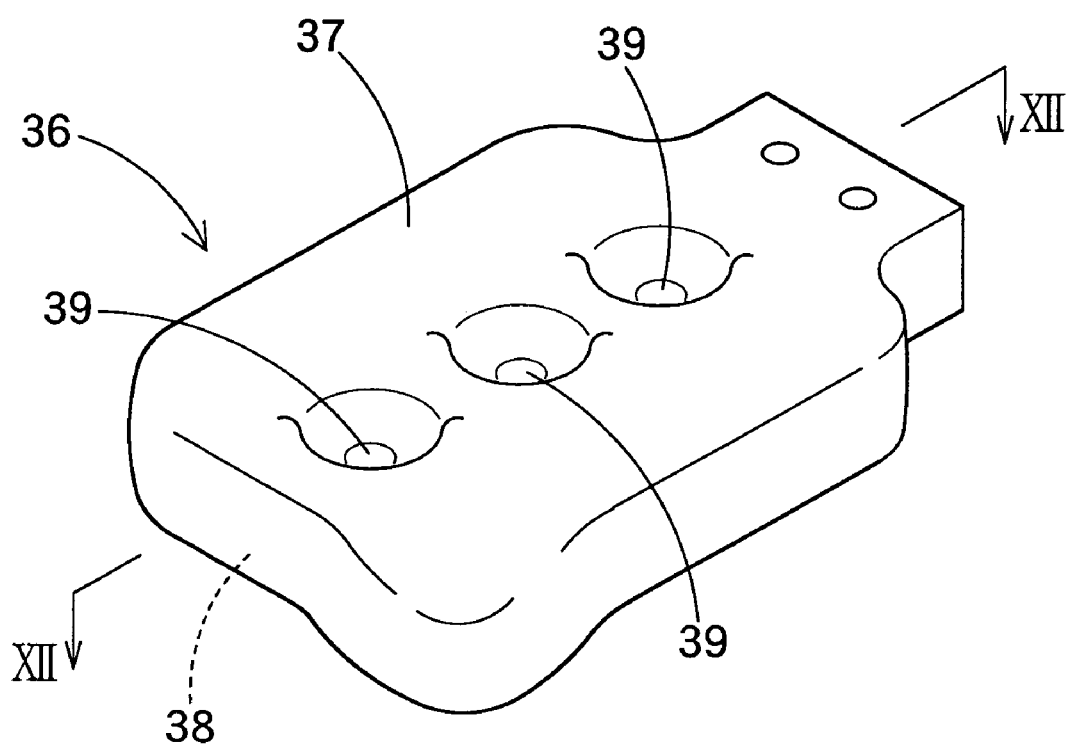
FIG. 12 is a perspective view showing still another modification of the airbag.
Figure 12:
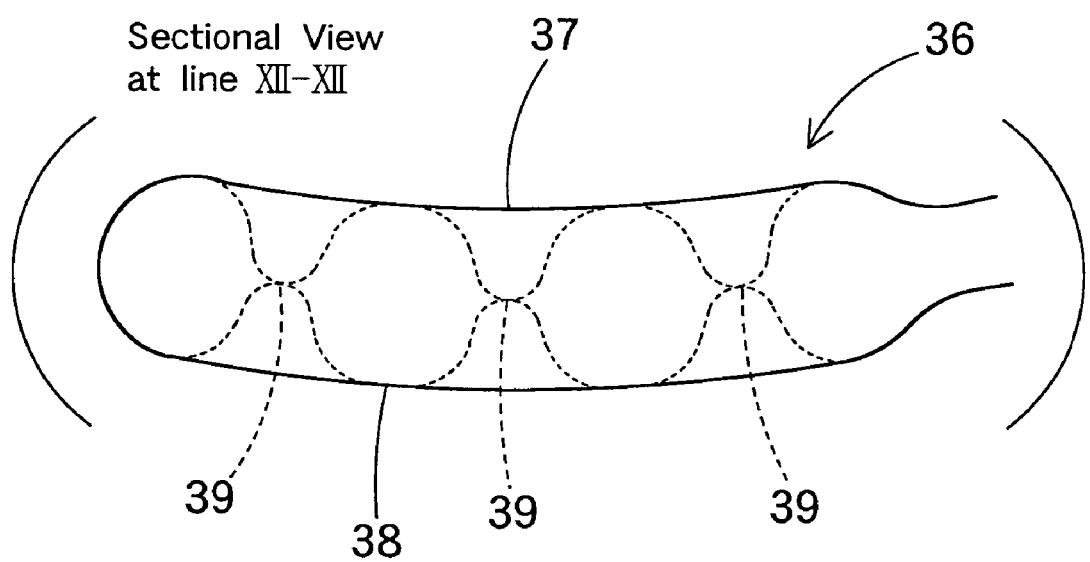

In order to retain the generally plate shape of the airbag, a tether/tethers formed by sewing or adhering the peripheral walls may be used as a connecting means to partially connect the peripheral walls opposed in the thickness direction of the airbag. As in an airbag 36 shown in FIG. 12, moreover, joint portions 39 may be formed as the connection means by adhering a column cover side wall portion 37 and a driver's side wall portion 38 partially to adhere the peripheral walls to each other. Moreover, the connection means may also be constructed by hollow-weaving the airbag and by jointing the peripheral walls opposed in the thickness direction to each other.

In the airbags 26 and 26A of the embodiment, the longitudinal length LU in the upper side cloth 27 of the airbags 26 and 26A is set shorter than the longitudinal length LD in the lower side cloth 28 opposed in the thickness direction to the upper side cloth 27. Therefore, the airbags 26 and 26A being expanded and inflated take a shape in which the upper end (or rear end) 26a is curved upward, and easily extend close to the side of the column cover lower surface 9a. As a result, the airbags 26 and 26A can go more smoothly into the narrow clearance between the column cover lower surface 9a and the knee of the driver.

Figure 13:
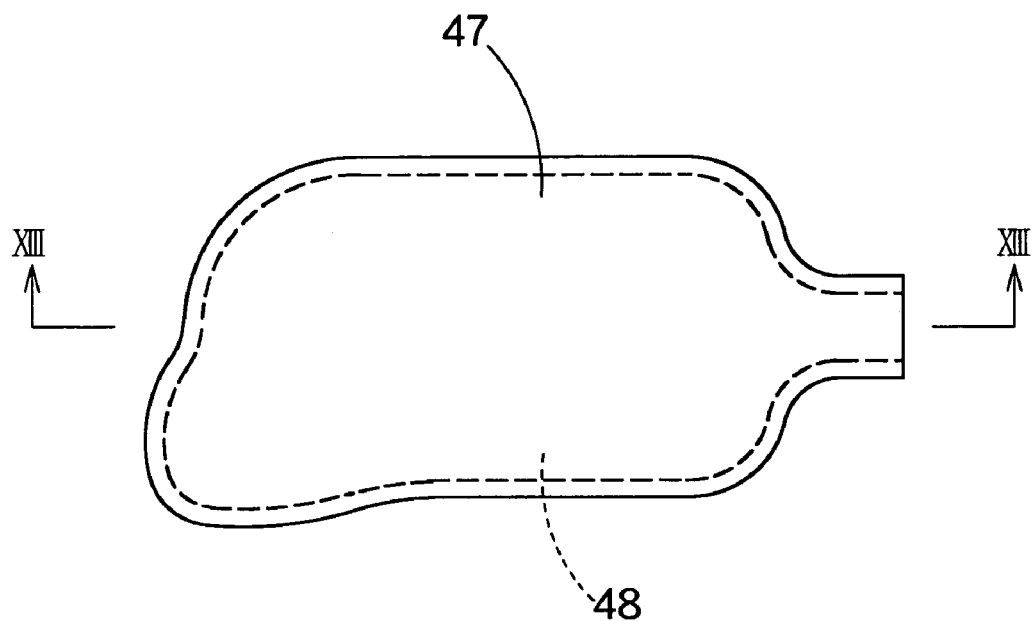
FIG. 13 diagrams the steps of manufacturing still another modification of the airbag.
Figure 13:
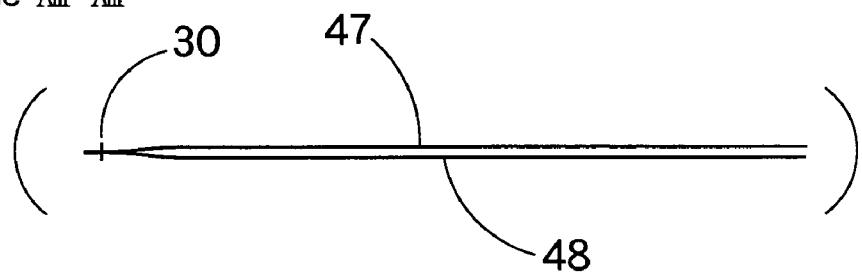
Figure 13:
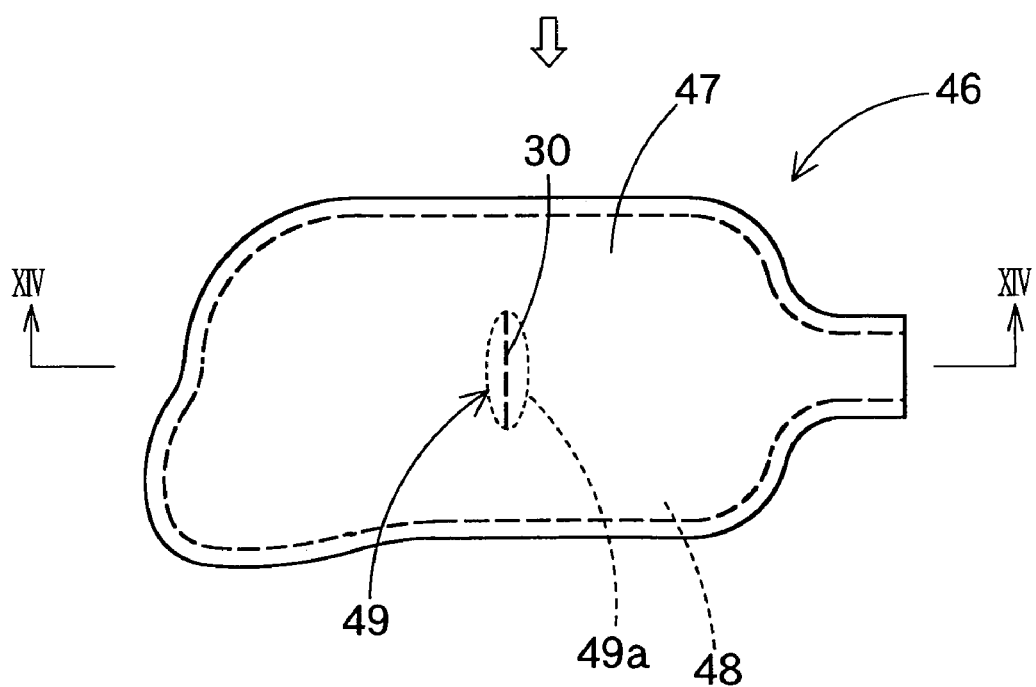
Figure 14:
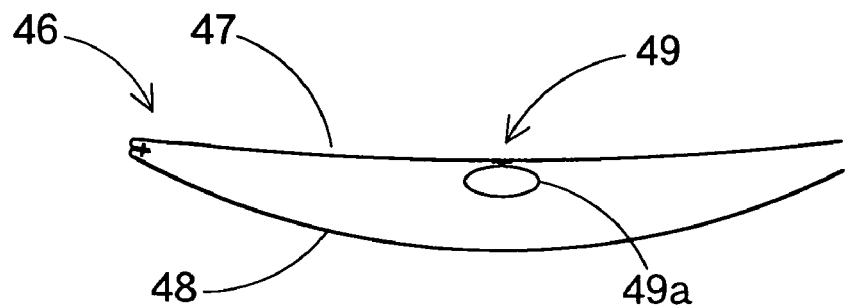
FIG. 14 is a sectional view of a portion XIV-XIV of FIG. 13.
Figure 14:
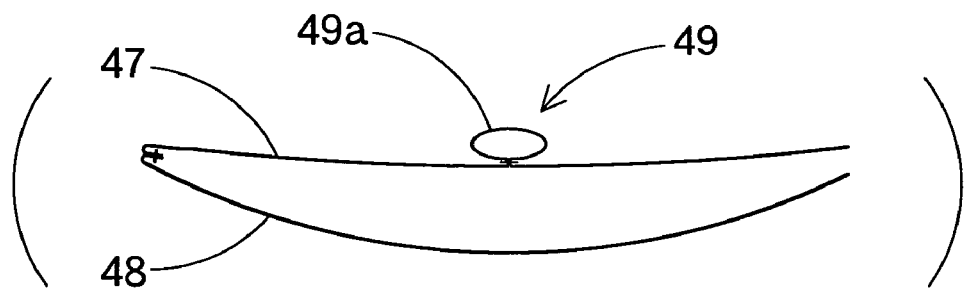
Figure 15:
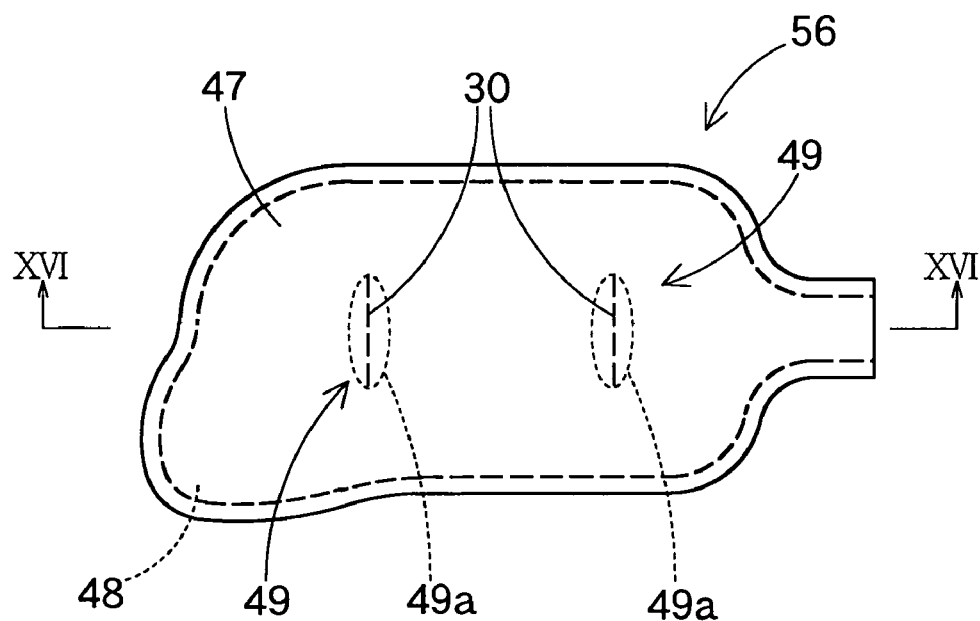
FIG. 15 is a top plan view showing still another modification of the airbag.
Figure 16:
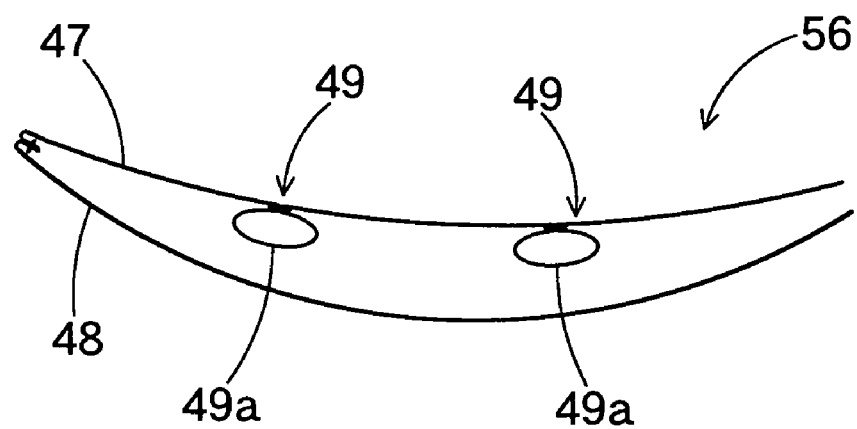
FIG. 16 is a sectional view of a portion XVI-XVI of FIG. 15.

Here, the construction of the airbag 46 shown in FIGS. 13 and 14 may be adopted when the longitudinal length in the upper side peripheral wall is set shorter than the longitudinal length in the lower side peripheral wall in order that the airbag expand and inflate close to the column cover lower surface 9a. In this airbag 46, a column cover side wall portion 47 and a driver's side wall portion 48 of an identical shape are sewn up at their peripheral edges by using a sewing thread 30, and a tuck 49 is then formed at a part of the column cover side wall portion 47 by using the sewing thread 30. The tucked portion 49a may be formed on the inner peripheral side of the airbag 46 or may be exposed on the outer peripheral side of the airbag 46, as shown in a parenthesis of FIG. 14. Here, the number of tucks 49 should not be limited to one, but two tucks may be arranged in the longitudinal direction, as in an airbag 56 shown in FIGS. 15 and 16. Moreover, three or more tucks 49 may be arranged. If the number of tucks 49 is thus increased, the longitudinal length of the upper peripheral wall (or the upper side cloth/column cover side wall portion) after completion of the inflation is easily made shorter than that of the lower peripheral wall (or the lower side cloth/driver's side wall portion). If a plurality of tucks 49 are arranged in the longitudinal direction, moreover, the length of the peripheral wall 47 on the upper side can be shortened balancedly.

Figure 17:
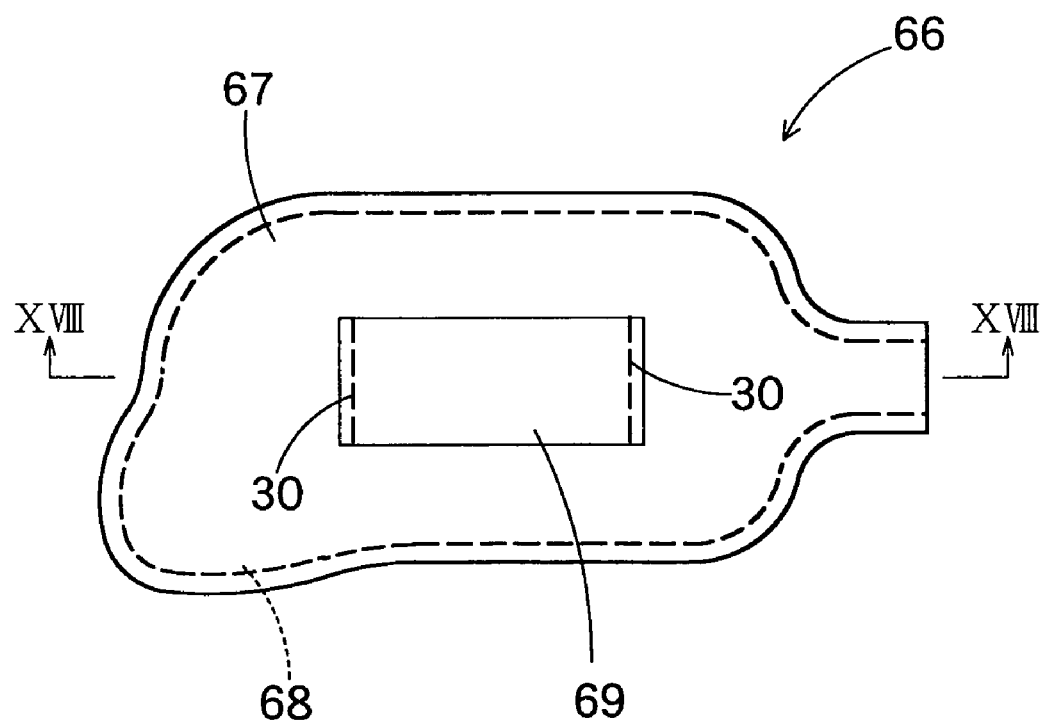
FIG. 17 is a top plan view showing still another modification of the airbag.
Figure 18:
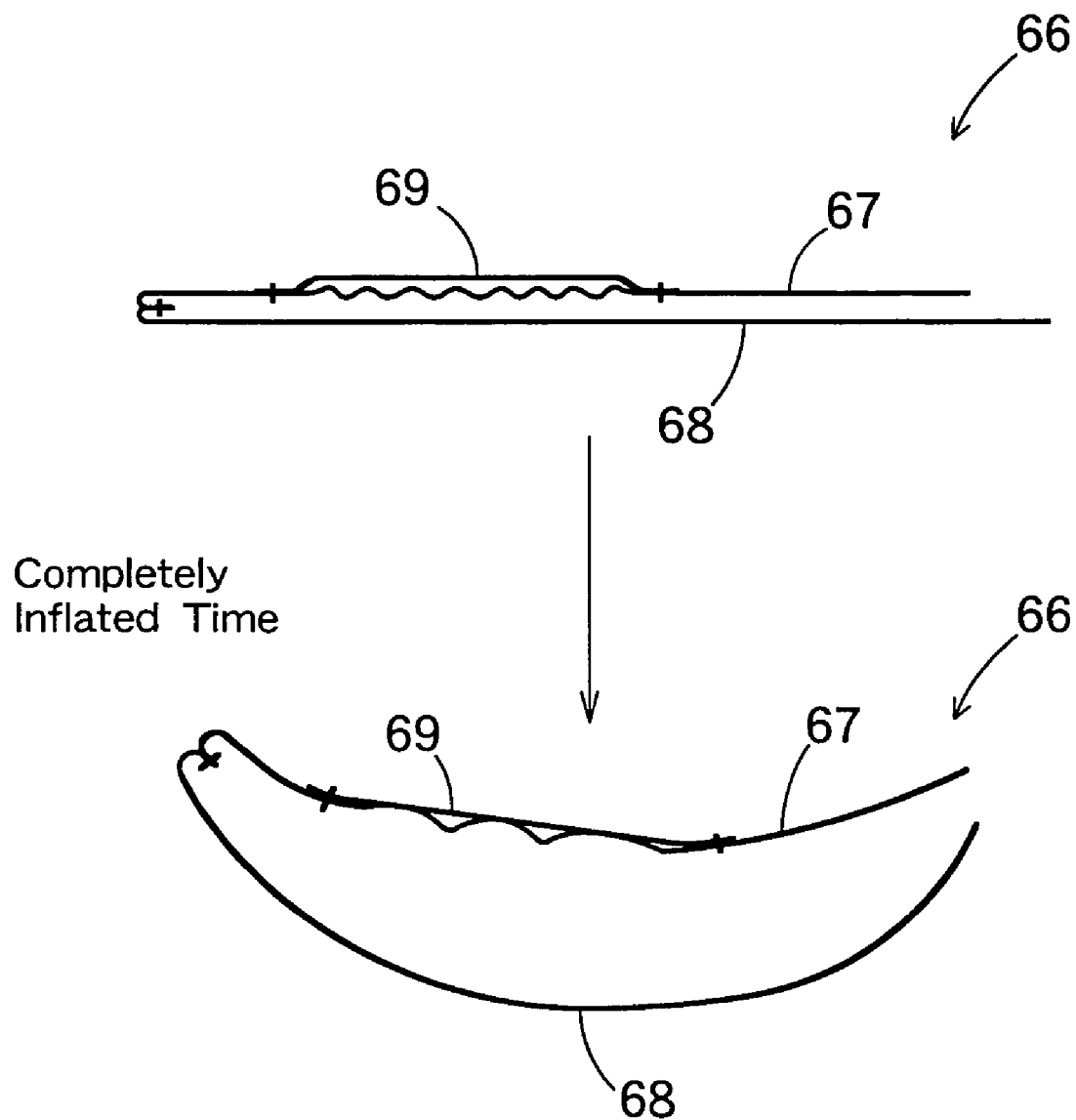
FIG. 18 presents sectional views of a portion XVIII-XVIII of FIG. 17.

Alternatively, the construction may also be modified into an airbag 66, as shown in FIGS. 17 and 18. In this airbag 66, a length adjusting cloth 69 is so jointed at its front and rear end portions to the outer peripheral side of the wall portion 67 by using the sewing thread 30 as to shorten the longitudinal length of a column cover side wall portion 67. In the airbag 66, therefore, the wall portion 67 is pulled by the adjusting cloth 69 when completely inflated so that the longitudinal length of the wall portion 67 is made shorter than a driver side wall portion 68. In this airbag 66, the longitudinal length of the column cover side wall portion 67 is easily shortened compared with the aforementioned airbag 56 having a plurality of tucks 49 arranged.

Figure 19:
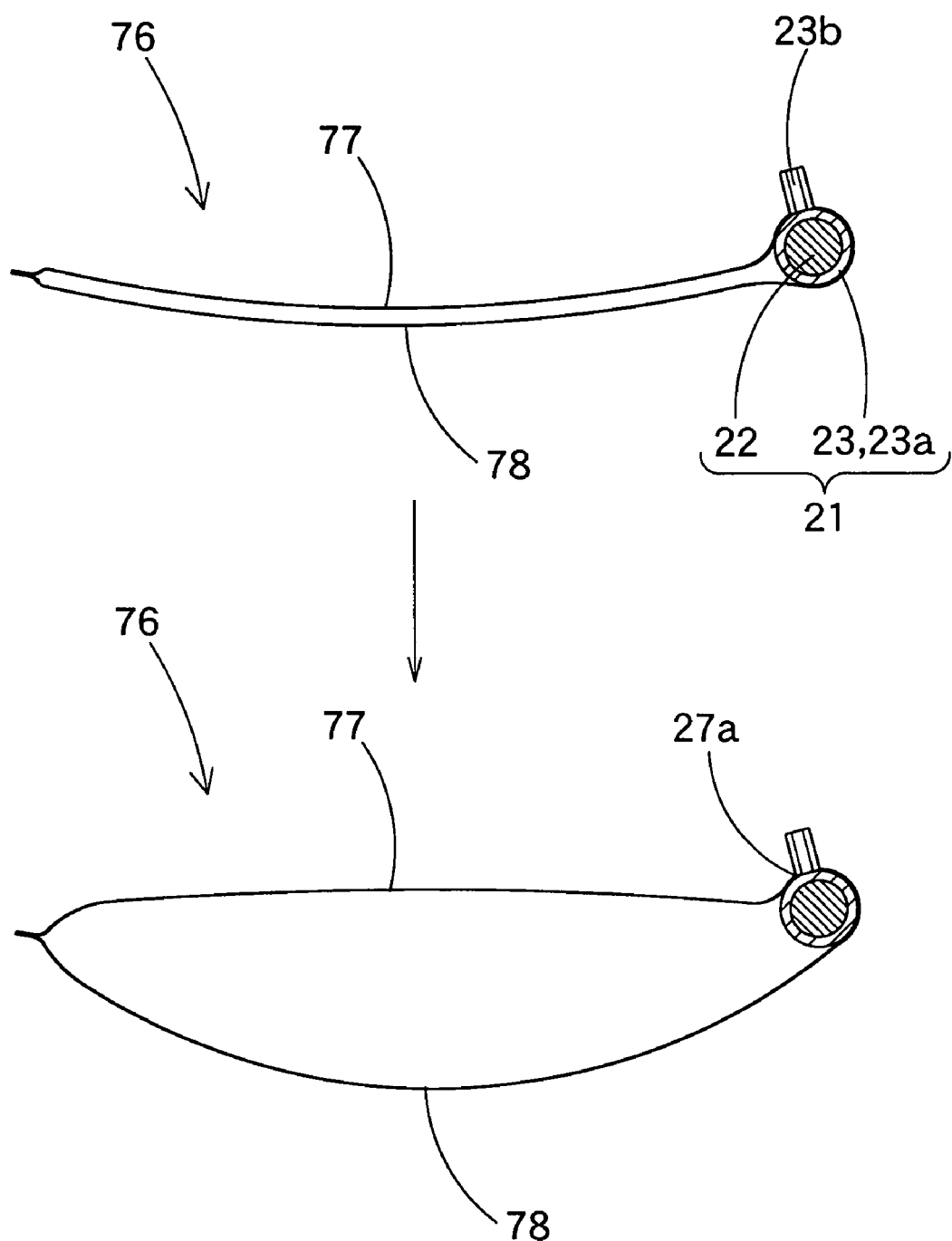
FIG. 19 presents sectional views showing still another modification of the airbag.

Moreover, the construction may also be modified into an airbag 76, as shown in FIG. 19. This airbag 76 is hollow-woven with the number of weaving yarns (warps and wefts) being larger in a column cover side wall portion 77 than in a driver's side wall portion 78. In this airbag 76 being expanded and inflated, the column cover side wall portion 77 is harder to extend. When the inflation is completed, therefore, the longitudinal length of the wall portion 77 is shorter than the driver's side wall portion 78.

Figure 20:
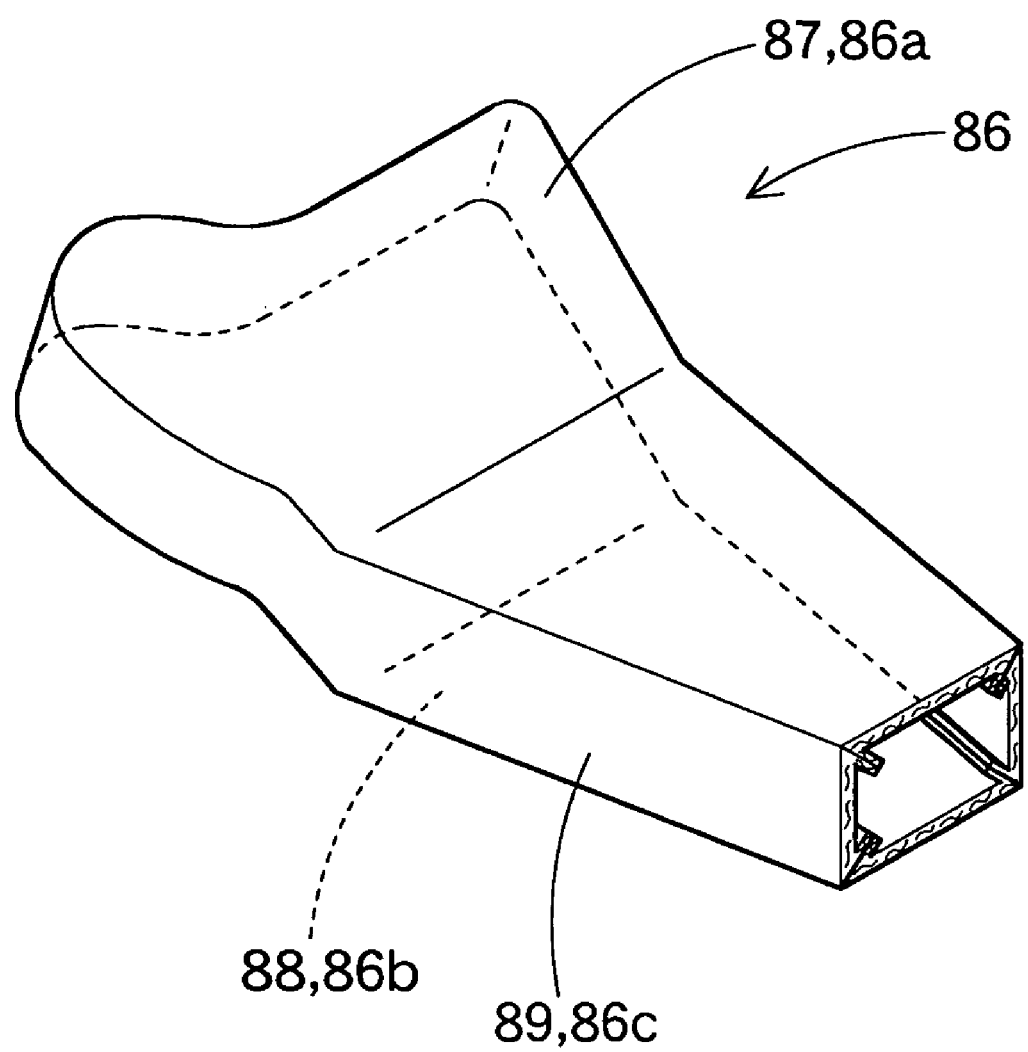
FIG. 20 is a perspective view showing still another modification of the airbag.

In the first and second embodiments, there have been disclosed the airbags 26 and 26A which have the flat plane shape by sewing the column cover side wall portion 27 and the driver side wall portion 28 in the flatly expanded state. As shown in FIG. 20, however, an airbag 86 may be formed solidly by jointing a predetermined number of such airbag elements as have been cut solid to match the inflation completed shape. In the shown example, the airbag 86 is formed of three airbag elements 86a, 86b and 86c: an airbag element 86a to form a column cover side wall portion 87; an airbag element 86b to form a driver's side wall portion 88; and a band-shaped connecting wall portion 89 for connecting the peripheral edges of the wall portions 87 and 88 to each other. Moreover, the airbag 86 is manufactured by jointing these airbag elements 86a, 86b and 86c suitably by sewing, adhering or welding. In this airbag 86, the inflation completed shape can be formed solidly to fit the column cover lower surface 9a. Therefore, the airbag 86 having completed the expansion and inflation comes properly in close contact with the side of the lower surface 9a of the column cover 9.

In the first and second embodiments, still moreover, the airbags 26 and 26A are folded and housed in the lower panels 13 and 13A of the dashboard 11 below the column cover 9. In the first and second embodiments, therefore, it is easier to retain the housing spaces for the airbags 26 and 26A than the case in which the airbag is folded and housed in the column cover 9. Moreover, at the time of the expansion and inflation, the airbags 26 and 26A can be raised easily and smoothly along the column cover lower surface 9a above the housing portion.

Figure 21:
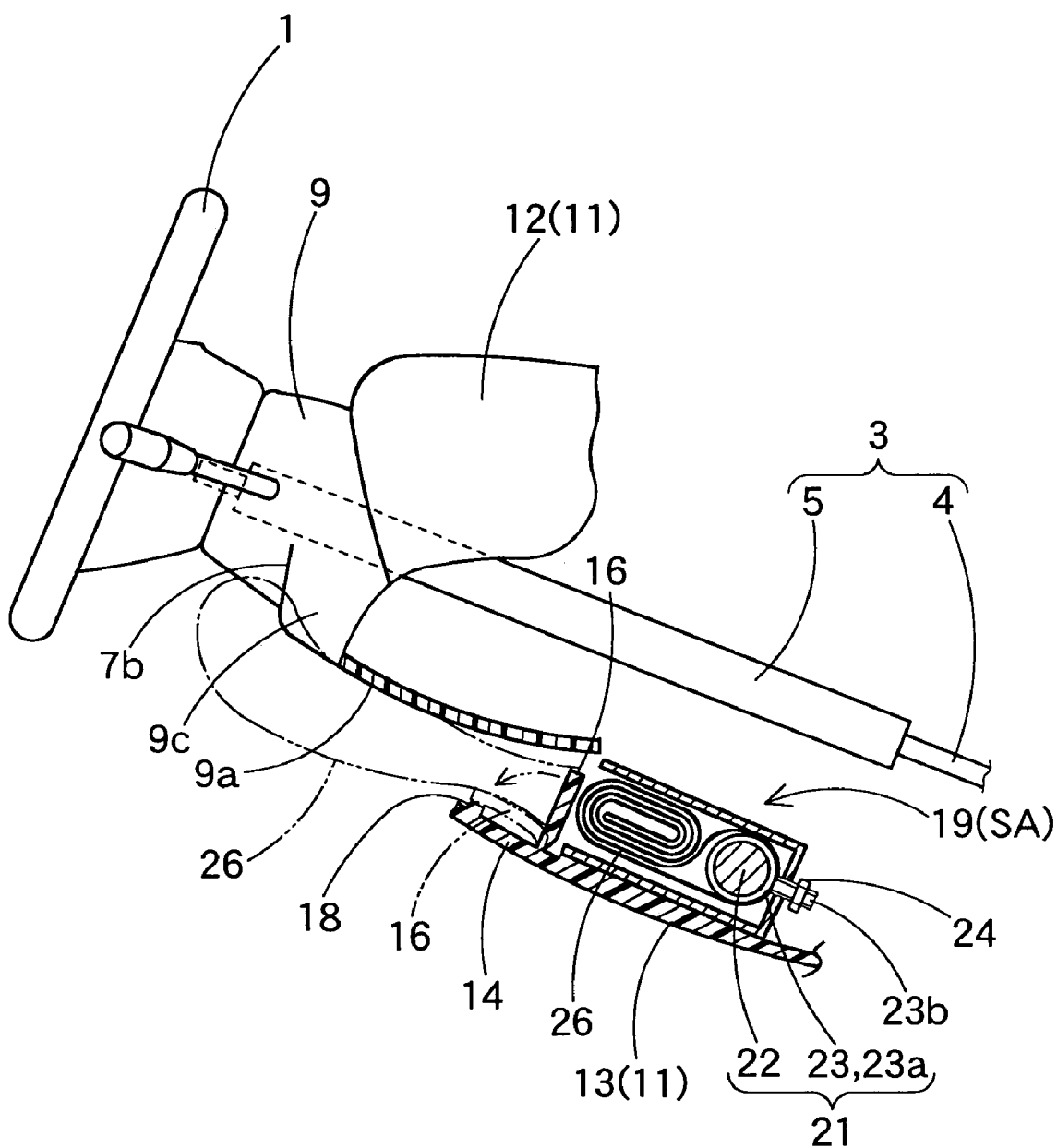
FIG. 21 is a sectional view showing another connected and supported state of the airbag device.
Figure 22:
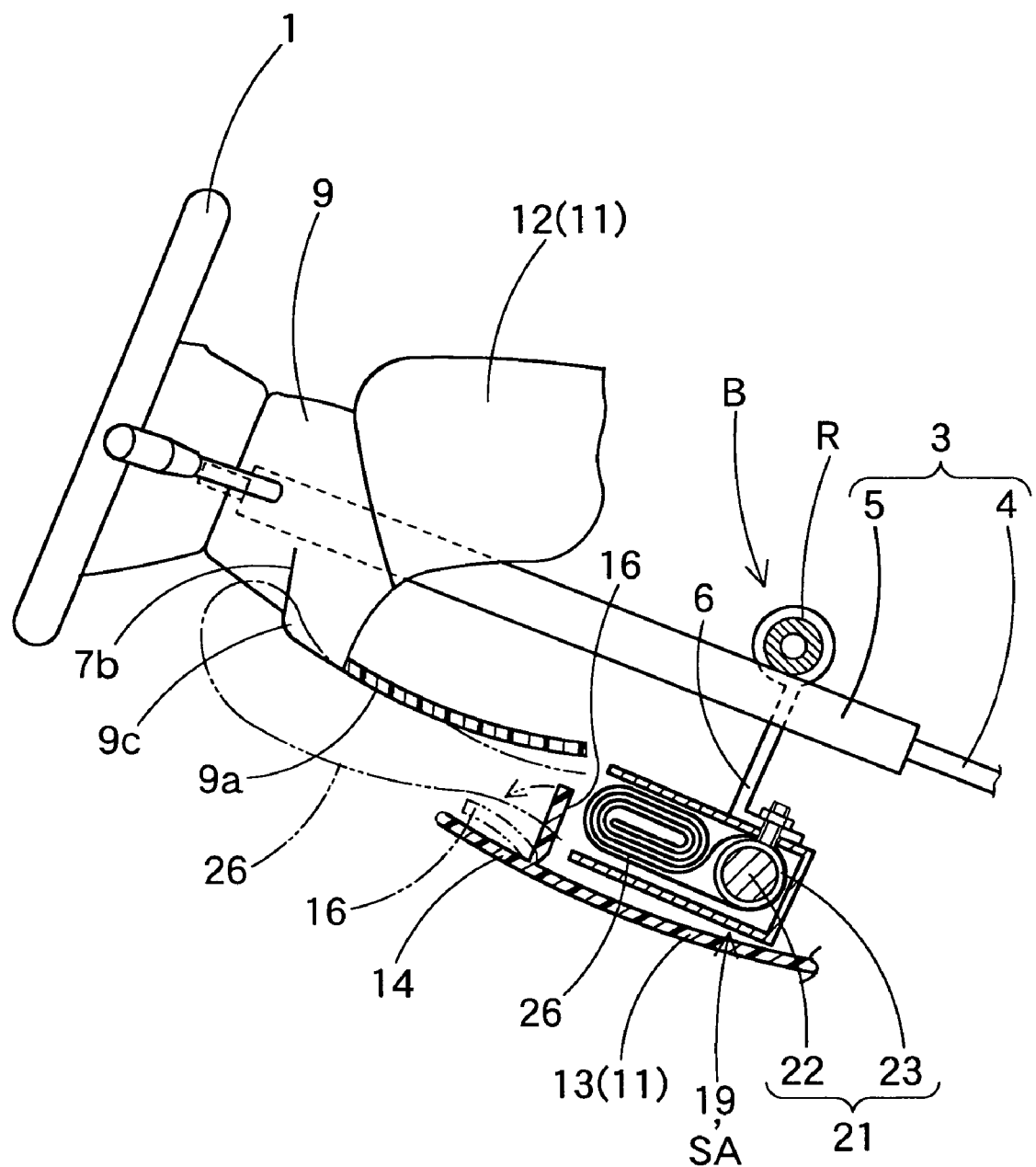
FIG. 22 is a sectional view showing still another connected and supported state of the airbag device.

Here, the first and second embodiments have been described on the case in which the case 19 is connected to and supported by the column 3 together with the folded airbags 26 and 26A and inflator 21. However, the case 19 may be connected to and supported by the lower panel 13, as shown in FIG. 21, not to the column 3. As shown in FIG. 22, moreover, the case 19 may be connected to and supported by a reinforcement R on the side of a body B by means of the bracket 6. Here, the reinforcement R is arranged in the vicinity of the steering column 3 to support the column 3.

Moreover, the first and second embodiments are provided, at the back of the airbags 26 and 26A folded and housed, with the door portion 16 which is opened by the push of the airbags 26 and 26A being expanded and inflated. In other words, the folded airbag 26 is covered with the door portion 16. In this construction, therefore, the door portion 16 helps improve the appearance design of the lower side of the column cover 9. Moreover, the door portion 16 prevents foreign substances from going into the folded airbags 26 and 26A.

In the first and second embodiments, still moreover, the door portion 16 is arranged inside of the lower panels 13 and 13A of the dashboard 11. Therefore, it is difficult to discriminate the presence of the airbag devices M1 and M2. Specifically, vehicles with and without the airbag device present substantially identical appearances in the vicinity of the column cover lower surface 9a. As a result, the appearance and design of the lower side of the column cover 9 in the vehicle having the airbag device is not deteriorated, as compared with that of the vehicle having no airbag device.

Figure 23:
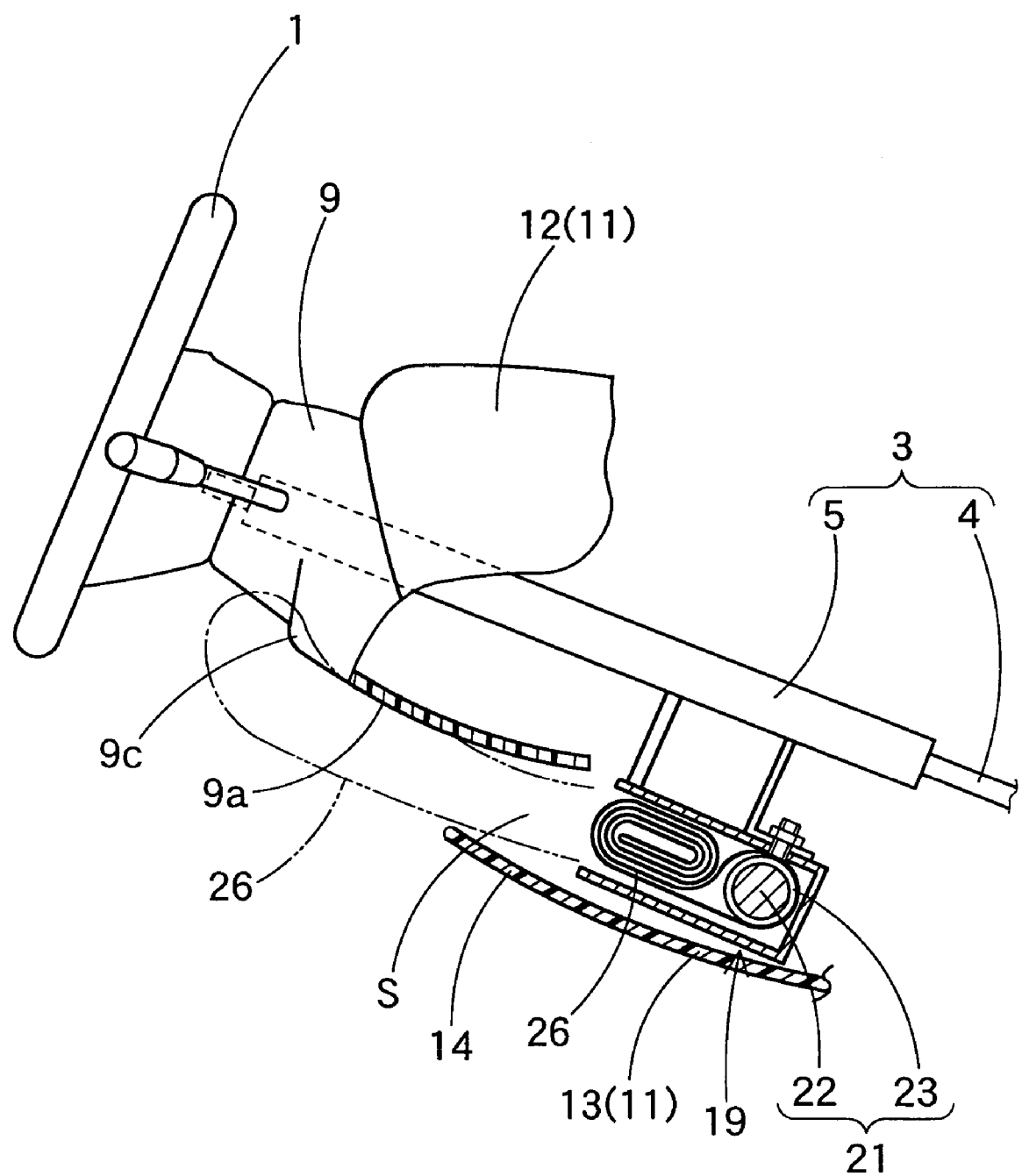
FIG. 23 is a sectional view showing a modification of the airbag device.

Here, in case the folded airbags 26 and 26A are housed deeply in the lower panels 13 and 13A of the dashboard 11 below the column cover 9, the housed portions are hardly seen from the driver or the like. Therefore, the door portion 16 may be omitted, as shown in FIG. 23. In this case, the airbags 26 and 26A are expanded and inflated from the clearance S between the peripheral edge portions 14 of the lower panels 13 and 13A and the column cover 9.

Figure 24:
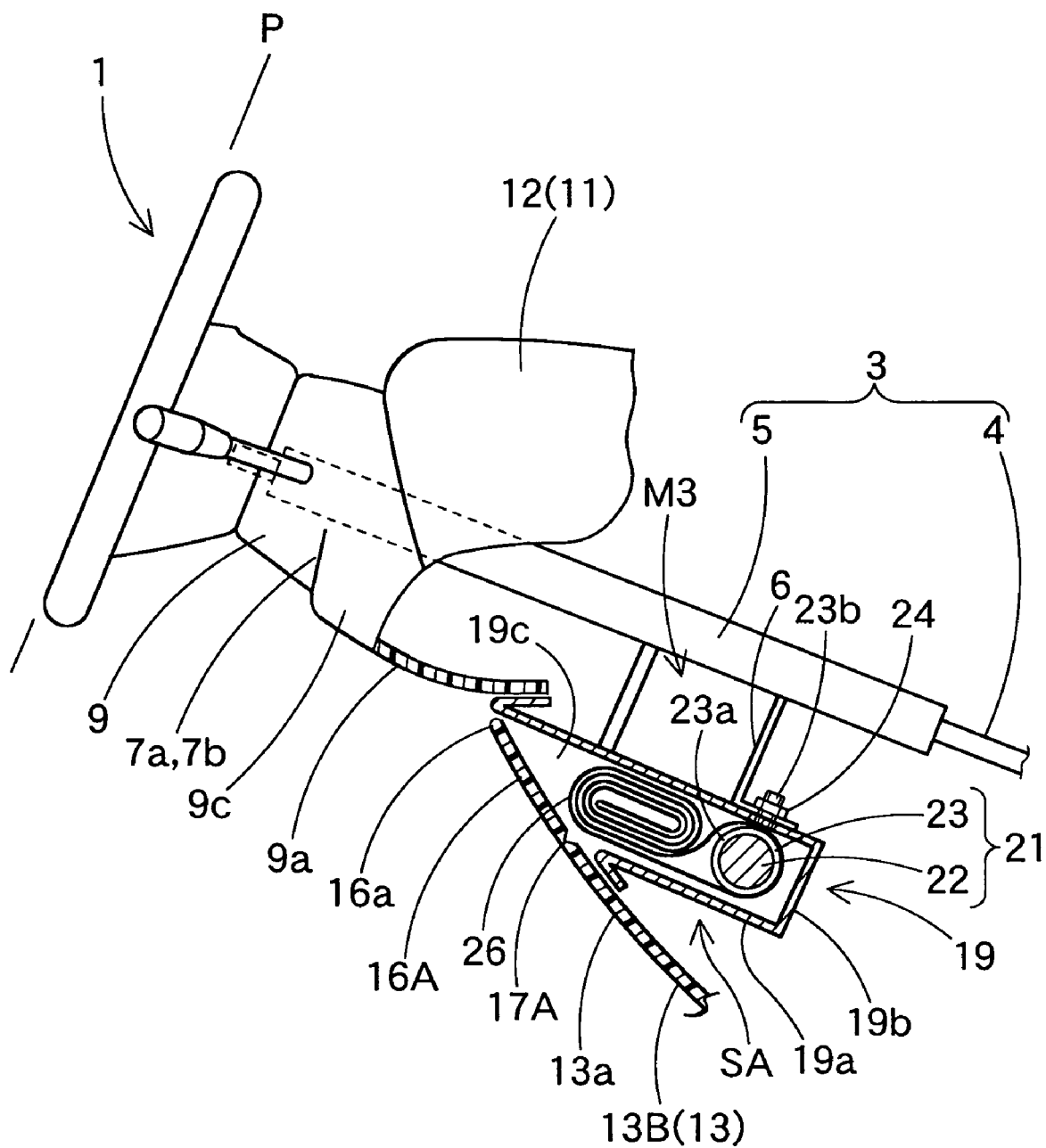
FIG. 24 is a sectional view showing an airbag device of a third embodiment.
Figure 25:
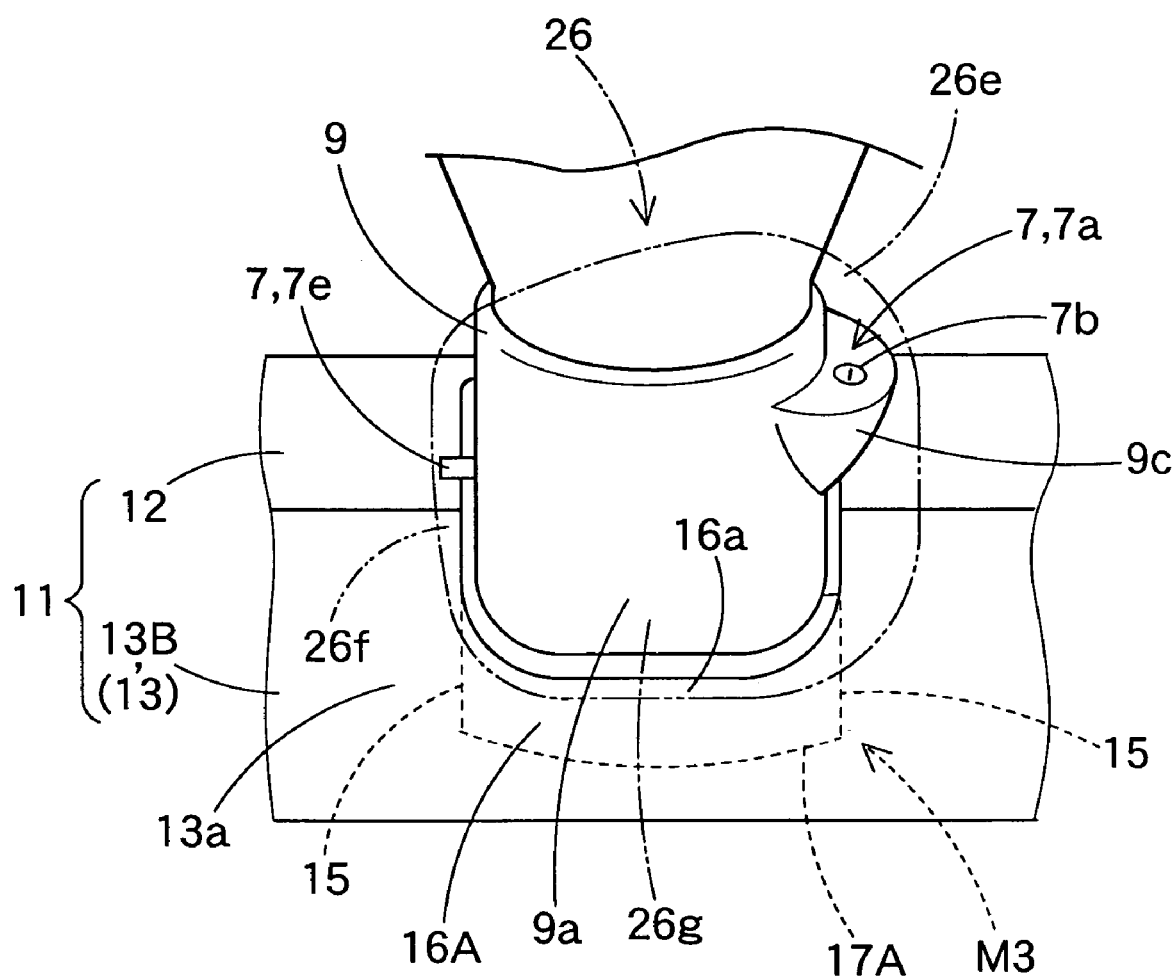
FIG. 25 is a front elevation of the vicinity of a column cover of the third embodiment.
Figure 26:
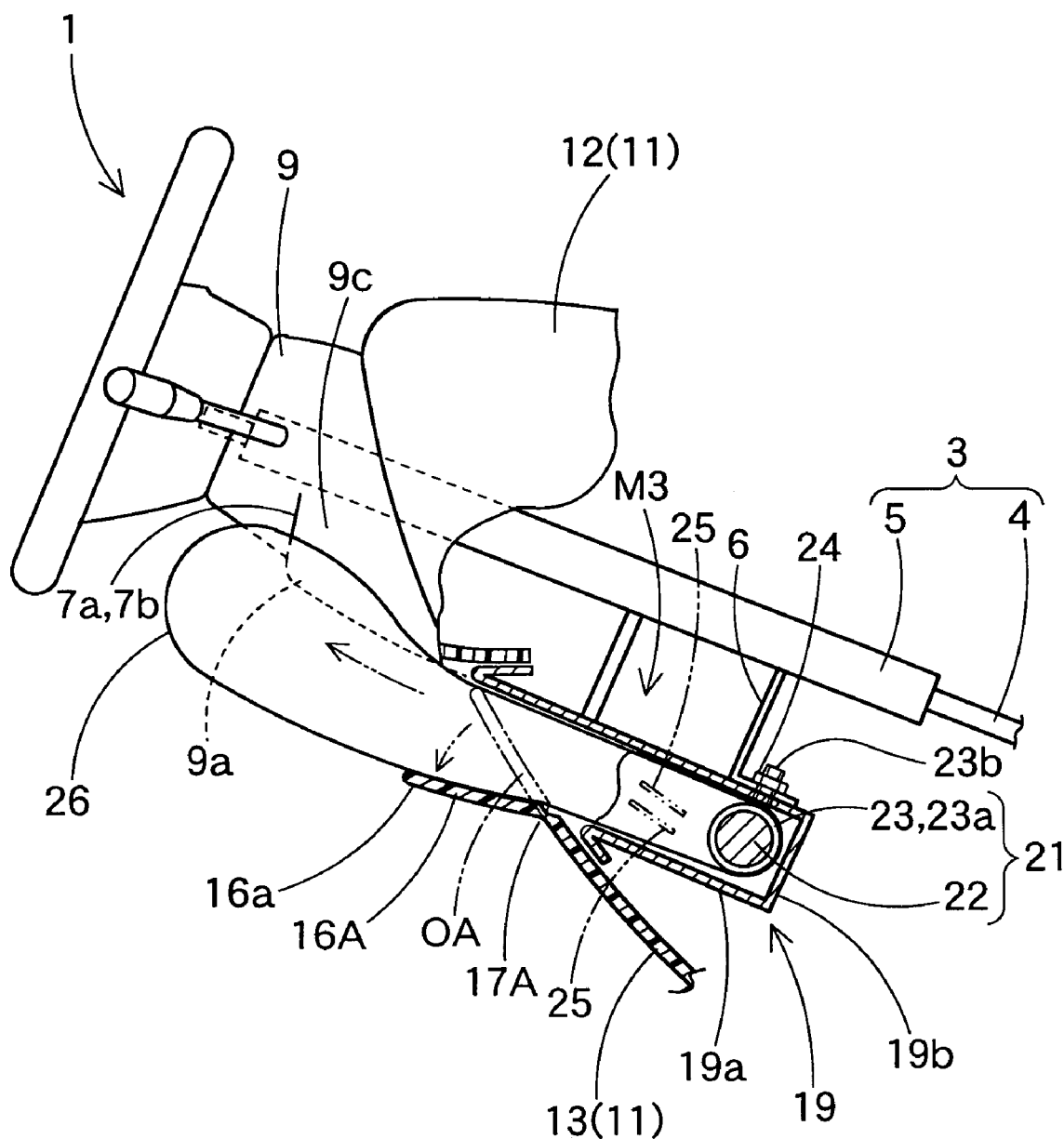
FIG. 26 is a diagram showing the airbag of the third embodiment being expanded and inflated.

Moreover, the first and second embodiments have been described on the case in which the door portion 16 to be opened at the expanding and inflating time of the airbags 26 and 26A are arranged on the inner sides of the lower panels 13 and 13A of the dashboard 11. However, the construction may be modified into an airbag device M3 of a third embodiment, as shown in FIGS. 24 to 26. In this airbag device M3, a door portion 16A is disposed at the rear end side of the lower panel 13 behind the airbag 26 folded up and housed. This door portion 16A is provided with a hinge portion 17A at the lower edge side, and portions 15 to be broken. The hinge portion 17A is arranged generally in a semi-arcuate shape and is constructed of an integral hinge. The portions 15 to be broken are breakably thinned and extends linearly upward from the two left and right ends of the hinge portion 17A. This door portion 16A is opened, at the expanding and inflating time of the airbag 26, by breaking the portions to be broken 15 and 15 while being pushed by the airbag 26 and by turning the side of the upper edge 16a backward of the vehicle on the hinge portion 17A. In other words, the door 16A opens downward. In this door portion 16A, the hinge portion 17A is formed generally in a semi-arcuate shape. Therefore, the door portion 16A does not open fully toward the rear side of the vehicle but opens at a small angle. In other words, the door portion 16A plays a role as a guide plate for guiding the airbag 26 to be expanded and inflated along the column cover lower surface 9a. Here, this airbag device M3 differs from the first embodiment in that a control unit (or control lever) 7e for both the tilt mechanism and the telescopic mechanism is arranged on the left side face of the column cover 9. However, the remaining members are similar to those of the first embodiment so that their description will be omitted by designating them the common reference numerals.

In this airbag device M3, too, when expanding and inflating, the airbag 26 pushes and opens the door portion 16A to expand and inflate while rising from the lower side below the column cover 9 along the column cover lower surface 9a. Moreover, the airbag 26 is formed generally into such a rectangular plate shape as to cover the lower surface 9a of the column cover 9 when it completes the expansion and inflation. Even if the knee of the driver is close to the column cover 9 when the driver depresses the brake pedal, therefore, the airbag 26 being expanded and inflated goes smoothly into the clearance between the knee of the driver and the column cover lower surface 9a. As a result, the airbag 26 can protect the knee of the driver properly preventing the knee from interfering with the column cover 9.

In this third embodiment, the door portion 16A is exposedly arranged on the inner surface side of the vehicle so that it can be directly seen. Therefore, a lower panel 13B itself having the door portion 16A is the airbag cover 13B for covering the rear side of the folded airbag 26 or the case 19. Moreover, the third embodiment is constructed by arranging the hinge portion 17A at the lower end side of the door portion 16A so that the door portion 16A disposed in the airbag cover 13B may be opened downward. In this construction, the door portion 16A is opened from the side of the upper end 16a by the push of the airbag 26 being expanded and inflated. Therefore, the airbag 26 to be expanded and inflated is protruded, at the beginning of the opening of the door portion 16A, from the upper side of an opening area OA made by the door portion 16A. In other words, the airbag 26 to be expanded and inflated is easily protruded upward. As a result, the airbag 26 is smoothly expanded and inflated while rising along the column cover lower surface 9a. Moreover, the airbag 26 folded and mounted on the vehicle is covered with the airbag cover 13B, which improves the appearance design of the airbag device M3.

Moreover, this airbag cover 13B is integrated with the lower panel 13B of the dashboard 11 below the column cover 9. Therefore, the airbag device M3 does not deteriorate the appearance of the vicinity of the column cover 9 when it is mounted on the vehicle.

On the other hand, the door portion 16A of this airbag cover 13B is opened by breaking the portion to be broken 15 arranged in its peripheral edge. Specifically, the door portion 16A of the airbag cover 13B has an appearance identical to that of an airbag cover body portion (or general portion) 13a around the door portion 16A. Therefore, the airbag cover 13B improves the appearance design including the door portion 16A.

Here in the first to third embodiments, the airbags 26 and 26A are housed in the lower panels 13 and 13A of the dashboard 11 below the column cover 9, and is covered with the door portions 16 and 16A. However, the airbag may be housed in the column cover 9, as long as the airbag can be expanded and inflated along the column cover lower surface 9a to go smoothly into the clearance between the knee of the driver and the column cover lower surface 9a. More specifically, the folded airbag may also be housed in the column cover 9, while being covered with a openable door portion, below the cover portion 9c on the lower surface 9a of the column cover 9 or on the lower side of the vertically intermediate portion of the column cover 9 in the lower surface 9a (as referred to a column cover 9A of FIGS. 72 and 73).

Figure 27:
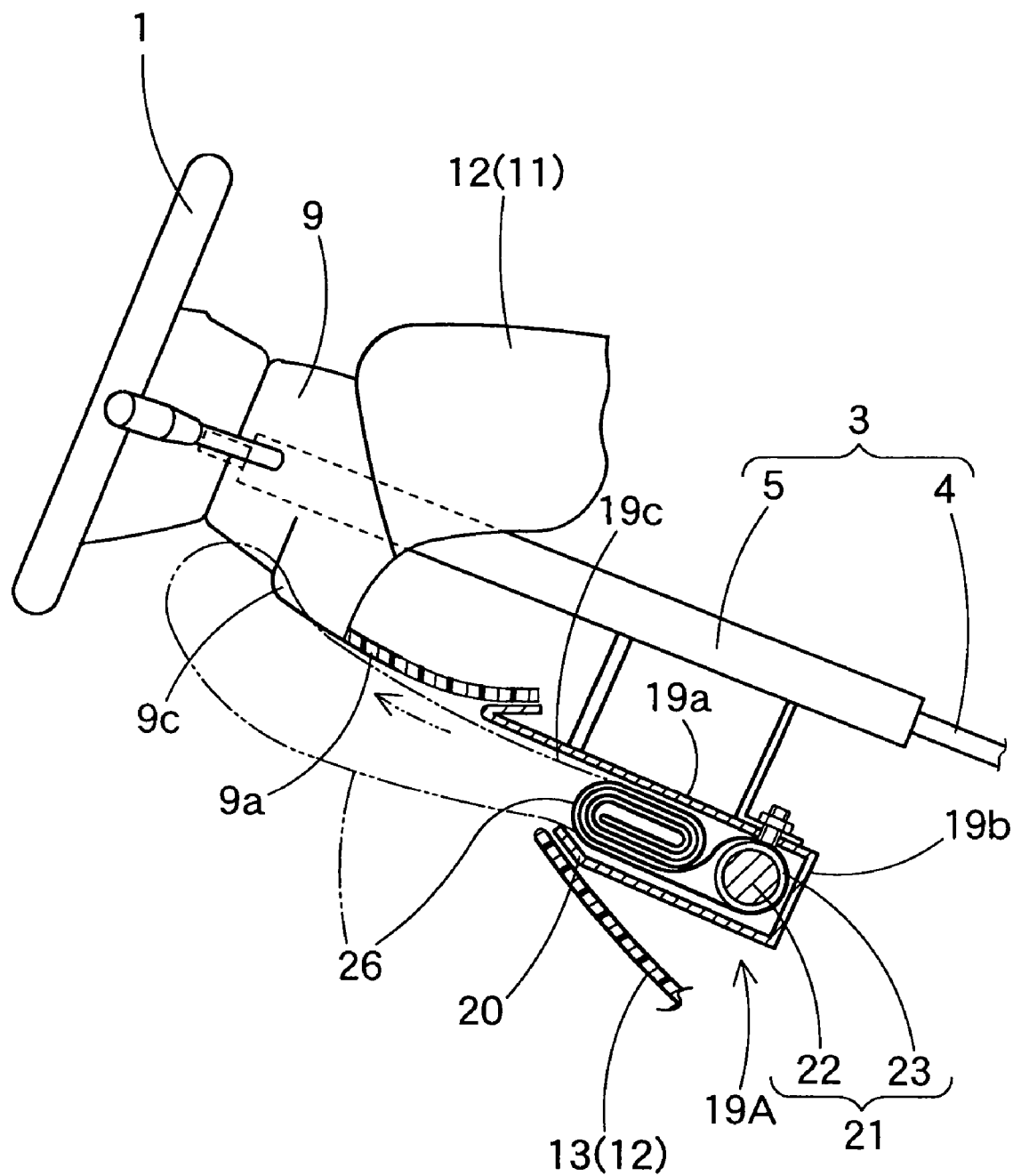
FIG. 27 is a sectional view showing a modification of the airbag device of the third embodiment.

The door portions 16 and 16A of the first to third embodiments are constructed to play the role of a guide plate portion for guiding the airbags 26 and 26A to be expanded and inflated along the column cover lower surface 9a. As shown in FIG. 27, however, a guide plate portion 20 for guiding the airbag 26 to expand and inflate along the column cover lower surface 9a may be disposed in the peripheral edge of the lower edge side of the rear side opening 19c in the peripheral wall portion 19a of a case 19A. Alternatively, diffusers 25 (as referred to double-dotted lines of FIGS. 3 and 26) for regulating the flow of the inflating gas may be so disposed near the inflator body 22 that the inflating gas discharged from the inflator body 22 may flow along the column cover lower surface 9a.

In case the door portions 16 and 16A functions as the guide plate portion, moreover, the opening angle may be regulated by the arrangement of the hinge portions 17 and 17A, but the construction may be modified into one shown in FIG. 21. Specifically, the door portions 16 and 16A may be provided therearound or on themselves with an angle regulating member 18 which interferes with the door portions 16 and 16A when opened, and regulates the opening angle of the door portion 16 and 16A.

In each of the embodiments M1, M2 and M3, still moreover, the airbag assembly SA is assembled before mounted on the vehicle. The airbag assembly SA is formed by housing the folded airbags 26 or 26A and the inflator 21 feeding the airbags with the inflating gas, in the case 19. In each embodiment, this airbag assembly SA is either fixed on the steering column 3 or the body B of the vehicle, or attached to the lower panel 13 when it is mounted on the vehicle. In this construction, the airbag device M1, M2 or M3 can be assembled in advance as an assembly. With this construction, therefore, it is easy to assemble the airbag device M1, M2 and M3 with the vehicle. With this construction, moreover, since the individual members are integrated, their handling before they are mounted on the vehicle is facilitated. Here, the airbag assembly SA may be attached to the lower panel 13, but is desirably attached to the rigid steering column 3 or vehicular body B so as to retain the mounting strength.

Here will be described a knee protecting airbag device M4 according to a fourth embodiment with reference to FIGS. 28 to 31. This airbag device M4 is held on a plate-shaped holding plate 117 acting as a holding member. The holding plate 117 is arranged below the column cover 9, as shown in FIG. 31. The holding plate 117 is fixed on vehicular frame FC and FR arranged on the left and right sides by means of bolts. The airbag device M4 is provided with: an airbag 129 housed below the steering column 3; an inflator 124 for feeding the inflating gas to the airbag 129; and a case 119 for housing the airbag 129 and the inflator 124. The airbag device M4 is so attached to the holding plate 117 that the case 119 is arranged on the vehicular front side of the holding plate 117.

In this fourth embodiment, too, the column cover 9 and the steering column 3 covered with the former are given constructions substantially similar to those of the first to third embodiments.

Figure 28:
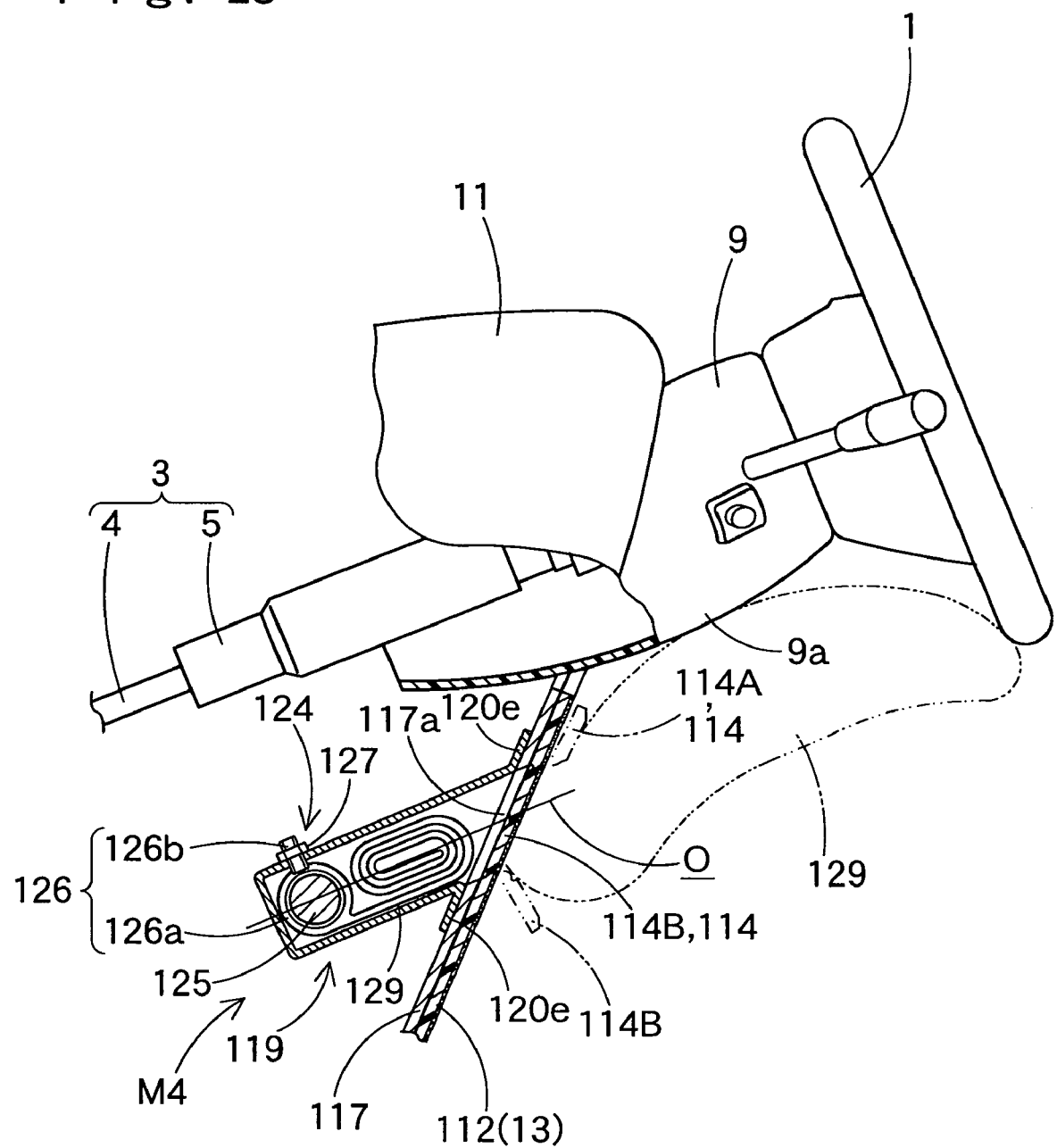
FIG. 28 is a sectional view showing a knee protecting airbag device of a fourth embodiment in use.
Figure 29:
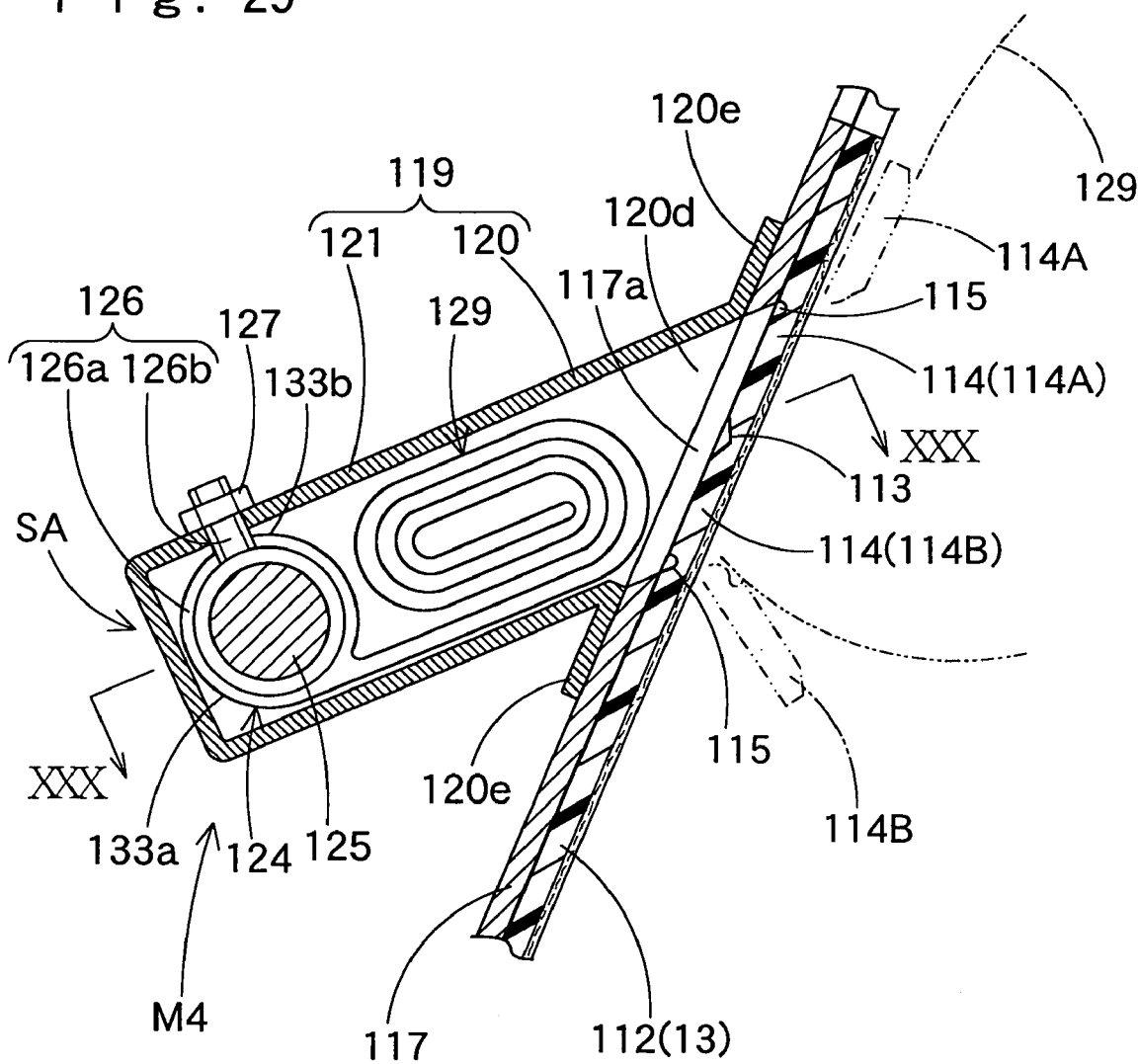
FIG. 29 is an enlarged sectional view of the knee protecting airbag device of the fourth embodiment.
Figure 30:
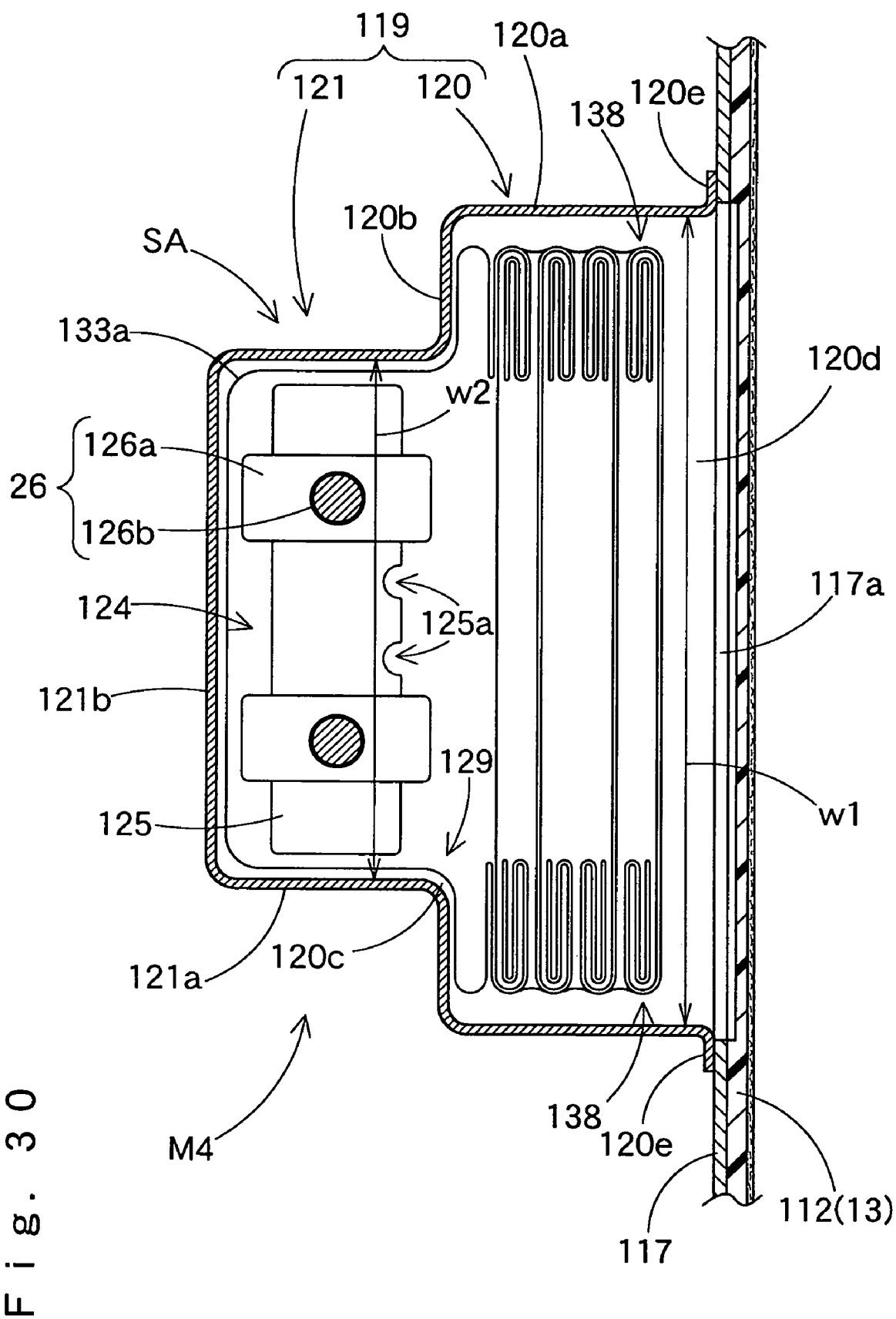
FIG. 30 is a sectional view of a portion XXX-XXX of FIG. 29.
Figure 31:
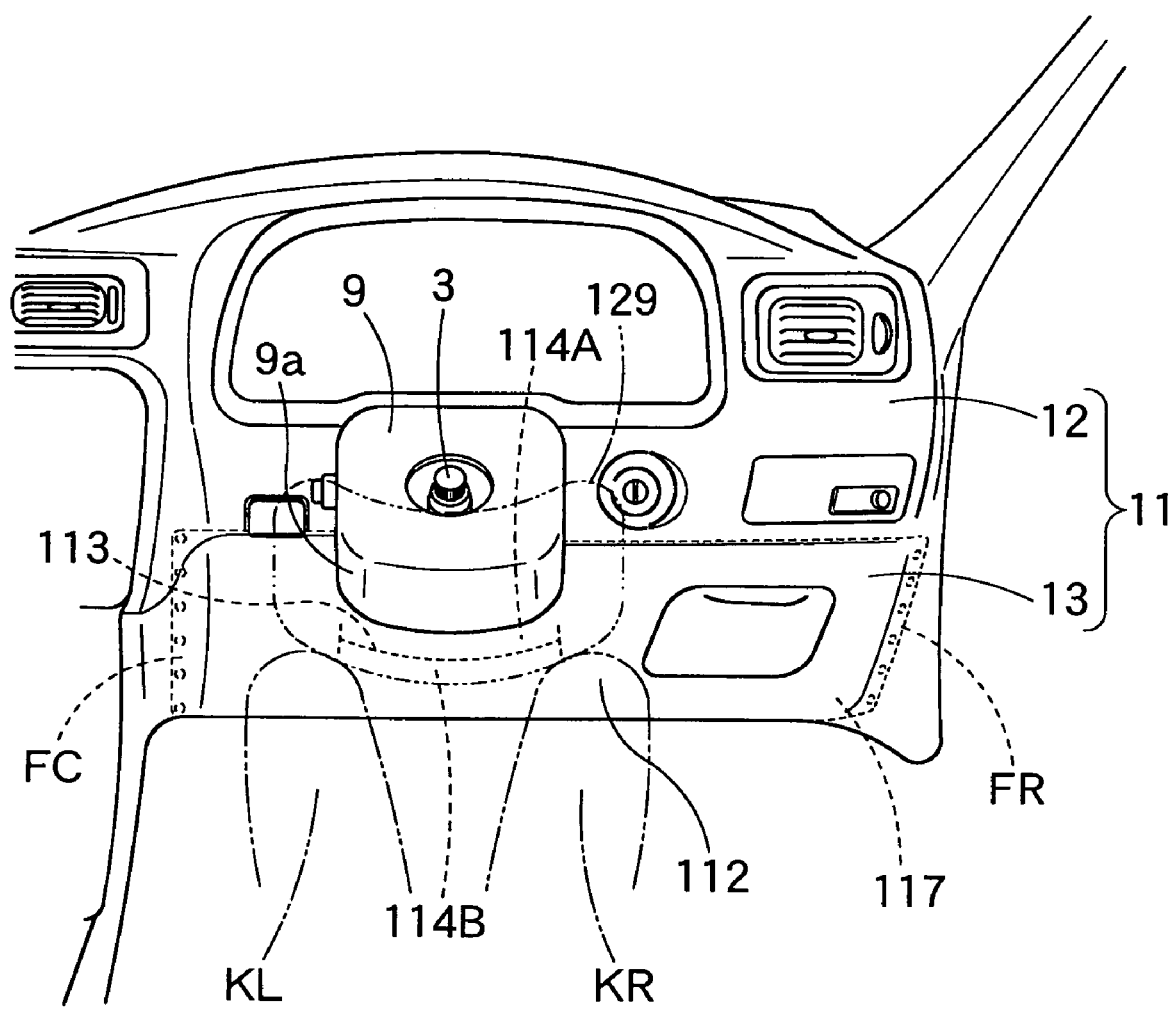
FIG. 31 is a front elevation of the vicinity of a column cover of the fourth embodiment.

Moreover, the case 119 is made of a sheet metal and is constructed, as shown in FIGS. 28 to 30, to include a bag housing portion 120 and an inflator housing portion 121. The bag housing portion 120 houses the airbag 129 folded and is provided with an opening 120d on the vehicular rear side. The inflator housing portion 121 is arranged on the vehicular front side of the bag housing portion 120 and houses the inflator 124. The bag housing portion 120 is formed into a generally rectangular parallelepiped shape. The bag housing portion 120 is provided with a peripheral wall portion 120a of a generally square cylinder shape and a bottom wall portion 120b. The bottom wall portion 120b is arranged on the vehicular front side of the peripheral wall portion 120a and is provided with a communication hole 120c communicating with the inflator housing portion 121. The inflator housing portion 121 is formed into a generally rectangular parallelepiped shape. The inflator housing portion 121 is provided with a peripheral wall portion 121a and a bottom wall portion 121b. The peripheral wall portion 121a is formed into a generally square cylinder shape and is arranged in the peripheral edge of the communication hole 120c formed in the bottom wall portion 120b of the bag housing portion 120. The bottom wall portion 121b is arranged on the vehicular front side of the peripheral wall portion 121a.

Moreover, the bag housing portion 120 and the inflator housing portion 121 are made to have substantially equal width sizes in the vertical direction of the vehicle, as shown in FIGS. 28 and 29. The width w1 of the bag housing portion 120 in the transverse direction of the vehicle is made larger than the width w2 of the inflator housing portion 121 in the transverse direction of the vehicle, as shown in FIG. 30.

From the peripheral edge of the opening 120d of the bag housing portion 120, there is outwardly protruded a flange portion 120e for attaching the case 119 to the holding plate 117. In the embodiment, the case 119 is fixed at the flange portion 120e on the holding plate 117 by means of not-shown bolts or the like, as shown in FIGS. 28 and 29. The case 119 is so arranged while the axial direction O of the peripheral wall portions 120a and 121a are directed along the column cover lower surface 9a (or along the axial direction of the steering column 3) that the airbag 129 housed therein may be protruded from the case 119 along the lower surface 9a of the column cover 9.

The inflator 124 is provided with a cylinder type body 125 and two bracket portions 126 and 126, as shown in FIGS. 28 to 30, 32 and 33. The body 125 is provided with gas discharge ports 125a for discharging the inflating gas. This inflator 124 is also activated, like the inflator 21 of the first embodiment, in response to an electric signal from a predetermined control device simultaneously with the airbag device for the steering wheel 1. Each bracket portion 126 is constructed, like the bracket portions 23 of the first embodiment, to include a retaining ring 126a made of a sheet metal for clamping the body 125, and bolts 126b protruded from the retaining ring 126a. The inflator 124 is enveloped by the airbag 129 and is housed in the inflator housing portion 121 while the bracket portions 126 and 126 clamping the body 125. By fastening nuts 127 on the individual bolts 126b protruded from the housing portion 121, moreover, the inflator 124 is attached and fixed together with the airbag 129 on the inflator housing portion 121. Not-shown lead wires are connected with the body 125.

The holding plate 117 is made of a sheet metal and is arranged on the lower side of the dashboard 11 covering the column cover 9, as shown in FIGS. 28, 29 and 31. Moreover, the holding plate 117 is covered on its vehicular inner side with the lower panel 13 on the lower side of the dashboard 11. The lower panel 13 plays a role of an airbag cover 112. In the holding plate 117, there is formed an opening 117a for communicating with the opening 120d of the case 119. In the airbag cover 112, there are formed door portion 114 (114A and 114B) of a generally rectangular plate shape which are to be opened into the compartment of the vehicle when pushed by the airbag 129 being expanded and inflated. These door portions 114 are formed integrally with the airbag cover 112 and have therearound a thinned portion 113 to be broken, as shown in FIGS. 29 and 31. The portion 113 to be broken is formed into a generally H-shape, as seen from the vehicular inside. Of the individual door portions 114, the door portion 114A on the vehicular upper side has a hinge portion 115 arranged on the upper edge side, and the door portion 114B on the vehicular lower side has a hinge portion 115 arranged on the lower edge side. Moreover, the individual door portions 114A and 114B are so set as to be opened upward and downward of the vehicle, respectively. Here in the embodiment, the door portions 114A and 114B are set to be opened vertically but may be modified to be opened transversely. Alternatively, the door portions may also be modified into one door portion 314 of FIG. 68, in which a portion 315 to be broken is arranged in an inverted U-shape, as seen from the vehicular inside. The door portion 314 of this case is of a downward-opening type having a hinge portion 316 on the lower edge side.

Figure 32:
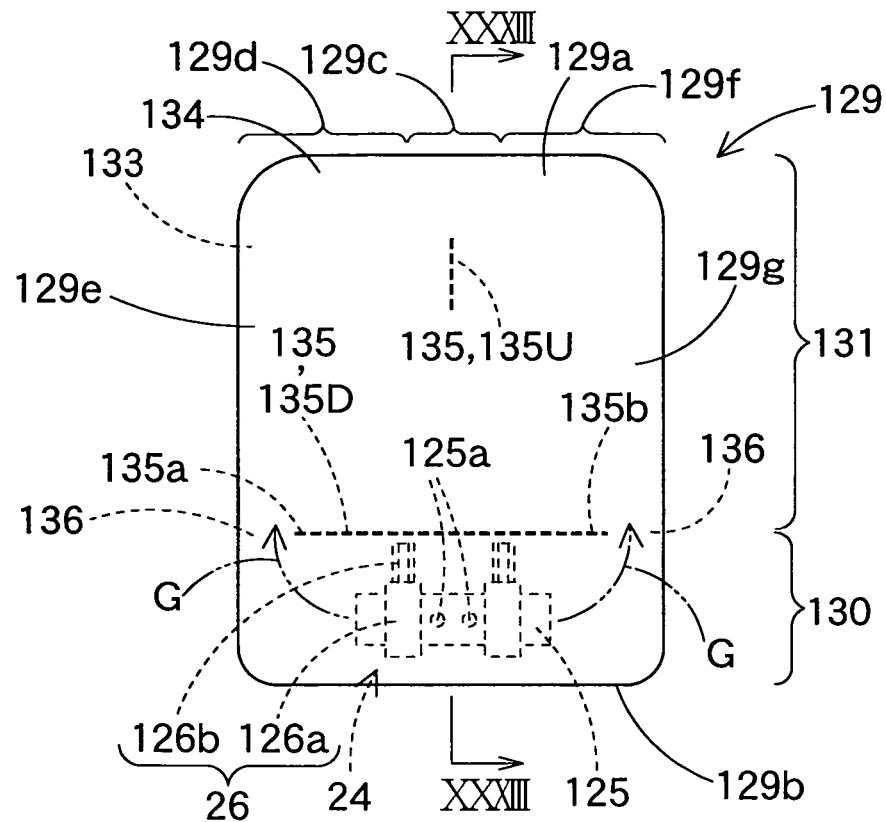
FIG. 32 is a top plan view of an airbag to be used in the fourth embodiment.
Figure 33:
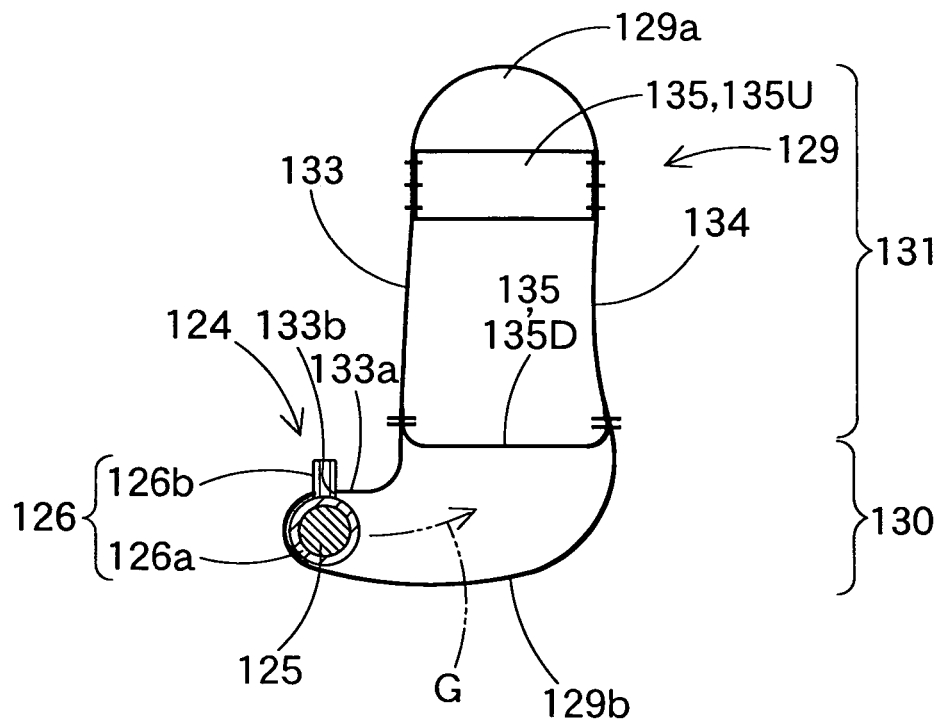
FIG. 33 is a sectional view of a portion XXXIII-XXXIII of FIG. 32.

The airbag 129 is formed of a flexible woven fabric of polyester, polyamide or the like and takes a generally rectangular plate shape when it completes the expansion and inflation, as shown in FIGS. 32 and 33. The airbag 129 is constructed to include a wall portion 133 for the side of the column cover 9 and a wall portion 134 for the side of a driver D when it completes the expansion and inflation. In the column cover side wall portion 133 at the lower end (or front end) 129*b* of the airbag 129, there is arranged a housing portion 133*a* for housing and attaching the inflator 124 therein. The housing portion 133*a* is protruded to the vehicular front side. In the housing portion 133*a*, there are formed through holes 133*b* for inserting the individual bolts 126*b* thereinto.

Figure 40:
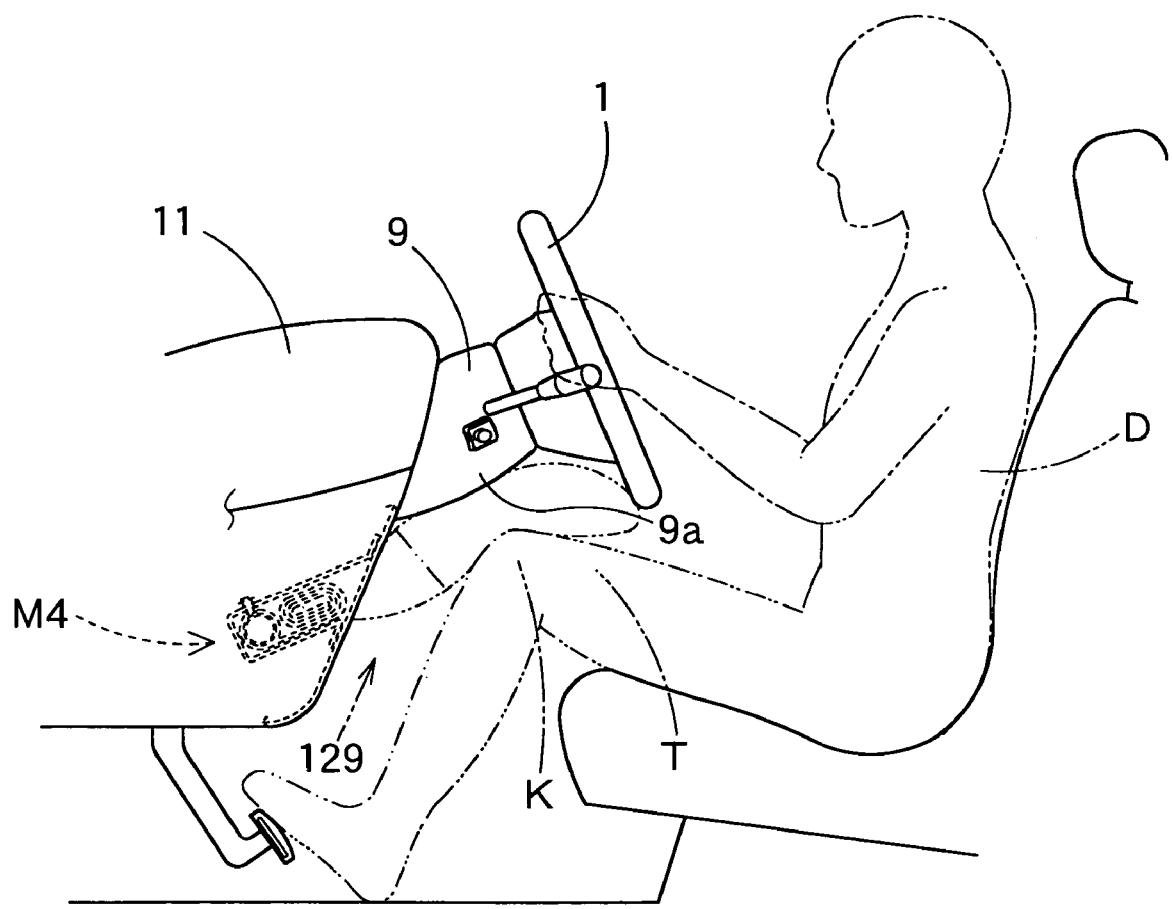
FIG. 40 is a schematic diagram showing the completely inflated state of the airbag of the fourth embodiment.

The airbag 129 is constructed to include a central portion 129*c* near the transverse center, and a left end portion 129*d* and a right end portion 129*f* arranged on the left and right of the central portion 129*c*. The inflator 124 is housed in the central portion 129*c* on the side of the lower end (or front end) 129*b* of the airbag 129. Here, the airbag 129 rises, when it is expanded and inflated, from the case 119 along the lower surface 9*a* of the column cover 9, as shown in FIGS. 31 and 40. Then, the airbag 129 protects the area from the vicinities of the two knees KR and KL to the vicinity of the thigh T of the driver D.

Figure 37:
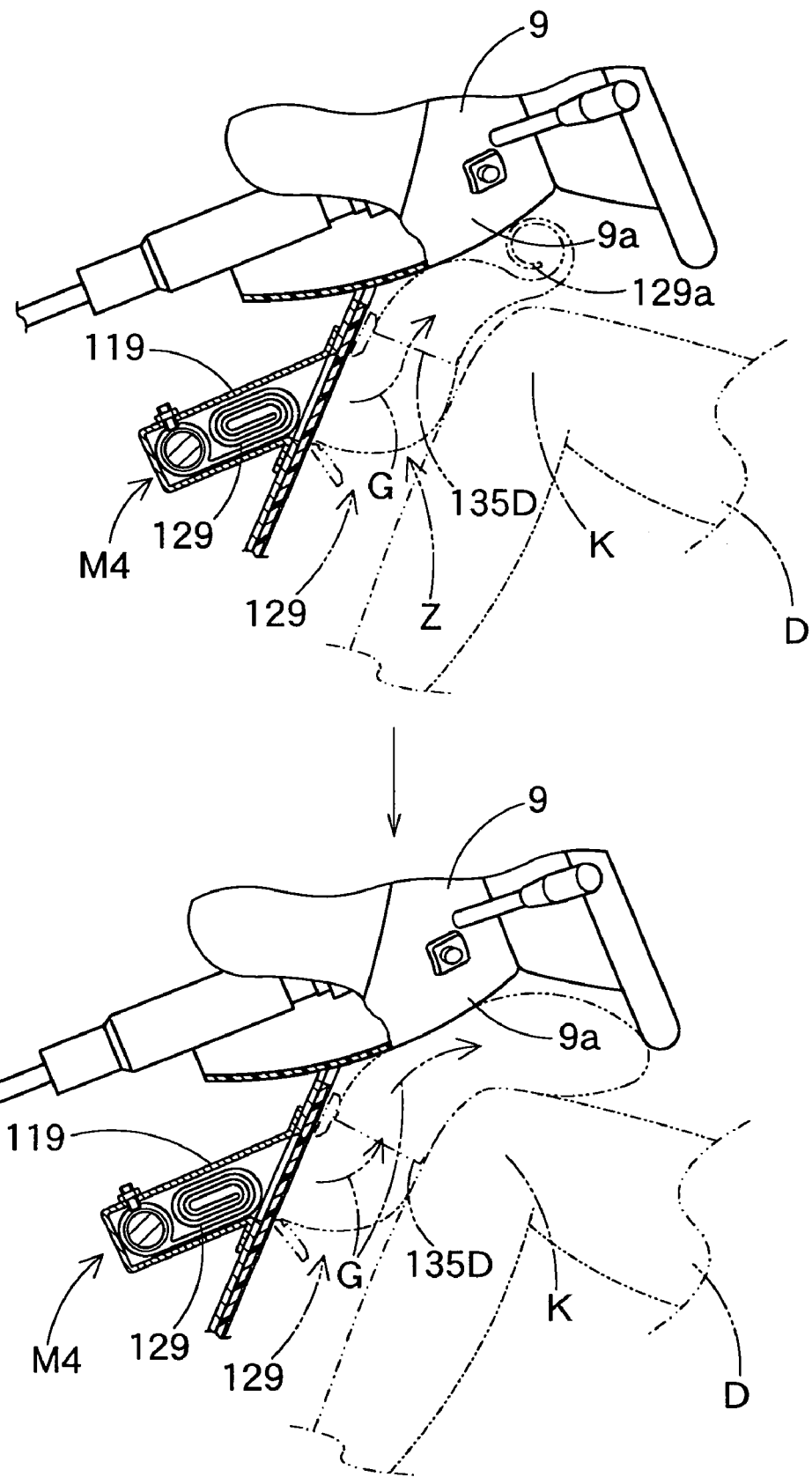
FIG. 37 diagrams the airbag of the fourth embodiment being expanded and inflated, and shows the state after FIG. 36.

In the airbag 129, as shown in FIGS. 32 and 33, there are arranged a plurality of tethers 135 for connecting the column cover side wall portion 133 and the driver side wall portion 134 to each other. The tethers 135 are thickness regulating means for making the thickness of the airbag 129 constant on expansion and inflation. The tethers 135 (135D and 135U) are made of a flexible material like the airbag 129. The tether 135D is arranged above and near the housing portion 133*a* generally in parallel with the transverse direction of the vehicle. In the case of the embodiment, as shown in FIG. 37, the tether 135D is located, in the airbag 129, at such a position which leaves the airbag housing portion (i.e., the case 119) for the vehicular inner side at the time of expansion and inflation, but near the housing portion. The tether 135U is arranged at the transverse center near the upper end (or rear end) of the airbag 129 and along the vertical direction of the vehicle. The tethers 135D and 135U keep the thickness of the airbag 129 constant excepting the housing portion 133*a* on expansion and inflation. The tethers 135D and 135U are arranged to help the airbag 129 being expanded and inflated to go smoothly into the clearance between the knee K of the driver D and the column cover lower surface 9*a*.

Moreover, the tether 135D plays a role to partition the inside of the airbag 129 into an upstream portion 130 and a downstream portion 131 of the inflating gas G. In other words, the tether 135D partitions the airbag 129 into the upstream portion 130 on the lower side and the downstream portion 131 on the upper side.

Still moreover, the tether 135D plays a role as a gas flow regulating member, too. Specifically, the tether 135D has two left and right end portions 135*a* and 135*b* arranged apart from the two left and right edges 129*e* and 129*g* of the airbag 129. Therefore, gas communication holes 136 and 136 are formed individually between the end portions 135*a* and 135*b* and the edges 129*e* and 129*g*. Accordingly, the inflating gas G is so regulated by the tether 135D as to flow both leftward and rightward in the upstream portion 130 and then flow through the gas communication holes 136 and 136 into the downstream portion 131.

Here will be described how to mount this airbag device M4 on the vehicle. First of all, the airbag 129 is folded up while having the inflator 124 packaged therein. Here, the individual bolts 126*b* of the inflator 124 are protruded from the through holes 133*b*. On the other hand, not-shown lead wires extending from the inflator body 125 are led out from the predetermined not-shown through holes of the airbag 129.

In the case of the embodiment, the airbag 129 is folded up by a longitudinal folding step and a transverse folding step.

In the longitudinal folding step, as shown in FIG. 34A, the driver's side wall portion 134 and the column cover side wall portion 133 in abutment on each other is flatly expanded. Next, the two left and right edges 129*e* and 129*g* of the airbag 129 is folded to approach the side of the housing portion 133*a* (or to the side of the central portion 129*c*). At this time, the two left and right edges 129*e* and 129*g* are individually folded toward the column cover side wall portion 133 into such a shape at their vicinities as shown in FIG. 35A. Next, the two edge portions 137 and 137 folded are further folded closer to the housing portion 133*a*, as shown in FIG. 34C. At this time, the two folded edge portions 137 and 137 are individually folded back to the column cover side wall portion 133 thereby to form folded portions 138 and 138. As a result, the left and right end portions 129*d* and 129*f* of the air bag 129 are folded in a bellows shape on the column cover side wall portion 133. Thus, the longitudinal folding step is ended.

At this time, in the embodiment, the transverse width w3 of the airbag 129 folded is made substantially equal to or slightly smaller than the transverse width w1 (as referred to FIG. 30) of the bag housing portion 120 in the case 119, as shown in FIG. 35B.

Next, in the transverse folding step, the longitudinally folded airbag 129 is rolled from the upper end 129*a* to the column cover side wall portion 133, as shown in FIG. 34D. By this rolling, the transverse folding step is completed to complete the folding work of the airbag 129.

After thus folded, the airbag 129 is wrapped with not-shown breakable wrapping film, and the individual bolts 126*b* are protruded from the wrapping film. Next, the individual bolts 126*b* are protruded from the case 119, and the nuts 127 are fastened to the individual protruded bolts 126*b* to attach the inflator 124 and the airbag 129 to the case 119 thereby to make the airbag assembly SA. At this time, the inflator 124 is housed in the inflator housing portion 121, and the folded airbag 129 is housed in the bag housing portion 120. On the other hand, not-shown lead wires extending from the inflator body 125 are led out from the wrapping film and from not-shown through holes of the case 119.

Then, the airbag assembly SA having the case 119, the inflator 124 and the airbag 129 is fixed on the holding plate 117 by using the flange portion 120*e*. Moreover, the two left and right ends of the holding plate 117 are fixed on the vehicular frame portions FC and FR arranged on the left and right sides, by means of bolts. Subsequently, not-shown lead wires are connected with the control circuit, and the upper panel 12 and the lower panel 13 of the dashboard 11 are mounted on the vehicle. Thus, the airbag device M4 can be mounted on the vehicle, as shown in FIGS. 28 to 30. Here, in order that the portion 113 to be broken may be smoothly broken, the lower panel 13 is desirably fixed as the airbag cover 112 on the peripheral edge of the opening 117*a* of the holding plate 117.

If a predetermined electric signal is inputted to the inflator body 125 after the airbag device M4 was mounted on the vehicle, the inflating gas G is discharged from the gas discharge ports 125*a* to inflate the airbag 129. Then, the airbag 129 breaks the not-shown wrapping film and pushes and opens the door portions 114A and 114B of the airbag cover 112. And, the airbag 129 of a generally plate shape is expanded and inflated while being transversely and longitudinally unfolded to rise along the column cover lower surface 9*a*.

Figure 36:
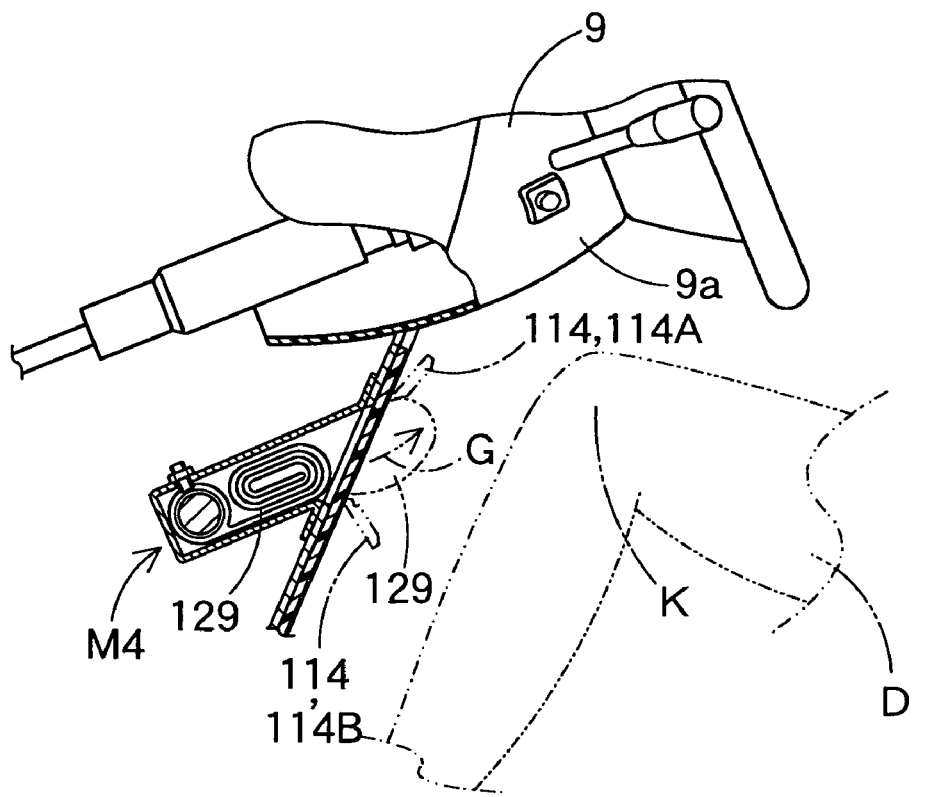
FIG. 36 diagrams the airbag of the fourth embodiment being expanded and inflated.
Figure 36:
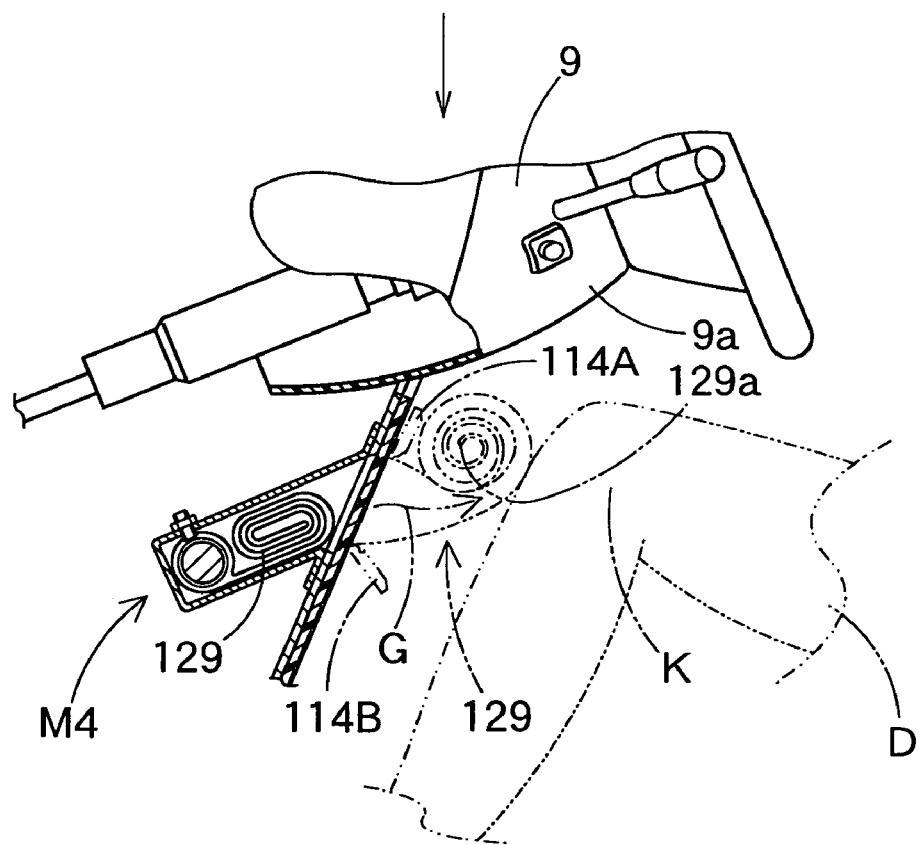

At this time, in the airbag device M4 of the fourth embodiment, the airbag 129 is so folded in advance that its upper end 129*a* is rolled on the side of the column cover side wall portion 133. When the airbag 129 is to be transversely unfolded with the inflating gas G let in, therefore, its upper end 129*a* is expanded and inflated along the column cover lower surface 9*a* while being unrolled, as shown in FIGS. 36 and 37, and its expansion and inflation are completed as shown in FIG. 40. At this time, the airbag 129 is unfolded while coming as close to the column cover 9 as possible when it is expanded and inflated, so that its protrusion toward the knee K of the driver D can be avoided. As a result, the airbag 129 is expanded and inflated and smoothly rises along the column cover lower surface 9*a* without protruding toward the driver D. Moreover, the airbag 129 is expanded so smoothly as to be unrolled, even if it comes into contact with the knee K of the driver D, so that it does not put an excessive pressure on the driver D.

In the fourth embodiment, moreover, the airbag 129 is longitudinally folded before it is rolled. In this longitudinal folding step, the airbag 129 is longitudinally folded from the flatly expanded state to bring its two left and right edges 129*e* and 129*f* close to the central portion 129*c* so that the width w3 of the airbag 129 becomes so small as to be housed in the case 119 (or the airbag housing portion 120). In the airbag device M4 of the fourth embodiment, therefore, the airbag 129 can cover, when expanded and inflated, the column cover lower surface 9*a* over an area wider than the transverse width w1 of the case 119 (or the airbag housing portion 120). As a result, the airbag 129 can protect the two knees KL and KR of the driver D over the wide range.

Figure 38:
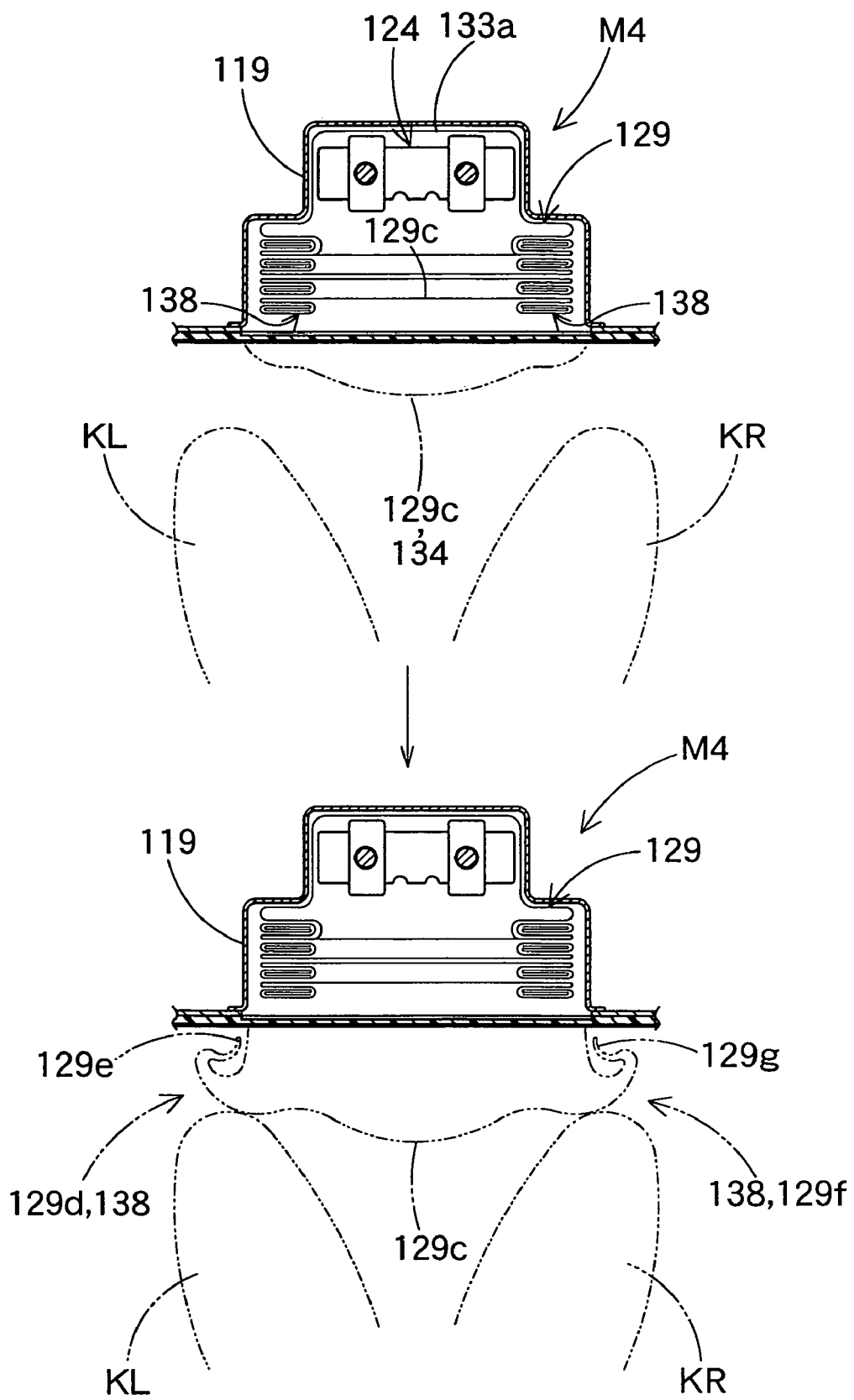
FIG. 38 diagrams the airbag of the fourth embodiment being expanded and inflated.

In the fourth embodiment, on the other hand, when the airbag 129 eliminates longitudinally folding with the inflating gas G let in, the driver side wall portion 134 of the central portion 129*c* where the inflator 124 is disposed is protruded at first from the case 119 to approach the driver D, as shown in FIG. 38. Subsequently, the left and right end portions 129*d* and 129*f* leading from the central portion 129*c* are individually protruded from the case 119 to approach the driver D.

Figure 39:
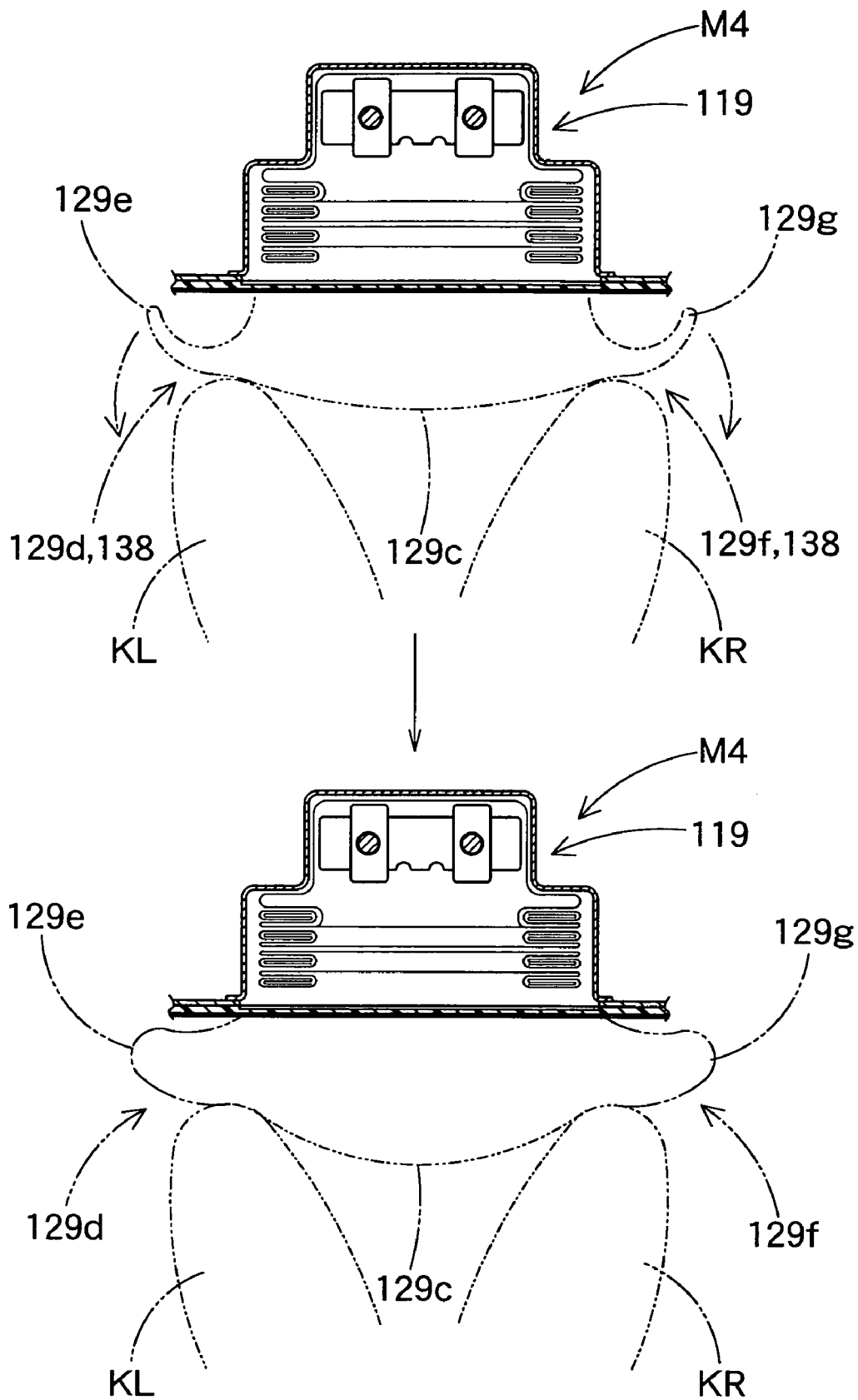
FIG. 39 diagrams the airbag of the fourth embodiment being expanded and inflated, and shows the state after FIG. 38.

As shown in FIG. 39, thereafter, as the inflating gas G comes in, the folded portions 138 and 138 of the airbag 129 on the sides of the two left and right edges 129*e* and 129*g* are individually unfolded. At this time, the left and right end portions 129*d* and 129*f* adjoining the central portion 129*c* are longitudinally folded on the side of the column cover side wall portion 133, as shown in FIG. 35B. Therefore, the left and right edges 129*e* and 129*g* of the airbag 129 are unfolded while widely expanding to the left and right sides such that their protrusions toward the driver D are minimized, namely, such that they are directed toward the column cover 9.

Therefore, the knee protecting airbag device M4 of the fourth embodiment can attain the same working-effects as those of the first to third embodiments. Moreover, the airbag 129 is widely expanded and inflated in the transverse direction without protruding toward the driver D, so that it can protect the two knees KR and KL of the driver D properly.

In the airbag device M4 of the fourth embodiment, moreover, the airbag 129 is constructed such that the inflating gas G is guided by the tether 135D to flow to the two left and right sides in the upstream portion 130 at the lower side of the airbag and then to the upper side of the airbag 129 or the downstream side 131. In this airbag 129, the inflating gas G flows to the two transverse sides (as referred to FIG. 32) when it flows in the upstream portion 130. Therefore, the lower side of the airbag 129 is expanded and inflated to enlarge the transverse width without protruding toward the driver D, and subsequently the downstream portion 131 of the upper side completes inflation. As a result, the airbag 129 is expanded and inflated to enlarge the transverse width while further suppressing the protrusion to the driver D, so that a single airbag 129 can protect the two knees KL and KR of the driver D properly.

Especially in the airbag 129 of the fourth embodiment, the tether 135D for connecting the column cover side wall portion 133 and the driver side wall portion 134 is arranged as the gas flow regulating member in the upstream portion 130. This tether 135D as the gas flow regulating member is so arranged in the transverse direction as to form the gas communication holes 136 in the airbag 129 between the two left and right ends 135*a* and 135*b* and the two left and right sides 129*e* and 129*g* of the airbag 129, respectively. In this construction, by the tether 135D arranged in the airbag 129, the flow of the inflating gas G can be reliably regulated, and the airbag 129 is so expanded and inflated (as referred to FIGS. 38 and 39) as to enlarge the transverse width size stably while suppressing the protrusion toward the driver D. The tether 135D is made of a flexible cloth material so that it is not bulky and can be folded together with the airbag 129 when the airbag 129 is housed. Moreover, the gas flow regulating member 135D connects the column cover side wall portion 133 and the driver side wall portion 134. Therefore, the gas flow regulating member 135D regulates the thickness of the airbag 129 to a constant value when the airbag 129 completes the inflation, thereby to further suppress the protrusion to the driver D.

In the airbag 129 of the fourth embodiment, moreover, the downstream portion 131 is provided therein with the tether 135U acting as the thickness regulating means for regulating the thickness of the airbag 129. In other words, the tether 135U helps the downstream portion 131 of the airbag 129 having completed the inflation to keep the generally plate shape. Therefore, the tether 135U can arrange the airbag 129 easily in the narrow space between the column cover lower surface 9*a* and the knees KL and KR of the driver D.

In the airbag 129 of the fourth embodiment, still moreover, the tether 135D as the gas flow regulating member is arranged in the airbag 129 at such a portion (as referred to FIG. 37) as leaves the airbag housing portion 119 for the vehicular inner side on expansion and inflation and which is near the housing portion. In this construction, the airbag 129 is more rapidly expanded to the left and right sides by the gas flow regulating member 135D positioned in the free space Z on the inner side of the vehicle, at the initial time that the airbag 129 is protruded from the airbag housing portion 119 to rise along the column cover lower surface 9*a*. Therefore, the gas flow regulating member 135D further suppresses the protrusion of the airbag 129 toward the driver D.

In the fourth embodiment, moreover, the airbag assembly SA is connected to the frame portions FC and FR of the side of the body B at the two left and right sides of the steering column 3 by using the holding plate 117. In this airbag device M4, therefore, the airbag assembly SA can be easily assembled with the vehicle without interfering with the steering column 3. Of course in the fourth embodiment, as in the first to third embodiments, the airbag 129, the inflator 124 and the case 119 of the airbag device M4 can be assembled in advance as the airbag assembly SA. Therefore, mounting work of the airbag device M4 on the vehicle is facilitated. With this construction, moreover, the individual parts are integrated so that they can be easily handled till they are mounted on the vehicle.

Here, the embodiment has been described on the case in which the flange portion 120*e* of the case 119 is connected to the holding plate 117 by means of bolts. However, the construction may be modified by extending the flange portion 120e to eliminate the holding plate 117 such that the flange portion 120e is directly connected to and fixed on the frame portions FC and FR.

Figure 41:
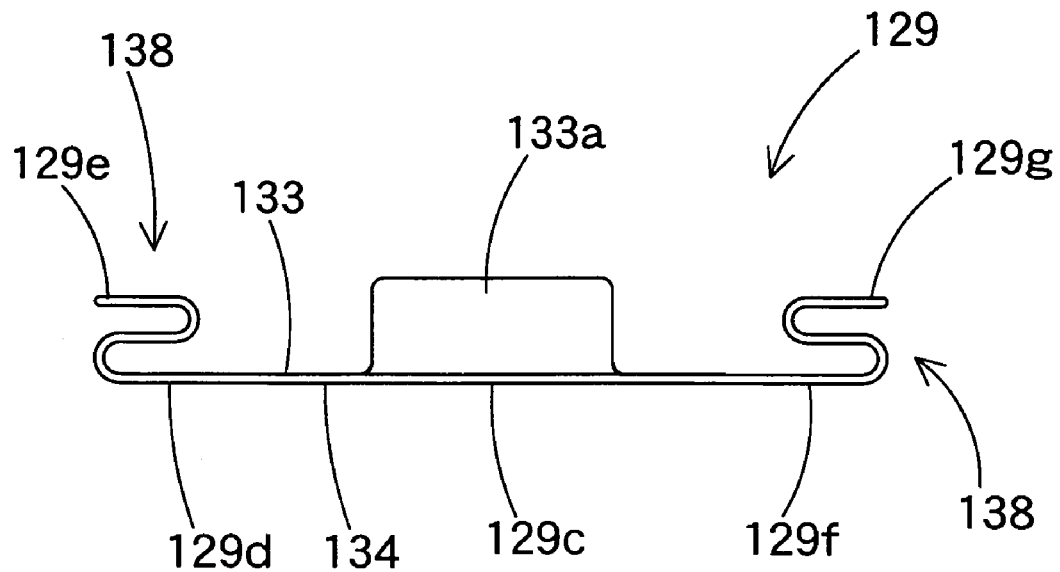
FIG. 41 is a schematic section showing another folding manner of the airbag of the fourth embodiment.
Figure 42:
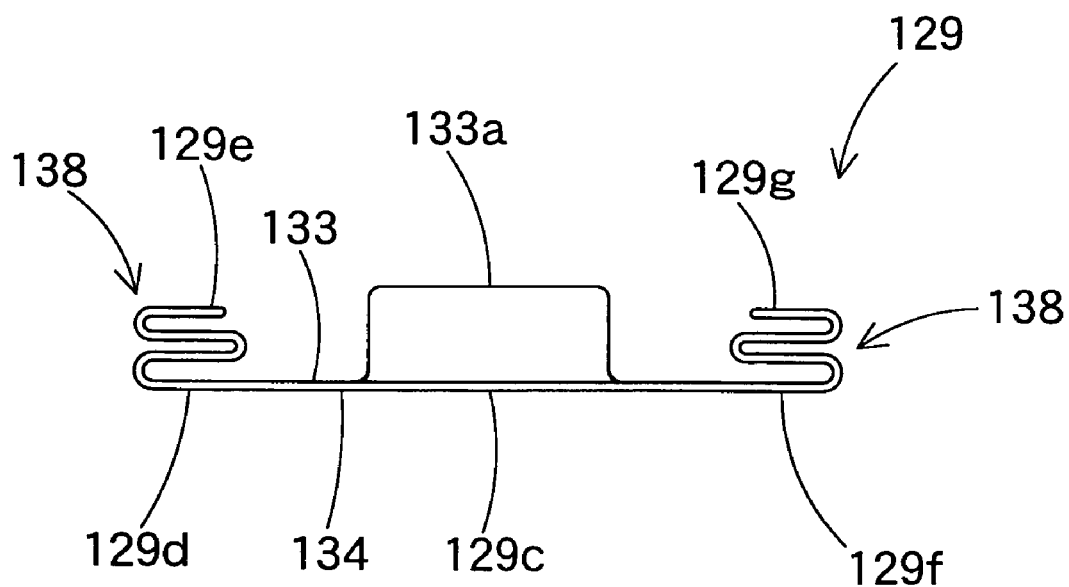
FIG. 42 is a schematic section showing still another folding manner of the airbag of the fourth embodiment.

In the fourth embodiment, on the other hand, the folded portions 138 and 138 on the two left and right edges 129e and 129g of the airbag 129 are folded in a bellows shape. However, the bellows-folding of the left and right end portions 129d and 129f of the airbag 129 on the column cover side wall portion 133 should not be limited to the aforementioned folding method. The folding method may be modified as shown in FIGS. 41 and 42, for example. In the airbag 129 of FIG. 41, the folded portions 138 and 138 of the airbag 129 on the sides of the left and right end portions 129d and 129f are folded in a bellows of two steps. The individual folded portions 138 are so individually arranged that the two left and right edges 129e and 129g of the airbag 129 are directed outward on the side of the column cover side wall portion 133. In the airbag 129 of FIG. 42, the folded portions 138 and 138 of the airbag 129 on the sides of the left and right end portions 129d and 129f are folded in a bellows of three steps. The individual folded portions 138 are so individually arranged that the left and right edges 129e and 129g of the body portion 133 are directed toward the housing portion 133a.

If the folded portion 138 is folded in these bellows fashion, the order or position of placing a folding plate can be adequately changed, when the airbag 129 is folded by the folding plate, so that the folding process is flexibilized.

After the longitudinal folding step shown in FIG. 41 or 42 was completed, the process goes on to the aforementioned step of transversely rolling.

Figure 43:
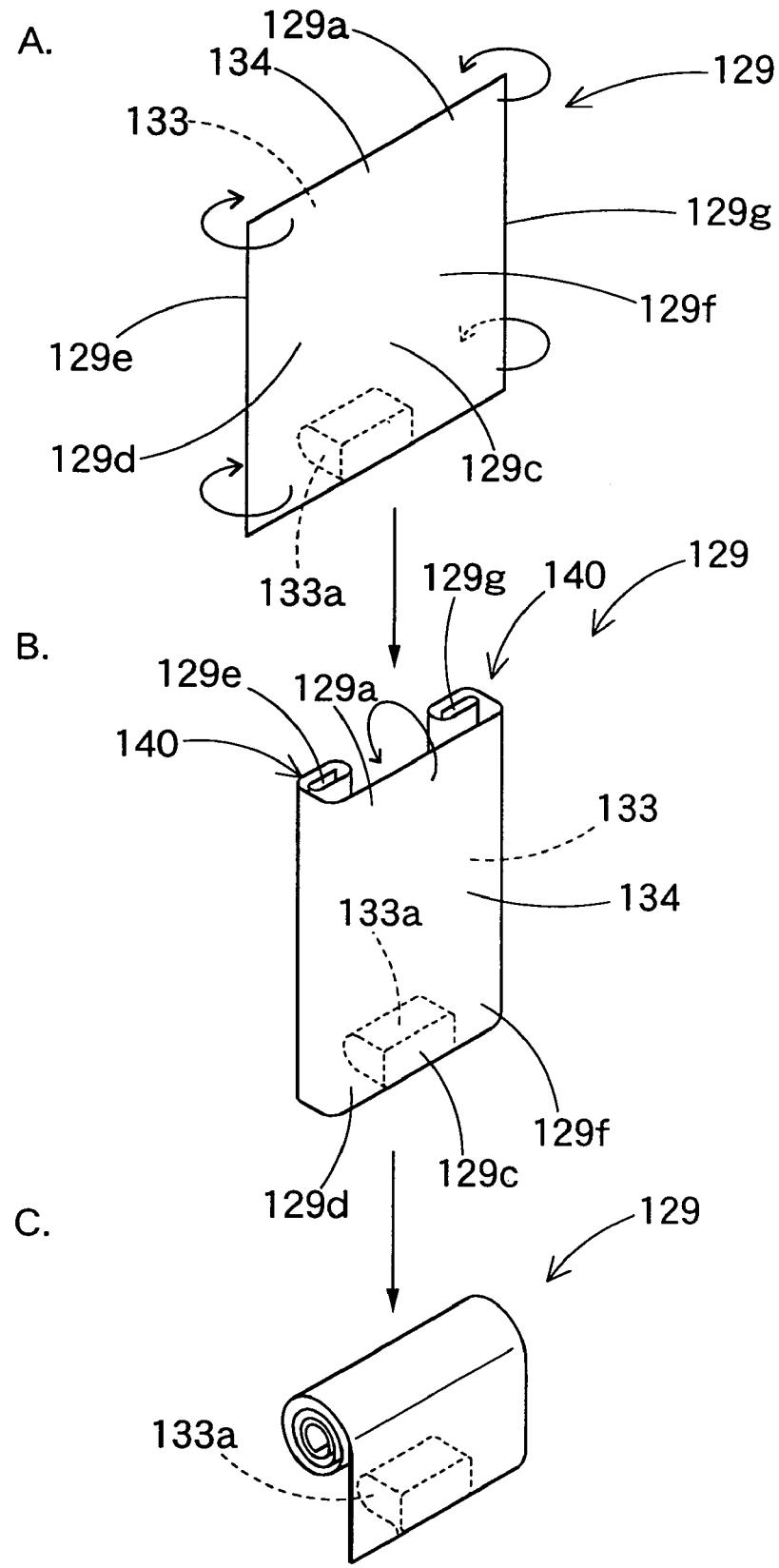
FIG. 43 presents schematic diagrams showing still another folding manner of the airbag of the fourth embodiment.
Figure 44:
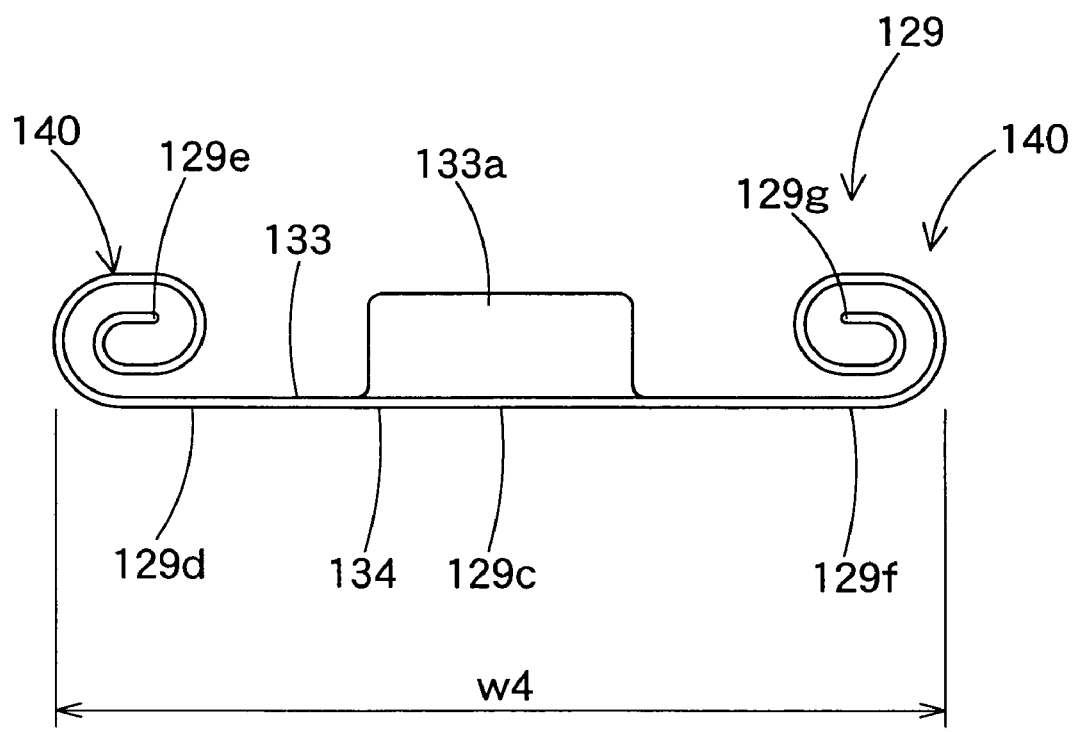
FIG. 44 is a schematic section showing a folding manner of the airbag in FIG. 43.

The longitudinal folding of the airbag 129 may also be done, as shown in FIGS. 43 and 44. First of all, the driver side wall portion 134 is brought into abutment on the column cover side wall portion 133 and is then expanded flat, as shown in FIG. 43A. Then, the two left and right edges 129e and 129g of the airbag 129 are individually rolled toward the column cover side wall portion 133, as shown in FIG. 43B, to complete the longitudinal folding step. The longitudinally folded portions 140 and 140 of the two end portions 129d and 129f are individually arranged on the side of the column cover side wall portion 133, as shown in FIG. 44. At this time, as in the cases of the aforementioned folding methods, the transverse width w4 of the folded airbag 129 is set substantially equal to or slightly smaller than the transverse width w1 of the bag housing portion 120 of the case 119.

Subsequently, the transverse folding step is completed by folding the folded airbag 129 from the upper end 129a toward the column cover side wall portion 133, as shown in FIG. 43C, to complete the folding work of the airbag 129.

When the airbag 129 is thus folded, its left and right edges 129e and 129g are unrolled, when expanded and inflated, to come as close to the column cover 9 as possible. Therefore, it is avoided that the two left and right end portions 129d and 129f of the airbag 129 protrudes toward the driver D.

When the folded portions 140 and 140 in the rolled state are to be unfolded with the inflating gas let in, they are unfolded while being unrolled. In other words, the unfolded portions are pulled toward the rolling side by the inertial force generated by the turning motions of the folded portion. In this state, the folded portions 140 and 140 are unfolded. Therefore, the folded portions 140 and 140 are curved, as they are unfolded, toward the column cover side wall portion 133. As a result, the folded portions 140 and 140 are expanded in the transverse direction of the vehicle along the column cover lower surface 9a.

Figure 45:
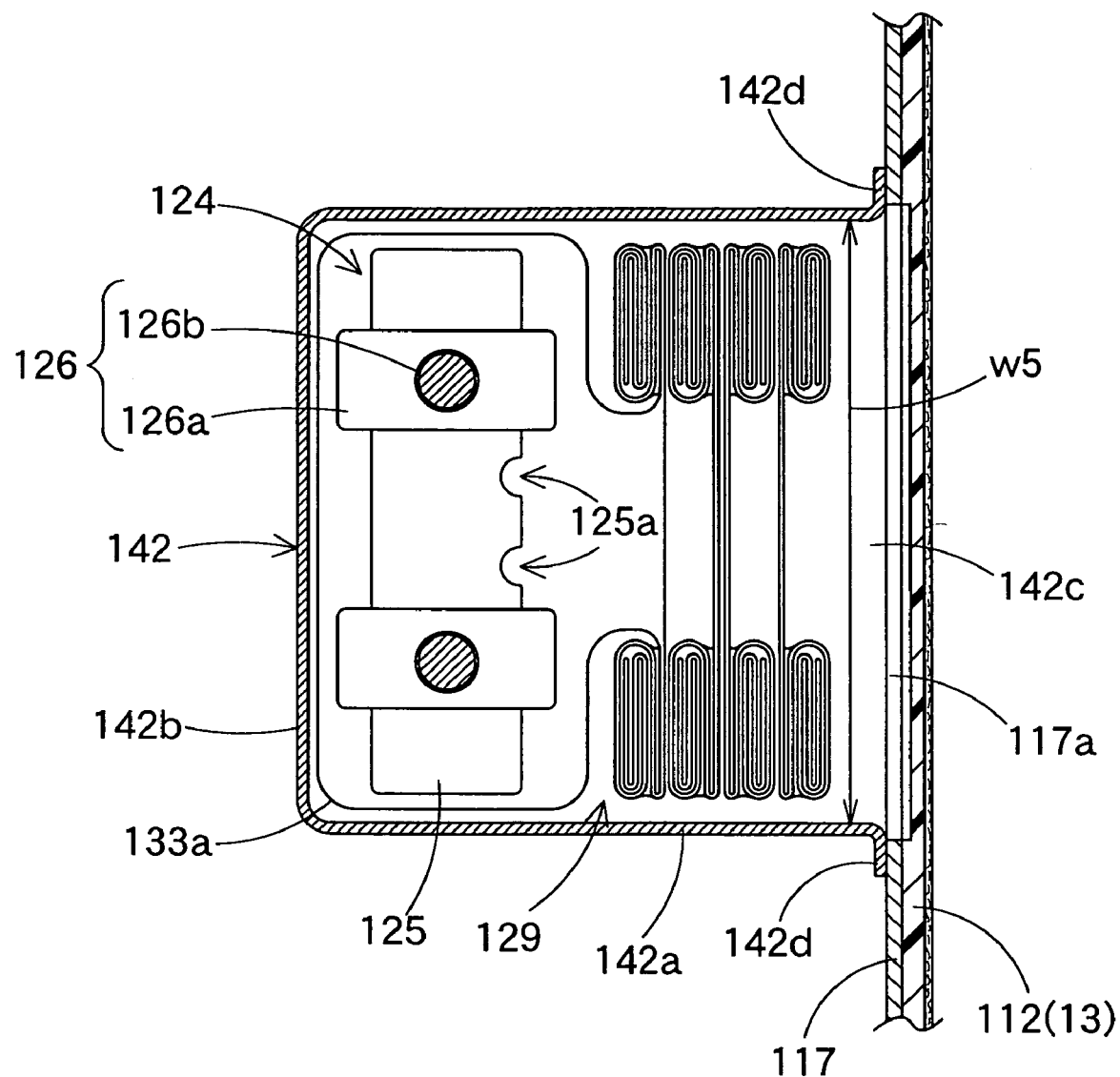
FIG. 45 is a sectional view showing the state in which the airbag of the fourth embodiment is housed in another case.

The airbag 129 may also be housed in a case 142 shown in FIG. 45. This case 142 is provided with a peripheral wall portion 142a of a generally square cylinder shape, and a bottom wall portion 142b of a generally rectangular shape for closing the vehicular front side of the peripheral wall portion 142a. The case 142 has a vehicular transverse width size w5 capable of housing the inflator 124, as shown in FIG. 45. Moreover, the case 142 is attached to and fixed on the holding plate 117 by using a flange portion 142d formed on the peripheral edge of an opening 142c of the peripheral wall portion 142a.

Figure 46:
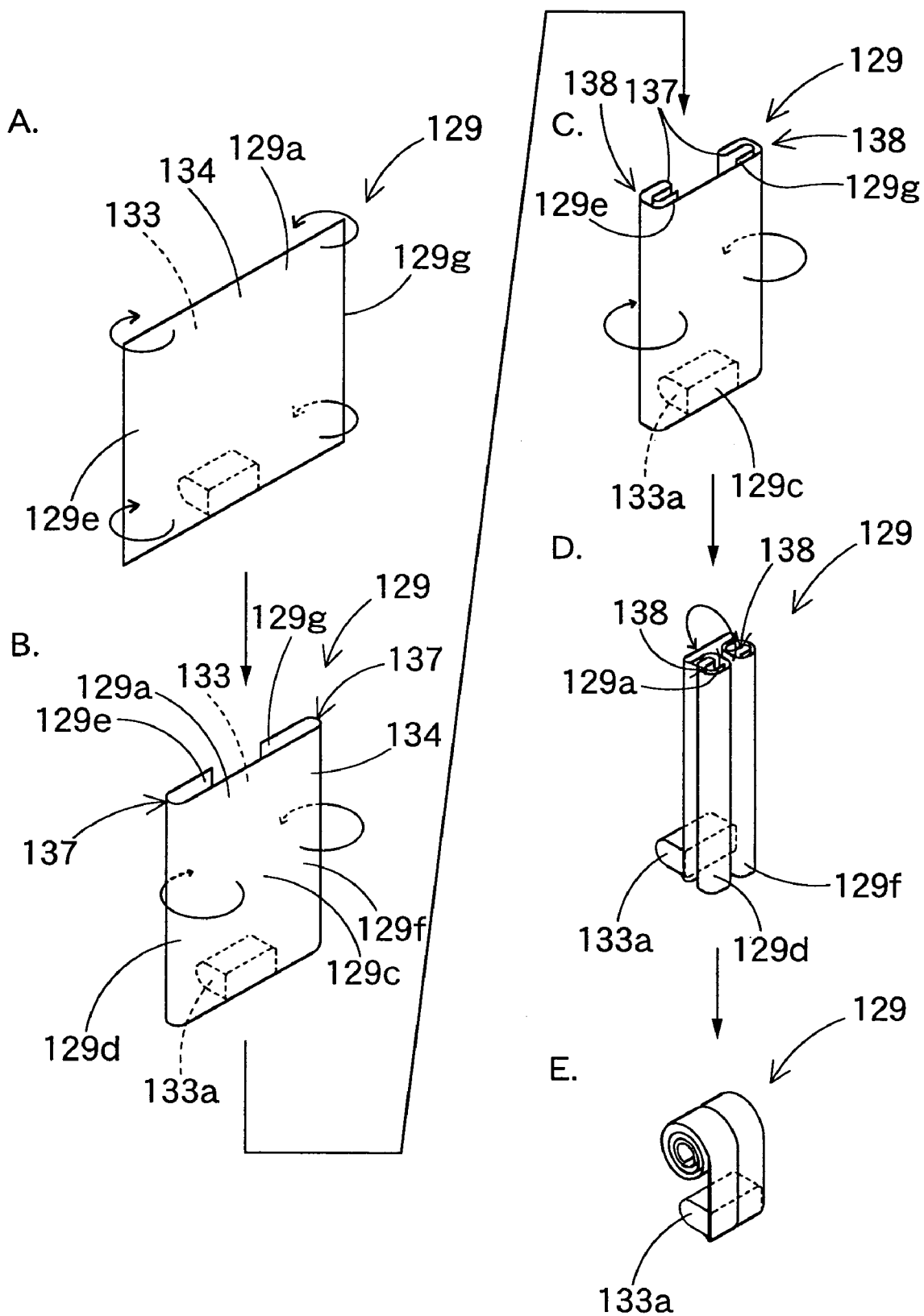
FIG. 46 presents schematic diagrams showing still another folding manner of the airbag of the fourth embodiment.
Figure 47:
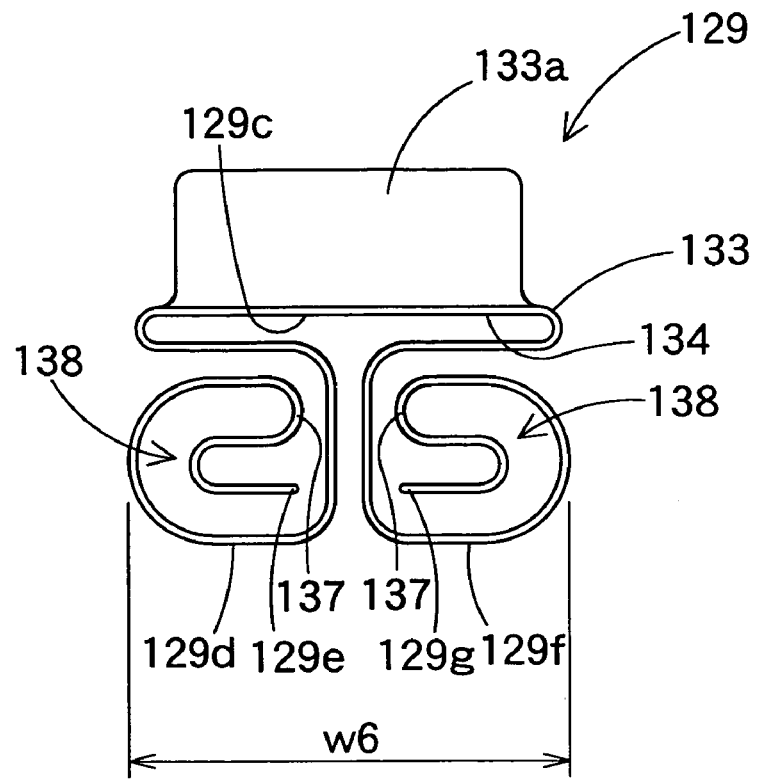
FIG. 47 is a schematic section showing a folding manner of the airbag in FIG. 46.

The airbag 129 to be housed in the case 142 is folded in the following manner. In the longitudinal folding step, as shown in FIGS. 46A, 46B and 46C, the airbag 129 is longitudinally folded at first at its left and right end portions 129d and 129f, similarly as FIG. 34, to form the folded portions 138 and 138. Next, the airbag 129 is folded, as shown in FIG. 46D, such that the folded portions 138 and 138 are folded back to be placed, while keeping their individual arrangements on the side of the column cover side wall portion 133, on the outer surface (i.e., on the vehicular rear side or on the driver's side) at the central portion 129c of the driver side wall portion 134. In short, the airbag 129 is folded into a shape shown in FIG. 47. At this time, the airbag 129 has its transverse width w6 set substantially equal to or slightly smaller than the transverse width w5 of the case 142.

As shown in FIG. 46E, moreover, the folded airbag 129 like before is rolled from the upper end 129a toward the column cover side wall portion 133 to complete the transverse folding step, thereby to complete the folding work of the airbag 129.

Figure 34:
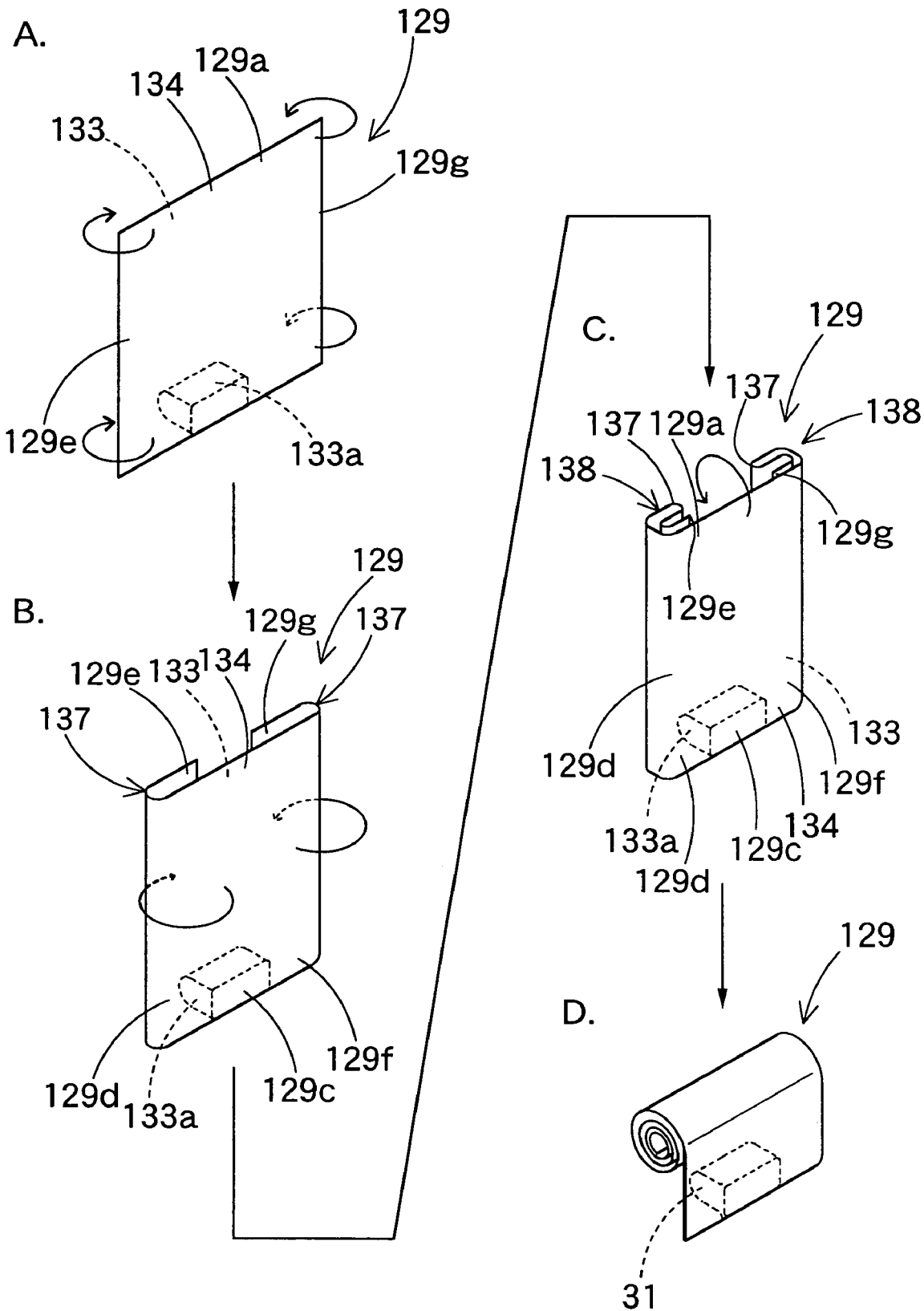
FIG. 34 presents schematic diagrams showing a folding manner of the airbag of the fourth embodiment.
Figure 35:
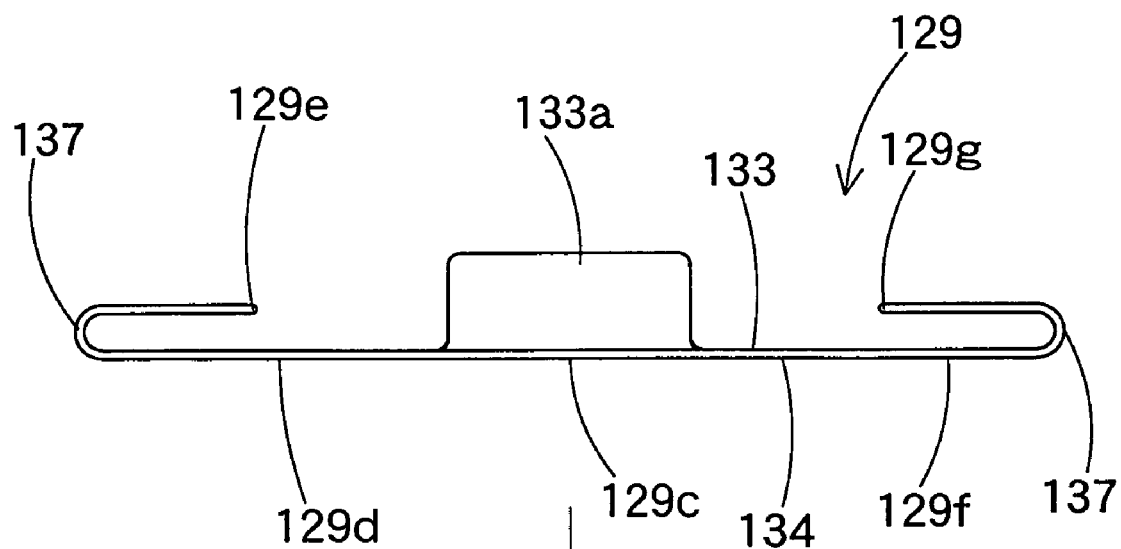
FIG. 35 presents schematic sections showing a folding manner of the airbag in FIG. 34.
Figure 35:
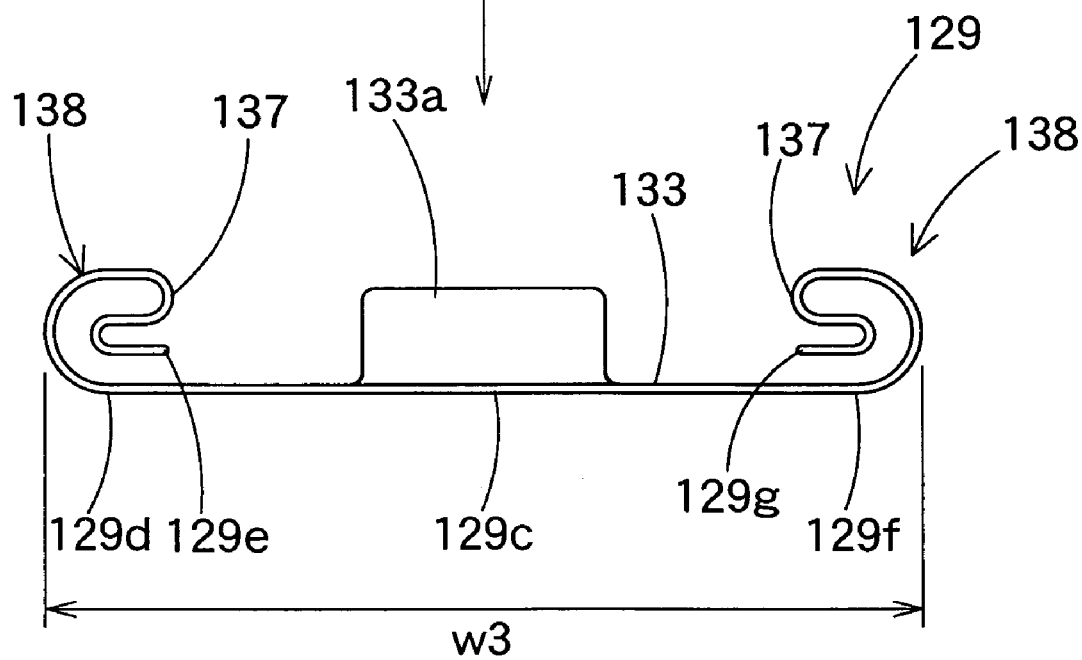

When the airbag 129 is thus folded, its transverse width w6 at the time of completion of the longitudinal folding is made more compact compared with the folding steps shown in FIG. 34 described before.

In this case, too, when the airbag 129 eliminates longitudinal folding with the inflating gas let therein, the driver's side wall portion 134 of the central portion 129c near the inflator 124 is protruded at first from the case 142 toward the driver D. At this time, the central portion 129c of the driver side wall portion 134 pushes and separates the folded portions 138 and 138, which are placed on the outer surface of the driver side wall portion 134 at the central portion 129c, to expand in the left and right directions. As described hereinbefore, the left and right end portions 129d and 129f adjoining the central portion 129c are longitudinally folded, as shown in FIGS. 46B and 46C, on the side of the column cover side wall portion 133. As also described, therefore, the left and right edges 129e and 129g of the airbag 129 are widely expanded transversely and are unfolded while prevented as much as possible from protruding toward the driver D, that is, while being directed to the column cover 9.

In this way, as long as the left and right end portions 129d and 129f of the airbag 129 are folded so as to be individually arranged on the side of the column cover side wall portion 133, their folded portions 138 and 138 may also be so folded and placed on the outer surface of the central portion 129c of the driver side wall portion 134 (i.e., on the wall portion 134 of the driver side) as to make the transverse width compact. In other words, by this folding method, the airbag 129 can be expanded and inflated to enlarge the transverse width size while suppressing the protrusion to the driver D, so that the two knees KR and KL of the driver D can be properly protected.

Figure 48:
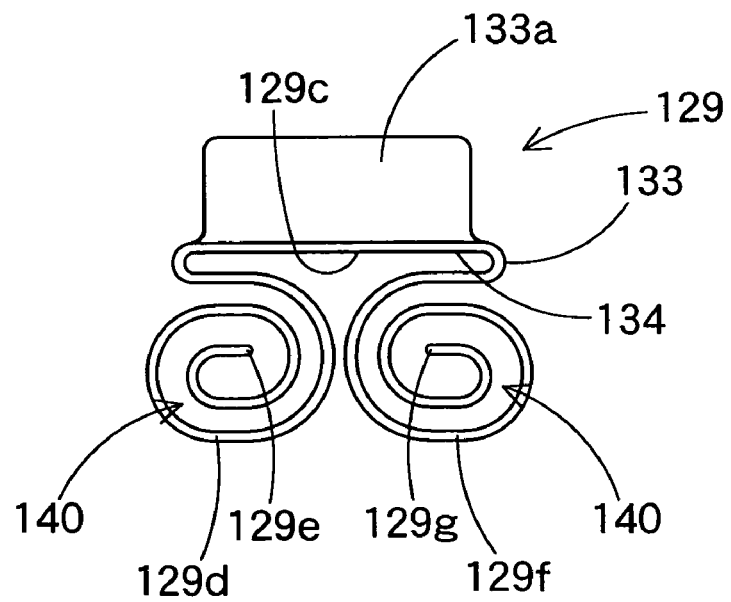
FIG. 48 is a schematic section showing still another folding manner of the airbag of the fourth embodiment.
Figure 49:
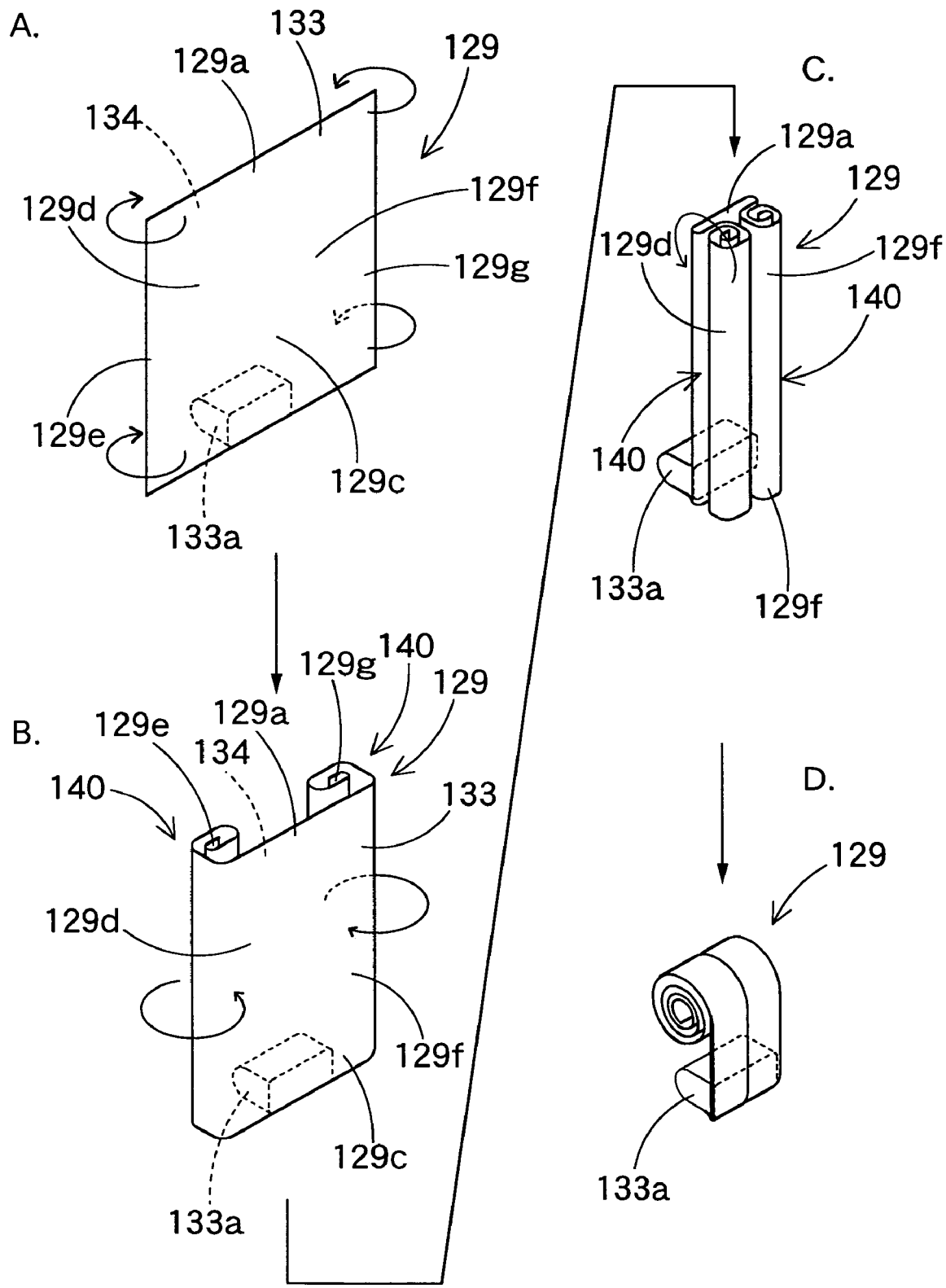
FIG. 49 presents schematic diagrams showing a folding manner of the airbag in FIG. 48.

Here, the airbag 129 may be longitudinally folded by rolling its left and right end portions 129d and 129f at first individually toward the column cover side wall portion 133, as shown in FIGS. 48 and 49. Then, the airbag 129 may be folded such that its folded portions 140 and 140 are individually placed on the side of the wall portion 134 of the driver side.

Here, the fourth embodiment employs the airbag 129 having the tethers 135D and 135U therein as the gas flow regulating member for regulating the flow of the inflating gas G discharged from the inflator 124. However, the airbag device M4 may employ an airbag 152 provided with a gas flow regulating member 159 shown in FIGS. 50 and 51.

This airbag 152 is constructed to include a column cover side wall portion 157 and a driver side wall portion 158. In the column cover side wall portion 157, there are formed a housing portion 157a for housing the inflator 124, and through holes 157b. At an upstream portion 154 of the gas G in the lower side of the airbag 152, moreover, there is arranged a generally cylindrical commutating cloth 159 acting as the gas flow regulating member. This commutating cloth 159 is so opened at 159a and 159a on both left and right sides of the vehicle and covers the outer periphery of the inflator 124. In the downstream portion 155 of the gas G on the upper side of the airbag 152, there is arranged a tether 160 for connecting the column cover side wall portion 157 and the driver side wall portion 158 to each other, like the tether 135U of the aforementioned airbag 129, thereby to make the thickness of the downstream portion 155 constant at the time of the expansion and inflation.

Figure 50:
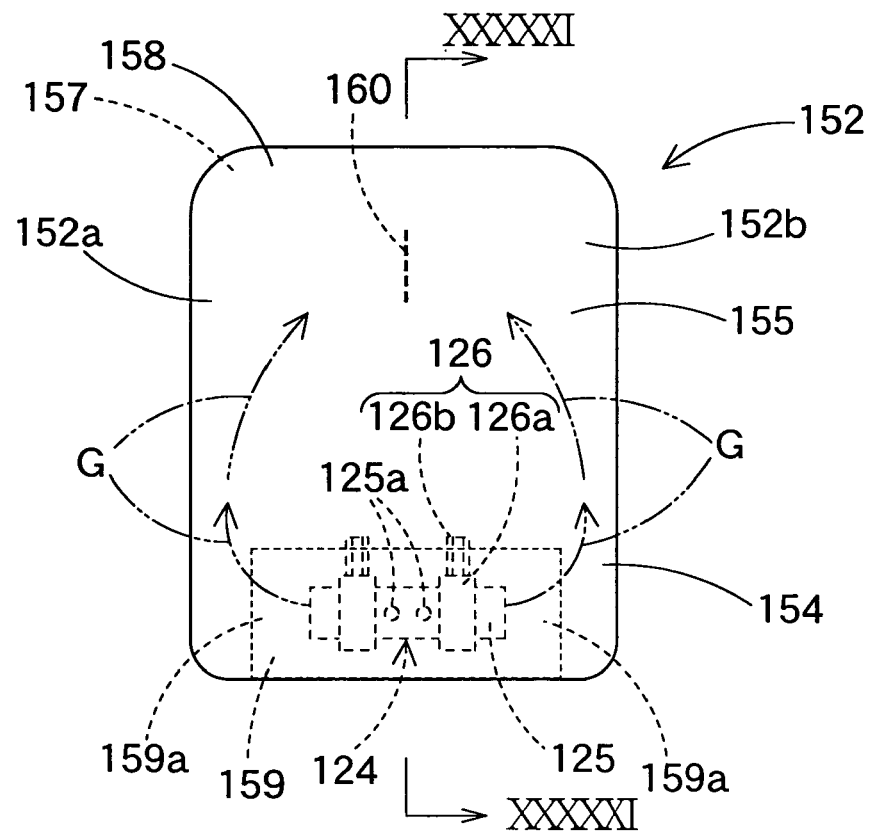
FIG. 50 is a top plan view showing another modification of the airbag of the fourth embodiment.
Figure 51:
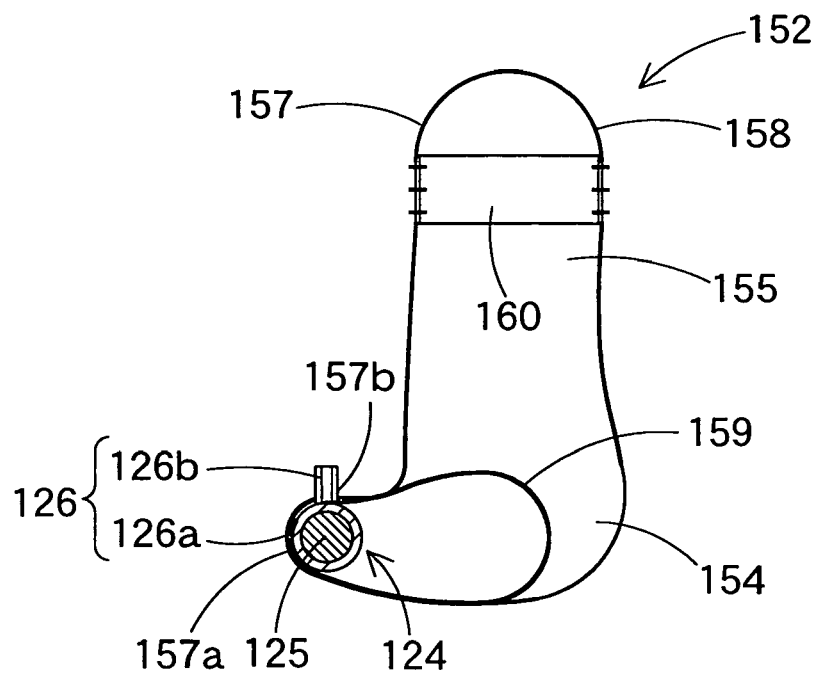
FIG. 51 is a sectional view of a portion XXXXXI-XXXXXI of FIG. 50.

With the airbag 152 being thus constructed, as shown in FIG. 50, the commutating cloth 159 directs the inflating gas G discharged from the inflator 124, to the left and right in the upstream portion 154. After this, the inflating gas G flows to the downstream portion 155 from between the both left and right end openings 159a and 159a of the commutating cloth 159 and the two left and right edges 152a and 152b of the airbag 152. Therefore, this airbag 152 can also be expanded and inflated to enlarge the transverse width while reliably suppressing the protrusion to the driver D by the commutating cloth 159. In short, the airbag 152 protects the both knees K of the driver D properly.

Figure 52:
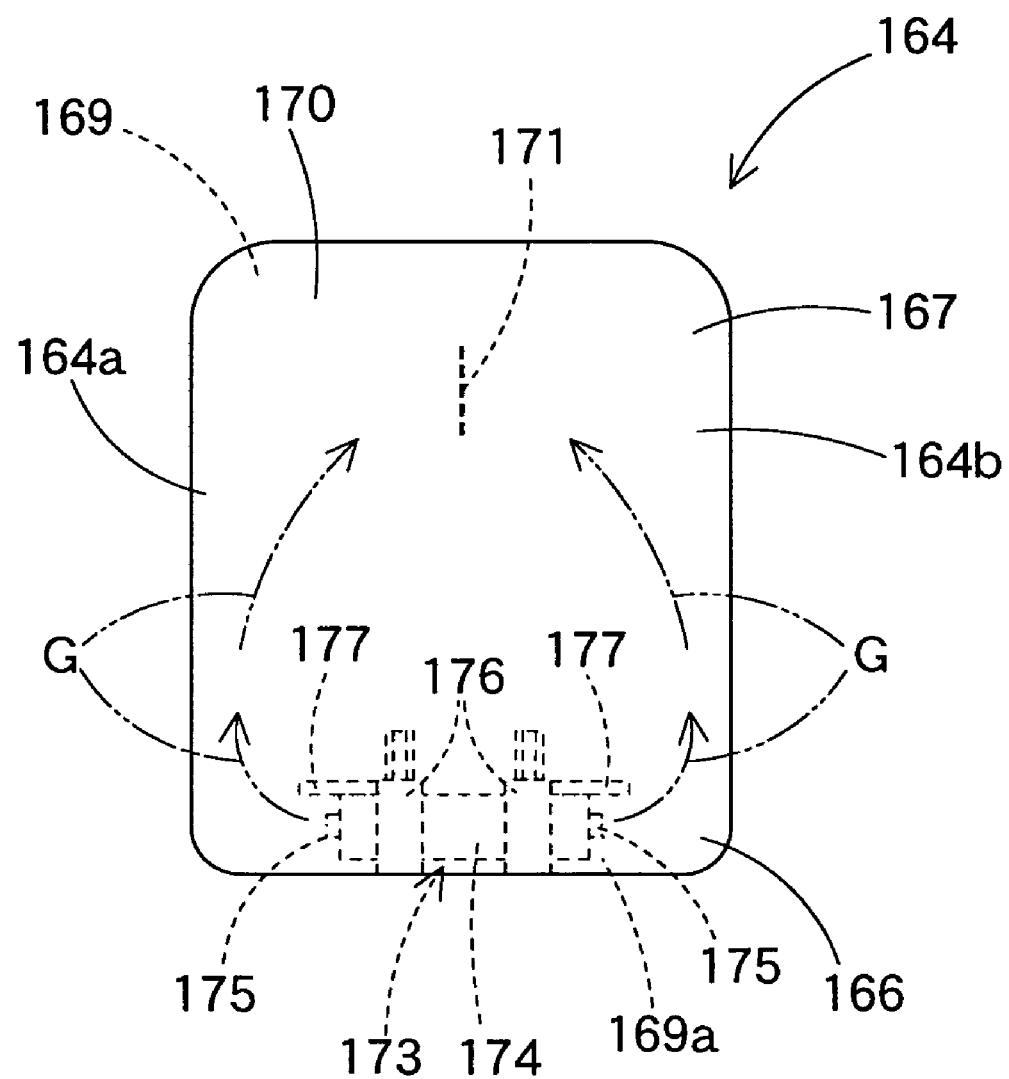
FIG. 52 is a top plan view showing still another modification of the airbag of the fourth embodiment.

Moreover, the gas flow regulating member may be exemplified by guide members 177 which are disposed in an inflator 173, as shown in FIG. 52.

An airbag 164 having the inflator 173 arranged therein is constructed to include a column cover side wall portion 169 and a driver side wall portion 170. In the column cover side wall portion 169, there is arranged a housing portion 169a for housing the inflator 173. In a downstream portion 167 on the upper side of the airbag 164, there is arranged a tether 171 for keeping the thickness of the downstream portion 167 constant at the time of the expansion and inflation by connecting the column cover side wall portion 169 and the driver side wall portion 170 to each other. At an upstream portion 166 on the lower side of the airbag 164, moreover, there is arranged the inflator 173. This inflator 173 is constructed to include a body 174 and two bracket portions 176 and 176. In the both left and right ends of the body 174, there are formed gas discharge ports 175 and 175 to discharge the inflating gas G toward the left and right edges 164a and 164b of the airbag 164. Near the left and right ends of the body 174, moreover, there are arranged the guide members 177 and 177 acting as the gas flow regulating member. These individual guide members 177 are formed into such a plate shape as to cover at least the upper sides of the gas discharge ports 175 and 175.

In the upstream portion 166, as shown in FIG. 52, the inflating gas G is discharged from the gas discharge ports 175 and 175 of the inflator 173 and is so guided by the guide members 177 and 177 as to flow toward the left and right sides of the airbag 164. Therefore, the airbag 164 is so reliably expanded and inflated as to enlarge the transverse width while suppressing the protrusion to the driver D. As a result, the airbag 164 protects both knees K of the driver D properly.

In the shown embodiment, the guide members 177 are exemplified by ones of plate shape. However, the shape of the guide members as the gas flow regulating members is not limited to this, but may be exemplified by ones of a cylindrical shape. In the shown embodiment, moreover, the guide members 177 are so arranged in the body 174 as to guide the inflating gas discharged from the gas discharge ports 175 and 175 to both left and right sides. However, the construction may also be so modified that no guide members 177 and 177 are arranged in the inflator 173 and that the inflating gas G discharged from the gas discharge ports 175 and 175 may flow from the body 174 directly to both left and right sides of the airbag 164. In short, the inflator itself may be constructed to act as the gas flow regulating members by using the gas discharge ports 175 and so on.

Figure 53:
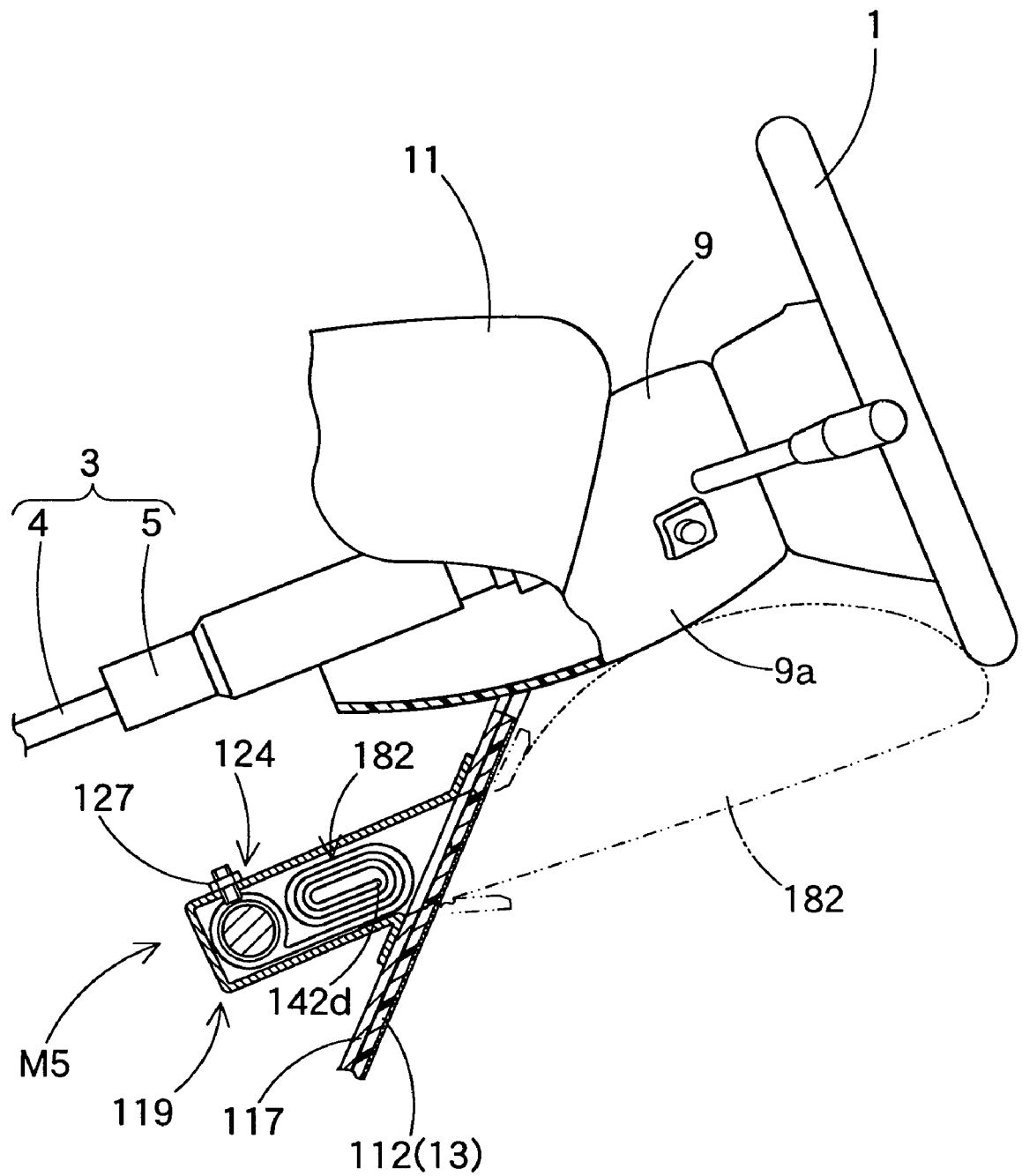
FIG. 53 is a sectional view showing a knee protecting airbag device of a fifth embodiment in use.
Figure 54:
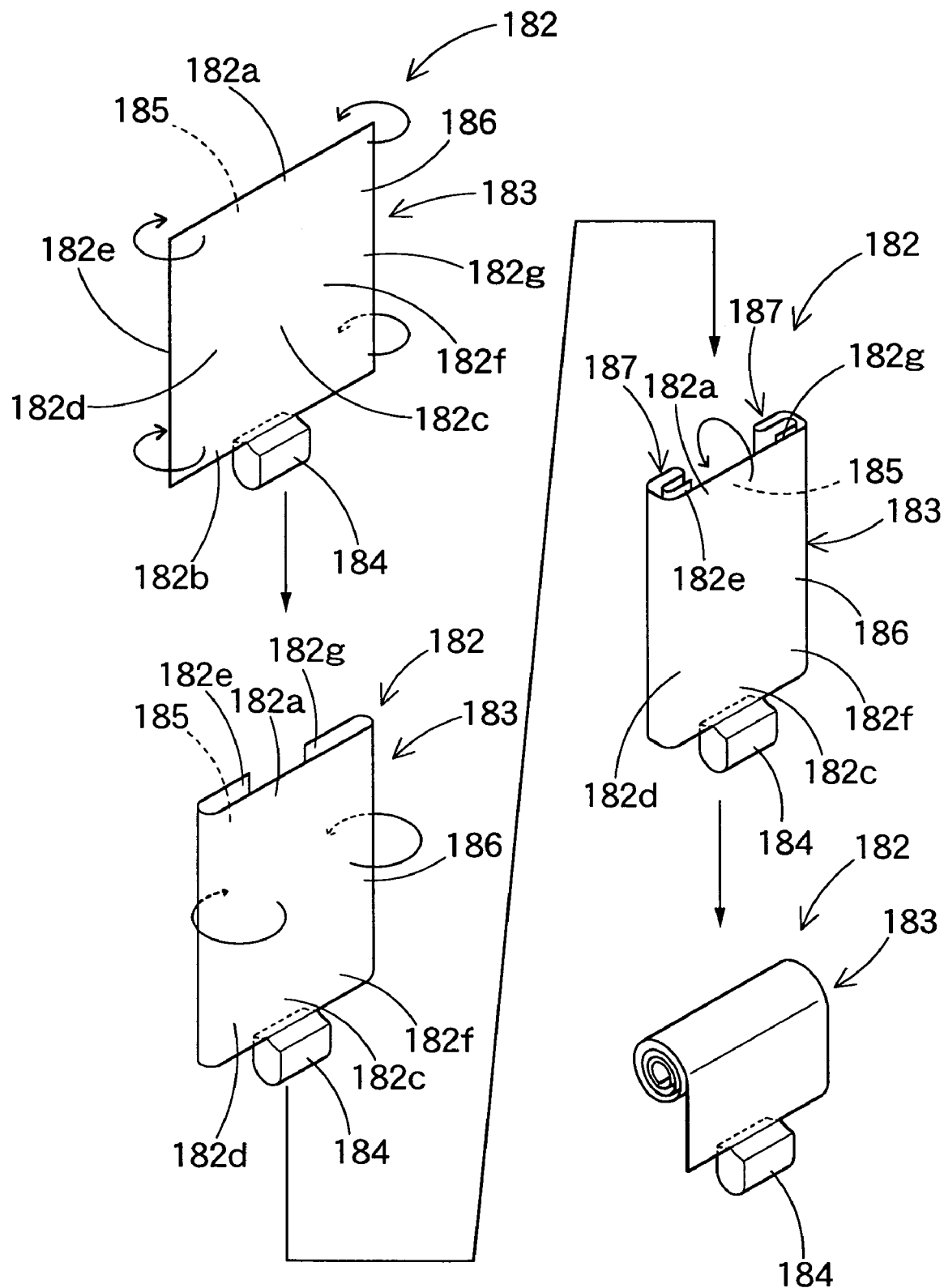
FIG. 54 presents schematic diagrams showing a folding manner of the airbag used in FIG. 53.

Still moreover, the airbag may be exemplified by an airbag 182 of an airbag device M5 of a fifth embodiment shown in FIGS. 53 and 54. In this airbag 182, a housing portion 184 for housing the inflator 124 is arranged at a lower end 182b near the center of a boundary portion between a column cover side wall portion 185 and a driver side wall portion 186. This airbag 182 is constructed to include a central portion 182c near the transverse center, and left and right end portions 182d and 182f adjacent to the central portion 182c and located on the sides of left and right edges 182e and 182g. When this airbag 182 is to be folded, it is longitudinally folded at first, as shown in FIG. 54, such that the folded portions 187 and 187 of the left and right end portions 182d and 182f are individually arranged on the sides of the column cover side wall portion 185. After this, the airbag 182 is rolled from its upper end 182a to the column cover side wall portion 185 and is housed in the case 119.

In this airbag 182, the housing portion 184 for attaching the inflator 124 therein is arranged in alignment with a body portion 183 of the airbag 182. Here, the body portion 183 means the portion of the airbag 182 other than the housing portion 184. In this airbag 182 being expanded and inflated, too, the inflating gas discharged from the inflator 124 flows at first into the body portion 183 and then flows along the central portion 182c to the upper end 182a. Then, the portion of the driver side wall portion 186 near the central portion 182c is unrolled and expanded to the side of the driver D. Subsequently, as in the airbag 129, the folded portions 187 and 187 of the left and right end portions 182d and 182f adjacent to the central portion 182c let in the inflating gas so as to be individually expanded and inflated, while being unrolled, along the column cover lower surface 9a. At this time, the airbag 182 is expanded and inflated to enlarge the transverse width size while minimizing the protrusion to the driver D. As a result, the airbag 182 can protect both knees K of the driver D properly.

When the airbag 182 is to be housed in the case 142 shown in FIG. 45, the folded portions 187 and 187 are placed, at the longitudinal folding time just before the rolling, on the driver side wall portion 186, as shown in FIGS. 46C and 46D. After this, the airbag 182 may be rolled.

The fourth and fifth embodiments have been described on the case in which the airbag is subjected to the transverse folding step after the longitudinal folding step. However, the longitudinal folding may be done after the transverse folding, although the same working-effects as the fourth and fifth embodiments cannot be attained. Moreover, the transverse folding may be done in the bellows shape. Alternatively, the transverse folding or the longitudinal folding may be added in the course of the longitudinal folding step or the transverse folding step. In the folding steps of the airbag 129 shown in FIG. 46, for example, the airbag 129 is folded at first to the state shown in FIG. 46B. After this, the upper end 129a is rolled toward the column cover side wall portion 133 up to the vicinity of the vertically intermediate portion of the airbag 129. Subsequently, the longitudinal folding is completed by performing it to the state shown in FIG. 46D. Then, the halfway rolled airbag may be rolled to complete the transverse folding.

Figure 55:
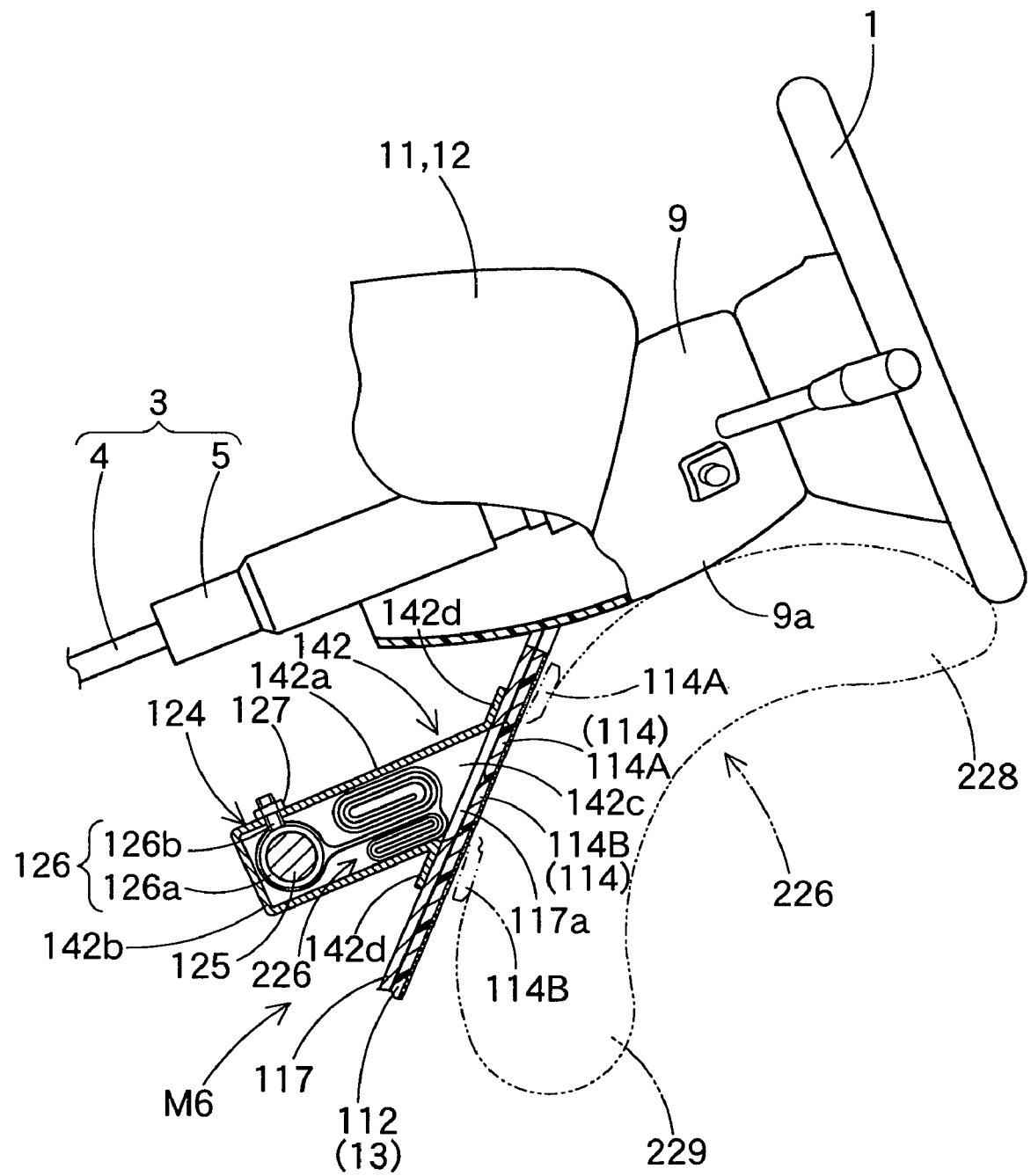
FIG. 55 is a sectional view showing a knee protecting airbag device of a sixth embodiment in use.
Figure 56:
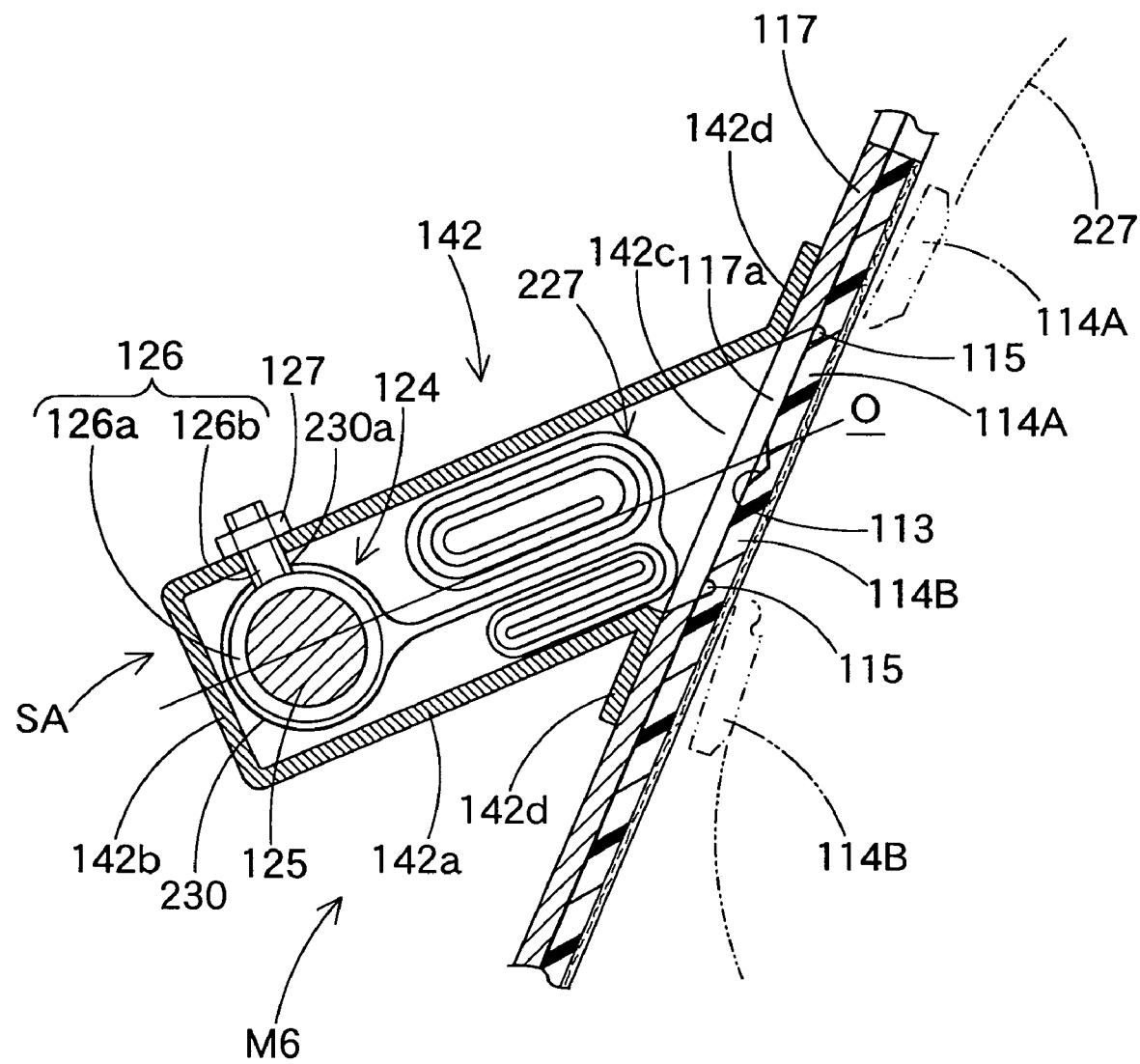
FIG. 56 is an enlarged sectional view of the airbag device of the sixth embodiment.
Figure 57:
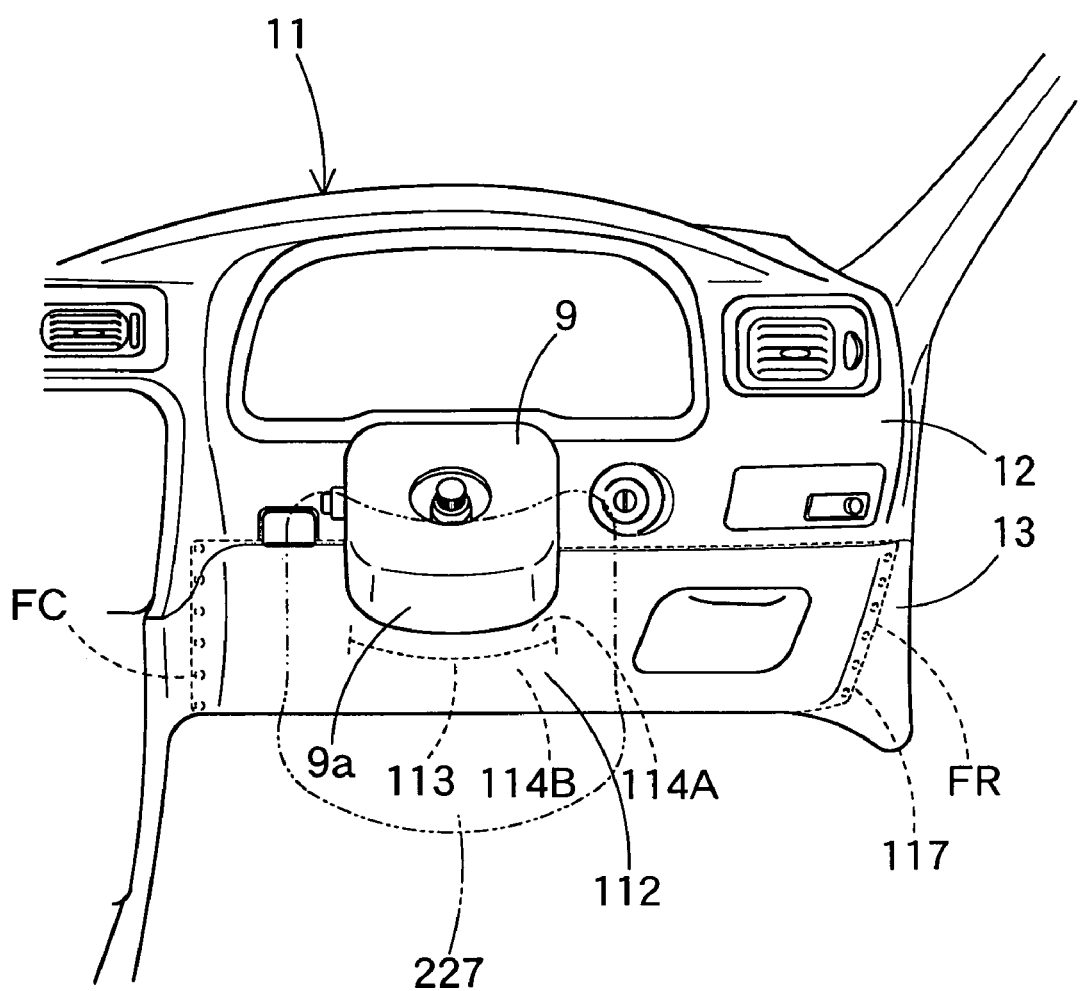
FIG. 57 is a front elevation of the vicinity of a column cover of the sixth embodiment.

Here will be described a knee protecting airbag device M6 of a sixth embodiment with reference to FIGS. 55 to 57. As in the fourth and fifth embodiments, the airbag device M6 is held by the plate-shaped holding plate 117 acting as the holding member arranged below the column cover 9. The airbag device M6 is constructed to include a folded airbag 226, the inflator 124 for feeding the inflating gas to the airbag 226, and the case 142 for housing the airbag 226 and the inflator 124. Moreover, the airbag device M6 is attached to the holding plate 117 so that the case 142 is arranged on the vehicular front side of the holding plate 117.

The column cover 9, the steering column 3 covered by the column cover 9, the dashboard 11, the inflator 124 and the holding plate 117 are similar to those of the fourth embodiment, and their description will be omitted by designating them the same reference numerals as those of the fourth embodiment. Moreover, the case 142 is similar to that shown in FIG. 45, and its description will be omitted by designating the individual portions the same reference numerals as those of FIG. 45.

Figure 58:
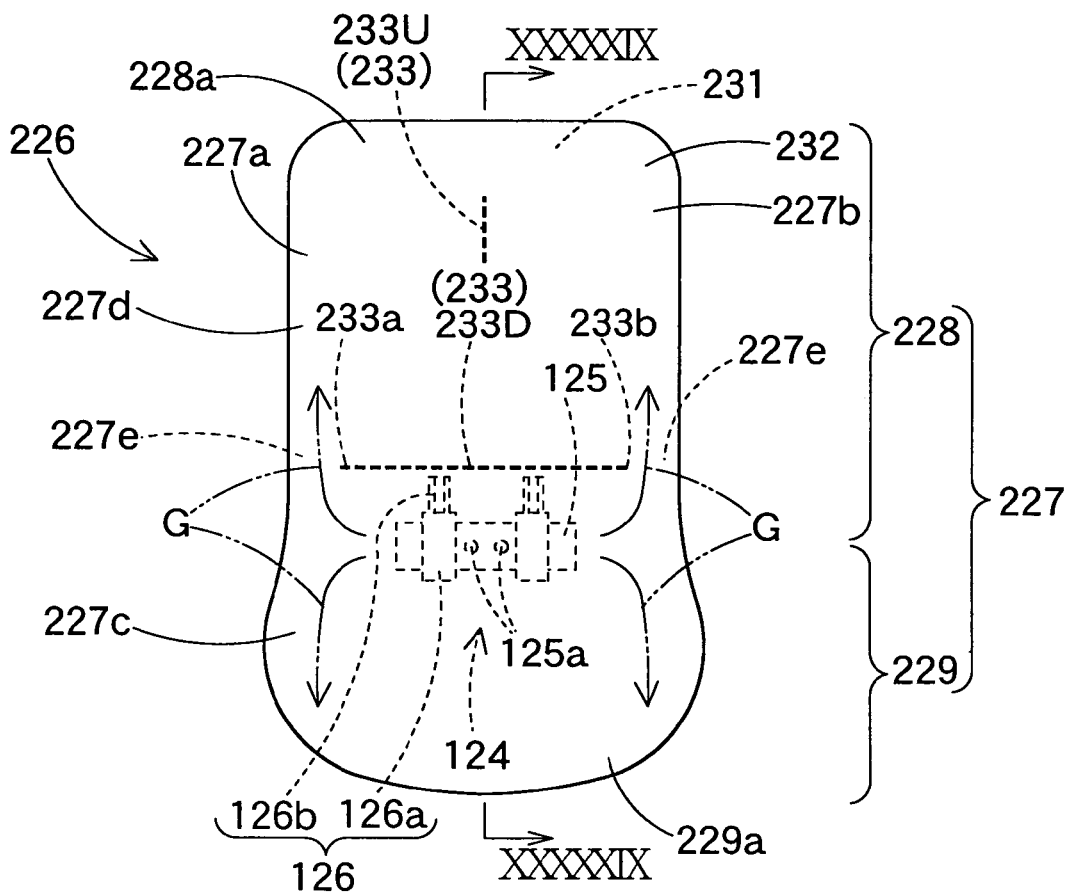
FIG. 58 is a top plan view of an airbag to be used in the sixth embodiment.
Figure 59:
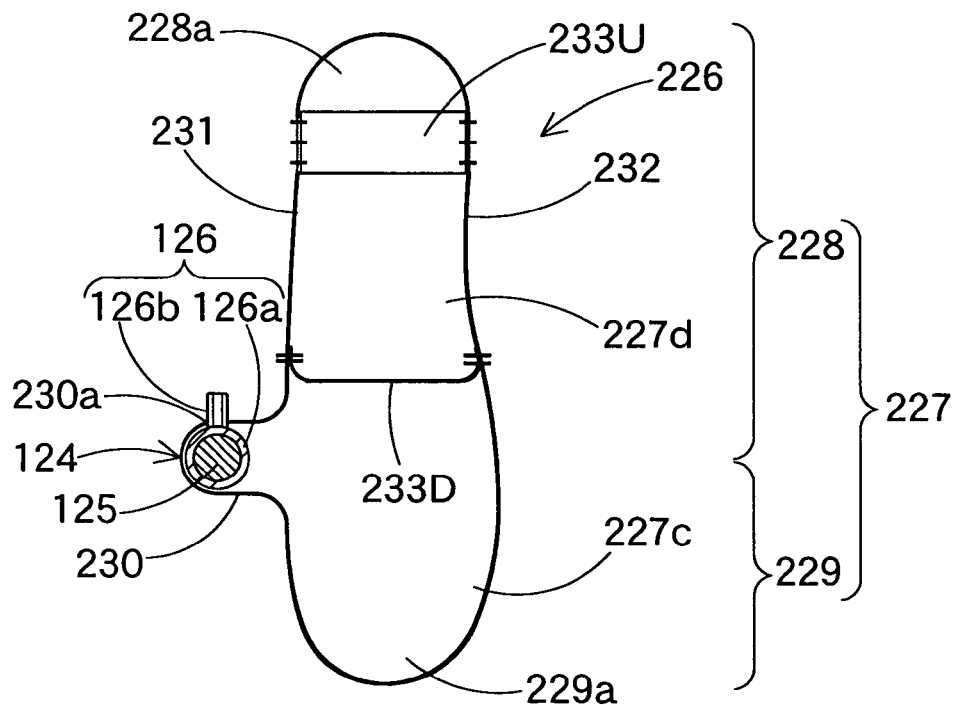
FIG. 59 is a sectional view of a portion XXXXXIX-XXXXXIX of FIG. 58.

The airbag 226 is formed of a flexible woven fabric of polyester, polyamide or the like. This airbag 226 is made to have such a substantially identical shape to the airbag 129 of the fourth embodiment having the lower end 129b extended downward. As shown in FIGS. 58 and 59, more specifically, the airbag 226 is provided with a column cover side wall portion 231 and a driver side wall portion 232 and is formed into such a generally rectangular plate shape as is vertically extended when completing the expansion and inflation. On the lower side of the column cover side wall portion 231, there is arranged a housing portion 230 for housing and attaching the inflator 124 therein. The housing portion 230 is to be left in the case 142 when the airbag 226 is expanded and inflated. A body portion 227 of the airbag 226 other than the housing portion 230 is protruded from the case 142 when the airbag 226 is expanded and inflated. Here in the housing portion 230, there are formed through holes 230a for inserting the bolts 126b of the inflator 124 thereinto.

In the case of the sixth embodiment, this body portion 227 is constructed to include an upper portion 228 and a lower portion 229. The upper portion 228 is expanded upward to cover the area from the case 142 to the lower surface 9a of the column cover 9 so that it can protect the driver D from the upper knees to the vicinities of the thighs. The lower portion 229 is expanded downward to cover the inner side of the airbag cover 112 from the case 142 so that it can protect the driver D from the lower side of the knees to the vicinities of the legs. This airbag 226 is so housed in the case 142 that the upper portion 228 and the lower portion 229 are individually rolled, as shown in FIGS. 55 and 56.

In the upper portion 228, as shown in FIGS. 58 and 59, there are arranged a plurality of tethers 233 which act as the connection means for connecting the column cover side wall portion 231 and the driver side wall portion 232 to each other so as to make the thickness constant at the time of the expansion and inflation. In the case of the embodiment, the airbag 226 has two tethers 233D and 233U arranged therein like the tethers 135 of the fourth embodiment. These tethers 233D and 233U are arranged to keep the thickness of the upper portion constant when expanded and inflated so that the upper portion 228 being expanded and inflated may go smoothly into the clearance between the knee K of the driver D and the column cover lower surface 9a. The tether 233U is arranged, like the tether 135U of the fourth embodiment, along the vertical direction of the vehicle and at the generally transverse center of the upper portion 228 from the center to the vicinity of the upper end 228a.

The tether 233D is arranged, like the tether 135D of the fourth embodiment, near the housing portion 230 in the upper portion 228 and generally in parallel with the transverse direction of the vehicle. This tether 233D plays a role of partitioning the space in the body portion 227 of the airbag 226 into an upstream portion 227c and a downstream portion 227d with respect to the flow of the inflating gas G. In short, the tether 233D partitions the body portion 227 into the upstream portion 227c on the lower side and the downstream portion 227d on the upper side. Moreover, the tether 233D plays a role of the gas flow regulating member. Specifically, the left and right end portions 233a and 233b of the tether 233D are arranged apart from the left and right edges 227a and 227b of the airbag body portion 227. Between the end portions 233a and 233b and the edges 227a and 227b, therefore, there are arranged gas communication holes 227e and 227e, respectively. Accordingly, the inflating gas G is so regulated by the tether 233D as to flow to the left and right sides in the upstream portion 227c and then flow through the gas communication holes 227e and 227e to the downstream portion 227d. Moreover, the tether 233D is located, like the tether 135D, in the body portion 227 of the airbag 226 at such a position as leaves the airbag housing portion (or the case 142) for the vehicular inner side and which is near the housing portion.

Here will be described how to mount this airbag device M6 on the vehicle. First of all, the airbag 226 is folded up while having the inflator 124 packaged therein. Here, the individual bolts 126b of the inflator 124 are protruded from the through holes 230a. On the other hand, not-shown lead wires extending from the inflator body 125 are led out from predetermined not-shown through holes of the airbag 226.

Figure 60:
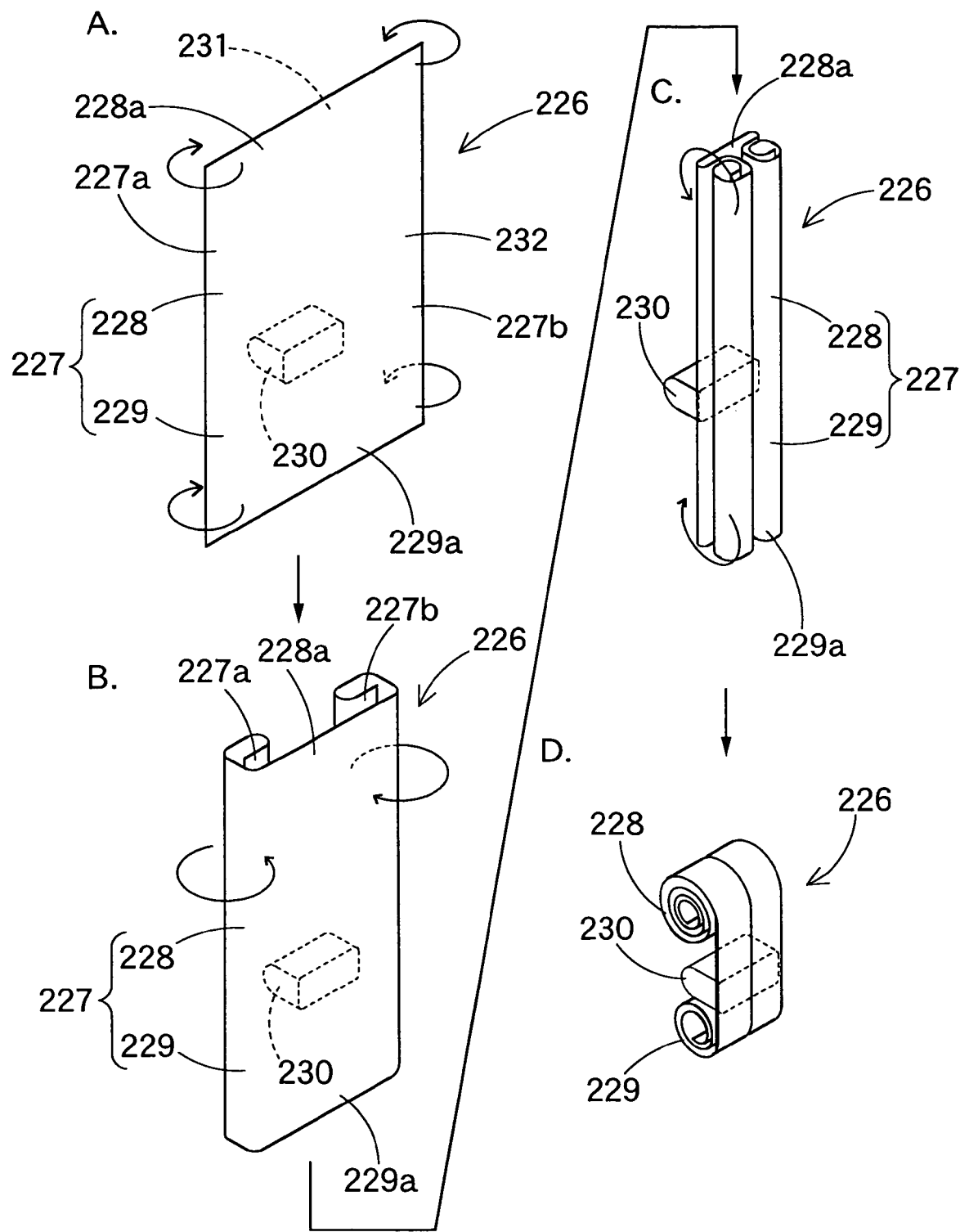
FIG. 60 presents schematic diagrams showing a folding manner of the airbag of the sixth embodiment.

The airbag 226 is folded by the longitudinal folding step and the transverse folding step after the longitudinal one. In the longitudinal folding step, as shown in FIG. 60A, the column cover side wall portion 231 and the driver side wall portion 232 are overlapped and expanded flat at first. Then, the left and right edges 227a and 227b of the body portion 227 are rolled toward the column cover side wall portion 231, as shown in FIG. 60B. After this, the rolled portions are placed on the driver side wall portion 232 on the vehicular rear side, as shown in FIG. 60C, and are folded to a width substantially equal to the transverse width of the case 142. Thus, the longitudinal folding step is completed.

In the transverse folding step, as shown in FIG. 60D, the upper portion 228 is rolled from the upper end 228a on the side of the column cover side wall portion 231, and the lower portion 229 is rolled from the lower end 229a on the side of the column cover side wall portion 231. Thus, the transverse folding step is completed.

Thereafter, the airbag 226 is wrapped, after folded, with not-shown breakable wrapping film, and the individual bolts 126b are protruded through the wrapping film from the case 142. Next, the airbag assembly SA is formed by fastening the nuts 127 on the individual bolts 126b protruded and by housing the folded airbag 226 and the inflator 124 in the case 142. Here, the not-shown lead wires extending from the inflator body 125 are led out from the wrapping film and from the not-shown through holes of the case 142.

The airbag assembly SA is fixed on the holding plate 117 by using the flange portion 142d. After this, the left and right ends of the holding plate 117 are fixed on the vehicular frame portions FC and FR arranged on the left and right sides, by means of bolts. By connecting the not-shown lead wires with the control circuit and by mounting the upper panel 12 and the lower panel 13 (or the airbag cover 112) of the dashboard 11 on the vehicle, the airbag device M6 can be mounted on the vehicle, as shown in FIG. 55.

If a predetermined electric signal is inputted to the inflator body 125 after the airbag device M6 was mounted on the vehicle, the inflating gas G is discharged from the gas discharge ports 125a. Then, the airbag 226 is inflated to break the not-shown wrapping film and to push and open the door portions 114 (114A and 114B) of the airbag cover 112 so that the upper portion 228 and the lower portion 229 are expanded and inflated upward and downward, respectively, along the column cover lower surface 9a and the surface of the airbag cover 112.

Figure 61:
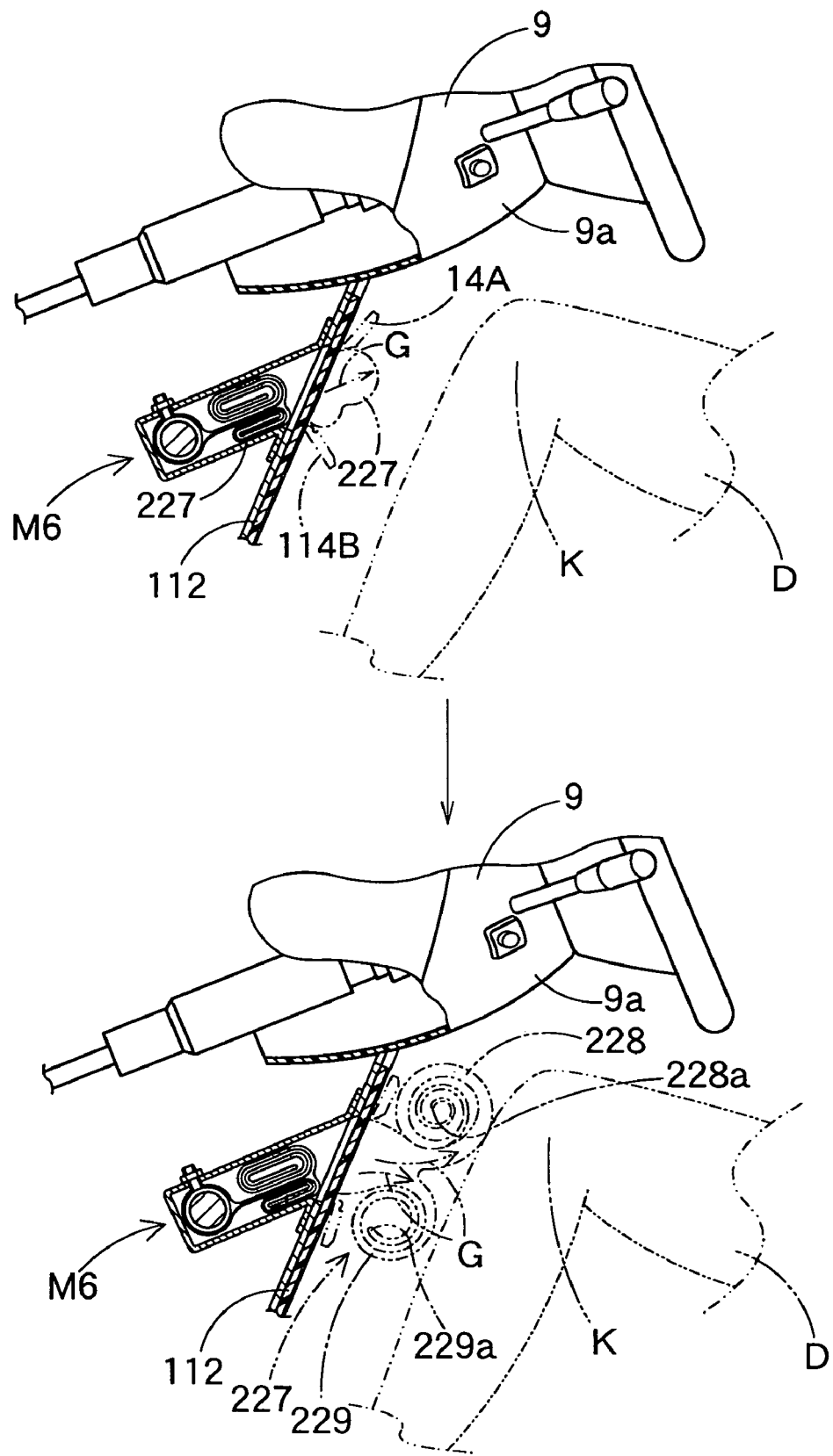
FIG. 61 diagrams the airbag of the sixth embodiment being expanded and inflated.
Figure 62:
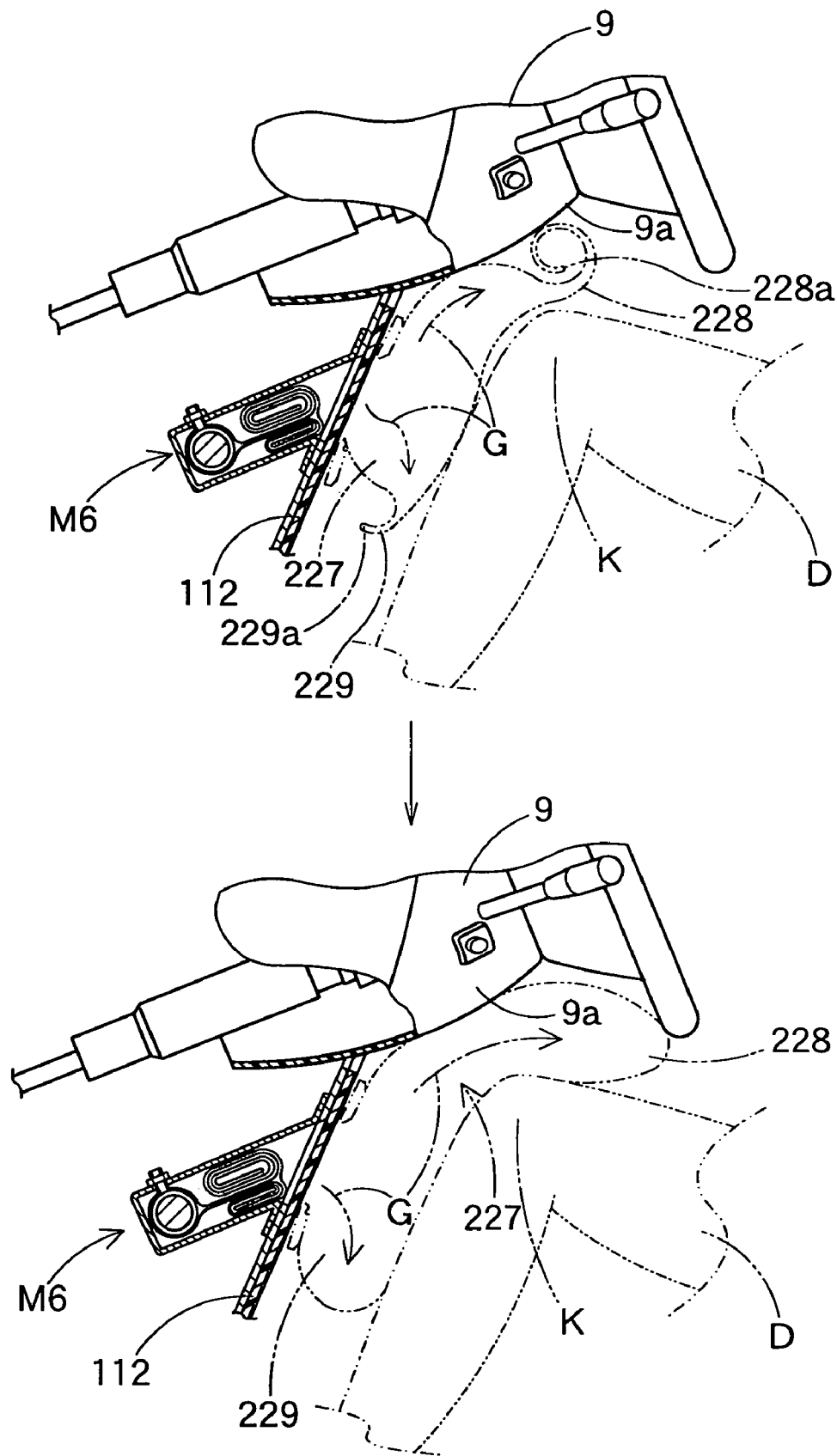
FIG. 62 diagrams the airbag of the sixth embodiment being expanded and inflated, and shows the state after FIG. 61.

Specifically, the inflating gas G discharged from the gas discharge ports 125a flows into the airbag 226 so that the airbag 226 is expanded and inflated to open the door portions 114A and 114B upward and downward, as shown in FIG. 61. In the airbag 226, the vicinity of the boundary portion between the upper portion 228 and the lower portion of the body portion 227 is once protruded to the vehicular rear side. The upper portion 228 and the lower portion 229 are individually rolled. At the time of the expansion and inflation, therefore, while being unrolled, the upper end 228a of the upper portion 228 is expanded and inflated along the column cover lower surface 9a, and the lower end 229a of the lower portion 229 is expanded and inflated along the surface of the airbag cover 112, as shown in FIGS. 61 and 62. As a result, the airbag 226 is prevented from protruding to the knee K so that so much pushing force may not be put on the knee K of the driver D. Moreover, the airbag 226 of the embodiment can be smoothly expanded while being unrolled, even if it comes into contact with the knee K of the driver D.

In the airbag 226 of the sixth embodiment, on the other hand, the left and right edges 227a and 227b of the body portion 227 are rolled to the vehicular front side. At the time of the expansion and inflation, therefore, the upper portion 228 and the lower portion 229 are expanded and transversely widened while being transversely unrolled.

In the sixth embodiment, moreover, the tether 233D is arranged near the housing portion 230 in the upper portion 228 and generally in parallel with the transverse direction of the vehicle. The upper portion 228 is fed with the inflating gas G from the gas communication holes 227e near the left and right ends 233a and 233b of the tether 233D. Therefore, the upper portion 228 is initially expanded and inflated transversely. As a result, the sixth embodiment can further suppress the protrusion of the airbag 226 to the knee K.

Figure 63:
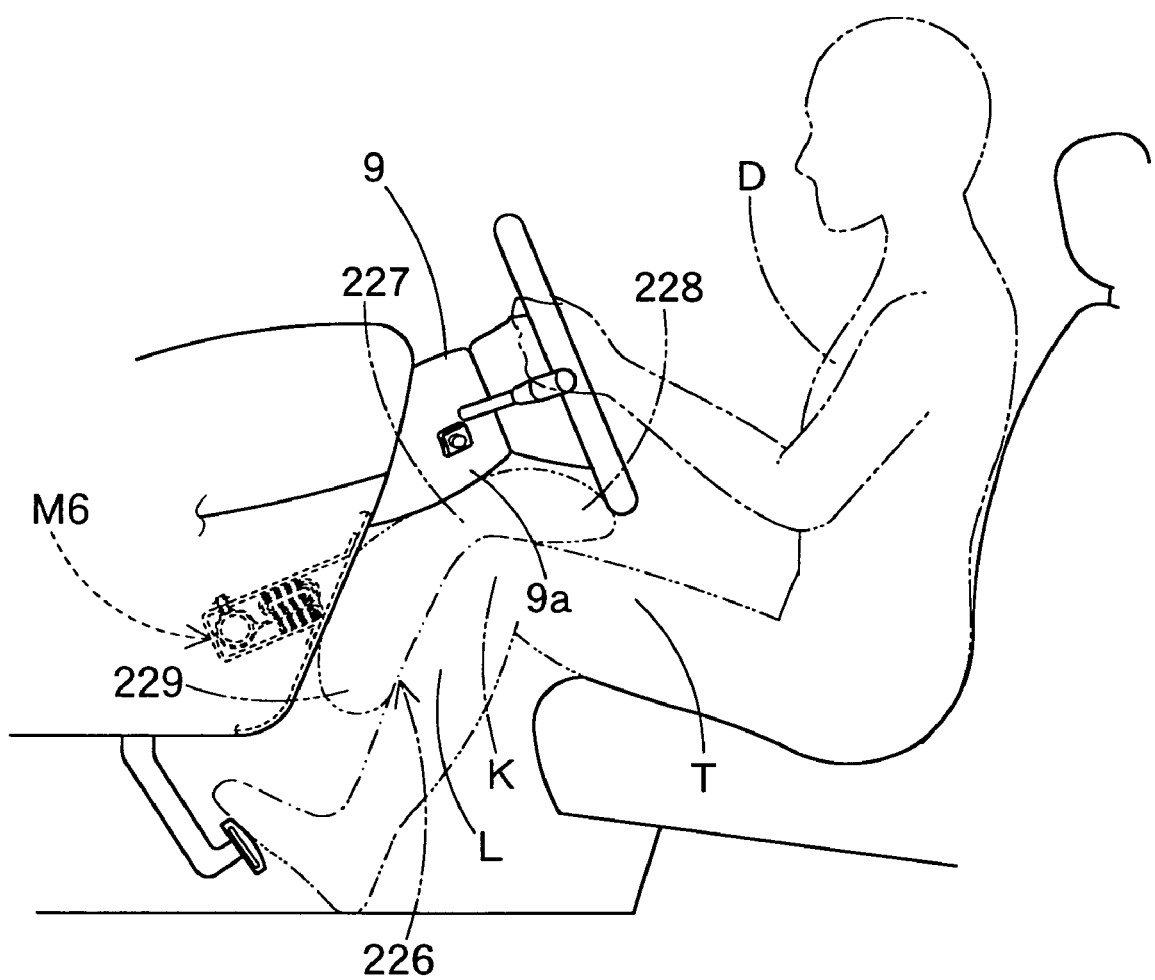
FIG. 63 is a schematic diagram showing the completely inflated state of the airbag of the sixth embodiment.

In the airbag device M6 of the sixth embodiment thus far described, the airbag 226 is provided with the upper portion 228 which is expanded upward from the case 142 and is expanded and inflated to cover the lower surface 9a of the column cover 9, and the lower portion 229 to be expanded downward from the case 142. As shown in FIG. 63, therefore, the upper portion 228 of the airbag 226 covers the area from the upper side of the knee K to the vicinity of the thigh T of the driver D, and the lower portion 229 of the airbag 226 covers the area from the lower side of knee K to the vicinity of the leg L. As a result, the airbag 226 expanded and inflated can protect the knee K of the driver D properly over the wide range.

Figure 66:
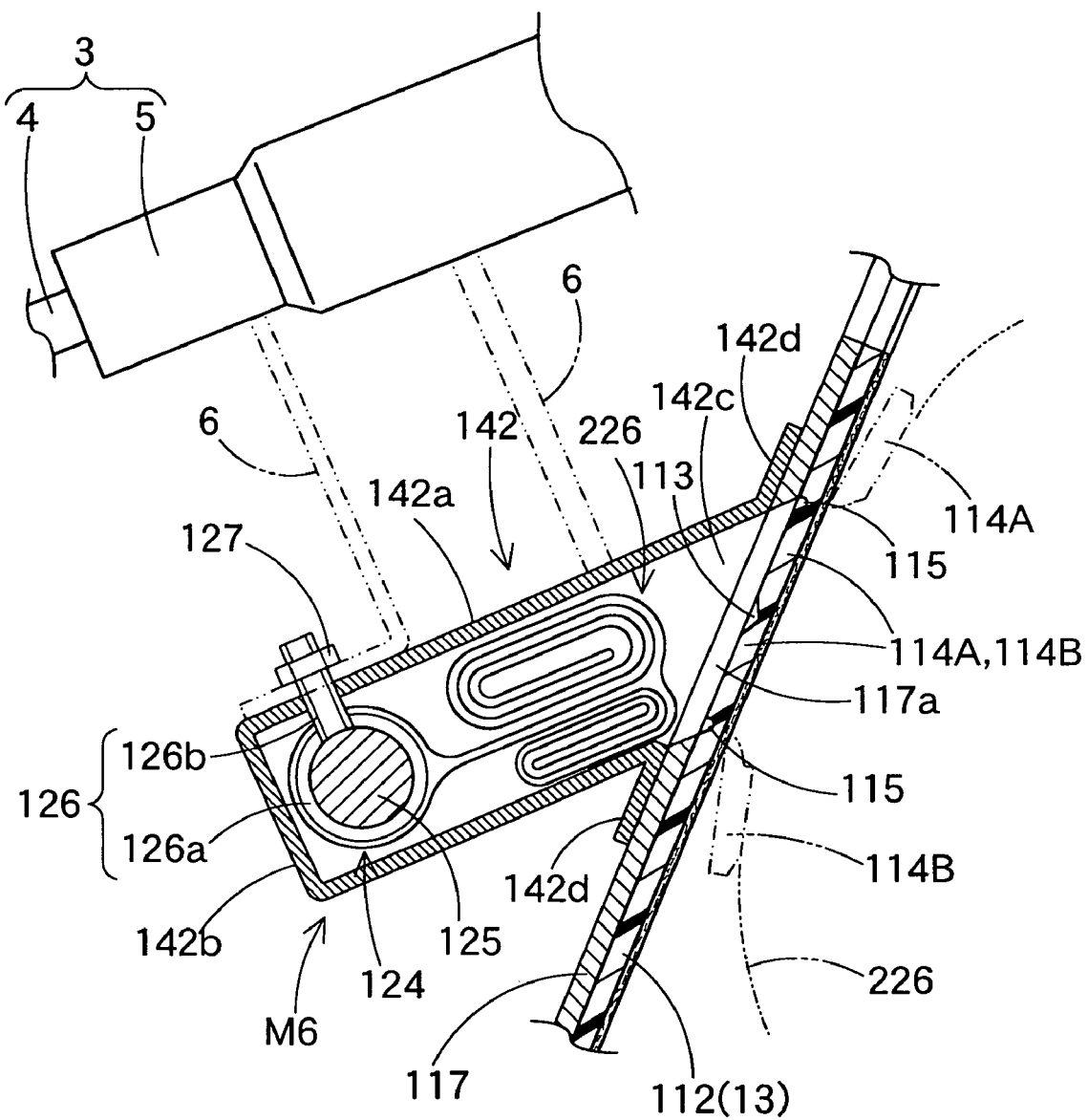
FIG. 66 is a sectional view showing a modification of the sixth embodiment.

In the sixth embodiment, too, the holding plate 117 fixing the case 142 is fixed at its both left and right ends on the vehicular frame portions FC and FR arranged on the left and right sides. Therefore, the airbag device M6 is stably held on the frame portions FC and FR. Moreover, the airbag 226 having completed the expansion and inflation is also stably supported by the holding plate 117. Without considering these points, the construction may be modified such that the holding plate 117 is omitted. Specifically, the case 142 may be connected to and fixed on an immovable portion of the column tube 5 in the steering column 3 by means of the bracket 6, as indicated by double-dotted lines of FIG. 66. Naturally, the case 142 may be fixed on both the bracket 6 and the holding plate 117. With this construction, the case 142 is fixed at the two portions, i.e., the bracket 6 and the holding plate 117. Therefore, the airbag device M6 is held more stably.

In the sixth embodiment, still moreover, the axial direction O of the peripheral wall portion 142a in the case 142 is generally parallel to the axial direction of the steering column 3. When the airbag 226 is protruded to the vehicular rear side along the column cover lower surface 9a, therefore, the airbag 226 (especially its upper portion 228) goes smoothly into the clearance between the column cover 9 and the knee K of the driver D. As a result, the airbag 226 protects the vicinity of the upper portion of the knee K of the driver D more properly.

As has been described hereinbefore, the sixth embodiment attains the same working-effects as the fourth embodiment. In the sixth embodiment, still moreover, the airbag 226 extends the lower portion 229 downward to protect the thigh T, the knee K and the leg L of the driver D over a wide range.

Figure 64:
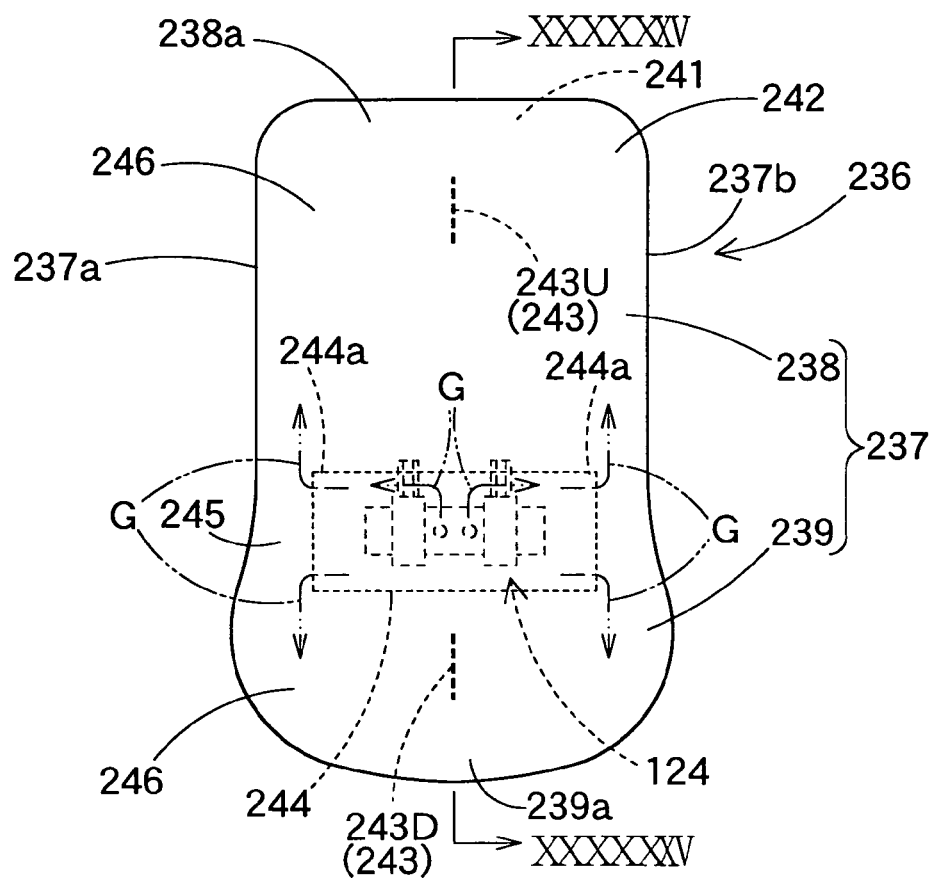
FIG. 64 is a top plan view of a modification of the airbag of the sixth embodiment.
Figure 65:
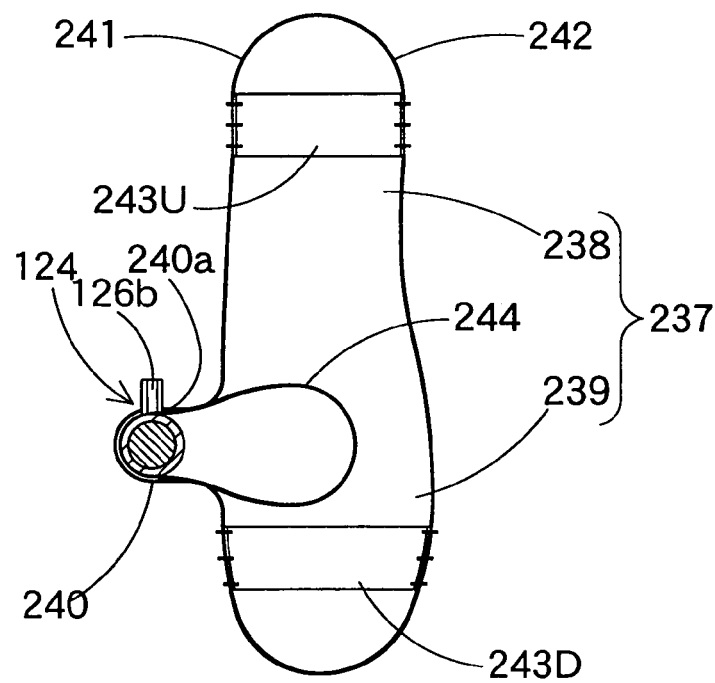
FIG. 65 is a sectional view of a portion XXXXXXV-XXXXXXV of FIG. 64.

The airbag 226 may be exemplified by an airbag 236 shown in FIGS. 64 and 65. This airbag 236 includes a body portion 237 and a housing portion 240 like the airbag 226 of the foregoing embodiment, and the body portion 237 includes an upper portion 238 and a lower portion 239. In the housing portion 240, there are formed through holes 240a for inserting the bolts 126b of the inflator 124 thereinto. In the airbag 236, moreover, there is arranged a commutating cloth 244 acting as the gas flow regulating member. The commutating cloth 244 is formed into such a generally cylindrical shape as to cover the outer circumference of the inflator 124. In the commutating cloth 244, moreover, there are arranged openings 244a and 244a on the both left and right sides of the vehicle. In this airbag 236, an upstream portion 245 for the inflating gas G is arranged around the commutating cloth 244, and two downstream portions 246 of the inflating gas G are arranged in the upper portion 238 above the commutating cloth 244 and in the lower portion 239 below the commutating cloth 244.

In each of the upper portion 238 and the lower portion 239, there is arranged one tether 243 (243D and 243U) for connecting a column cover side wall portion 241 and a driver side wall portion 242 to each other. The individual tethers 243 are arranged at the transverse center and along the vehicular vertical direction.

This airbag 236 is also folded like the airbag 226 and is housed in the case 142. In this airbag 236 being expanded and inflated, the inflating gas G discharged from the inflator 124 is discharged out to both the left and right sides from the openings 244a and 244a of the commutating cloth 244, as shown in FIG. 64. Therefore, the inflating gas G discharged from the inflator 124 is prevented from flowing directly into the upper portion 238 or the lower portion 239. Then, the inflating gas G flows from the side of the left and right edges 237a and 237b of the body portion 237 to the upper end 238a of the upper portion 238 and the lower end 239a of the lower portion 239. As a result, the upper and lower portions 238 and 239 are expanded and inflated while the portion of the body portion 237a in the vicinity of the commutating cloth 244 being transversely extended. At the beginning of the expansion, more specifically, the upper portion 238 and the lower portion 239 are expanded and inflated to enlarge the transverse width without protruding to the driver D, so that the thigh T, the knee K and the leg L of the driver D are protected properly.

Here will be described a knee protecting airbag device M7 of a seventh embodiment shown in FIGS. 67 and 68. This airbag device M7 is arranged below the steering column 3 and below the column cover 9. This airbag device M7 is constructed to include an airbag 326, an inflator 321, a case 319 for housing the airbag 326 and the inflator 321, and an airbag cover 312.

The steering column 3, the column cover 9 and the dashboard 11 are similar to those of the fourth to sixth embodiments, and their description will be omitted by designating them the same reference numerals as those of the individual embodiments.

The case 319 is made of a sheet metal and is provided with a peripheral wall portion 319a of a generally rectangular cylinder shape, and a bottom wall portion 319b of a generally rectangular shape for closing the peripheral wall portion 319a on the upper front side of the vehicle. On the other hand, the peripheral wall portion 319a has an opening 319c on its lower rear side of the vehicle. In the case 319, moreover, a flange portion 319d on the peripheral edge of the opening 319c is fixed on the vehicular frame portions FC and FR, as arranged on both the transverse sides of the steering column 3, by means of bolts.

Figure 67:
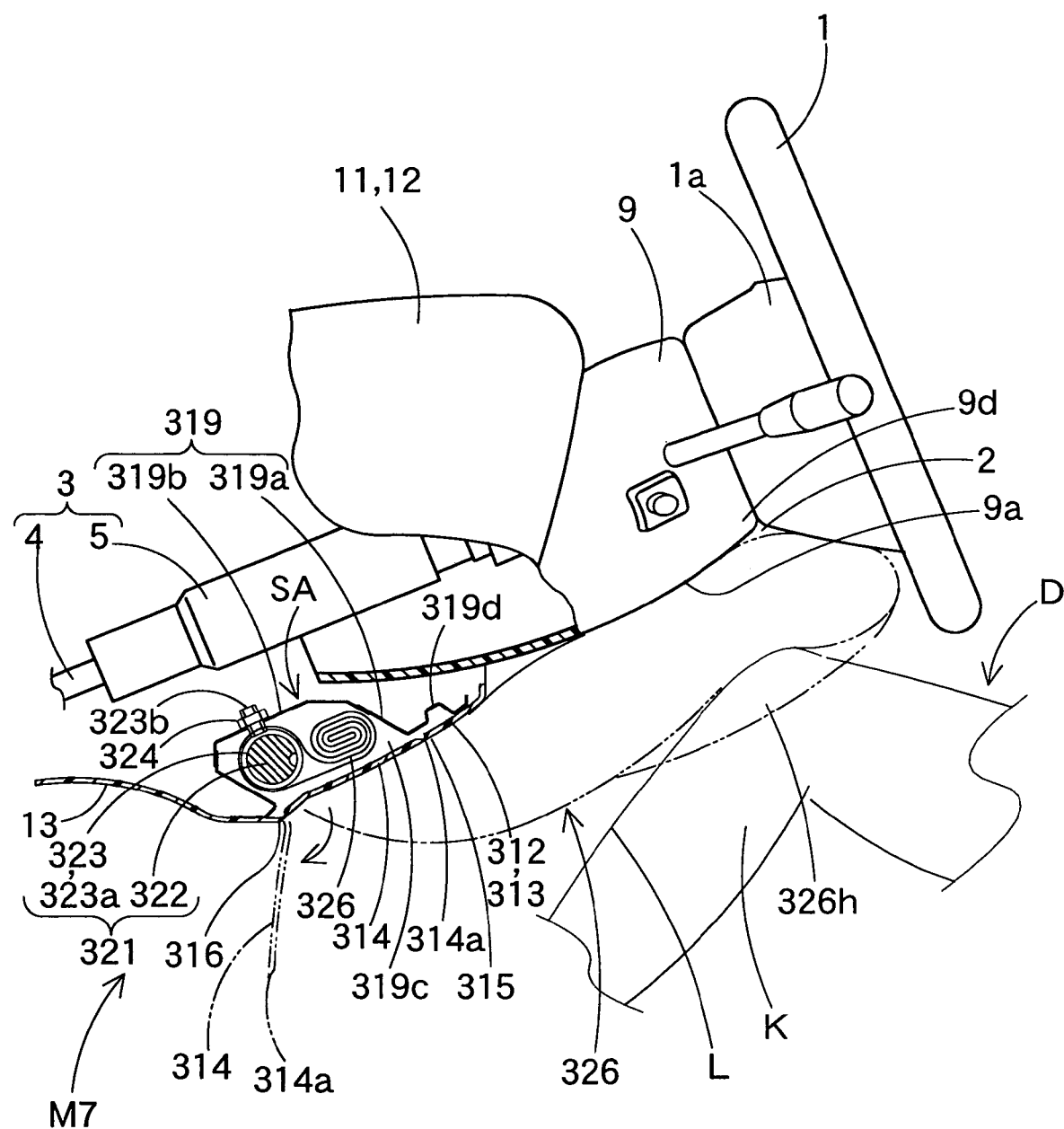
FIG. 67 is a sectional view showing a knee protecting airbag device of a seventh embodiment in use.
Figure 68:
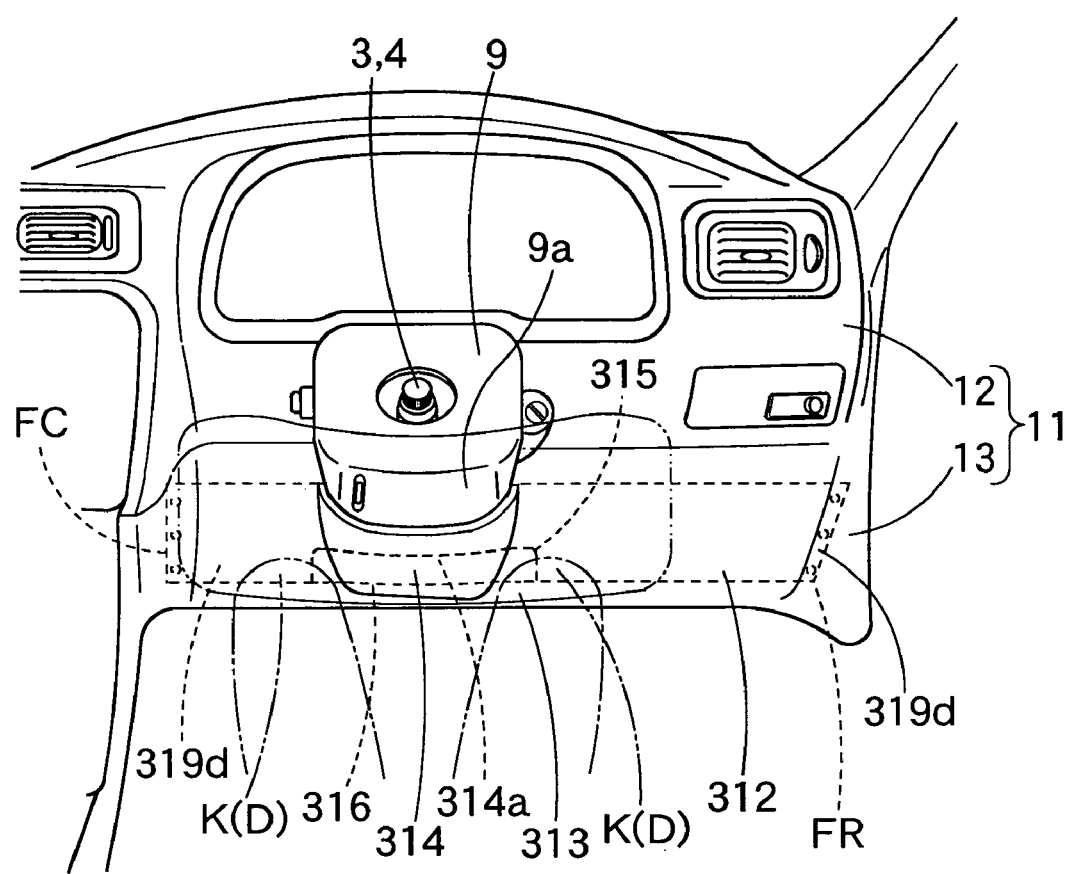
FIG. 68 is a front elevation of the vicinity of a column cover of the seventh embodiment.
Figure 69:
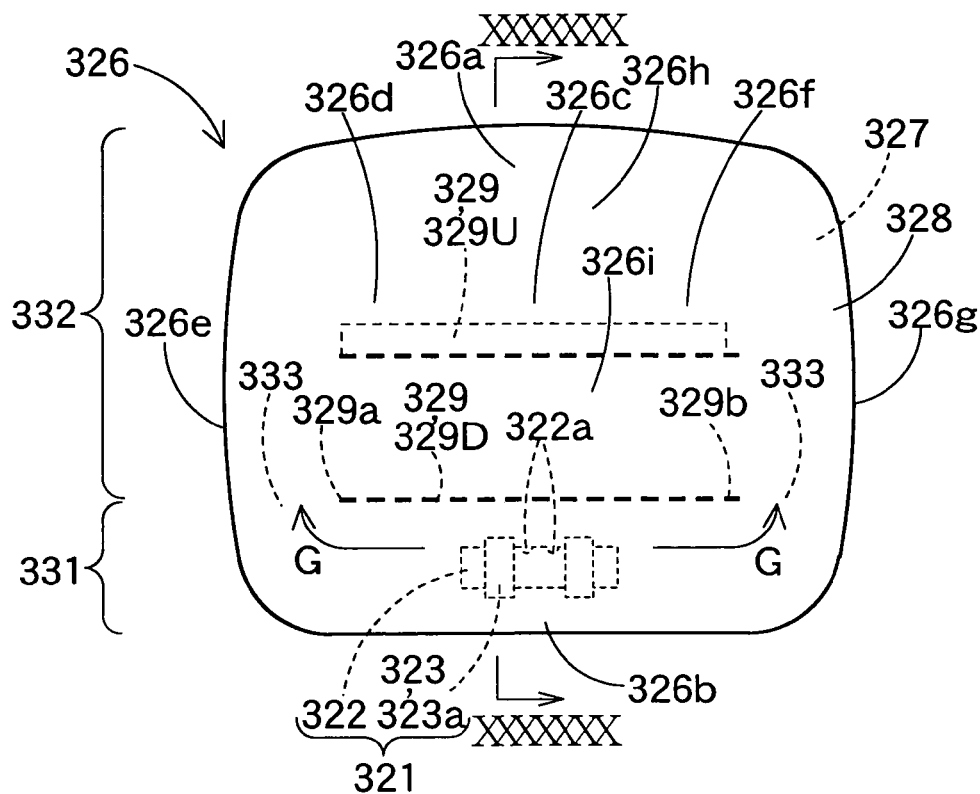
FIG. 69 is a front elevation of an airbag used in the seventh embodiment.
Figure 70:
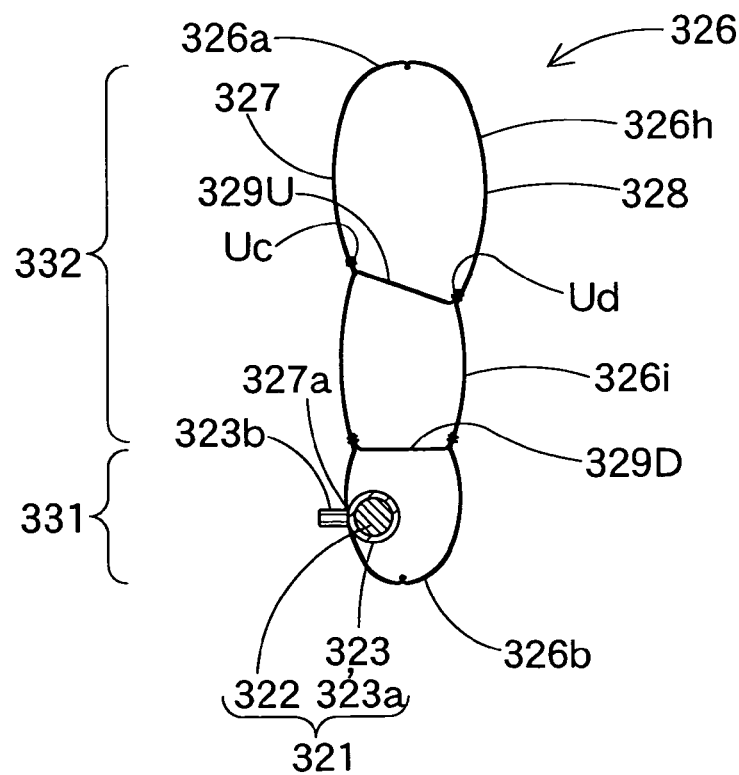
FIG. 70 is a sectional view of a portion XXXXXXX-XXXXXXX of FIG. 69.

As in the individual embodiments, the inflator 321 includes a cylinder type body 322 and two bracket portions 323 and 323, as shown in FIGS. 67, 69 and 70. The body 322 is provided with gas discharge ports 322a for discharging the inflating gas. The body 322 acts simultaneously with a not-shown airbag device mounted on the steering wheel 1. Each bracket portion 323 is composed of a retaining ring 323a of a metal sheet capable of clamping the body 322, and the bolt 323b protruded from the retaining ring 323a.

The inflator 321 is assembled by cramping the body 322 by the bracket portions 323 and 323 and is housed in the case 319 while enveloped in the airbag 326. The inflator 321 is fastened and fixed to the case 319 by fastening the nuts 324 onto the individual bolts 323b protruded from the case 319. Moreover, the not-shown lead wires are connected with the body 322.

The airbag cover 312 is provided with an airbag cover body portion 313 and the door portion 314. This door portion 314 is formed integrally with the airbag cover body portion 313 and is arranged at the vehicular lower side in the opening 319c of the case 319. In the case of the seventh embodiment, like the fourth to sixth embodiments, the airbag cover body portion 313 is formed integrally with the lower panel 13 of the dashboard 11, as shown in FIGS. 67 and 68. The door portion 314 is arranged generally at the vertical center of the airbag cover body portion 313 below the column cover 9. The door portion 314 is formed into a generally rectangular shape, as seen from the vehicular inner side. The door portion 314 is provided at its periphery with a thinned portion 315 to be broken, which takes a generally inverted U-shape, as seen from the vehicular inner side. On the lower end side of the door portion 314, moreover, there is formed a thinned hinge portion 316 which is made of an integral hinge. Therefore, the door portion 314 is opened downward on the hinge portion 316, when it is pushed by the airbag 326.

The airbag 326 is formed of a flexible woven fabric of polyester, polyamide or the like. Moreover, this airbag 326 is made, when it completes the expansion and inflation, to have such a generally rectangular plate shape as to cover the lower surface 9a of the column cover 9, as shown in FIGS. 69 and 70. The airbag 326 is constructed such that the peripheral wall includes an upper face side column cover side wall portion 327 and a lower face side driver side wall portion 328 opposed to each other in the thickness direction. On the side of the lower end 326b of the column cover side wall portion 327, there are formed through holes 327a for inserting the individual bolts 323b of the inflator 321 thereinto.

In the airbag 326, as shown in FIG. 70, there are arranged a plurality of (or two in the embodiment) tethers 329 which act as connection means for connecting the column cover side wall portion 327 and the driver side wall portion 328 to each other so that the thickness may be kept generally constant to retain the generally plate shape. The tethers 329 (329U and 329D) are formed of a material having a flexibility like the airbag 326. These tethers 329U and 329D are arranged in the upper side and in the lower side, respectively, generally in parallel with the transverse direction of the vehicle.

Moreover, the connection portion Ud of the tether 329U of the upper side (or the rear side of the vehicle) to the driver side wall portion 328 is arranged at the more upstream side of the inflating gas G (or at the side closer to the inflator 321) than an interference portion 326h with the knee K of the driver D in the airbag 326 having completed the expansion and inflation, as shown in FIG. 70. Moreover, this connection portion Ud of the tether 329U with the driver side wall portion 328 is located at the lower side (or the upstream side of the inflating gas G) than a connection portion Uc of the tether 329U to the column cover side wall portion 327.

Figure 71:
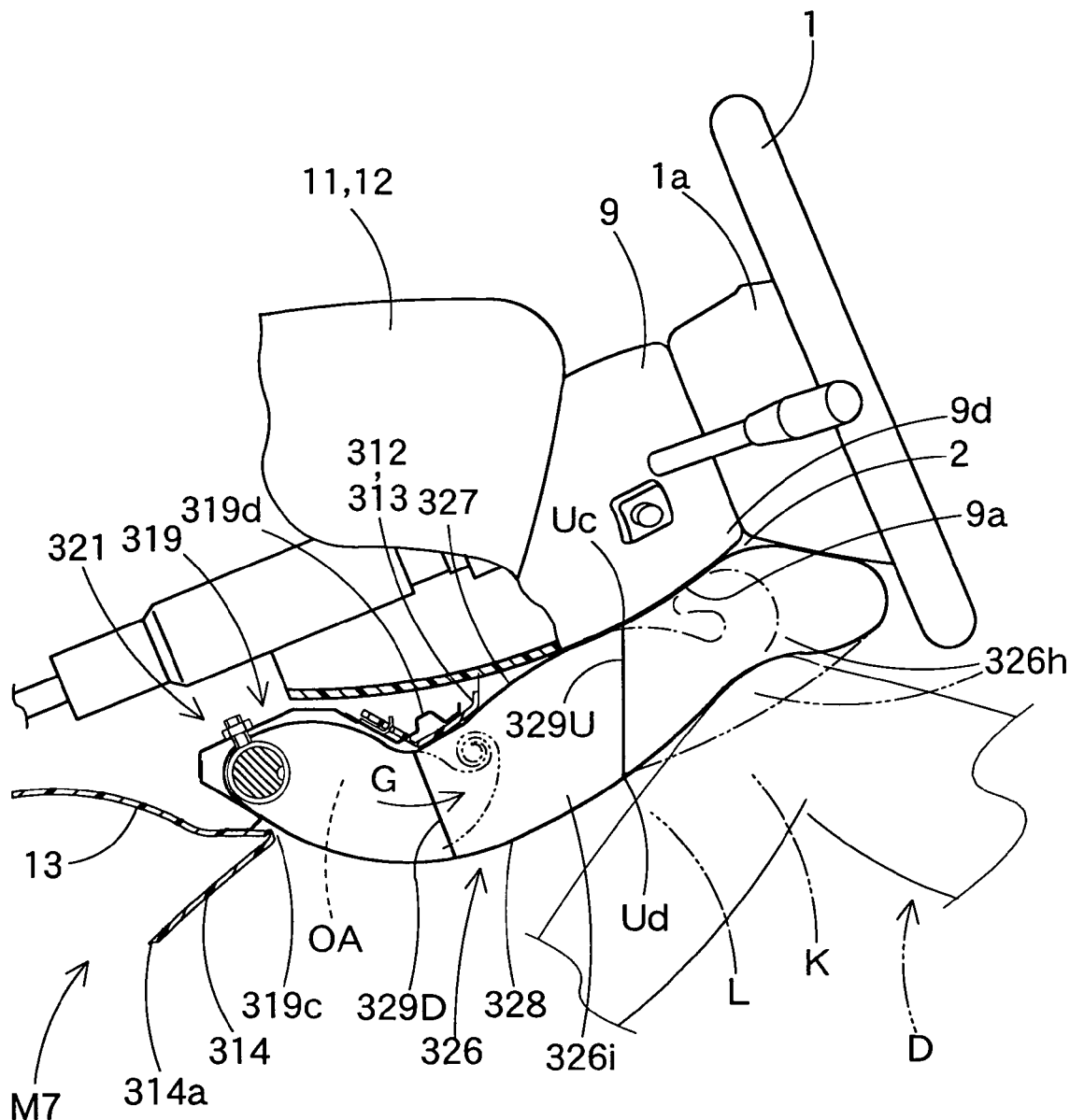
FIG. 71 is a schematic diagram showing the airbag of the sixth embodiment having completed the inflation.

At the expanding and inflating time of the airbag 326, therefore, the interference portion 326h arranged on the upper side of the tether 329U is set such that its thickness can be made as large as possible to exhibit a high cushionability (as referred to FIG. 71). Moreover, this portion 326h arranges, when it enters a recess 2, the driver side wall portion 328 of the interference portion 326h as a smoothly curved lower side before the interference with the knee K. Here, this recess 2 is an upward space from the vicinity of the rear end 9d of the column cover lower surface 9a to a lower cover 1a at the center of the steering wheel 1.

On the other hand, the tether 329D on the lower side is arranged in the airbag 326, as shown in FIG. 71, at a position where the airbag releases itself at the expanding and inflating time from the airbag housing portion (or the case 319)

to a free space on the inner side of the vehicle and at a position near the housing position.

Here, the interference portion 326h of the airbag 326 on the side of the upper end (or front end) 326a becomes thicker than the remaining portions when the expansion and inflation is completed. However, the upper end 326a of the airbag has a small inflow of the inflating gas G in the course of the expansion and inflation. Therefore, the upper end 326a of the airbag goes smoothly into the clearance between the knee K of the driver D and the column cover lower surface 9a before the expansion and inflation is completed.

The tether 329D also plays a role of partitioning the inner space of the airbag 326 into an upstream portion 331 and a downstream portion 332 for the inflating gas G. In other words, the tether 329D partitions the airbag 326 into the upstream portion 331 on the lower side and the downstream side 332 on the upper side.

Moreover, the tether 329D plays a role as the gas flow regulating member. Specifically, the tether 329D has its left and right end portions 329a and 329b arranged apart from the left and right edges 326e and 326g of the airbag 326. Therefore, gas communication holes 333 and 333 are arranged individually between the end portions 329a and 329b and the edges 326e and 326g. Thus, the inflating gas G flows leftward and rightward in the upstream portion 331 by the tether 329D and then flows to the downstream portion 332 through the gas communication holes 333 and 333.

Here will be described how to mount the airbag device M7 of the seventh embodiment on the vehicle. First of all, the airbag 326 is folded up while housing the inflator 321 therein. Here, the individual bolts 323b of the inflator 321 are protruded from the through holes 327a. Not-shown lead wires extending from the inflator body 322 are led out from predetermined not-shown insertion holes of the airbag 326.

The airbag 326 is folded as in FIG. 49 through the longitudinal folding step and the transverse folding step. At the end of the longitudinal folding step, the folded portions of the left and right end portions 326d and 326f are placed on the driver side wall portion 328 at the central portion 326c. At the transverse folding step, the airbag 326 is rolled such that the upper end 326a is rolled to the column cover side wall portion 327.

After folding, the airbag 326 is wrapped in not-shown breakable wrapping film, and the individual bolts 323b are protruded from the wrapping film. Then, the airbag 326 and the inflator 321 are housed in the case 319, and the individual bolts 323b are protruded from the case 319 so that the nuts 324 are fastened on the individual bolts 323b protruded. Thus, there is formed the airbag assembly SA which is made by assembling the airbag 326, the inflator 321 and the case 319 integrally.

Here, the not-shown lead wires extending from the inflator body 322 are led out from the wrapping film and the not-shown through holes of the case 319.

Then, the airbag assembly SA is mounted on the vehicle by connecting the flange portion 319d of the case 319 to the frame portions FC and FR of the body B on both left and right sides of the steering column 3 by means of bolts. Moreover, the not-shown lead wires are connected with the control circuit. When the upper panel 12 and the lower panel 13 of the dashboard 11 are then mounted on the vehicle, the airbag device M7 can be mounted on the vehicle.

If a predetermined electric signal is inputted to the inflator body 322 after the airbag device M7 was mounted on the vehicle, the inflating gas is discharged from the gas discharge ports 322a. Then, the airbag 326 is inflated to break the not-shown wrapping film and to push and open the door portion 314 of the airbag cover 312 so that it is expanded and inflated while rising along the column cover lower surface 9a. As shown in FIG. 71, moreover, the airbag 326 expanded and inflated protects the knee K of the driver D.

This airbag device M7 of the seventh embodiment can achieve the same working-effects as the fourth embodiment. In this seventh embodiment, as shown in FIG. 71, the tethers 329U and 329D as the thickness regulating means are arranged on the more upstream side of the inflating gas G than the interference portion 326h of airbag 326 with the knee K of the driver D at the time of completion of the expansion and inflation. In this construction, at the time of completion of the expansion and inflation, the interference portion 326h of the airbag 326 with the knee K of the driver D can be made thicker than the arrangement positions of the tethers 329U and 329D. Therefore, the airbag 326 having completed the expansion and inflation is enabled to protect the knee K of the driver D effectively by the thickened portion 326h.

Here in the airbag 326 having completed the expansion and inflation, the portion 326i to be arranged in front of the leg L below the knee of the driver D is regulated in its thickness by the tethers 329U and 329D. Therefore, the airbag 326 having completed the expansion and inflation does not press the leg L more than necessary.

In the seventh embodiment, on the other hand, the axial direction of the peripheral wall portion 319a of the case 319 to the side of the opening 319c is oriented obliquely downward to the back, not along the steering column 3 or the column cover lower surface 9a. At the initial stage of the expansion and inflation of the airbag 326, therefore, the rolled portion is liable to protrude obliquely downward from the generally horizontal direction on the rear side of the vehicle.

However, the door portion 314 of the airbag cover 312 is opened downward from the side of the upper end 314a by the push of the airbag 326 being expanded and inflated. Therefore, the airbag 326 to be expanded and inflated is protruded from the upper side (or the rear side of the vehicle) of the open area OA of the door portion 314 at the initial opening time. In other words, the airbag 326 to be expanded and inflated is helped to protrude upward. In the transverse folding step, moreover, the airbag 326 itself is folded to roll the upper end 326a to the side of the column cover side wall portion 327. Therefore, the airbag 326 rises smoothly along the column cover lower surface 9a as it is unrolled in the subsequent expanding and inflating course. In this subsequent expanding and inflating course, therefore, the airbag 326 goes smoothly into the narrow space between the knee K of the driver D and the column cover lower surface 9a.

Figure 72:
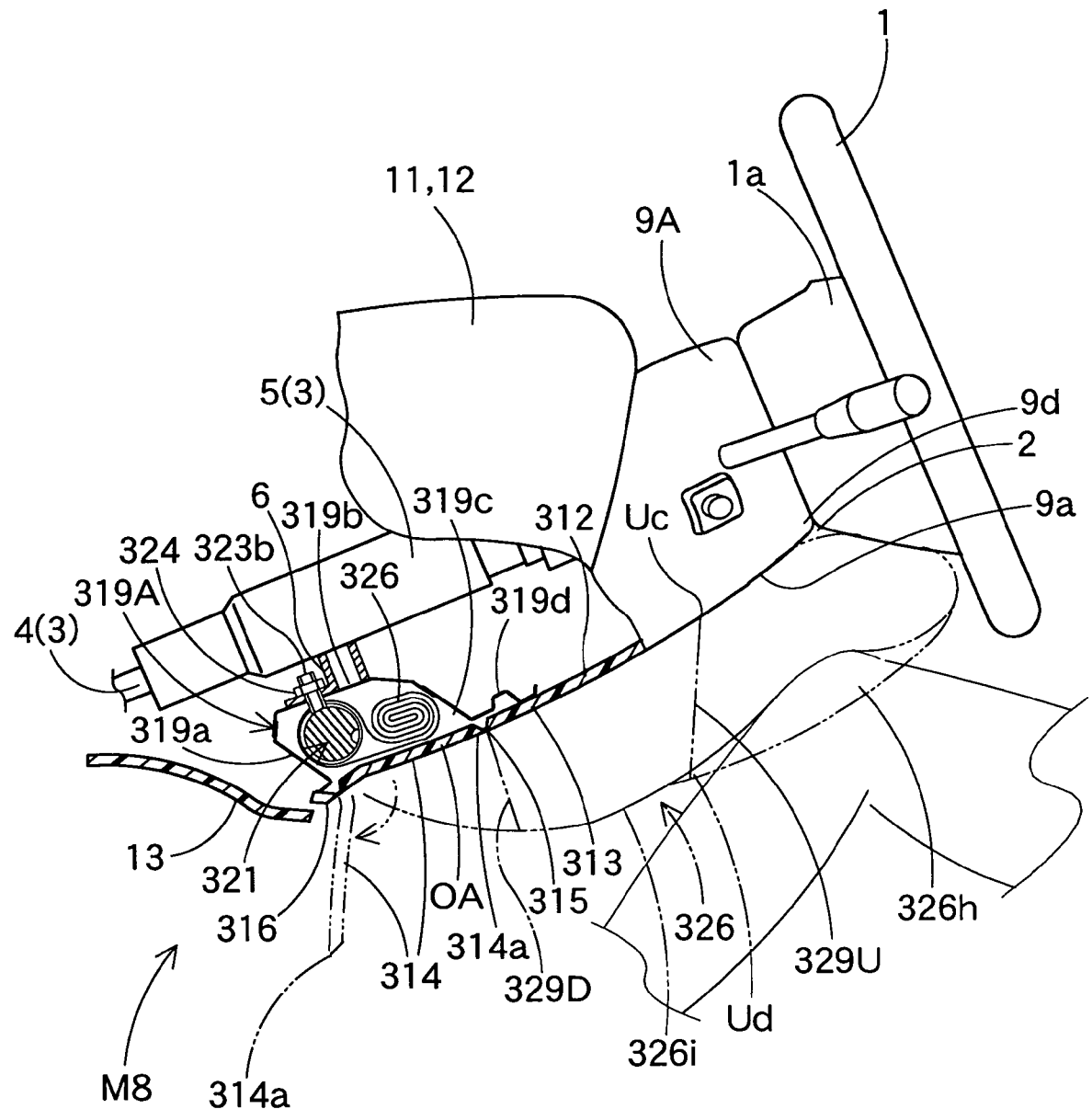
FIG. 72 is a sectional view showing a knee protecting airbag device of an eighth embodiment in use.
Figure 73:
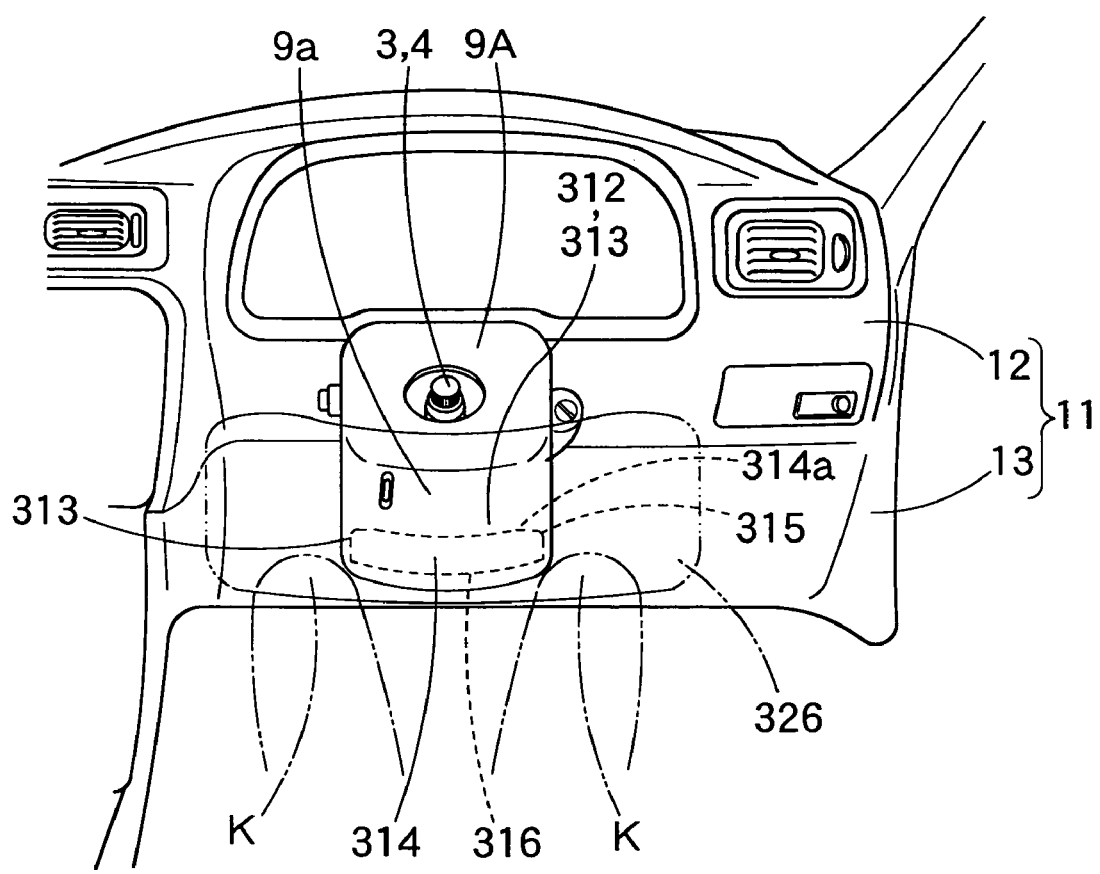
FIG. 73 is a front elevation of the vicinity of a column cover of the eighth embodiment.

The seventh embodiment has been described on the case in which the knee protecting airbag device M7 is arranged in the lower panel 13 below the steering column 3. However, as long as the airbag is expanded and inflated along the column cover lower surface 9a to go smoothly into the clearance between the knee K of the driver D and the column cover lower surface 9a, a knee protecting airbag device M8 may be arranged in the column cover 9A below the steering column 3, as shown in FIGS. 72 and 73.

In this airbag device M8, the airbag cover 312 is formed integrally with the column cover 9A at the lower end side of the column cover 9A. In the airbag cover 312, there is arranged the door portion 314. This door portion 314 has at its periphery the breakable portion 315 having an inverted U-shape, as viewed from inner side, and the hinge portion 316 on the lower end side. Therefore, the door portion 314 is opened downward while breaking the portion 315 and turning its upper end 314a downward when pushed and opened by the airbag 326.

A case 319A is connected to and fixed on an immovable portion of the column tube 5 in the steering column 3, by using the bracket 6 and the bolts 323b and the nuts 324 of the inflator 321.

Here, the inflator 321, the airbag 326 and the airbag folding process are similar to those of the seventh embodiment.

In this eighth embodiment, the same working-effects as those of the seventh embodiment can be obtained when the airbag 326 is expanded and inflated. Moreover, the airbag cover 312 is made integral with the lower cover 9A. Even if the knee protecting airbag device M8 is mounted on the vehicle, therefore, the appearance of the vicinity of the column cover 9A is not deteriorated.

Like the seventh embodiment, moreover, the eighth embodiment is constructed such that the door portion 314 of the airbag cover 312 is opened breaking the portion 315 to be broken arranged at its peripheral edge. Specifically, the door portion 314 of the airbag cover 312 can have an appearance identical to that of the airbag cover body portion (or the general portion) 313 around the door portion 314. Therefore, the airbag cover 312 has an improved appearance design.

Here will be described a knee protecting airbag device M9 of a ninth embodiment with reference to FIGS. 74 to 77. As in the individual embodiments, this airbag device M9 is arranged below the column cover 9 at the lower position of the steering column 3. The airbag device M9 includes the airbag 26, the inflator 21, a case 419 and an airbag cover 412 for covering the case 419 at the vehicle's rear side.

The steering column 3, the column cover 9 and the dashboard 11, and their parts are similar to those of the individual embodiments, and their description will be omitted by designating them the same reference numerals as those of the individual embodiments.

Moreover, the inflator 21, the airbag 26 and their individual parts are similar to those of the first embodiment, and their description will be omitted by designating them by the same reference numerals as those of the first embodiment.

The case 419 is made of a sheet metal and is provided with a peripheral wall portion 419a of a generally rectangular cylinder shape and a bottom wall portion 419b of a generally rectangular shape for closing the vehicular front side of the peripheral wall portion 419a. And, the case 419 is connected to and fixed on an immovable portion of the column tube 5 of the steering column 3, by using the bracket 6. The peripheral wall portion 419a has an opening 419c on the vehicular rear side. As in the first embodiment, the case 419 is so arranged to have the axial direction O of the peripheral wall portion 419a along the column cover lower surface 9a (or along the axial direction of the steering column 3) that the housed airbag 26 may protrude along the lower surface 9a of the column cover 9 when it is protruded from the case 419.

Figure 74:
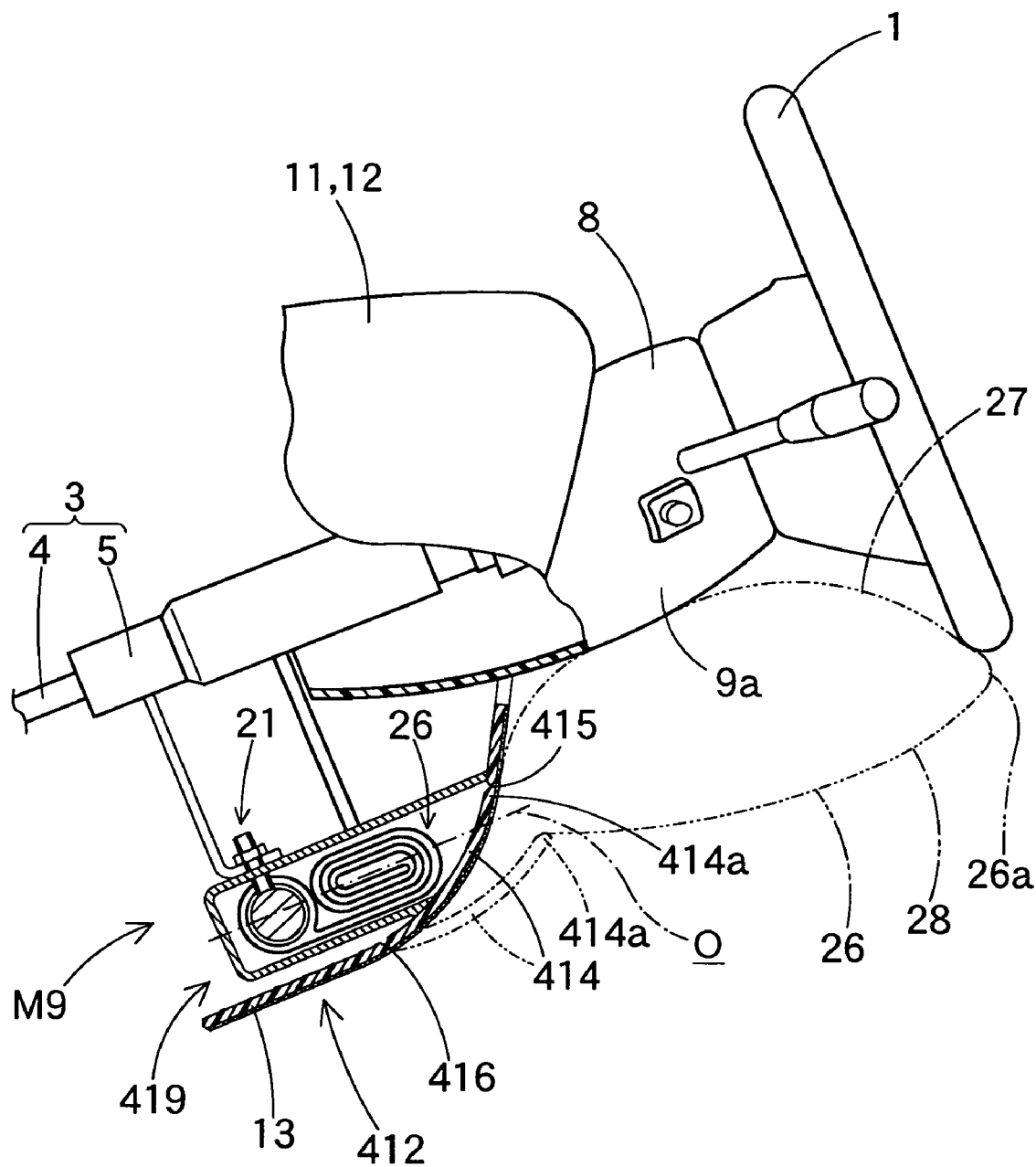
FIG. 74 is a sectional view showing a knee protecting airbag device of a ninth embodiment in use.
Figure 75:
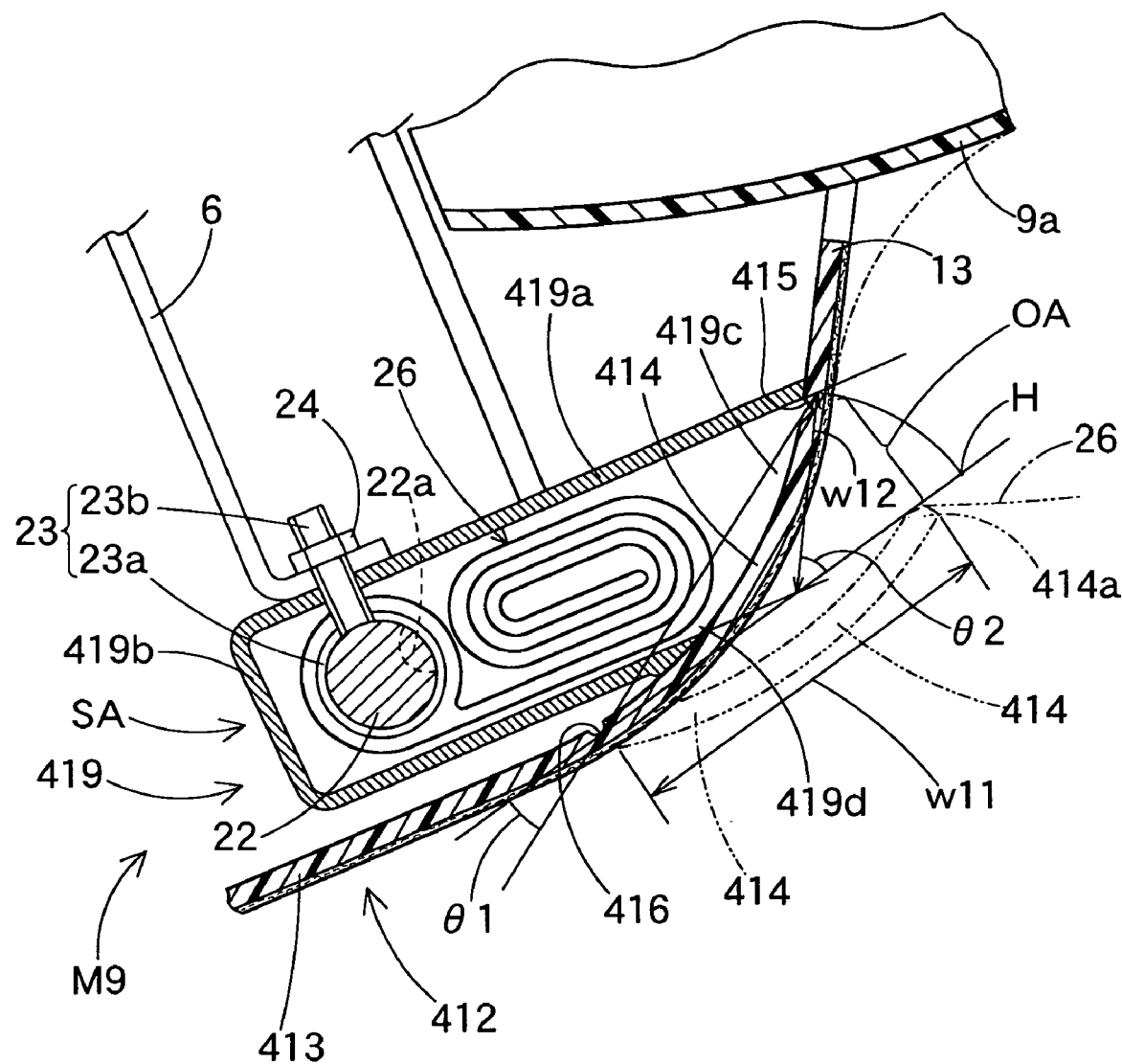
FIG. 75 is an enlarged sectional view of the knee protecting airbag device of the ninth embodiment.

The airbag cover 412 is provided with an airbag cover body portion 413 and a door portion 414. This door portion 414 is made integral with the body portion 413 and is arranged to cover the vehicular rear side of the case 419 near the opening 419c. Moreover, the airbag cover body portion 413 is made integral with the lower panel 13 of the dashboard 11, as shown in FIGS. 74 to 76, and is fixed on the vehicular frame at not-shown positions.

Figure 76:
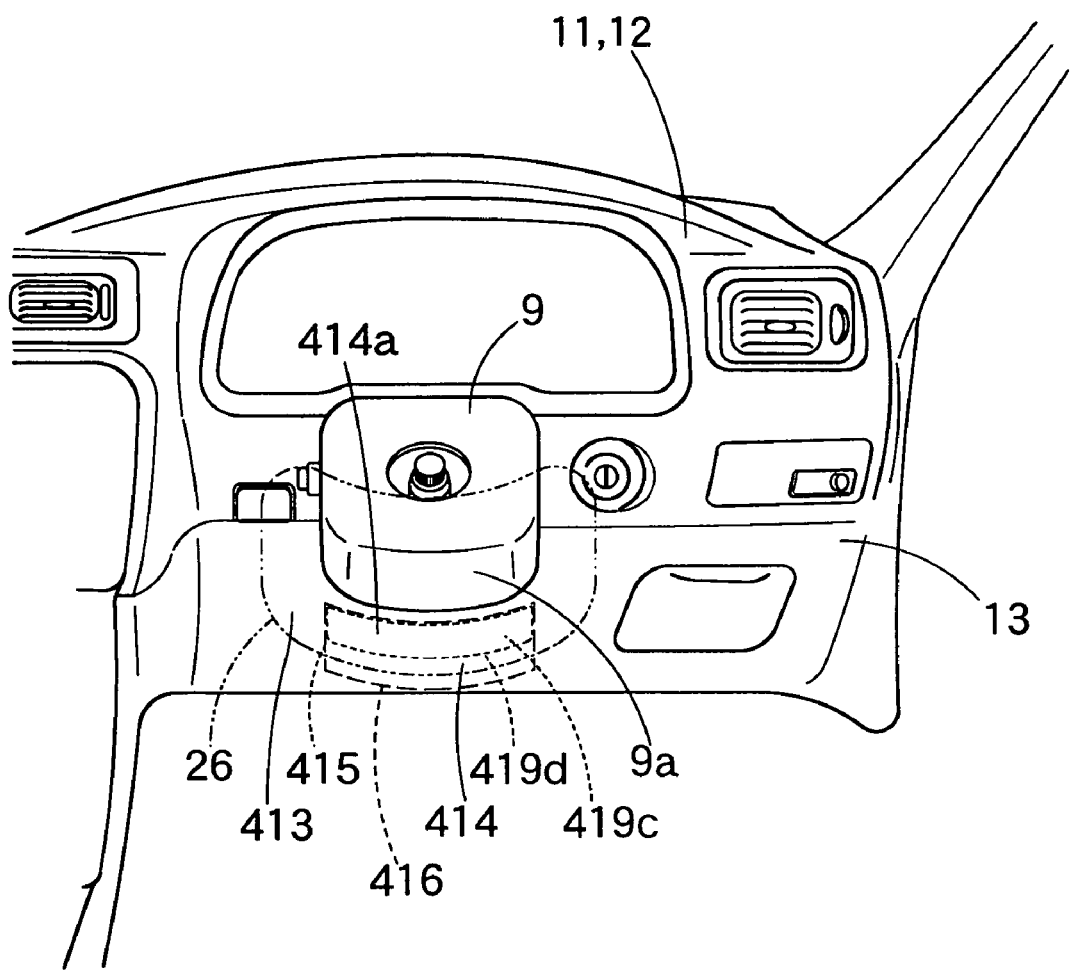
FIG. 76 is a front elevation of the vicinity of a column cover of the ninth embodiment.
Figure 77:
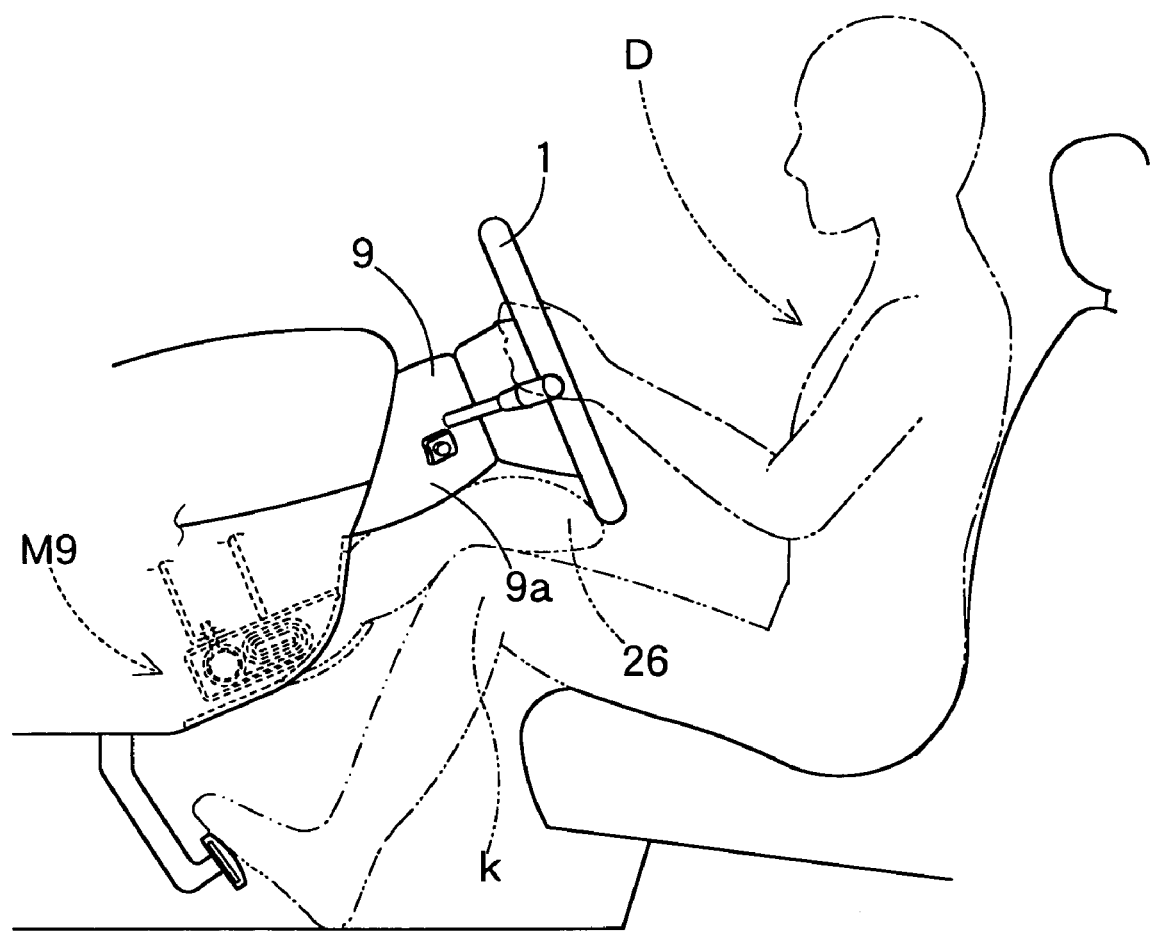
FIG. 77 is a schematic diagram showing the airbag of the ninth embodiment having completed the inflation.

As shown in FIG. 76, the door portion 414 is arranged at the generally vertical center of the airbag cover body portion 413 below the column cover 9 and is formed into a generally rectangular shape, as seen from the vehicular inner side. Around the door portion 414, moreover, there is arranged a thinned portion 415 to be broken, which takes a generally inverted U-shape, as seen from the vehicular inner side. The door portion 414 is so curved and bulged downward from its upper end 414a to the lower side that its longitudinal section may be protruded obliquely downward to the vehicular rear side. Moreover, the door portion 414 is constructed to be opened downward by arranging a thinned hinge portion 416 of an integral hinge on its lower end side. This hinge portion 416 is arranged on the vehicular front side of the upper end 414a of the door portion 414, as shown in FIGS. 74 and 75, and below and on the vehicular front side of the lower edge 419d of the case opening 419c, as shown in FIGS. 74 to 76.

This airbag device M9 is also mounted on the vehicle as in the first embodiment. Specifically, the inflator 21 is packaged in the airbag 26, and this airbag 26 is folded through the predetermined longitudinal folding step and transverse folding step of rolling, as has been described in the fourth embodiment. After this, the airbag 26 is wrapped with the not-shown breakable wrapping film, and the individual bolts 23b are protruded from the wrapping film. By housing the airbag 26 in the case 419 and by protruding the individual bolts 23b from the case 419 to assemble not-shown spring nuts of a sheet metal with the individual bolts 23b protruded, there is formed the airbag assembly SA which is composed of the airbag 26, the inflator 21 and the case 419.

Then, the airbag device M9 can be mounted on the vehicle by fixing the airbag assembly SA on the bracket 6 by means of the nuts 24 and by mounting the dashboard 11 and the airbag cover 412 on the vehicle.

After the airbag device M9 was mounted on the vehicle, the inflating gas is discharged from the gas discharge ports 22a of the inflator body 22. Then, the airbag 26 is inflated to break the not-shown wrapping film and to push and open the door portion 414 of the airbag cover 412, so that it is expanded and inflated along the column cover lower surface 9a (as referred to FIG. 77).

At this time, in the ninth embodiment, the hinge portion 416 on the lower end side of the door portion 414 is positioned on the vehicular front side of the upper end 414a of the door portion 414, as shown in FIG. 75. Especially in the case of the embodiment, the hinge portion 416 is further arranged on the vehicular front side of the lower edge 419d of the case opening 419c. In this construction, as compared with a comparison example, the airbag 26 can be smoothly expanded and inflated while suppressing the backward protrusion of the door portion 414 to be opened when the airbag 26 is expanded and inflated. Here in the comparison example, the door portion is arranged along the generally vertical direction while retaining such an opening area OA of the airbag cover 412 for the airbag 26 to expand and inflate from. That is, the door portion of the comparison is arranged at a position of a dimension line w12. Moreover, the door portion of the comparison example also has the hinge portion arranged at its lower end.

In the door portion 414 of the ninth embodiment, the hinge portion 416 is positioned on the front side, so that the width w11 of the door portion 414 itself in the vertical direction along the door portion 414 is larger than the vertical width w12 of the door portion in the comparison example. As a result, in the door portion 414, its opening angle θ1 is reduced. Here, this opening angle θ1 is the angle at which the door portion 414 opens while retaining the opening area OA of the airbag cover 412 for the airbag 26 to expand and inflate from. On the other hand, the door portion of the comparison example has a hinge portion arranged at a position substantially identical in the vehicular longitudinal direction to that of the upper end of the door portion. In order to retain the opening area OA of the airbag cover 412 necessary for the expansion and inflation of the airbag 26, therefore, the comparison example is required to open the door portion at a large opening angle 62 along the generally horizontal direction. However, the door portion 414 of the ninth embodiment is constructed to arrange the hinge portion 416 of the lower end side on the vehicular front side of the door portion upper end 414*a*. Therefore, the door portion 414 takes the large width size w11 (or the turning radius for the door portion 414 to open) in the vertical direction along the door portion 414. As a result, even with the small opening angle θ1, the door portion 414 can easily retain the enough opening area OA of the airbag cover 412 for the expansion and inflation of the airbag 26. Because of the small opening angle θ1, moreover, the door portion 414 of the embodiment can make the protrusion width at the opening time in the horizontal direction to the vehicular rear side smaller than that of the door portion of the comparison example. More specifically, as compared with the comparison example in which the door portion is arranged in the vertical direction, the construction of the embodiment reduces the horizontal and backward protrusion width of the upper end 414*a* of the door portion 414, i.e., of the end portion (or the rear end portion) 414*a* on the driver side at the opening time. In other words, the door portion 414 of the embodiment suppresses the horizontal and backward protrusion when it is opened. Here in the door portion of the comparison example, the upper end at the opening time is located at the position H of FIG. 75. In the door portion 414 of the embodiment, the upper end 414*a* at the opening time is located on the vehicular front side of the position H.

As a result, in the door portion 414 of the ninth embodiment, the airbag 26 can be smoothly expanded and inflated since the protrusion of the opening door to the vehicular rear side is suppressed at the time of the expansion and inflation.

In the airbag device M9, too, the door portion 414 is opened downward from its upper end 414*a* when pushed and opened by the airbag 26 being expanded and inflated. Therefore, the airbag 26 protrudes from the upper side of the open area OA at the initial opening stage of the door portion 414. As a result, in the airbag device M9, the airbag 26 is smoothly expanded and inflated along the column cover lower surface 9*a* since it is easily protruded upward.

Here in the ninth embodiment, the door portion 414 is so curved and bulged to protrude obliquely downward to the vehicular rear side. However, the door portion 414 should not be limited to the aforementioned shape as long as the hinge portion 416 is positioned on the vehicular front side of the upper end 414*a*. Like the door portion 16A in the airbag device M3 of the third embodiment shown in FIGS. 24 to 26, more specifically, the door portion 16A or 414 may be formed into a generally flat shape and arranged obliquely downward to the vehicular front side as a whole. Alternatively, the door portion 414 may be formed into such a flat plate shape as is vertically extended from the upper end 414*a* to the vicinity of the lower edge 419*d* of the case opening 419*c* and as is sloped obliquely downward toward the vehicular front side from the vicinity of the lower edge 419*d* of the case opening 419*c*.

However, it is preferred from the viewpoint of space economy that the door portion 414 is curved and arranged. If the distance in the vehicular longitudinal direction between the hinge portion 416 and the upper end 414*a* is enlarged, moreover, it is possible to further suppress the protrusion of the upper end 414*a* of the door portion 414 to the vehicular rear side. It is, therefore, preferable that the door portion 414 is so curved and bulged downward as to protrude obliquely downward to the vehicular rear side, as in the ninth embodiment, and that the hinge portion 416 is arranged on the vehicular front side of the lower edge 419*d* of the case opening 419*c*.

Figure 78:
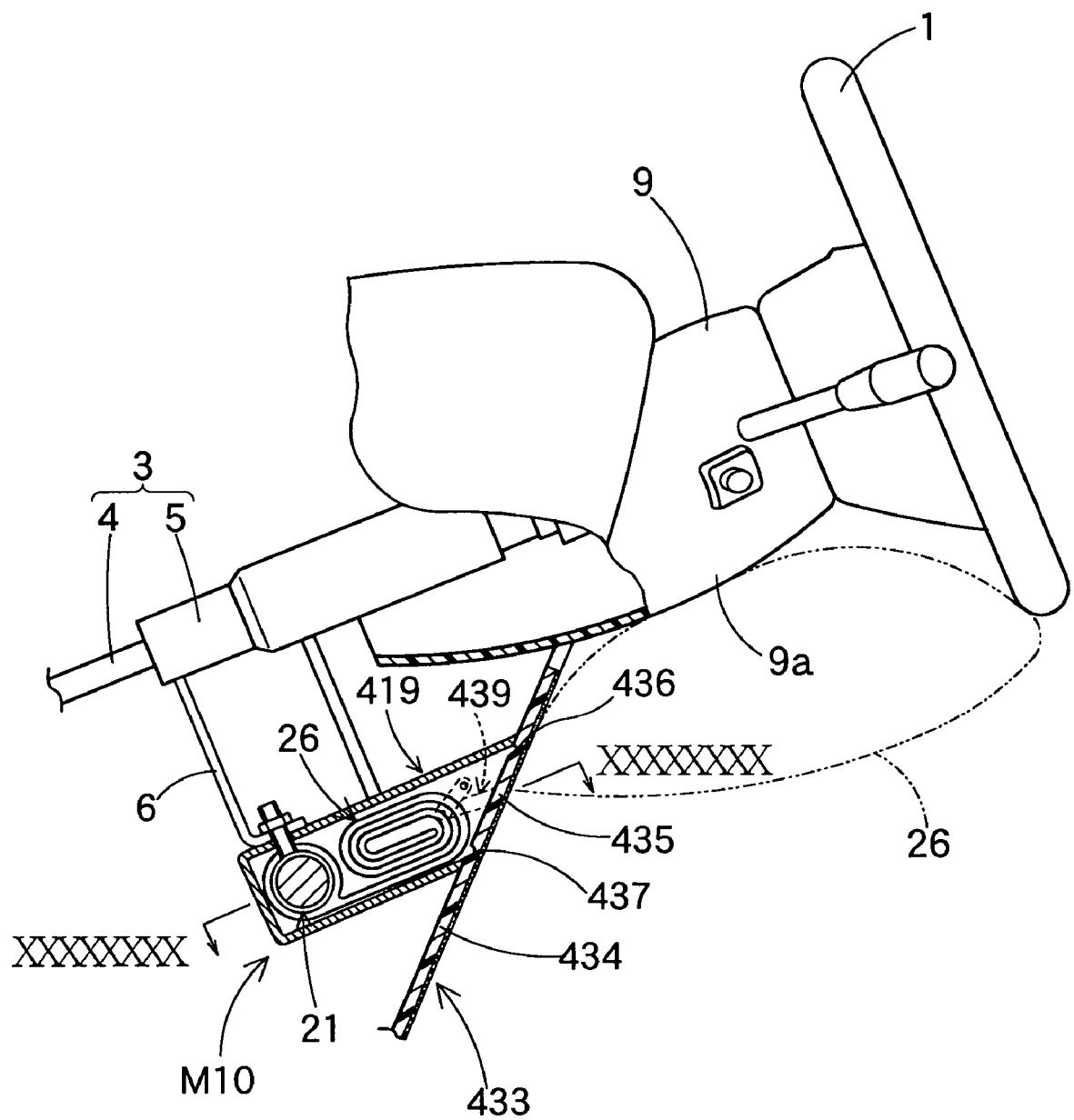
FIG. 78 is a sectional view showing a knee protecting airbag device of a tenth embodiment in use.

Here will be described a knee protecting airbag device M10 of a tenth embodiment with reference to FIGS. 78 to 80. The airbag device M10 has a similar construction in the parts other than an airbag cover 433 to the airbag device M9 of the ninth embodiment, as shown in FIG. 78, and therefore, the description will be omitted by designating the parts the common reference numerals.

As in the ninth embodiment, the airbag cover 433 is provided with an airbag cover body portion 434 and a door portion 435. The door portion 435 is made integral with the airbag cover body portion 434. Moreover, the door portion 435 is so arranged as to cover the vehicular rear side of the case 419 near the opening 419*c*. The airbag cover body portion 434 and the door portion 435 are formed into a flat plate shape, as shown in FIGS. 78 and 79. Moreover, the airbag cover body portion 434 and the door portion 435 are arranged below the column cover 9, sloping down toward the vehicular front side from the upper end side to the lower side. Like the door portion 414 of the ninth embodiment, the door portion 435 is arranged at the generally vertical center of the airbag cover body portion 434 and is formed into a generally rectangular shape, as viewed from the vehicular inner side. As shown in FIG. 80, the door portion 435 has a larger transverse width w14 than the transverse width w13 of the case 419. As in the ninth embodiment, the door portion 435 has such a thinned portion 436 to be broken arranged therearound as has a generally inverted U-shape as viewed from the vehicular inner side. Moreover, the door portion 435 is adapted to be opened downward by arranging a thinned hinge portion 437 on the lower end side.

Near the left and right edges of the door portion 435, moreover, there are arranged link mechanisms 439. Each of these link mechanisms 439 is an angle regulating means for regulating the opening angle of the door portion 435 by connecting the case peripheral wall portion 419*a* and the door portion 435. Each link mechanism 439 is constructed of two long lever links 440A and 440B, as shown in FIGS. 79 and 80. These individual links 440A and 440B are connected by a pin 441 at their end portions 440*b* and 440*a* to each other in a rotatable manner. The end portion 440*a* of each link 440A is pivoted on the left and right outer sides of the case peripheral wall portion 419*b*, and the end portion 440*b* of each link 440B is pivoted on the door portion 435 at the left and right sides of the case 419. When the door portion 435 is closed, each link mechanism 439 has its links 440A and 440B bent in a V-shape, and widens the intersection angle of the links 440A and 440B into a straight shape when the door portion 435 is opened.

Figure 79:
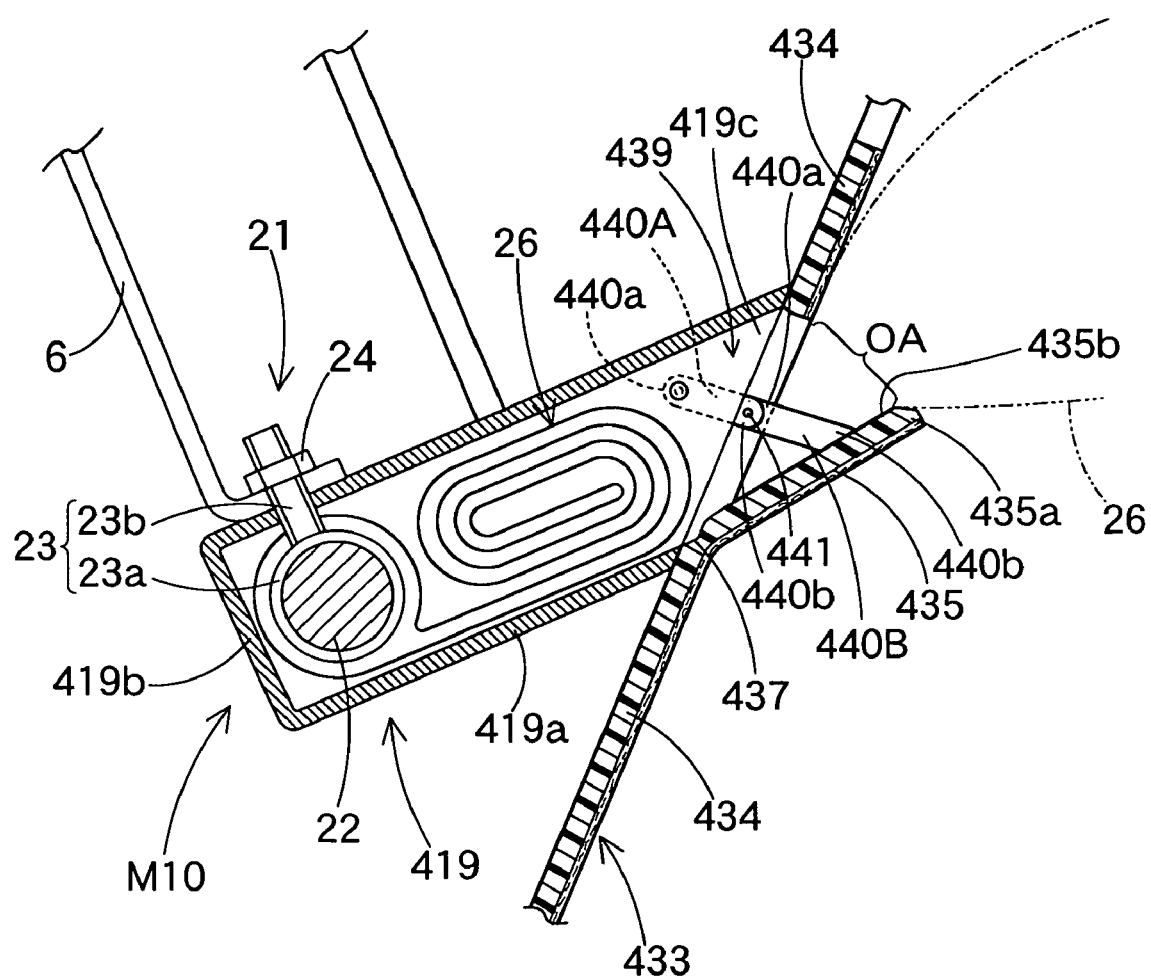
FIG. 79 is an enlarged section of the knee protecting airbag device of the tenth embodiment.
Figure 80:
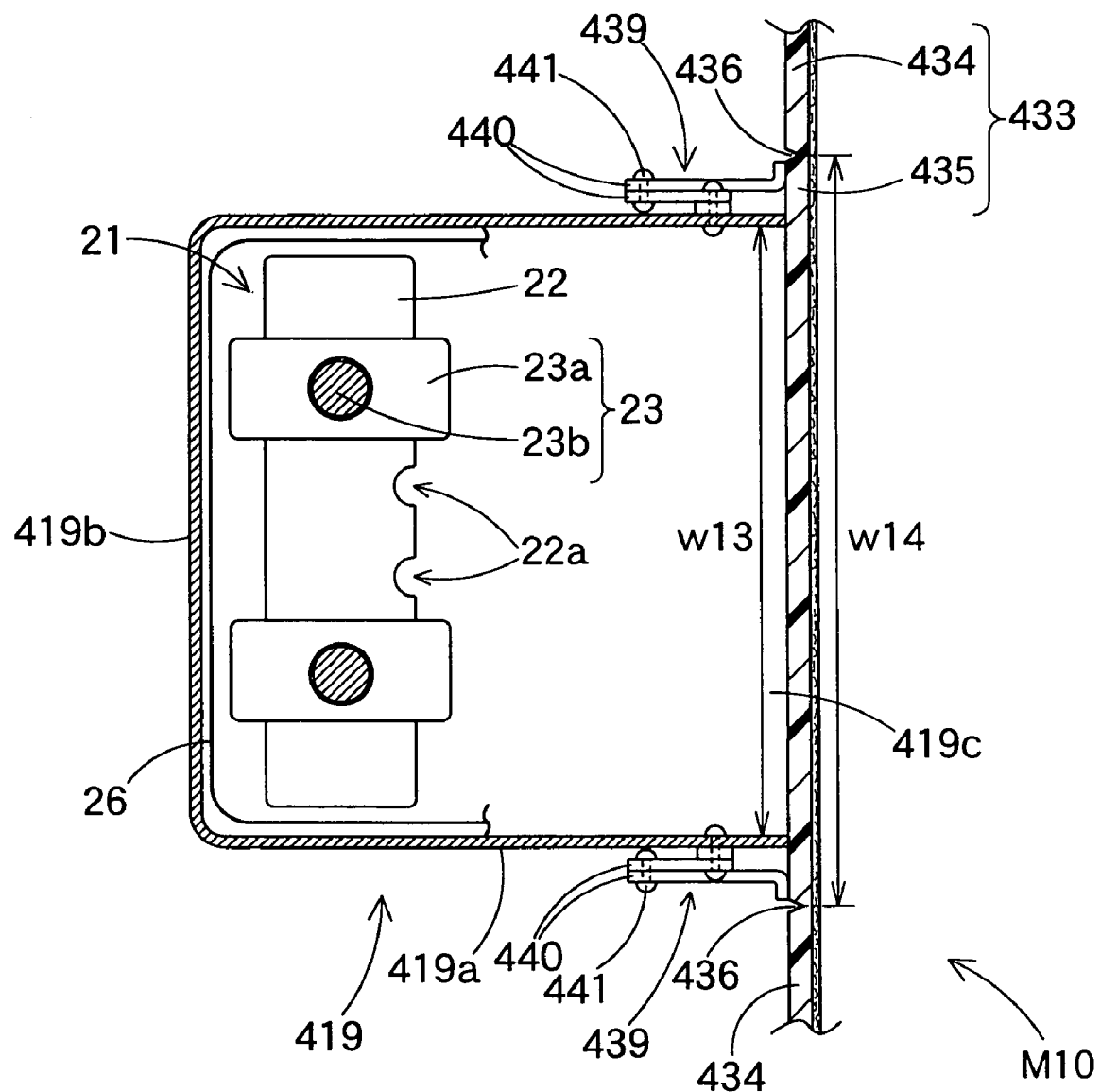
FIG. 80 is a sectional view of a portion XXXXXXXX-XXXXXXXX of FIG. 78.

In this tenth embodiment, as shown in FIG. 79, the opening angle of the door portion 435 is kept at a predetermined value when the links 440A and 440B of each link mechanism 439 become straight. At this predetermined opening angle of the door portion 435, the door portion 435 can retain, when opened, the opening area OA necessary for expanding and inflating the airbag 26. When the individual links 440A and 440B of the link mechanism 439 become straight, the door portion 435 is regulated from being opened wider than that angle.

With this construction, when the door portion 435 is pushed and opened by the airbag 26 being expanded and inflated, it is kept, by the link mechanism 439 as the angle regulating means, at the opening angle for retaining the opening area OA necessary for the expansion and inflation of the airbag 26. By the link mechanism 439, moreover, the door portion 435 is regulated from being opened over that opening angle. Thus, there is regulated the position of the upper end 435a of the door portion 435 at the time of the expansion and inflation of the airbag 26, that is, the end portion (or the rear end portion) 435a on the driver side at the time when the airbag 26 is opened. As a result, the door portion 435 suppresses itself from protruding to the vehicle rear side in the horizontal direction than in the case of using the door portion without the link mechanisms 439. On the other hand, the door portion 435 is regulated by the link mechanisms 439 at the position capable of retaining the opening area OA necessary for the expansion and inflation of the airbag 26. Therefore, the door portion 435 opened allows the airbag 26 to be smoothly expanded and inflated without any interference with the airbag 26.

Therefore, the airbag device M10 attains the same working-effects as the first embodiment and further suppresses the protrusion of the door portion 435, as opened when the airbag 26 is expanded and inflated, to the vehicular rear side, allowing the airbag 26 to be smoothly expanded and inflated.

In the airbag device M10, on the other hand, the door portion 435 is opened from the upper end 435a as in the aforementioned airbag device M9. Therefore, the airbag 26 to be expanded and inflated protrudes from the upper side of the opening area OA at the initial stage of opening of the door portion 435. As a result, in the airbag device M10 like the airbag device M9, the airbag 26 being expanded and inflated is easily protruded upward to be smoothly expanded and inflated along the column cover lower surface 9a. Moreover, since the door portion 435 is regulated in the opening angle by the angle regulating means, the airbag's side face 435b of the door portion 435 guides the airbag 26 to protrude along the column cover lower surface 9a.

Figure 81:
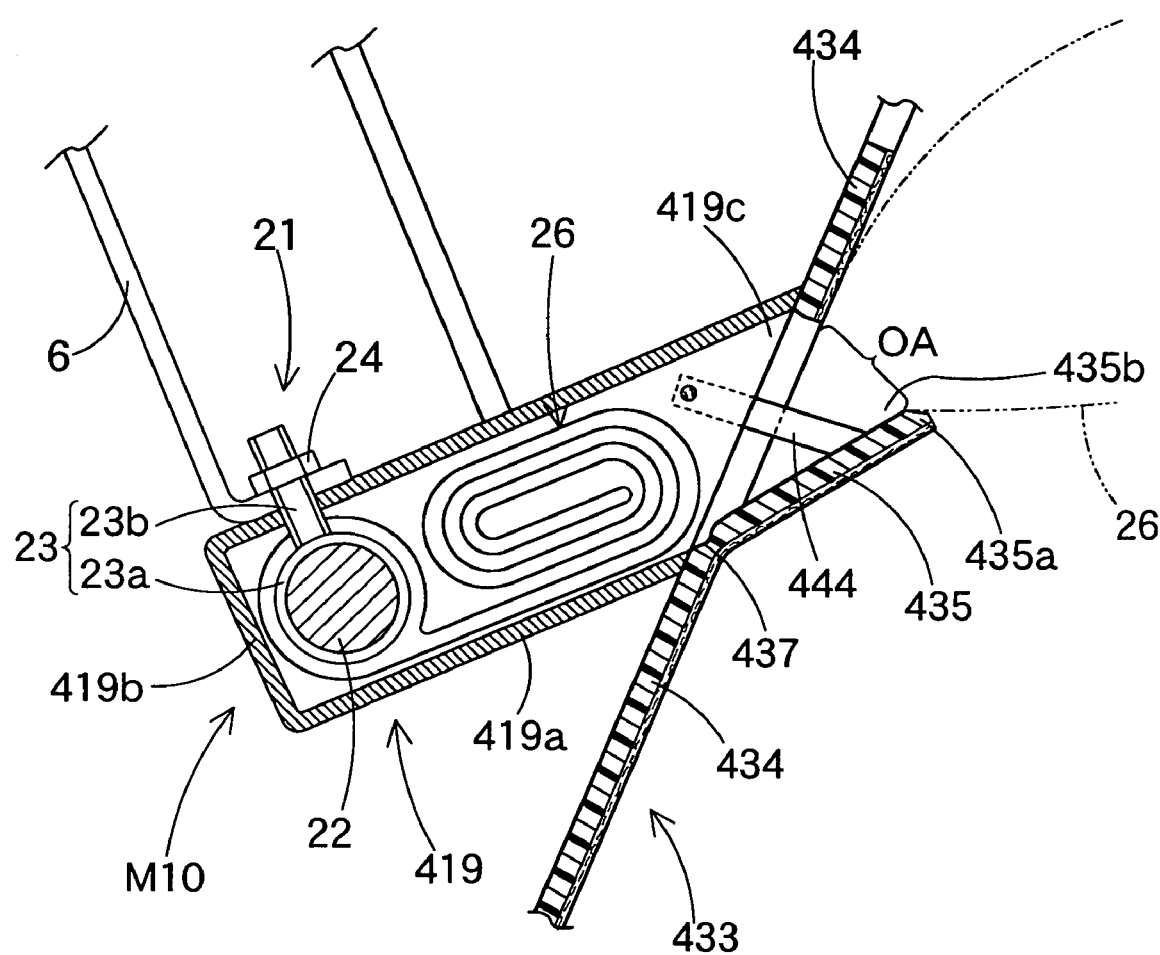
FIG. 81 is an enlarged sectional view of the knee protecting airbag device of the tenth embodiment which employs another angle regulating member.

Here, the angle regulating means should not be limited to the aforementioned link mechanisms 439. For example, a band- or string-shaped tether 444 may be arranged, as shown in FIG. 81. This tether 444 is made of a flexible material such as cloth or the like and connects the case 419 and the door portion 435. This tether 444 is set to have such a length as can keep the opening angle for retaining the opening area OA necessary for the expansion and inflation of the airbag 26 and as can regulate an opening larger than the opening angle. This tether 444 is so housed when the door portion 435 is closed as is warped to the vehicular front side in the vicinity of the left and right edges of the door portion 435.

Here will be described a knee protecting airbag device M11 of an eleventh embodiment with reference to FIGS. 82 and 83. In this airbag device M11, the parts other than an airbag cover 447 are similar to those of the airbag device M9 of the ninth embodiment, as shown in FIG. 82, and their description will be omitted by designating them the common reference numerals.

Figure 82:
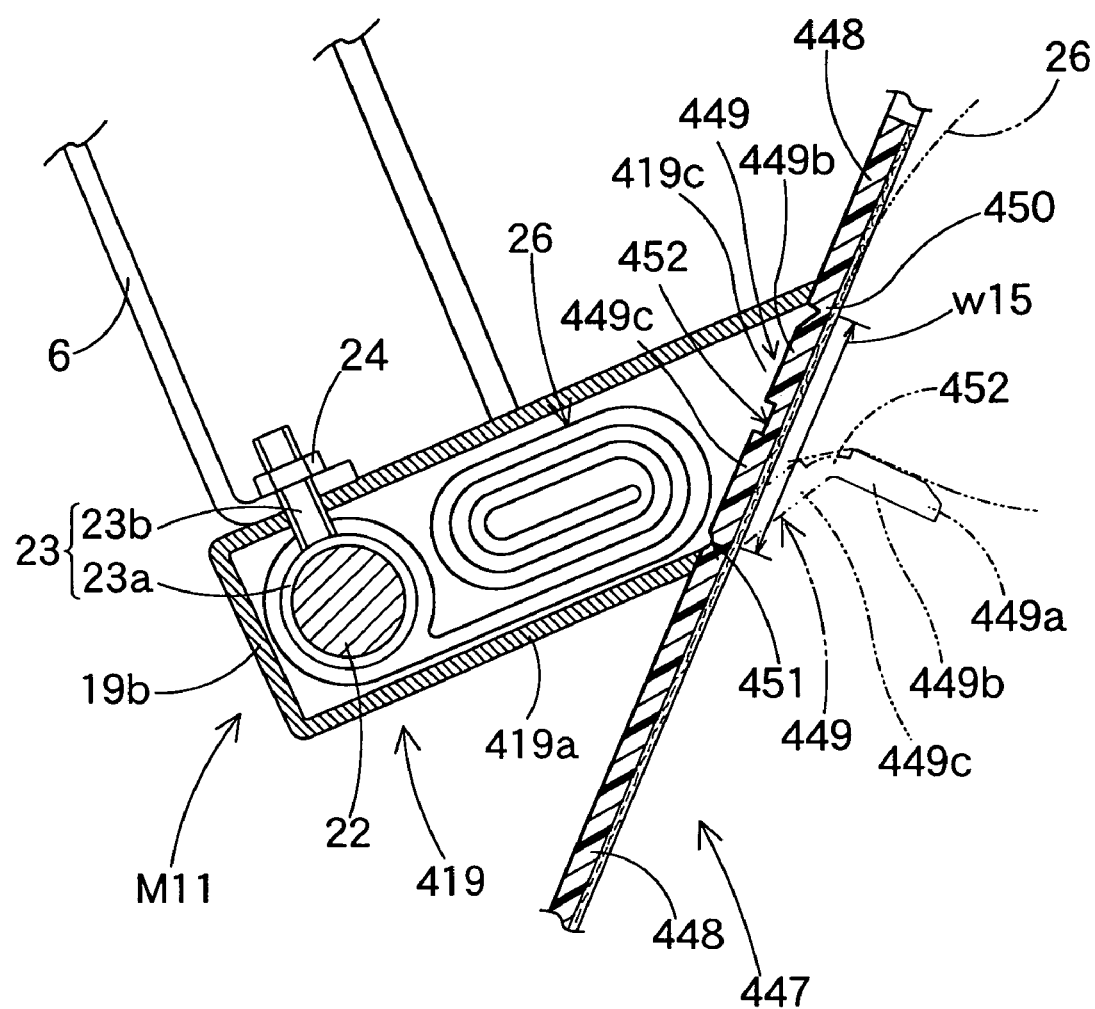
FIG. 82 is an enlarged section of a knee protecting airbag device of an eleventh embodiment.
Figure 83:
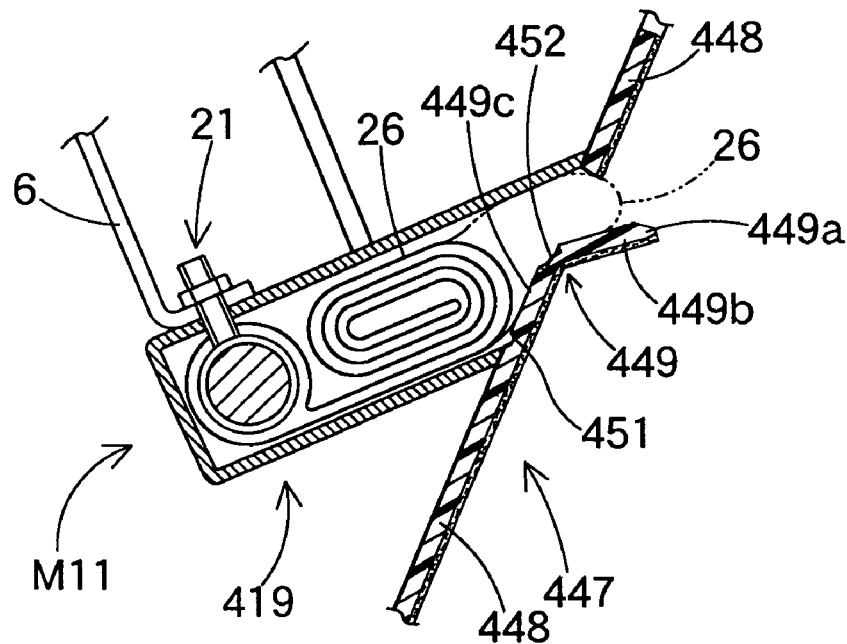
FIG. 83 presents diagrams explaining the airbag of the eleventh embodiment being expanded and inflated.
Figure 83:
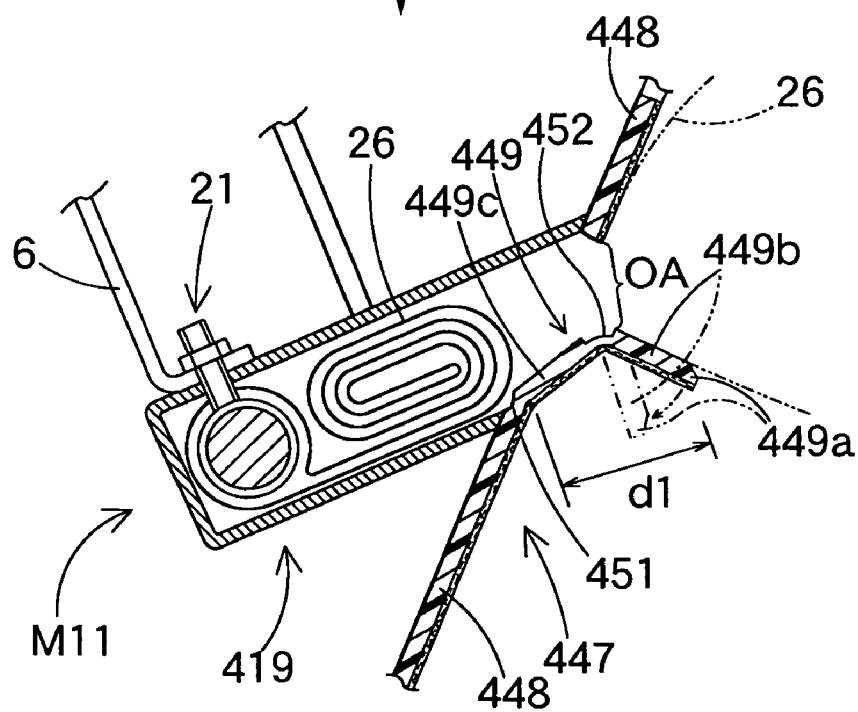

As shown in FIG. 82, the airbag cover 447 is provided, as in the aforementioned airbag devices M9 and M10, with an airbag cover body portion 448 and a door portion 449, as shown in FIG. 82. The door portion 449 is made integral with the airbag cover body portion 448 and is arranged to cover the vehicular rear side of the case 419 near the opening 419c. The airbag cover body portion 448 and the door portion 449 are formed into a flat shape as in the aforementioned airbag device M10 and are inclined on the lower side of the column cover 9 obliquely downward and toward the vehicular front side from the upper end to the lower side.

As in the aforementioned airbag devices M9 and M10, the door portion 449 is arranged at a generally vertical center of the airbag cover body portion 448 and is formed into a generally rectangular shape, as seen from the vehicular inner side. Around the door portion 449, there is arranged a thinned portion 450 to be broken, which has a generally inverted U-shape, as seen from the vehicular inner side. The door portion 449 is constructed to be opened downward by arranging a thinned lower end hinge portion 451 on its lower end side. At a generally vertically middle position between the lower end hinge portion 451 and the door portion upper end 449a, there is arranged an auxiliary hinge portion 452 which is made of a thinned integral hinge. This auxiliary hinge portion 452 is arranged all over the transverse length of the door portion 449. The auxiliary hinge portion 452 enables the upper side portion thereof, i.e., an upper side door portion 449b to be opened downward.

With this construction, the door portion 449 is pushed and opened from its upper end 449a when the portion 450 is broken by the airbag 26 being expanded and inflated. As shown in FIG. 83A, therefore, the auxiliary hinge portion 452 is bent at first, and the upper side door portion 449b arranged on the upper side of the auxiliary hinge portion 452 is then opened downward. Next, the lower end hinge portion 451 is bent, as shown in FIG. 83B, and the lower side door portion 449c arranged on the upper side of the lower end hinge portion 451 is opened so that the door portion 449 is opened in its entirety.

When the door portion 449 is to be fully opened, more specifically, the lower side door portion 449c is opened with the upper side door portion 449b over the auxiliary hinge portion 452 being bent. As compared with the case in which the door portion used has only the lower end hinge portion 451, therefore, the door portion 449 has a smaller substantial turning radius d1 from the lower end hinge portion 451 to the door portion upper end 449a. Here, the turning radius of the door portion having only the lower end hinge portion 451 takes such a vertical width w15 along the door portion itself as is larger than the turning radius d1. As a result, the door portion 449 suppresses the horizontal and backward protrusion of the end portion 449a of the driver side, when it is opened retaining the opening area OA necessary for the expansion and inflation of the airbag 26.

Therefore, in the airbag device M11 of the eleventh embodiment, as in the ninth and tenth embodiments, the protrusion of the door portion 449 opened at the time of the expansion and inflation of the airbag 26 to the vehicular rear side is suppressed to expand and inflate the airbag 26 smoothly.

In the airbag device M11 like the aforementioned airbag devices M9 and M10, the door portion 449 is opened downward. Therefore, the airbag 26 being expanded and inflated is protruded from the upper side of the opening area OA at the initial opening stage of the door portion 449. As a result, in the airbag device M11 like the airbag devices M9 and M10, the airbag 26 being expanded and inflated is easily protruded upward to be expanded and inflated smoothly along the column cover lower surface 9a.

Moreover, the airbag device M11 can attain the following working-effects, if the bending strength of the auxiliary hinge portion 452 of the integral hinge is set to a low level. When the airbag 26 is expanded and inflated, more specifically, the end portion 449a of the door portion 449 is pushed by the knee of the driver, as indicated by double-dotted lines in FIG. 83B, even if the end portion 449a interferes with the knee of the driver. Therefore, the door portion 449 is warped to the vehicular front side by the auxiliary hinge portion 452. Therefore, the airbag device M11 can protect the knee of the driver more properly.

Here, the airbag device M11 is provided with one auxiliary hinge portion 452. However, it is arbitrary to arrange two or more auxiliary hinge portions 452. Moreover, the thickness of the portion to be broken may be so adequately changed that the door portion 449 may be easily opened from the upper end 449a. Specifically, the portion to be broken arranged on the left and right sides of the upper side door portion 449b is made thinner than the portion to be broken arranged on the left and right sides of the lower side door portion 449c. Moreover, the portion to be broken arranged near the upper end 449a of the upper side door portion 449b, is made even thinner than the portion to be broken arranged on the left and right sides of the upper side door portion 449b. With this construction, the portion to be broken, as arranged on the more upper side, can be broken the more easily. As a result, the door portion 449 is smoothly opened from the side of the upper end 449a when it is pushed by the airbag 26 being expanded and inflated.

Figure 84:
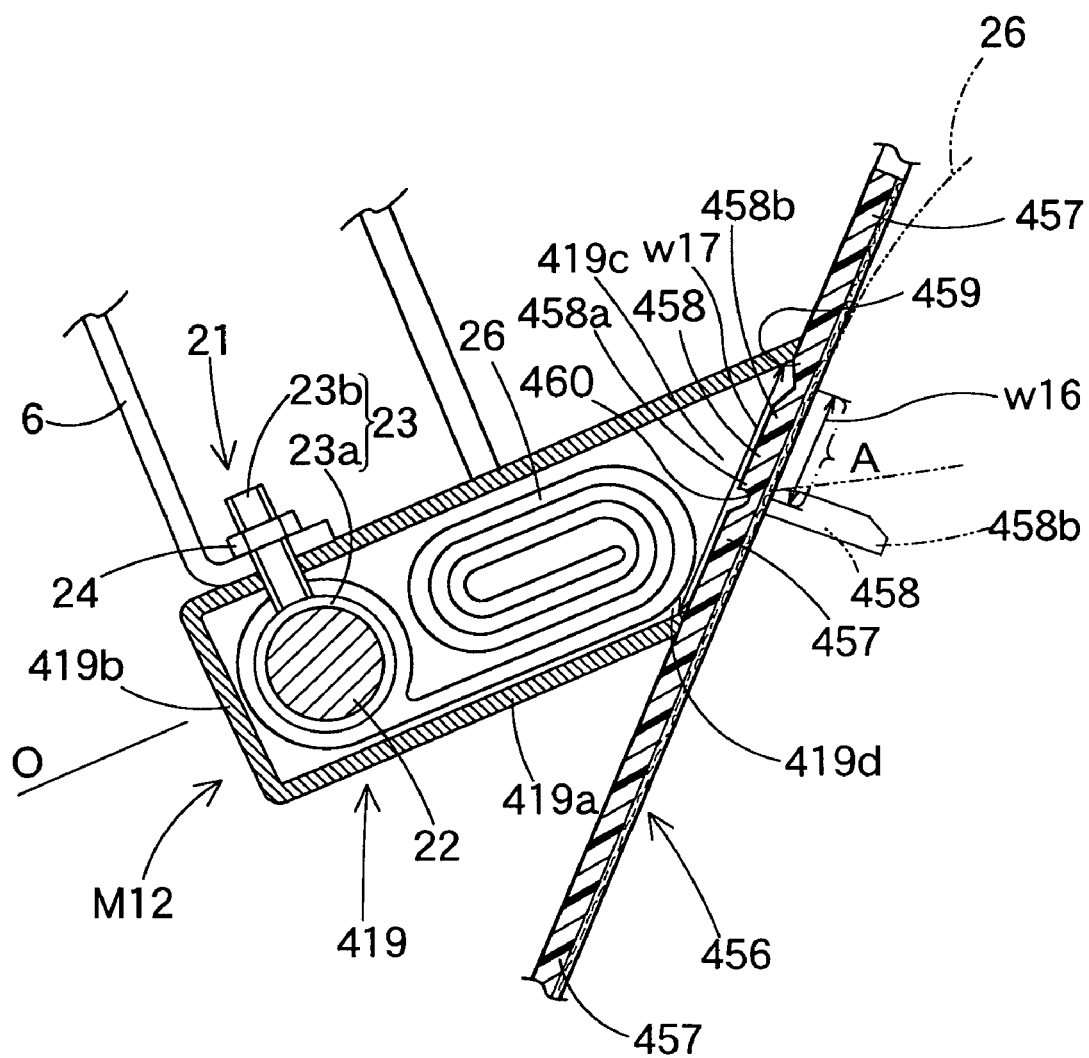
FIG. 84 is an enlarged section of a knee protecting airbag device of a twelfth embodiment.

Here will be described a knee protecting airbag device M12 of a twelfth embodiment with reference to FIG. 84. In this airbag device M12, the parts other than an airbag cover 456 are similar to those of the airbag device M9 of the ninth embodiment, and their description will be omitted by designating them the common reference numerals.

As in the aforementioned airbag devices M9, M10 and M11, the airbag cover 456 is provided with an airbag cover body portion 457 and a door portion 458. This door portion 458 is made integral with the airbag cover body portion 457 and is arranged to cover the vehicular rear side of the case 419 at the vicinity of the opening 419c. As in the aforementioned airbag devices M10 and M11, the airbag cover body portion 457 and the door portion 458 are formed into a flat plate shape and are sloped down toward the vehicular front side on the lower side of the column cover 9 from the upper end to the lower side. As in the aforementioned airbag devices M9, M10 and M11, the door portion 458 is arranged at a generally vertical center of the airbag cover body portion 457 and is formed into a generally rectangular shape, as seen from the vehicular inner side.

Moreover, the door portion 458 has the lower end 458a arranged at an upper side of the lower edge 419d of the case opening 419c. Specifically, the vertical width w16 of the door portion 458 itself along the door portion 458 is made smaller than the vertical width w17 of the case opening 419c along itself. Around the door portion 458, on the other hand, there is arranged a thinned portion 459 to be broken, which has a generally inverted U-shape as seen from the vehicular inner side, as in the aforementioned airbag devices M9, M10 and M11. Moreover, the door portion 458 is set to be opened downward by arranging a thinned hinge portion 460 on the side of the lower end 458a. Moreover, the lower side of the case opening 419c is covered with the airbag cover body portion 457.

With the airbag cover 456 thus constructed, the vertical width w16 of the door portion 458 along itself is made smaller than the vertical width w17 of the opening 419c of the case 419 along itself. As compared with the case in which there is arranged the door portion having a generally equal vertical width to the vertical width of the case opening 419c, therefore, the door portion 458 can suppress the protrusion of its upper end 458b at the inflation time of the airbag 26 or the end portion 458b on the driver side at the opening time to the vehicular rear side in the horizontal direction.

In the twelfth embodiment, moreover, the lower end 458a of the door portion 458 is arranged on the upper side of the lower edge 419d of the case opening 419c, and the lower side of the case opening 419c is covered with the airbag cover body portion 457. In this construction, however, the axial direction O of the case peripheral wall portion 419a is arranged along the axial direction of the steering column 3, and the airbag 26 is expanded and inflated below the column cover 9 from the case 419 along the lower surface 9a of the column cover 9 upward to the vehicular rear side. Therefore, the airbag 26 being expanded and inflated passes over the upper side of the case opening 419c, even if the lower side of the case opening 419c is covered with the airbag cover body portion 457. Moreover, the airbag 26 is protruded from the case 419 and is smoothly expanded and inflated while minimizing the interference with the airbag cover body portion 457.

In the airbag device M12 of the twelfth embodiment as in the ninth to eleventh embodiments, therefore, the backward protrusion of the door portion 458 being opened at the expansion and inflation time of the airbag 26 is suppressed to expand and inflate the airbag 26 smoothly.

Figure 85:
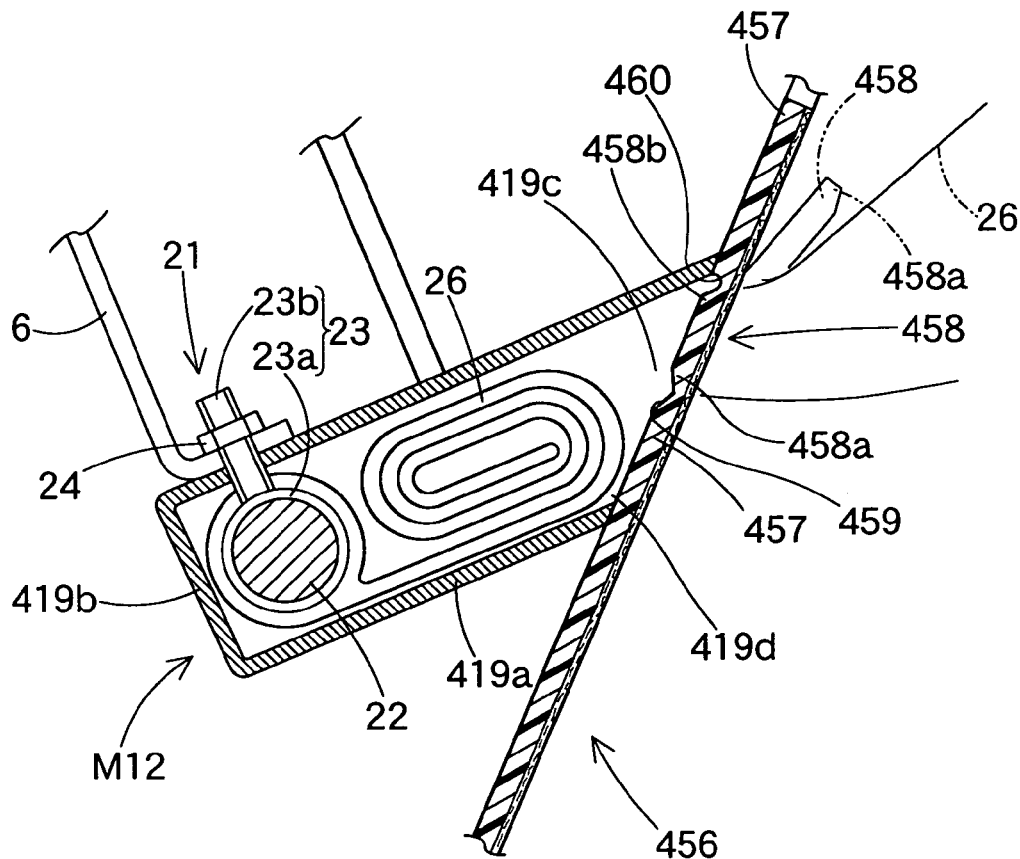
FIG. 85 is an enlarged sectional view of the knee protecting airbag device in the twelfth embodiment, in which the position of a hinge portion is changed.

Here in the airbag device M12, the door portion 458 is set to be opened downward by arranging the hinge portion 460 on the side of the lower end 458a. However, the opening direction of the door portion 458 should not be limited thereto. As shown in FIG. 85, for example, the door portion 458 may be constructed to be opened upward by arranging the hinge portion 460 on the side of the upper end 458b of the door portion 458.

Figure 86:
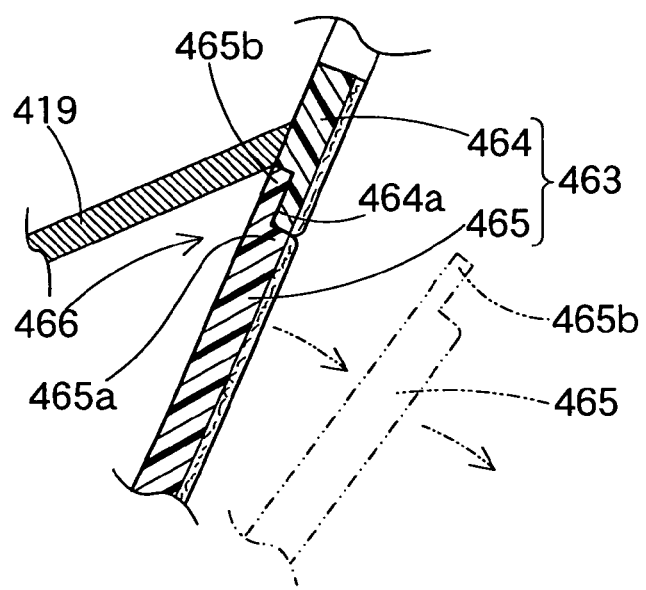
FIG. 86 is a sectional view showing another fixing means for fixing a door portion on the body portion of an airbag cover.
Figure 87:
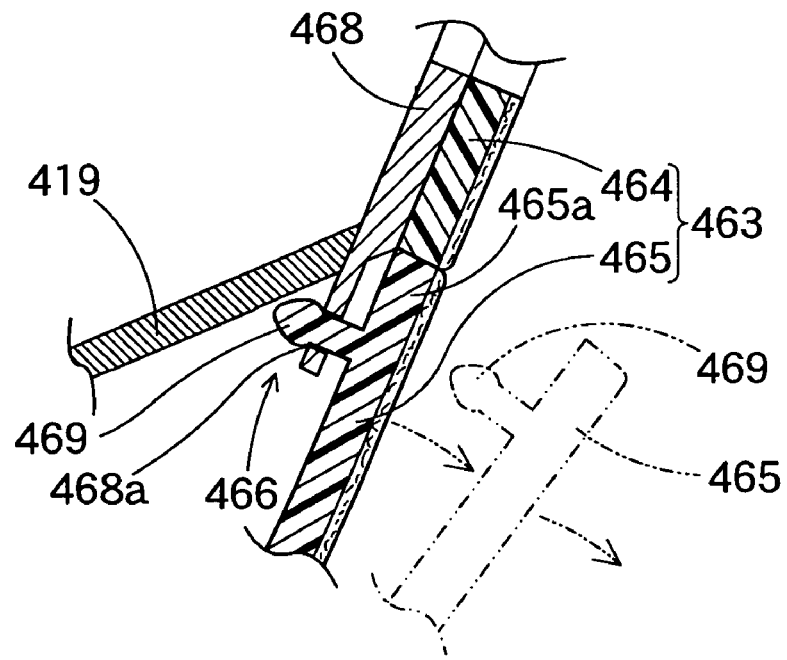
FIG. 87 is a sectional view showing still another fixing means for fixing the door portion on the body portion of the airbag cover.
Figure 88:
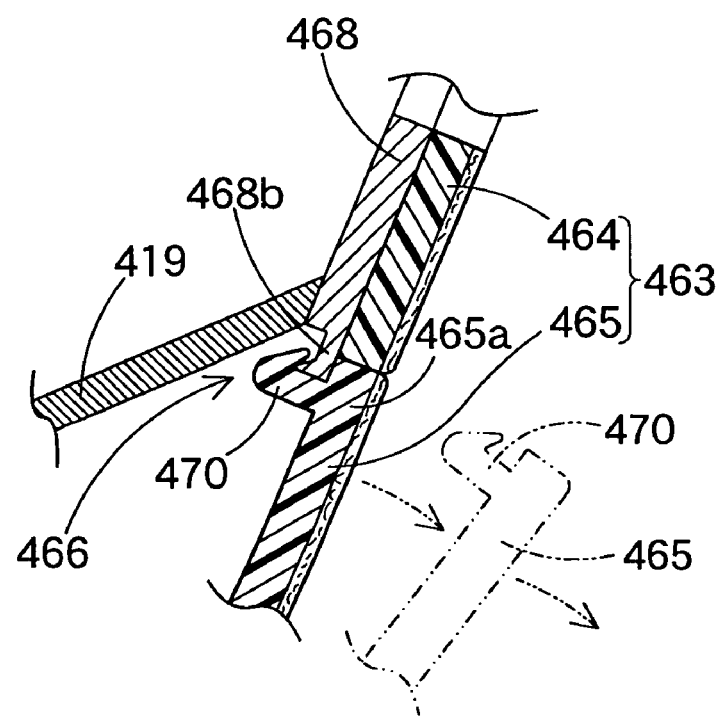
FIG. 88 is a sectional view showing still another fixing means for fixing the door portion on the body portion of the airbag cover.

In the ninth, tenth, eleventh and twelfth embodiments, on the other hand, the airbag cover body portions 413, 434, 448 and 457 and the door portions 414, 435, 449 and 458 are formed integrally. As shown in FIGS. 86 to 88, however, an airbag cover body portion 464 and a door portion 465 may be formed separately.

In the air bag cover 463 shown in FIGS. 86 to 88, for example, one end of the door portion 465 and the airbag cover body portion 464 are connected to each other by means of a (not shown) hinge.

At the end portion 465a (or the upper end portion in the shown embodiment) of the door portion 465 spaced vertically from the hinge, moreover, there is arranged an engagement means 466. This engagement means 466 engages with the airbag cover body portion 464 to keep the closed state of the door portion 465.

The engagement means 466 shown in FIG. 86 is composed of a concave 464a and a convex 465b. The concave 464a is formed at the end portion of the airbag cover body portion 464 on the side of the case 419. The convex 465b is so formed on the end portion 465a of the door portion 465 as to be fitted in the concave 464a.

The engagement means 466 shown in FIG. 87 is composed of an engagement plate 468 and an engagement projection 469. This engagement projection 469 is so arranged near the end portion 465a of the door portion 465 as to project toward the case 419. The engagement plate 468 is arranged in the airbag cover body portion 464 on the side of the case 419 and is provided with an engagement hole 468a for engaging with the engagement projection 469.

The engagement means 466 shown in FIG. 88 is composed of the engagement plate 468 and a retaining pawl 470. This retaining pawl 470 is arranged near the end portion 465a of the door portion 465 and projects to the case 419 to be retained by a receiving portion 468b of the engagement plate 468.

In any of these cases, the engagement means 466 is easily released from its engaging state when the airbag 26 is expanded and inflated to push and open the door portion 465.

On the other hand, the airbag covers 412, 433, 447 and 456 may be made integral with the lower panel 13 or the lower cover 9A of the dashboard 11, or may be formed separate of the lower panel 13 or the lower cover 9A. This construction applies not only to the case in which the airbag cover body portion and the door portion are made integral but also to the case in which the same are made separate. Here, the integral structure can improve the appearance design.

Moreover, the construction may be modified such that the angle regulating member (e.g., the link mechanism 439 or the tether 444) arranged in the airbag device M10 is arranged in the airbag devices M9, M11 and M12. Another construction may be made such that an auxiliary hinge portion is arranged in the door portion 414 of the airbag device M9 as in the airbag device M11.

Figure 89:
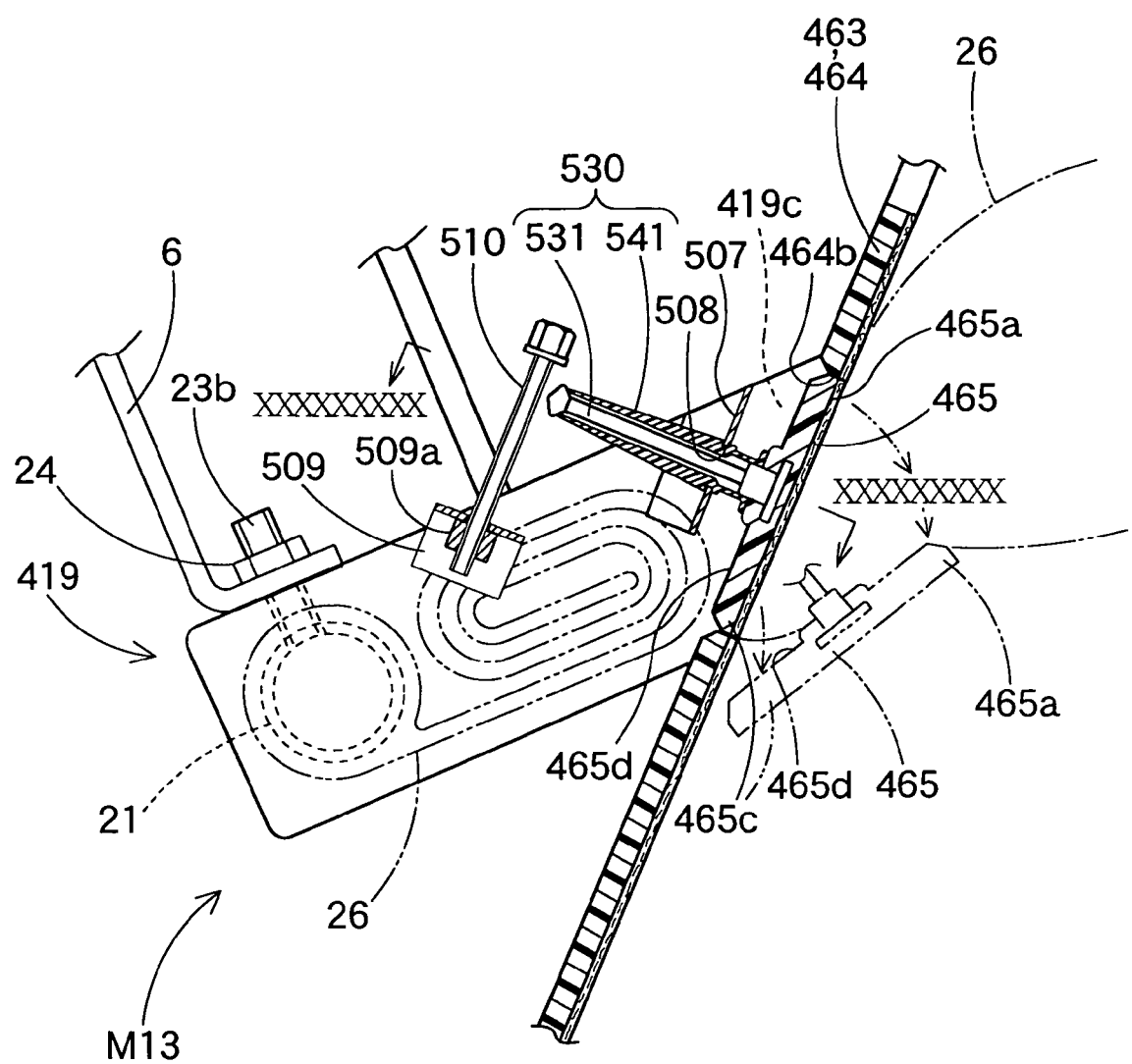
FIG. 89 is a sectional view of a knee protecting airbag device of a thirteenth embodiment.
Figure 90:
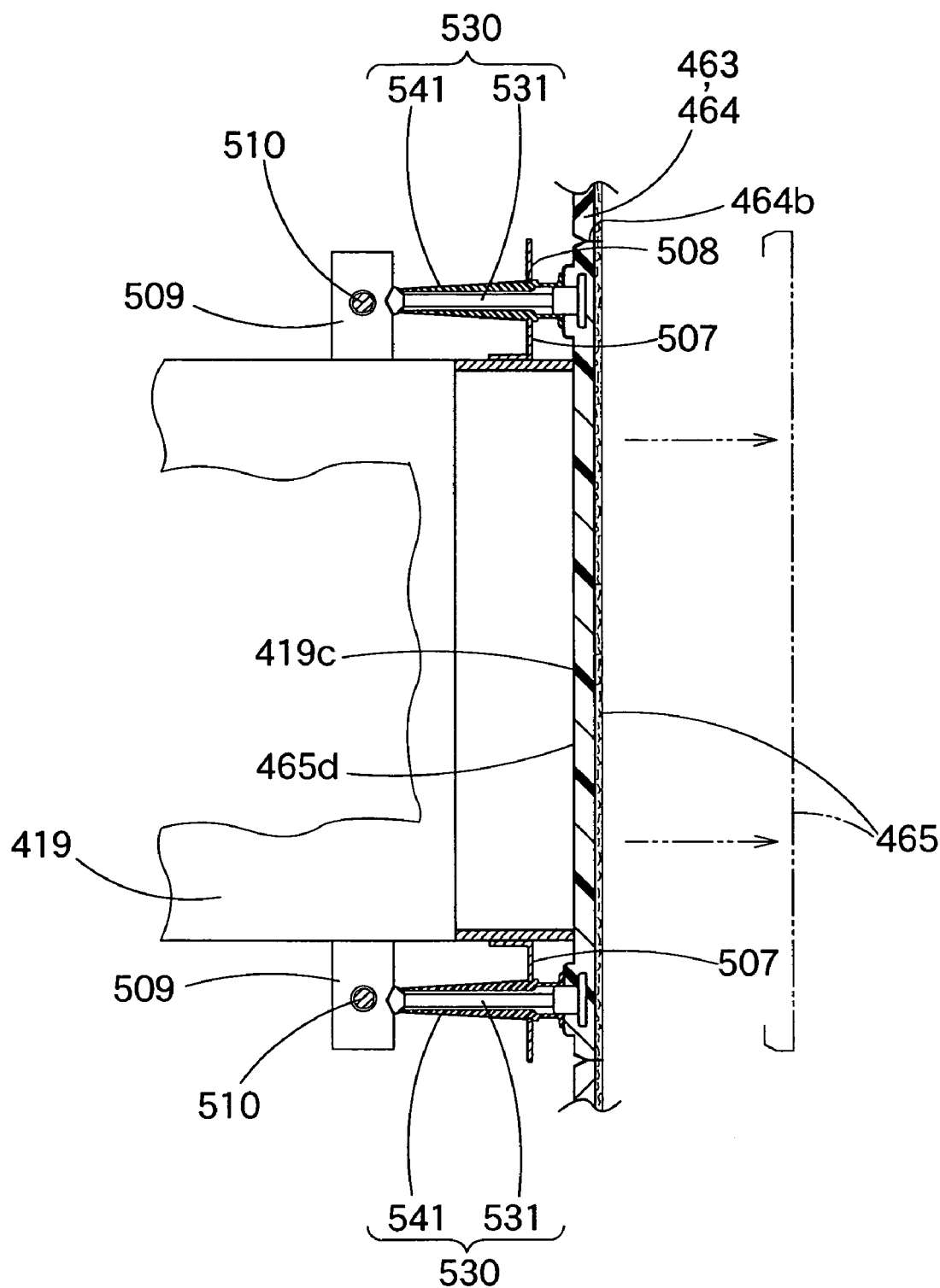
FIG. 90 is a sectional view of a portion XXXXXXXXX-XXXXXXXXX of FIG. 89.
Figure 91:
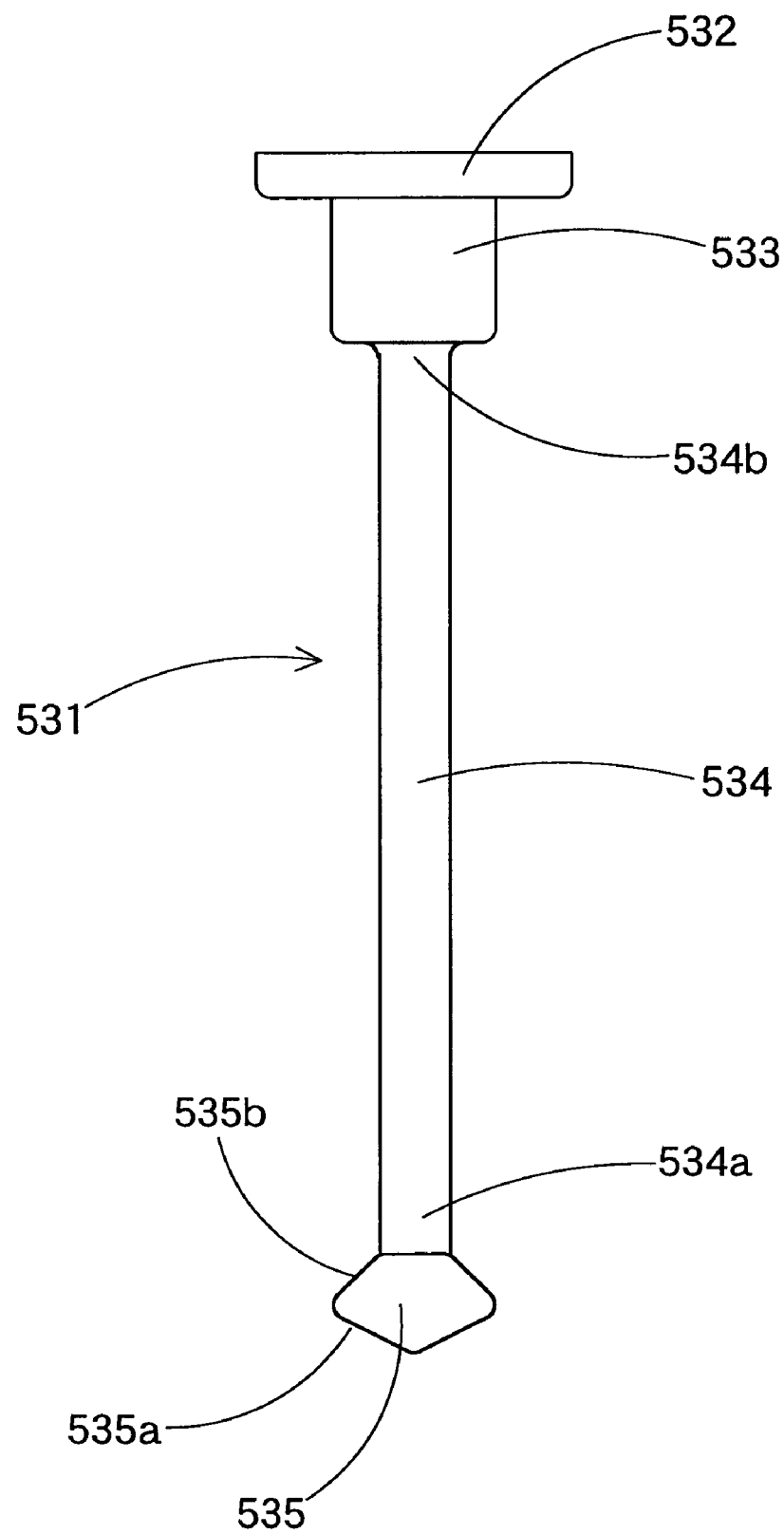
FIG. 91 is an enlarged front elevation showing a retaining core portion of a clip in the thirteenth embodiment.
Figure 92:
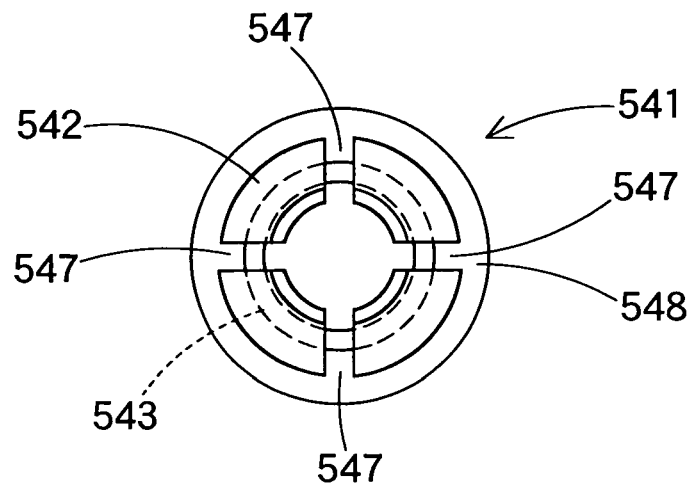
FIG. 92 is an enlarged top plan view showing a cap of the clip of the thirteenth embodiment.
Figure 93:
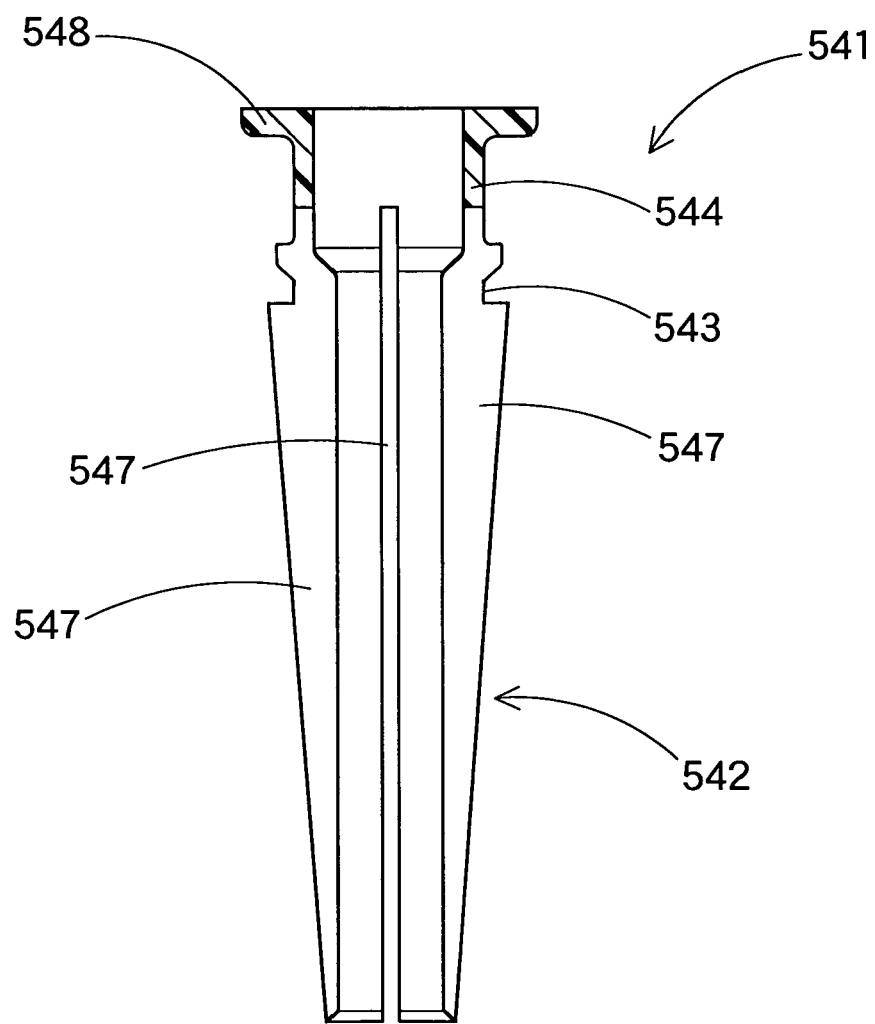
FIG. 93 is an enlarged longitudinal section showing the cap of the clip of the thirteenth embodiment.
Figure 94:
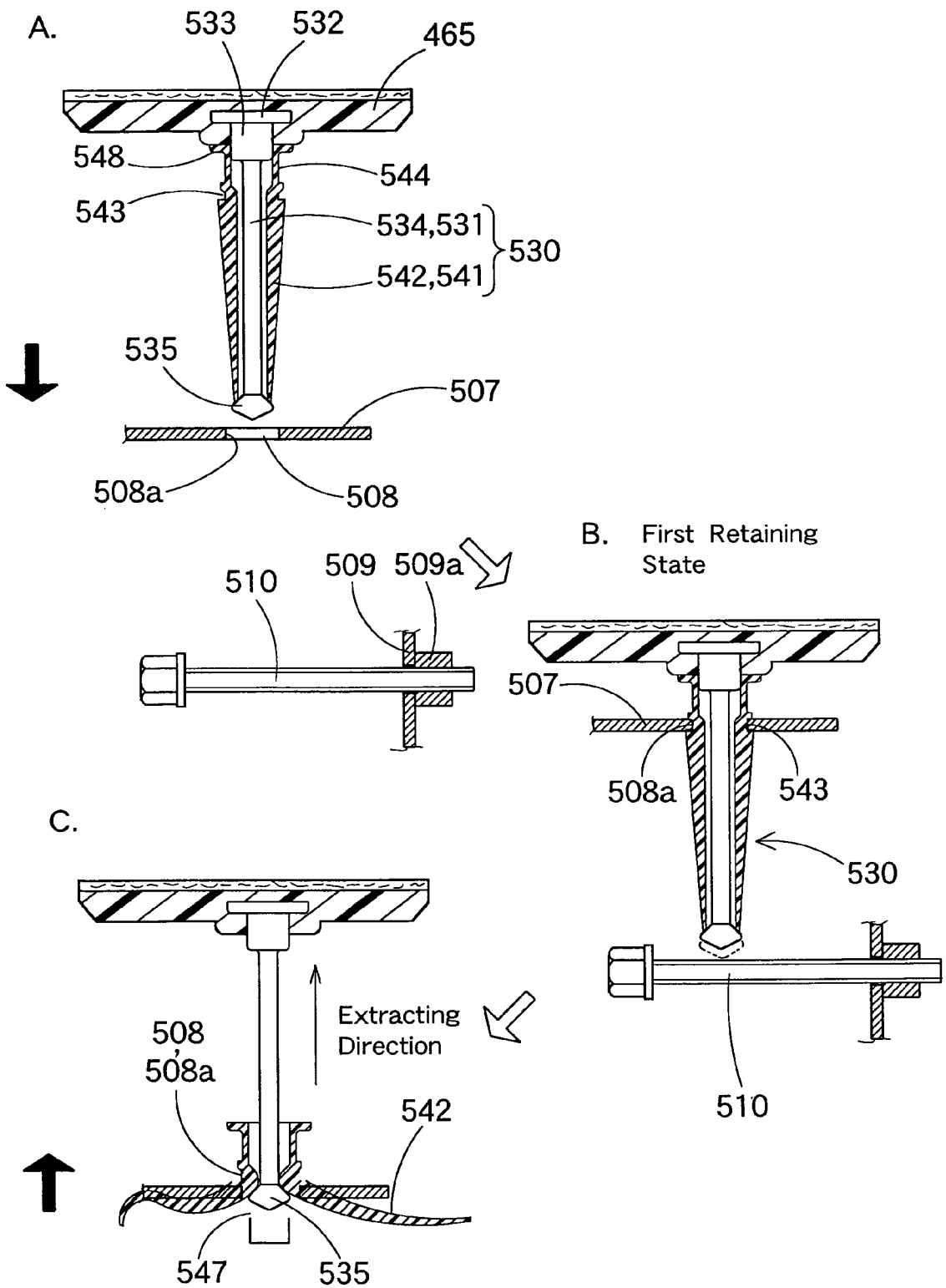
FIG. 94 presents enlarged sectional views for explaining the used state (or the first retaining state) of the clip of the thirteenth embodiment.

Moreover, in case the door portion 465 of the airbag cover 463 is made separate, the construction may be modified into a knee protecting airbag device M13 of a thirteenth embodiment shown in FIGS. 89 and 90. This airbag device M13 has similar parts to those of the tenth embodiment shown in FIGS. 78 to 80. However, the difference from the tenth embodiment resides in that the door portion 465 of the airbag cover 463 is made separate of the body portion 464, and in that clips 530 are used in place of the angle regulating member of the door portion 465. Therefore, the description of the inflator 21, the airbag 26, the case 419 and so on is omitted by designating them the same reference numerals as those of the tenth embodiment.

The clips 530 are arranged near the left and right edges of the door portion 465. Each clip 530 is inserted into the retaining hole 508 of the bracket 507 and is retained on the bracket 507. This bracket 507 is fixed on each of the left and right sides of the case 419. In the case 419, there is arranged a stopper 510 on the extension of the clip 530 retained on each bracket 507. The stopper 510 is attached to a bracket 509 fixed on each of the left and right sides of the case 419. On each bracket 509, there is fixed a nut 509a, and the stopper 510 is fastened on each nut 509a. Here, the stopper 501 is to be removed for maintenance and so on when the door portion 465 is removed.

Each clip 530 is composed, as shown in FIGS. 89 to 93, of a retaining core portion 531 and a cap 541 to be mounted on the retaining core portion 531.

The retaining core portion 531 is made of a metal such as a rigid steel rod and is provided with a connection portion 532, a diametrically larger portion 533, a neck portion 534 and a head portion 535. The connection portion 532 is formed into a disc shape and is buried in and connected to the door portion 465. The diametrically larger portion 533 is formed into a column shape leading to the connection portion 532, and the neck portion 534 is protruded from the end face of the diametrically larger portion 533 in a column shape with a smaller diameter. The head portion 535 is connected to the leading end portion 534a of the neck portion 534 and is given a larger diameter than that of the neck portion 534. This head portion 535 is provided with a converging portion 535a and a diverging portion 535b. The diverging portion 535b is arranged on the root side and is diverged to the leading end. The converging portion 535a is arranged on the leading end side and is converged to the leading end.

The cap 541 is made of an elastically deformable synthetic resin such as polyamide (or 66 nylon) or thermoplastic elastomer of olefin, or rubber. The cap 541 is formed into a generally cylindrical shape and is converged with a thicker leading end. As shown in FIGS. 89, 90 and 92 to 94, the cap 541 covers, when mounted on the retaining core portion 531, the area from the vicinity of the diametrically larger portion 533 to the root portion (or the diverging portion 535b) of the head portion 535, and is retained on the head portion 535. At this time, an annular flange portion 548 located at the end portion on the root side abuts against the door portion 465, and the leading end covers so far as the vicinity of a head portion 535 of the retaining core portion 531.

Moreover, the cap 541 is provided with a retaining/fixing portion 542 on the leading end side and a cylindrical portion 544 on the root side. The retaining/fixing portion 542 is formed into such a thick diverging shape as has a larger external diameter on the root portion. In the outer circumference between the cylindrical portion 544 and the retaining/fixing portion 542, moreover, there is formed a first groove 543. This first groove 543 fits the inner circumference portion 508a of the retaining hole 508. The cylindrical portion 544 has a larger internal diameter than the retaining/fixing portion 542. On the other hand, the cylindrical portion 544 is given an external diameter substantially equal to that of the bottom portion of the first groove 543. Moreover, the cap 541 is provided with a plurality of slits 547 extending from the leading end of the retaining/fixing portion 542 to the vicinity of the cylindrical portion 544.

This clip 530 is retained in the retaining hole 508 in two kinds of retaining states, i.e., the first retaining state and the second retaining state.

In the first retaining state, as shown in FIGS. 94A and 94B, the retaining core portion 531 having the cap 541 mounted thereon is inserted into the retaining hole 508 so that the inner circumference portion 508a of the retaining hole 508 is fitted in the first groove 543. In this first retaining state, when the clip 530 is pulled in an extracting direction from the retaining hole 508, the head portion 535 of the retaining core portion 531 moves to the vicinity of the first groove 543, as shown in FIG. 94C, while the cap 541 being retained by the bracket 507. This movement is easily done as the retaining/fixing portion 542 enlarges its internal diameter, because the slits 547 are arranged in the vicinity of the retaining/fixing portion 542. However, the retaining/fixing portion is made thicker near the first groove 543. Therefore, the head portion 535 of the retaining core portion 531 does not come out from the retaining/fixing portion 542 so that it does not go through the retaining hole 508. In short, in the first retaining state where the inner circumference portion 508a of the retaining hole 508 is fitted in the first groove 543 of the cap 541, the retaining core portion 531 is not pulled out from the retaining hole 508.

Here, FIG. 94C shows the state in which the retaining core portion 531 is to be linearly pulled out along the axial direction of the retaining hole 508. While being mounted on the vehicle, however, the retaining core portion 531 is moved in a rocking manner with its diametrically larger portion 533 being lower than the head portion 535.

Figure 95:
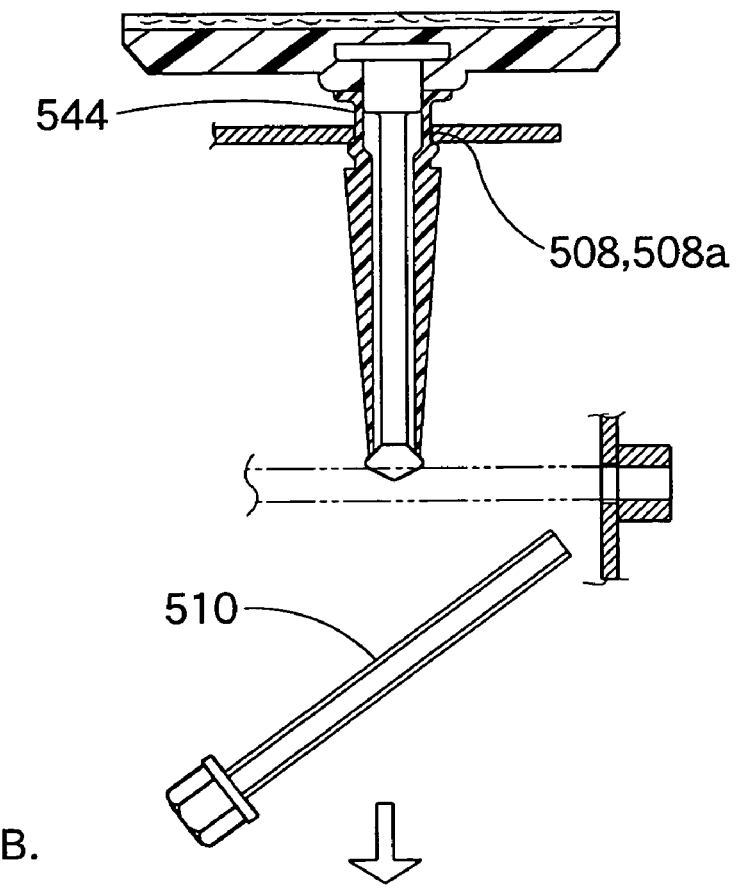
FIG. 95 presents enlarged sectional views for explaining the used state (or the second retaining state) of the clip of the thirteenth embodiment.
Figure 95:
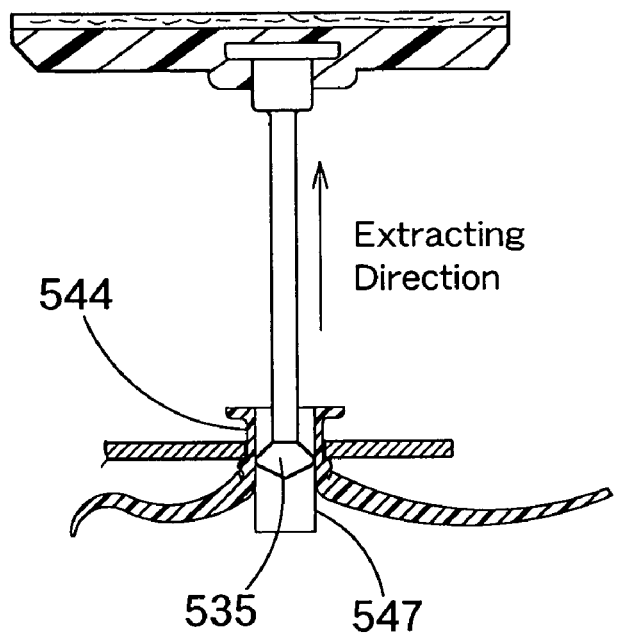

In the second retaining state, as shown in FIG. 95A, the cylindrical portion 544 is arranged at the inner circumference portion 508a of the retaining hole 508 by pushing the clip 530 into the retaining hole 508. In this second retaining state, when the clip 530 is pulled in the extracting direction from the retaining hole 508, the head portion 535 of the retaining core portion 531 can go through the retaining/fixing portion 542 while the cap 541 being retained by the bracket 507. At this time, the retaining/fixing portion 542 in the cap 541 has its thick root side disengaged from the retaining hole 508, so that the head portion 535 goes through the retaining/fixing portion 542 without any trouble. Moreover, the head portion 535 goes through the cylindrical portion 544 and is let off the bracket 507. In short, in the second retaining state where the cylindrical portion 544 of the cap 541 is arranged at the position of the retaining hole 508, the retaining core portion 531 can be extracted from the retaining hole 508.

Figure 96:
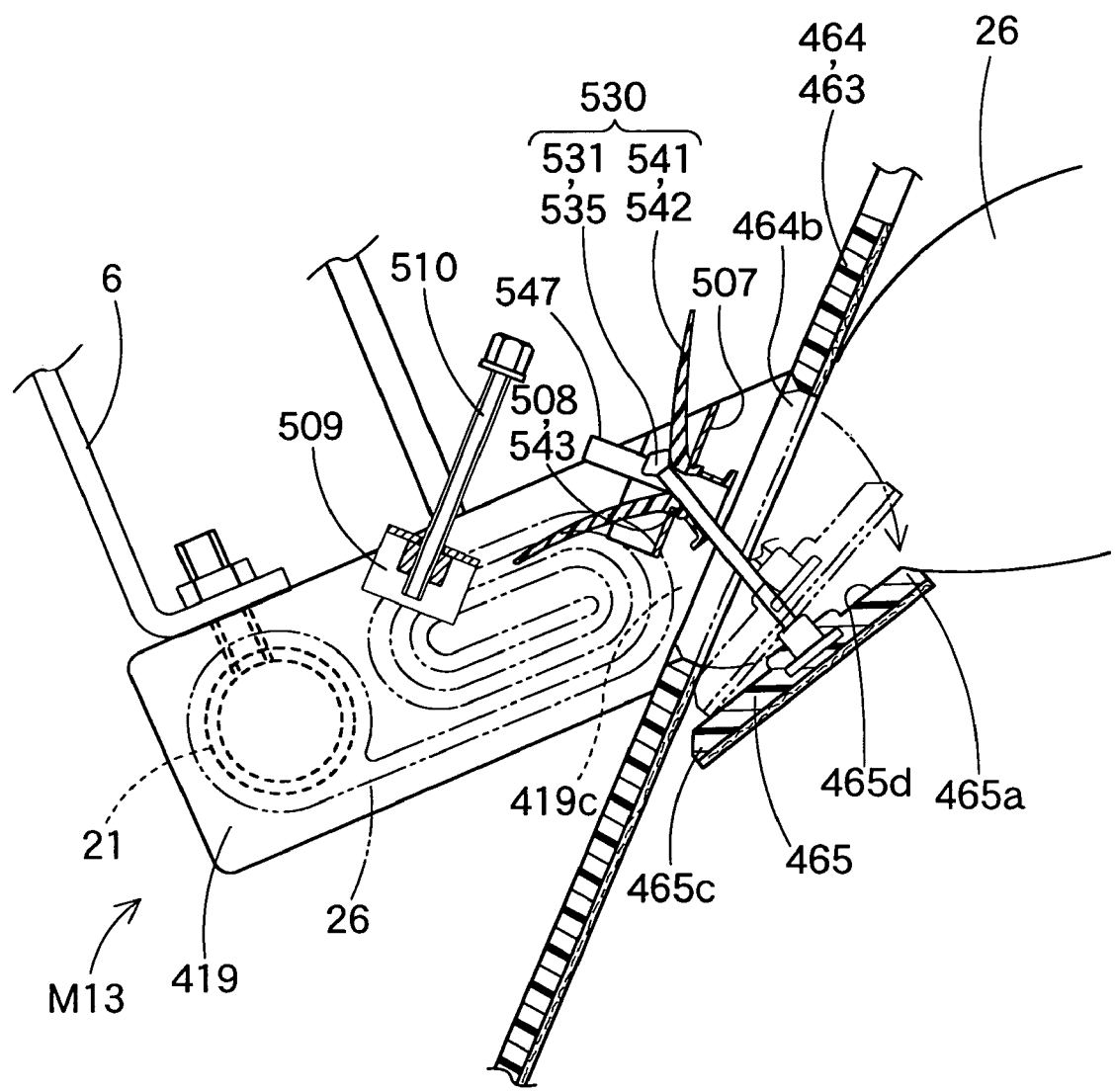
FIG. 96 is an enlarged sectional view showing the door portion of the thirteenth embodiment being opened.
Figure 97:
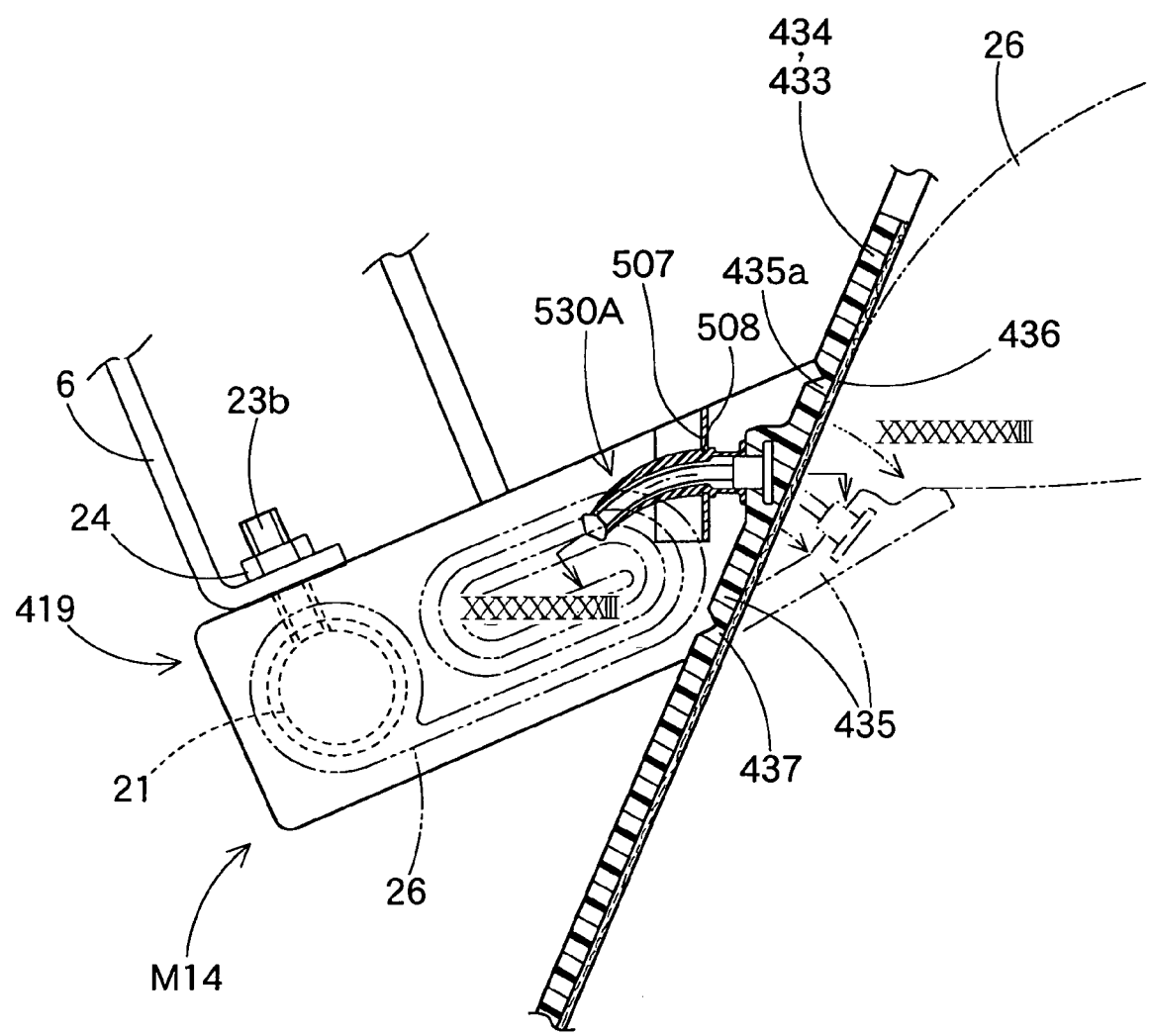
FIG. 97 is an enlarged sectional view of a knee protecting airbag device of a fourteenth embodiment.
Figure 98:
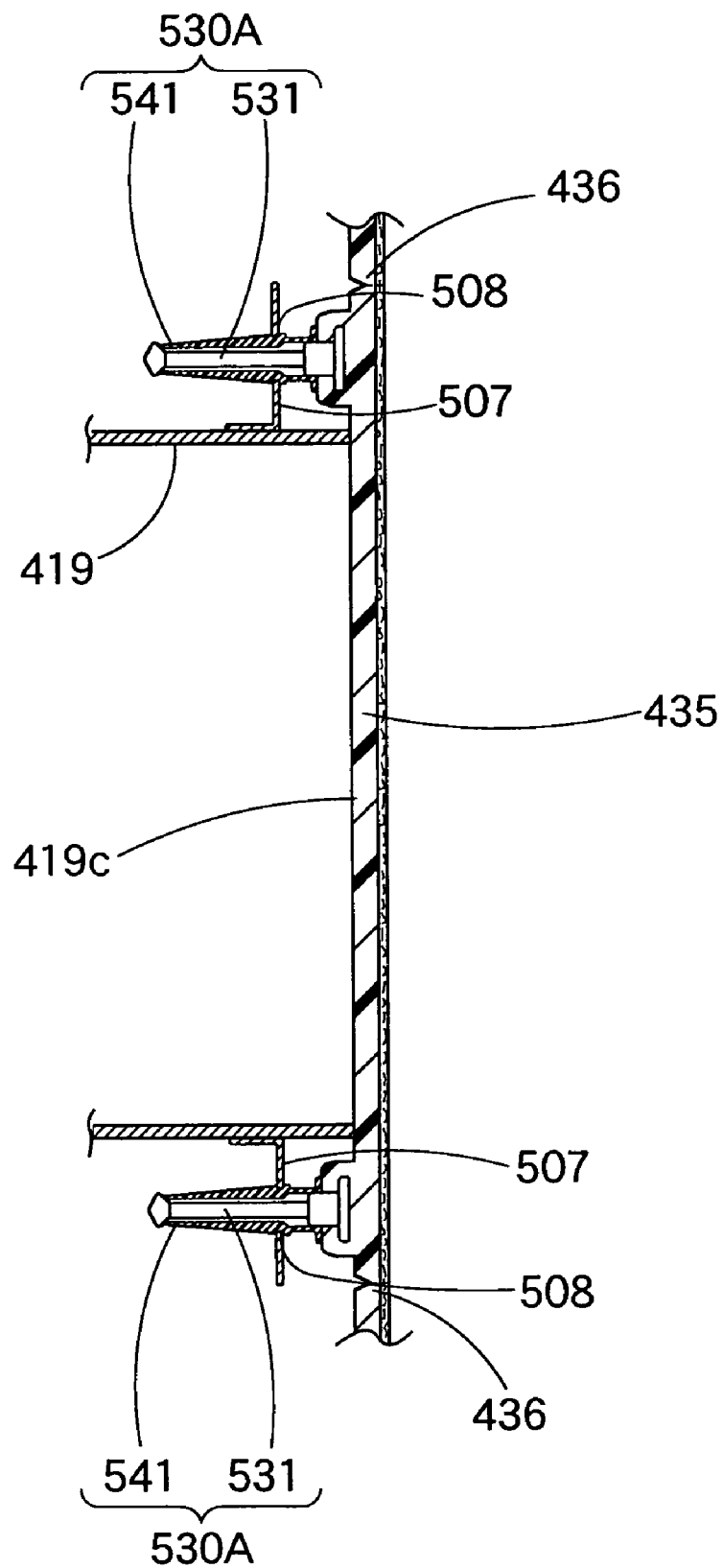
FIG. 98 is a sectional view of a portion XXXXXXXXXIII-XXXXXXXXXIII of FIG. 97.

As shown in FIGS. 89 and 90, the clip 530 is constructed such that the door portion 465 is connected to the case 419 in the first retaining state thereby to close the opening 464b of the airbag cover body portion 464. When the door portion 465 is to be opened by the push of the airbag 26 being expanded and inflated, as shown in FIGS. 89 and 96, it is opened to such an extent that the head portion 535 of the retaining core portion 531 comes close to the first groove 543 while being retained in the retaining hole 508. Specifically, by this moving stroke of the head portion 535, the door portion 465 is opened to protrude the airbag 26 from the openings 419c and 464b of the case 419 and the airbag cover body portion 464.

When the door portion 465 is to be removed for maintenances, on the other hand, the individual clips 530 are shifted to the second retaining state by removing the stopper 510 and by pushing the vicinity of the arrangement position of the clips 530 in the door portion 465 to the vehicular front side. If the door portion 465 is extracted, the retaining core portion 531 of each clip 530 is extracted from the retaining hole 508 while the vicinity of the cylindrical portion 544 of the cap 541 being retained on the peripheral edge of the retaining hole 508. After this, the cap 541 is extracted from the retaining hole 508 and is mounted on the retaining core portion 531.

At the normal time, there is arranged the stopper 510. Even if the door portion 465 is pushed to arrange the portion of the cylindrical portion 544 at the portion of the retaining hole 508, therefore, the head portion 535 of the retaining core portion 531 comes into abutment against the stopper 510, as indicated by double-dotted lines in FIG. 94B. Therefore, the clip 530 does not shift to the second retaining state.

The door portion 465 may be mounted on the case 419 by inserting each clip 530 into the retaining hole 508 while the cap 541 being fitted on each retaining core portion 531, and by fitting the inner circumference portion 508a of the retaining hole 508 in the first groove 543.

In the airbag device M13 of the thirteenth embodiment, moreover, the door portion 465 arranges its lower end 465c on the vehicular front side of and below the upper end 465a to close the opening 464b of the airbag cover body portion 464 and the opening 419c of the case 419. At the opening time, on the other hand, the clips 530 arranged on the left and right sides of the door portion 465 are connected to the generally vertical intermediate position of the door portion 465, not to the vertically upper side of the door portion 465. Moreover, the clips 530 are supported by the peripheral edge of the retaining hole 508, but can be moved in the axial direction of the retaining hole 508 and rocked in the vertical direction around the retaining hole 508. When the door portion 465 is pushed by the airbag 26 being expanded and inflated, therefore, the door 465 opens wider at the upper end 465a than at the lower end 465c. Therefore, the door portion 465 itself plays a role of a guide plate portion. Specifically, the door portion 465 guides the protruding direction of the airbag 26 along the column cover lower surface with its upper face (i.e., the face on the airbag side) being opened.

Here, the clips 530 of the thirteenth embodiment can be arranged on the door portions of the foregoing individual embodiments if the door portions are made separate.

In the clips 530 of the thirteenth embodiment, on the other hand, the retaining core portion 531 and the cap 541 are formed into a straight shape. Like clips 530A of a fourteenth embodiment shown in FIGS. 97 to 100, however, the retaining core portion 531 and the cap 541 may be made axially arcuate. This arc is made around the hinge portion 437 of the door portion 435.

Moreover, this knee protecting airbag device M14 of the fourteenth embodiment has a construction substantially similar to that of the airbag device M10 of the tenth embodiment shown in FIGS. 78 and 79. Specifically, the fourteenth embodiment uses the clips 530A in place of the link mechanisms 439 acting as the angle regulating member, and the description of the same members as those of the tenth embodiment will be omitted by designating them the common reference numerals.

Figure 99:
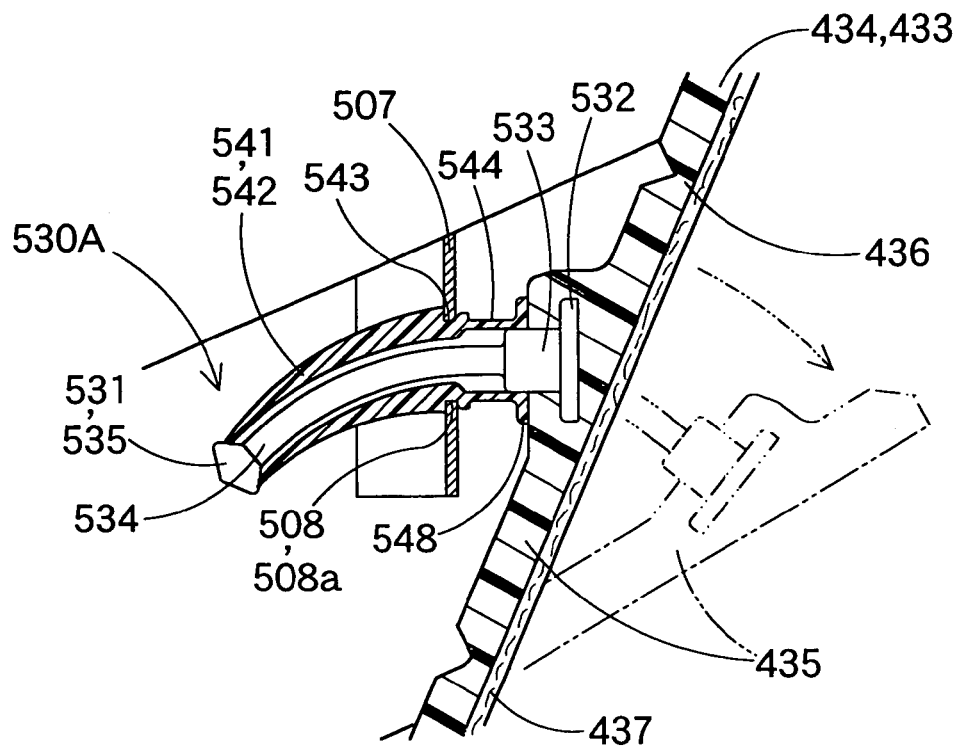
FIG. 99 is an enlarged sectional view of an angle regulating member of the fourteenth embodiment.
Figure 100:
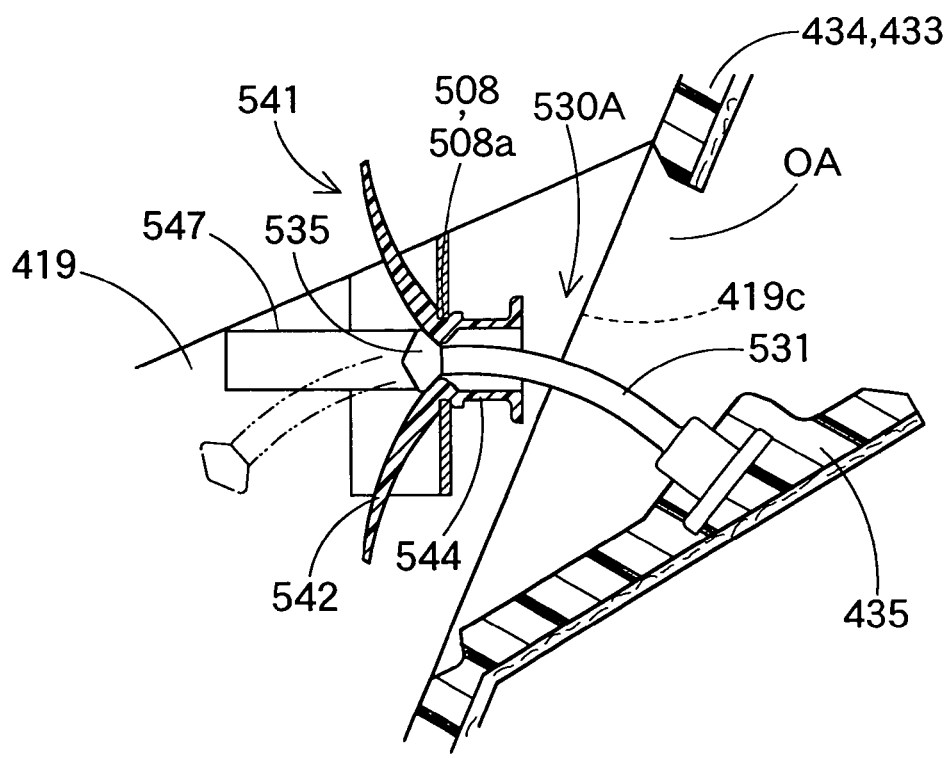
FIG. 100 is an enlarged sectional view of the angle regulating member of the fourteenth embodiment when a door portion is opened.

In the knee protecting airbag device M14 using the bent clip 530A, the head portion 535 of the retaining core portion 531 moves to the vicinity of the first groove 543 of the cap 541 thereby to regulate the opening angle of the door portion 435, as shown in FIGS. 99 and 100.

The bent clip 530A in the fourteenth embodiment may be used in the thirteenth embodiment together with the stopper 510.

The invention claimed is:

1. A knee-protecting airbag device for protecting knees of a driver, the airbag device being located below a column cover covering a steering column, the column cover protruding from an instrument panel and being inclined to rise upward toward a rear in such a manner that the front part of the column cover is located downward while the rear part of the column cover is located upward, the airbag device comprising:

an airbag; and a housing, wherein:

the airbag is folded and housed in the housing disposed inside the instrument panel disposed below the steering column;

when fed with inflation gas, the airbag expands and inflates in a clearance between the column cover and the driver's knees, and when having completed expansion and inflation, the airbag is configured into a generally plate shape covering an area from a front side to a rear end vicinity of the lower surface of the column cover;

the airbag includes a column cover side wall arranged toward the column cover and a driver's side wall arranged toward the driver;

in a flatly developed state where the driver's side wall and the column cover side wall are overlaid one on the other, the lateral width of the airbag is greater than the lateral width of the housing;

a lower part of the airbag serves as an upstream portion of the inflation gas whereas the upper part of the airbag serves as a downstream portion of the inflation gas; and the airbag includes a gas flow regulating member directing the inflation gas in the upstream portion such that the lateral width of the lower part of the airbag is increased, and then directing the gas toward the downstream portion such that the upper part of the airbag is inflated.

2. The knee-protecting airbag device according to claim 1 wherein:
the airbag internally comprises a thickness regulating means for regulating the thickness of the airbag by connecting the column cover side wall and the driver's side wall such that the airbag is inflated in a generally plate shape.

3. The knee-protecting airbag device according to claim 2, wherein:
the thickness regulating means is a tether arranged along the transverse direction of the airbag to partition the upstream portion and downstream portion, whereby serving also as the gas flow regulating member.

4. The knee-protecting airbag device according to claim 3, wherein:
the tether serving as the thickness regulating means as well as the gas flow regulating member is arranged in such a manner as to provide a gas communication hole each in a right region and a left region of the airbag such that the gas is fed to the downstream portion from the upstream portion through the hole.

5. The knee-protecting airbag device according to claim 3, wherein:
when the airbag is completely inflated and expanded,
the tether serving as the thickness regulating means as well as the gas flow regulating member is disposed at a position outside the housing and near the housing; and
a portion of the airbag around where the tether is disposed has a greater lateral width than the lateral width of the housing.

6. The knee-protecting airbag device according to claim 3, wherein:
when the airbag is completely inflated and expanded, the tether serving as the thickness regulating means as well as the gas flow regulating member is arranged in an area disposed in front of legs of the driver and below an area for protecting knees of the driver.

7. The knee-protecting airbag device according to claim 6, wherein:
the tether serving as the thickness regulating means as well as the gas flow regulating member is a first tether;
the airbag comprises a second tether connecting the column cover side wall and the driver's side wall to regulate the thickness of the airbag, the second tether being arranged above the first tether along the lateral direction of the airbag in the area in front of driver's legs, such that, upon airbag inflation, the area of the airbag disposed in front of driver's legs has a reduced thickness compared with the area for protecting driver's knees.

8. The knee-protecting airbag device according to claim 1, wherein:
before being housed in the housing, the airbag is folded through two folding steps: a roll-folding step where the airbag is roll-folded from an upper end thereof toward the column cover side wall in order to reduce the vertical dimension of the airbag; and a longitudinal folding step where left and right edges of the airbag are brought toward the center of the airbag for reducing the lateral width of the airbag, such that the airbag rises along the lower surface of the column cover upon deployment.

* * * * *